(12) United States Patent  
Ren

(10) Patent No.: US 8,635,123 B2  
(45) Date of Patent: Jan. 21, 2014

(54) SYSTEMS AND METHODS FOR MANAGING SUPPLIER INFORMATION BETWEEN AN ELECTRONIC PROCUREMENT SYSTEM AND BUYERS' SUPPLIER MANAGEMENT SYSTEMS

(75) Inventor: Tom Yitao Ren, Bellaire, TX (US)

(73) Assignee: SciQuest, Inc., Cary, NC (US)

( * ) Notice: Subject to any disclaimer, the term of this patent is extended or adjusted under 35 U.S.C. 154(b) by 56 days.

(21) Appl. No.: 13/088,235

(22) Filed: Apr. 15, 2011

(65) Prior Publication Data

US 2011/0258083 A1 Oct. 20, 2011

Related U.S. Application Data

(60) Provisional application No. 61/325,297, filed on Apr. 17, 2010.

(51) Int. Cl.
*G06Q 30/00* (2012.01)
*G06Q 30/06* (2012.01)

(52) U.S. Cl.
CPC ........ *G06Q 30/0641* (2013.01); *G06Q 30/0633* (2013.01); *G06Q 30/0603* (2013.01)
USPC .......................... 705/27.1; 705/26.1; 705/26.8

(58) Field of Classification Search
USPC ........................................ 705/26.1, 26.8, 27.1
See application file for complete search history.

(56) References Cited

U.S. PATENT DOCUMENTS

| | | | | |
|---|---|---|---|---|
| 5,319,542 | A * | 6/1994 | King et al. | 705/26.81 |
| 7,254,581 | B2 * | 8/2007 | Johnson et al. | 707/627 |
| 7,937,294 | B1 * | 5/2011 | Murray et al. | 705/26.2 |
| 8,290,833 | B2 * | 10/2012 | Yang et al. | 705/28 |
| 2001/0034673 | A1 * | 10/2001 | Yang et al. | 705/28 |
| 2002/0087439 | A1 * | 7/2002 | Lambert et al. | 705/29 |
| 2002/0133479 | A1 * | 9/2002 | Dippold | 707/1 |
| 2003/0236718 | A1 * | 12/2003 | Yang et al. | 705/28 |
| 2004/0143516 | A1 * | 7/2004 | Hastie et al. | 705/27 |
| 2004/0220815 | A1 * | 11/2004 | Belanger et al. | 705/1 |
| 2004/0267614 | A1 * | 12/2004 | Chan et al. | 705/14 |

OTHER PUBLICATIONS

Gonsalves, Antone, "Saqqara Systems to Launch Hosted Service," TechWeb, Apr. 19, 2002.*

* cited by examiner

*Primary Examiner* — Amee A Shah
(74) *Attorney, Agent, or Firm* — Morgan, Lewis & Bockius LLP

(57) ABSTRACT

A system and method provide an efficient and simple procurement process that is easily customizable and allows the automatic mapping of supplier information and catalogs according to the buyer/purchasing organization's internal data schema used for representing such data, and updates the buyer/purchasing organization's hosted supplier information and catalogs automatically. In an exemplary embodiment, access to an electronic procurement system is requested, a supplier provides supplier data through a graphical user interface (GUI) for storage in one or more databases of an electronic procurement system, the supplier designates a subset of the supplier data as protected supplier data, and conveniently selects one or more buyer organization's supplier management systems to receive the provided supplier data.

13 Claims, 126 Drawing Sheets

PROFILE | LOGOUT

USER MANAGEMENT - HR CONFIGURATION

| HOME | MY FAVORITES | PRODUCT SEARCH | CARTS | APPROVALS | HISTORY | SETTLEMENT |

SEARCH FOR [SUPPLIER PROFILE ▽] [ 6 ITEM(S). ] GO

[USER MGT ▽]

USERS | REGISTRATIONS | USER IMPORT | HR CONFIGURATION |

CLICK ON A DEPARTMENT NAME BELOW TO MANAGE ITS POSITIONS' ROLES. A POSITION MAY HAVE NO ROLES ASSOCIATED WITH IT. ASSIGN POSITIONS TO DEPARTMENTS UNDER THE POSITIONS TAB. ASSIGN PERMISSIONS TO ROLES UNDER THE ROLES TAB.

DEPARTMENTS ADMIN | POSITIONS | ROLES | RELATIONSHIP ⟵ 448

⟵ 440

[APPLY ALL CHANGES]

| SELECT A DEPARTMENT | POSITIONS OF DEPARTMENT | SELECTED ROLES | MOVE | AVAILABLE ROLES |
|---|---|---|---|---|
| ENGINEERING | | | | CTRL + SHIFT TO SELECT MULTIPLE |
| IT | PROFESSOR | APPROVER | | ACCOUNTING |
| LEGAL | | REQUISITIONER | ▽ △ | ADMINISTRATOR |
| MATH | | | | APPROVER |
| MIRCOBIOLOGY | RESEARCHER | REQUISITIONER | | CATALOG MANAGER |
| PRODUCT MANAGEMENT | | | ▽ △ | CHEMICALMANAGEMENTONLY |
| PURCHASING | | | | FINANCIAL SEARCHVIEW |
| TECH PUBS DEPT | | | | JUNIOR ADMIN |
| TRAINING | | | | JUNIOR ADMIN 2 |
| | | | | JUNIOR EDITOR |
| | | | | LBM ADMINISTRATOR |
| | | | | LCM ADMIN |
| | | | | LEGAL |

[SAVE RELATIONSHIP]

PROFILE | LOGOUT

USER MANAGEMENT - HR CONFIGURATION          SEARCH FOR [SUPPLIER PROFILE ▼]   6 ITEM(S) [▼]

HOME | MY FAVORITES | PRODUCT SEARCH | CARTS | APPROVALS | HISTORY | SETTLEMENT | USER MGT.
USERS | REGISTRATIONS | USER IMPORT | HR CONFIGURATION

CLICK ON A ROLE NAME BELOW TO MODIFY IT, OR SELECT A ROLE AND CLICK "ADD CHILD ROLE"
TO CREATE A NEW SUB-ROLE. TO CREATE A NEW TOP-LEVEL ROLE, CLICK ON "ROLES" BEFORE
CLICKING "ADD CHILD ROLE."
NOTE: ONCE YOU CLICK "ADD CHILD ROLE" YOU CANNOT DELETE THE NEW ROLE, ONLY INACTIVATE IT.

DEPARTMENTS ADMIN POSITIONS ROLES RELATIONSHIP

[ADD CHILD ROLE]

SELECT A ROLE TO EDIT          SELECTED ROLE: ADMINISTRATOR
OR CREATE NEW ROLES

ROLES                          ROLE PROPERTIES PURCHASING PERMISSIONS MATERIALS MGT HISTORY
- ADMINISTRATOR                SHOPPING/CART | ORDERS | APPROVALS | ACCOUNTS PAYABLE | ADMINISTRATION | MATERIALS MGT | CUSTOM FIELDS PERMISSIONS ?
  + JR ADMIN
    └ JR ADMIN 3                                                                                             ~ 446c
    └ LCM ADMIN
  └ APPROVER                   | PERMISSION | VALUE | OVERRIDE PERMISSION |
  └ CATALOG MANAGER             |------------|-------|---------------------|
  └ CHEMICAL MANAGEMENT ONLY   | SYSTEM ADMINISTRATION | | |
  + JUNIOR EDITOR              | ADMINISTRATION | ☑ | |
  └ LBM ADMINISTRATOR          | FIELD MANAGEMENT | ☑ | ☐ |
  └ LEGAL                      | LIST MANAGEMENT | ☑ | ☐ |
  └ RECEIVING                  | CUSTOM FIELD MANAGEMENT | ☑ | ☐ |
  + REQUISITIONER              | ADDRESS MANAGEMENT | ☑ | ☐ |
  └ RESEARCHER - DO NOT TOUCH  | MANAGE SHARED WORKFLOW FOLDERS | ☑ | ☐ |
  └ SENIOR EDITOR              | CATALOG MANAGEMENT | ☑ | ☐ |
  + SENIOR TECHNICAL WRITER    | SYSTEM CONFIGURATION | ☑ | ☐ |
  └ SUPPLIER                   | LICENSE | | ☐ |
                               | TRANSACTION REPORTS | ☑ | ☐ |
                               | CATALOG REPORTS | ☑ | ☐ |
                               | USAGE REPORTS | | ☐ |
                               | CONSORTIUM REPORTS | ☑ | ☐ |

| PERMISSION | VALUE | OVERRIDE PERMISSION |
|------------|-------|---------------------|
| USER ADMINISTRATION | | |
| VIEW MY PROFILE | ☑ | ☐ |
| EDIT MY PROFILE | ☑ | ☐ |
| CHANGE PASSWORD | ☑ | ☐ |
| EDIT PERSONAL INFORMATION | ☑ | ☐ |
| VIEW ALL USER PROFILES | ☑ | ☐ |
| EDIT ALL USER PROFILES/ROLES/PERMISSIONS | ☑ | ☐ |
| EDIT ROLES/DEPTS/RELATIONSHIPS | ☐ | ☐ |
| EDIT MY SUPERVISOR FOR APPROVALS | ☐ | ☐ |
| EDIT USER'S FINANCIAL APPROVERS | ☐ | ☐ |
| CUSTOMIZE NAVIGATION | ☑ | ☐ |

[APPLY ALL CHANGES]

FIG. 4P

| | |
|---|---|
| MANAGE ORGANIZATIONAL RAM LICENSE | ☐ |
| VIEW RAD SUMMARY ACTION IN PR/PO | ☐ |
| SUPPLIES MANAGER | |
| CREATE SUPPLIES ITEM | ☐ |
| ASSIGN APPROVER FOR SUPPLIES ITEM RECORD | ☐ |
| APPROVE SUPPLIES ITEM RECORD | ☐ |
| QUICK CREATE SUPPLIES | ☐ |
| IMPORT SUPPLIES | ☐ |
| EXPORT SUPPLIES | ☐ |
| EDIT APPROVED SUPPLIES ITEM RECORD | ☐ |
| SEARCH/VIEW SUPPLIES ITEMS AND INVENTORY | ☐ |
| SEARCH/ORDER SUPPLIES FROM INVENTORY | ☐ |
| BULK IMPORT SUPPLIES RECORDS | ☐ |
| ATTACH FILES/URLS IN MATERIALS MGMT | ☐ |
| VIEW REPLENISHMENT REPORT | ☐ |
| CYCLE COUNTING | ☐ |
| ADMINISTRATION | |
| LOCATION CONFIGURATION | ☐ |
| BULK IMPORT LOCATIONS | ☐ |
| CONTAINER CONFIGURATION | ☐ |
| PRINTER CONFIGURATION | ☐ |
| KIOSK ADMINISTRATION | ☐ |
| CYCLE COUNTING ADMINISTRATION | ☐ |
| FULFILLMENT CONFIGURATION | ☐ |
| PRICING MANAGEMENT | ☐ |

[UPDATE]

| Time | User | Action | Category | Detail | | Value | |
|---|---|---|---|---|---|---|---|
| 3:34 PM | NEIL | PUNCHOUT ACCESS REMOVED | PUNCHOUT ACCESS | GATEWAY, INC. | | | |
| 3:34 PM | NEIL | PUNCHOUT ACCESS ADDED | PUNCHOUT ACCESS | XEROX | | | |
| 3:34 PM | NEIL | PUNCHOUT ACCESS ADDED | PUNCHOUT ACCESS | FISCHER SCIENTIFIC | | | |
| 3:34 PM | NEIL | PUNCHOUT ACCESS ADDED | PUNCHOUT ACCESS | WEST PRESS | | | |
| 3:34 PM | NEIL | PUNCHOUT ACCESS ADDED | PUNCHOUT ACCESS | IKON OFFICE PRODUCTS | | | |
| 7:49 AM | CHRISTINE | MODIFIED | PERMISSIONS: CART/REQUISITION | MODIFY PO | VALUE | FALSE (INHERITED) | FALSE |
| 7:49 AM | CHRISTINE | MODIFIED | PERMISSIONS: CART/REQUISITION | CLAUSES IN PR/PO | VALUE | FALSE (INHERITED) | FALSE |
| 7:49 AM | CHRISTINE | MODIFIED | PERMISSIONS: CART/REQUISITION | WITHDRAW PR | VALUE | FALSE (INHERITED) | FALSE |
| 7:49 AM | CHRISTINE | MODIFIED | PERMISSIONS: CART/REQUISITION | BYPASS REVIEW | VALUE | FALSE (INHERITED) | FALSE |
| 7:49 AM | CHRISTINE | MODIFIED | PERMISSIONS: CART/REQUISITION | ALLOW EDITING OF TAX, SHIPPING, AND HANDLING | VALUE | FALSE (INHERITED) | FALSE |
| 7:49 AM | CHRISTINE | MODIFIED | PERMISSIONS: CART/REQUISITION | LINE-LEVEL EXTERNAL ATTACHMENTS | VALUE | FALSE (INHERITED) | FALSE |
| 7:49 AM | CHRISTINE | MODIFIED | PERMISSIONS: CART/REQUISITION | VIEW SENSITIVE CREDIT CARD DETAILS | VALUE | FALSE (INHERITED) | FALSE |
| 7:49 AM | CHRISTINE | MODIFIED | PERMISSIONS: CART/REQUISITION | SELECT CREDIT CARD FROM PROFILE | VALUE | FALSE (INHERITED) | FALSE |
| 7:49 AM | CHRISTINE | MODIFIED | PERMISSIONS: CART/REQUISITION | MANUALLY OVERRIDE PRICING | VALUE | FALSE (INHERITED) | FALSE |
| 7:49 AM | CHRISTINE | MODIFIED | PERMISSIONS: CART/REQUISITION | EDIT CREDIT CARD | VALUE | FALSE (INHERITED) | FALSE |
| 7:49 AM | CHRISTINE | MODIFIED | PERMISSIONS: CART/REQUISITION | EDIT PO NUMBER | VALUE | FALSE (INHERITED) | FALSE |
| 7:49 AM | CHRISTINE | MODIFIED | PERMISSIONS: CART/REQUISITION | EDIT USER'S CART ASSIGNEES | VALUE | FALSE (INHERITED) | FALSE |
| 7:49 AM | CHRISTINE | MODIFIED | PERMISSIONS: CART/REQUISITION | ASSIGN CART TO ANOTHER USER | VALUE | FALSE (INHERITED) | FALSE |
| 7:49 AM | CHRISTINE | MODIFIED | PERMISSIONS: CART/REQUISITION | DO NOT PERMIT PLACE ORDER | VALUE | FALSE (INHERITED) | FALSE |

HOME | MY FAVORITES | PRODUCT SEARCH | CARTS | APPROVALS | HISTORY | SETTLEMENT

PROFILE | LOGOUT

SEARCH FOR SUPPLIER PROFILE ▽   | 6 ITEM(S)

MY PROFILE — 520

USER SETTINGS | PURCHASING | PERMISSIONS | MATERIALS MGT | HISTORY — PROFILE ▽
520a — 520b

CUSTOM FIELDS | FINANCIAL APPROVERS | PURCHASING | APPROVAL LIMITS | ADDRESSES | PRODUCT VIEWS | PUNCHOUT ACCESS
520c — 520d — 520e — 520f

CHANGE PASSWORD

| LIMIT | VALUE | OVERRIDE ROLE |
|---|---|---|
| REQUISITION LIMIT | 100 | ☐ |
| REQUISITION LINE ITEM LIMIT | 50 | ☐ |
| REQUISITION APPROVAL LIMIT | 200 | ☐ |
| REQUISITION LINE ITEM APPROVAL LIMIT | 100 | ☐ |
| PURCHASE ORDER LIMIT | 0 | ☐ |
| PURCHASE ORDER LINE ITEM LIMIT | 0 | ☐ |
| PURCHASE ORDER APPROVAL LIMIT | 0 | ☐ |
| PURCHASE ORDER LINE ITEM APPROVAL LIMIT | 0 | ☐ |
| LIMITED PURCHASE ORDER LIMIT | 0 | ☐ |
| LINE ITEM LIMITED PURCHASE ORDER LIMIT | 0 | ☐ |

[SAVE]

PROFILE | LOGOUT

🛒 6 ITEM(S) | SEARCH FOR SUPPLIER PROFILE ▷ | GO ⊗ ?

HOME | MY FAVORITES | PRODUCT SEARCH | CARTS | APPROVALS | HISTORY | PROFILE ▷

USER SETTINGS | PURCHASING | PERMISSIONS | MATERIALS MGT | HISTORY | CHANGE PASSWORD

SHOPPING/CART | ORDERS | APPROVALS | ACCOUNTS PAYABLE | ADMINISTRATION | MATERIALS MGT | CUSTOM FIELDS PERMISSIONS  ?

530

MY ORDERS/ORGANIZATION ORDERS

| PERMISSION | VALUE | OVERRIDE ROLE |
|---|---|---|
| VIEW MY ORDERS | ✓ | ☐ |
| VIEW ORGANIZATION ORDERS | ✓ | ☐ |
| EDIT ORGANIZATION ORDERS | ✓ | ☐ |
| REVISE PO | X | ☐ |
| CLOSE PURCHASE ORDERS | X | ☐ |
| OPEN PURCHASE ORDERS | X | ☐ |
| RESEND PO TO SUPPLIER | ✓ | ☐ |
| EXPORT SEARCH RESULTS | X | ☐ |
| MANAGE COMPANY EXPORTS | | |
| MANAGE ORDER FAILURE NOTIFICATIONS | X | ☐ |

ORDER FULFILLMENT

| PERMISSION | VALUE | OVERRIDE ROLE |
|---|---|---|
| FORWARD FULFILLMENT PURCHASE ORDER | X | ☐ |
| FULFILL ORDERS | X | ☐ |
| DELEGATE FULFILLMENT PURCHASE ORDERS TO ANOTHER APPROVER | | ☐ |

[SAVE]

| | | PROFILE | LOGOUT | | | | |
|---|---|---|---|---|---|---|---|
| W@@t Organization | MY PROFILE | | | | | 6 ITEM(S) | |
| HOME | MY FAVORITES | PRODUCT SEARCH | CARTS | APPROVALS | HISTORY | SEARCH FOR SUPPLIER PROFILE ▽ | |

USER SETTINGS | PURCHASING | PERMISSIONS | MATERIALS MGT | HISTORY | PROFILE ▽ | CHANGE PASSWORD
SHOPPING/CART | ORDERS | APPROVALS | ACCOUNTS PAYABLE | ADMINISTRATION | MATERIALS MGT | CUSTOM FIELDS PERMISSIONS

~530

| PERMISSION | VALUE | OVERRIDE ROLE |
|---|---|---|
| BUDGET | | |
| VIEW BUDGET DETAILS | ✗ | ☐ |
| CREATE/EDIT BUDGET DETAILS | ✗ | ☐ |

| PERMISSION | VALUE | OVERRIDE ROLE |
|---|---|---|
| SETTLEMENT MANAGER | | |
| CREATE/VIEW RECIEPTS | ✓ | ☐ |
| ENABLE BLIND RECEIVING -(HIDE ORDER QUANTITY DURING RECEIVING) | ✗ | ☐ |
| VIEW INVOICES | ✓ | ☐ |
| CREATE/EDIT INVOICES | ✓ | ☐ |
| SET INVOICE AS PAYABLE | ✓ | ☐ |
| SET INVOICE AS PAID | ✓ | ☐ |
| MATCH DOCUMENTS WITHIN TOLERENCES | ✗ | ☐ |
| FORCE MATCH DOCUMENTS | ✗ | ☐ |
| UNMATCH DOCUMENTS | ✗ | ☐ |
| RESEND INVOICES TO EXTERNAL SYSTEM | ✗ | ☐ |

[SAVE]

| PERMISSION | VALUE | OVERRIDE ROLE |
|---|---|---|
| CHEMICAL MANAGER | | |
| CREATE CHEMICAL ITEM | xxxxxxxxxxx | ☐☐☐☐☐☐☐☐☐☐☐☐ |
| ASSIGN APPROVER FOR CHEMICAL ITEM RECORD | | |
| APPROVE CHEMICAL ITEM RECORD | | |
| QUICK CREATE CHEMICAL | | |
| IMPORT CHEMICAL | | |
| EXPORT CHEMICAL | | |
| EDIT APPROVED CHEMICAL ITEM RECORD | | |
| SEARCH/VIEW CHEMICAL ITEMS AND CONTAINERS | | |
| SEARCH/ORDER CHEMICAL FROM INVENTORY | | |
| BULK IMPORT CHEMICAL RECORDS | | |
| MANAGE ORGANIZATIONAL RAM LICENSE | | |
| VIEW RAD SUMMARY ACTION IN PR/PO | | |
| SUPPLIES MANAGER | | |
| CREATE SUPPLIES ITEM | xxxxxxxxxx | ☐☐☐☐☐☐☐☐☐ |
| ASSIGN APPROVER FOR SUPPLIES ITEM RECORD | | |
| APPROVE SUPPLIES ITEM RECORD | | |
| QUICK CREATE SUPPLIES | | |
| IMPORT SUPPLIES | | |
| EXPORT SUPPLIES | | |
| EDIT APPROVED SUPPLIES ITEM RECORD | | |
| SEARCH/VIEW SUPPLIES ITEMS AND INVENTORY | | |
| SEARCH/ORDER SUPPLIES FROM INVENTORY | | |
| BULK IMPORT SUPPLIES RECORDS | | |

| PERMISSION | VALUE | OVERRIDE ROLE |
|---|---|---|
| CONTAINER/INVENTORY MANAGEMENT | | |
| OWN INVENTORY | xxxxxxxxxx | ☐☐☐☐☐☐☐☐☐☐☐ |
| MARK FOR DISPOSAL | | |
| DISPOSE | | |
| REASSIGN | | |
| CORRECT AMOUNT/QUANTITY | | |
| UPDATE | | |
| HISTORY | | |
| CREATE NEW | | |
| RECORD USAGE | | |
| BULK IMPORT CONTAINERS | | |
| MISCELLANEOUS | | |
| PHYSICAL INVENTORY DETAILS SEARCH | xxxxx | ☐☐☐☐☐ |
| EXPORT INVENTORY SEARCH RESULTS | | |
| ATTACH FILES/URLS IN MATERIALS MGMT | | |
| VIEW REPLENISHMENT REPORT | | |
| CYCLE COUNTING | | |
| ADMINISTRATION | | |
| LOCATION CONFIGURATION | xxxxxxxxx | ☐☐☐☐☐☐☐☐ |
| BULK IMPORT LOCATIONS | | |
| CONTAINER CONFIGURATION | | |
| PRINTER CONFIGURATION | | |
| KIOSK ADMINISTRATION | | |
| CYCLE COUNTING ADMINISTRATION | | |
| FULFILLMENT CONFIGURATION | | |
| PRICING MANGEMENT | | |

FIG. 5M

| EQUIPMENT TAB | | | REQUISITION TYPE | | |
|---|---|---|---|---|---|
| VIEW PERSONAL LIST | ✓ | | VIEW PERSONAL LIST | ✓ | |
| EDIT PERSONAL LIST | ✓ | | EDIT PERSONAL LIST | ✓ | |
| VIEW ORGANIZATION VALUES | ✓ | | VIEW ORGANIZATION VALUES | ✓ | |
| CREATE VALUES FOR PERSONAL LIST | ✓ | | CREATE VALUES FOR PERSONAL LIST | ✓ | |
| FUND/GRANT (BG/DYN) | | | SEARCHABLE CUSTOM FIELD VALUES (51) | | |
| VIEW PERSONAL LIST | ✓ | ☐☐☐☐ | VIEW PERSONAL LIST | ✓ | ☐☐☐☐ |
| EDIT PERSONAL LIST | ✓ | | EDIT PERSONAL LIST | ✓ | |
| VIEW ORGANIZATION VALUES | ✓ | | VIEW ORGANIZATION VALUES | ✓ | |
| CREATE VALUES FOR PERSONAL LIST | ✓ | | CREATE VALUES FOR PERSONAL LIST | ✓ | |
| LOCATION | | | SERVICE REQUEST | | |
| VIEW PERSONAL LIST | ✓ | ☐☐☐☐ | VIEW PERSONAL LIST | ✗ | ☐☐☐☐ |
| EDIT PERSONAL LIST | ✓ | | EDIT PERSONAL LIST | ✗ | |
| VIEW ORGANIZATION VALUES | ✓ | | VIEW ORGANIZATION VALUES | ✗ | |
| CREATE VALUES FOR PERSONAL LIST | ✓ | | CREATE VALUES FOR PERSONAL LIST | ✗ | |
| ORGANIZATION (SB) | | | SERVICE REQUEST? | | |
| VIEW PERSONAL LIST | ✓ | ☐☐☐☐ | VIEW PERSONAL LIST | ✗ | ☐☐☐☐ |
| EDIT PERSONAL LIST | ✓ | | EDIT PERSONAL LIST | ✗ | |
| VIEW ORGANIZATION VALUES | ✓ | | VIEW ORGANIZATION VALUES | ✗ | |
| CREATE VALUES FOR PERSONAL LIST | ✓ | | CREATE VALUES FOR PERSONAL LIST | ✗ | |

[SAVE]

CONFIGURE MATCHING PARAMETERS BELOW. THESE PARAMETERS ARE APPLIED AT THE LINE ITEM LEVEL. TO NOT USE A PARAMETER, LEAVE IT BLANK. THESE TOLERANCES ARE ENFORCED BASED ON THE TYPE OF MATCHING PERFORMED AS CONFIGURED IN THE MATCHING PARAMETERS SECTION BELOW. SELECT THIS HELP TEXT FOR ADDITIONAL INFORMATION.

INVOICE QUANTITY DIFFERENCE>=     % OF TOTAL QUANTITY    ☐

INVOICE EXTENDED PRICE>=     % OF TOTAL AMOUNT ___ USD    ☐

NOTIFY USER AT THE TIME OF INVOICE CREATION    ✗    ☐

MATCHING PARAMETERS

PARAMETERS RELATED TO MATCHING ARE CONFIGURED HERE. VALUES ARE SET ON THE ORGANIZATION SETUP>ORDRING SCREENS ARE THE DEFAULT VALUES FOR ALL SUPPLIERS. THESE VALUES ARE OVERRIDDEN BY SUPPLIER FULFILLMENT CENTER WITHIN THE SUPPLIER PROFILE. A THRESHOLD VALUE CAN BE ESTABLISHED TO ALLOW FOR TWO TYPES OF MATCHING BASED ON THE PO (OR INVOICE FOR 2 WAY MATCHING INVOICE-RECEIPT) TOTAL (NOT INCLUDING, SHIPPING, HANDLING, AND TAX). ONE TYPE OF MATCHING CAN BE USED AT OR BELOW THE THRESHOLD AND ANOTHER FOR ABOVE THE THRESHOLD. FOR ADDITIONAL INFORMATION ON EACH PARAMETER, SELECT THE PARAMETER NAME, THIS HELP TEXT, OR THE ?.

MATCHING THRESHOLD     100.00    ☑
AT OR BELOW THRESHOLD     3 WAY    ☑
ABOVE THRESHOLD     3WAY    ☑

SHIPPING, HANDLING & TAX PARAMETERS

IF SHIPPING, HANDLING, AND TAX ARE TO BE USED FOR MATCHING CALCULATIONS, SET THE PARAMETERS IN THIS SECTION. VALUES SET ON THE ORGANIZATION SETUP>ORDERING SCREENS ARE THE DEFAULT VALUES FOR ALL SUPPLIERS. THESE VALUES ARE OVERRIDDEN BY SUPPLIER FULFILLMENT CENTER WITHIN THE SUPPLIER PROFILE. SELECT TO INCLUDE SHIPPING, HANDLING, AND TAX AND THE ASSOCIATED TOLERANCES FOR MATCHING. NOTE: THE PERCENTAGE DIFFERENCE IS RELATIVE TO THE PO TOTAL (NOT INCLUDING S, H&T). FOR ADDITIONAL INFORMATION ON EACH PARAMETER, SELECT THE PARAMETER NAME, THIS HELP TEXT, OR THE ?.

INCLUDE SHIPPING, HANDLING & TAX    ✗    ☐
SHIPPING, HANDLING & TAX DIFFERENCE >=    % OF TOTAL AMOUNT ___ USD    ☐

[ SAVE ]

|    | PROFILE | LOGOUT | | | | 6 ITEM(S) |
|---|---|---|---|---|---|---|
| Weet Organization | BROWSE BY CATEGORY | | | SEARCH FOR SUPPLIER PROFILE ☐ | | |
| HOME | MY FAVORITES | PRODUCT SEARCH | CARTS | APPROVALS | HISTORY | SETTLEMENT | MORE >> ☐ |

SEARCH TOOLS | MY FAVORITES

CATEGORIES

CATEGORY SEARCH > FURNITURE > FURNITURE AND FURNISHINGS > ACCOMMODATION FURNITURE > OUTDOOR FURNITURE

⊞ LAB SUPPLIES
⊞ OFFICE COMPUTER
⊞ MRO / FACILITIES
⊞ FURNITURE
   ⊞ FURNITURE AND FURNISHINGS  VIEW (INCL. SUB-CATEGORIES)
      ⊞ ACCOMMODATION FURNITURE  VIEW (INCL. SUB-CATOGORIES)
         ⊞ BABY AND TODDLER FURNITURE AND ACCESSORIES  VIEW (INCL. SUB-CATEGORIES)
         ⊞ FURNITURE  VIEW (INCL. SUB-CATEGORIES)
         ⊞ GENERAL FURNITURE PARTS AND ACCESSORIES  VIEW (INCL. SUB-CATEGORIES)
         ⊞ OFFICE FURNITURE  VIEW (INCL. SUB-CATEGORIES)
         ⊞ OUTDOOR FURNITURE  VIEW (INCL. SUB-CATORIES)
            └ BICYCLE RACKS  VIEW
            └ FLOWER STANDS  VIEW
            └ OUTDOOR BENCHES  VIEW
            └ OUTDOOR CHAIRS  VIEW
            └ OUTDOOR SWINGS  VIEW
            └ OUTDOOR TABLE OR PICNIC TABLES  VIEW
            └ OUTDOOR UMBRELLAS  VIEW
            └ OUTDOOR CLOTHES DRYER  VIEW
      ⊞ CLASSROOM AND INSTRUCTIONAL AND INSTITUTIONAL FURNITURE AND FIXTURES  VIEW (INCL. SUB-CATEGORIES)
      ⊞ COMMERCIAL AND INDUSTRIAL FURNITURE  VIEW (INCL. SUB-CATEGORIES)
   ⊞ INFORMATION TECHNOLOGY BROADCASTING AND TELECOMMUNICATIONS  VIEW (INCL. SUB-CATEGORIES)
   ⊞ PRINTING AND PHOTOGRAPHIC AND AUDIO AND VISUAL EQUIPMENT AND SUPPLIES  VIEW (INCL. SUB-CATEGORIES)
   ⊞ SERVICE INDUSTRY MACHINERY AND EQUIPMENT AND SUPPLIES  VIEW (INCL. SUB-CATOGORIES)
   ⊞ STRUCTURES AND BUILDING AND CONSTRUCTION AND MANUFACTURING COMPONENTS AND SUPPLIES  VIEW (INCL. SUB-CATOGORIES)
⊞ SERVICES
⊞ MANUFACTURING
⊞ BOOKS
⊞ ELECTRONICS
⊞ SPECIALTY
⊞ FOOD/FOOD EQUIPMENT
⊞ SUPPLIES MANAGER

| GRAINGER, INC. | | ORGANIZATION PRICE | | | USD | NO CONTRACT | ORGANIZATION | EDIT... | |
|---|---|---|---|---|---|---|---|---|---|
| VERSION | NOTE | DATE AVAILABLE | REVIEWED BY... | DATE REVIEWED | DATE EFFECTIVE | COMMENTS | STATUS | | SELECT |
| 1 | GRAINGER_WEET_102410.CSV WAS T...MORE... | 6:15 PM | | | | | NOT REVIEWED | | ☐ |
| 0 | | 7:05 PM | | | | | IMPLICITLY APPROVED | | ☐ |
| MATRIX TECHNOLOGIES | | ORGANIZATION PRICE | | | USD | NO CONTRACT | ORGANIZATION | EDIT... | |
| VERSION | NOTE | DATE AVAILABLE | REVIEWED BY... | DATE REVIEWED | DATE EFFECTIVE | COMMENTS | STATUS | | SELECT |
| 1 | | 12:29 PM | | | | PRICING UPDATE | NOT REVIEWED | | ☐ |
| 0 | | 11:19 PM | | | | | IMPLICITLY APPROVED | | ☐ |
| OFFICE MAX | | ORGANIZATION PRICE | | | USD | NO CONTRACT | ORGANIZATION | EDIT... | |
| VERSION | NOTE | DATE AVAILABLE | REVIEWED BY... | DATE REVIEWED | DATE EFFECTIVE | COMMENTS | STATUS | | SELECT |
| 1 | OFFICE_MAX_CONTRACT_WEET_10239...MORE... | 11:27 AM | | | | | NOT REVIEWED | | ☐ |
| 0 | | 11:19 PM | | | | | IMPLICITLY APPROVED | | ☐ |
| SCIQUEST, INC | | ORGANIZATION PRICE | | | USD | NO CONTRACT | ORGANIZATION | EDIT... | |
| VERSION | NOTE | DATE AVAILABLE | REVIEWED BY... | DATE REVIEWED | DATE EFFECTIVE | COMMENTS | STATUS | | SELECT |
| 6 | | 11:28 AM | | | | | NOT REVIEWED | | ☐ |
| 5 | | 7:46 AM | | | | IMPORTING NON-ERRORED ROWS | NOT REVIEWED | | ☐ |
| 4 | | 7:39 AM | | | | | NOT REVIEWED | | ☐ |
| 3 | | 10:20 AM | | | | | NOT REVIEWED | | ☐ |
| 2 | | 11:40 AM | | | | | NOT REVIEWED | | ☐ |
| 1 | | 11:40 AM | | | | | NOT REVIEWED | | ☐ |
| 0 | | 7:44 AM | | | | | NOT REVIEWED | | ☐ |

*FIG. 9F (cont)*

| HEWLETT-PACKARD COMPANY   MORE INFO... | | | | | | | |
|---|---|---|---|---|---|---|---|
| | | CONTRACT<br>PO NUMBER<br>QUOTE NUMBER | NO VALUE<br>TO BE ASSIGNED | | | | |

THE ITEMS WERE RETRIEVED FROM AN EXTERNAL SUPPLIER SITE, THEREFORE YOUR ABILITY TO EDIT OR VIEW THE ITEMS IN THIS APPLICATION MAY BE LIMITED.  CLICK THIS MESSAGE FOR MORE DETAILS.
THE FOLLOWING LINES CANNOT BE ACCESSED ON THE SUPPLIER'S WEBSITE.  CLICK THIS MESSAGE FOR MORE DETAILS.  LINE(S): 5
ADD NON-CATALOG ITEM FOR THIS SUPPLIER...

| | PRODUCT DESCRIPTION | CATALOG NO | SIZE / PACKAGING | UNIT PRICE | QUANTITY | EXT. PRICE | |
|---|---|---|---|---|---|---|---|
| 5 | HP COMPAQ TC4400 TABLET PC  ◆ MORE INFO... | EN358UA#ABA | EA | 2,099.00 | 1 EACH | 2,099.00 | ☐ ☐ |
| | | | SUPPLIER SUBTOTAL | | | 2,099.00 USD | |

| S.P. RICHARDS CO.   MORE INFO... | | | | | | | |
|---|---|---|---|---|---|---|---|
| | | CONTRACT<br>PO NUMBER<br>QUOTE NUMBER | NO VALUE<br>TO BE ASSIGNED | | | | |

ADD NON-CATALOG ITEM FOR THIS SUPPLIER...

| | PRODUCT DESCRIPTION | CATALOG NO | SIZE / PACKAGING | UNIT PRICE | QUANTITY | EXT. PRICE | |
|---|---|---|---|---|---|---|---|
| 6 | LAPTOP BACKPACK WITH HANDLE, 13-1/2in.W x 7in.D, x 17-1/2INin.H BLACK 📷 MORE INFO... | CCS55121 | EA | 9.99 | 1 EACH | 9.99 | ☐ ☐ |
| | | | SUPPLIER SUBTOTAL | | | 19.98 USD | |

SHIPPING, HANDLING, AND TAX CHARGES ARE CALCULATED AND CHARGED BY EACH SUPPLIER.
THE VALUES SHOWN HERE ARE FOR ESTIMATION PURPOSES, BUDGET CHECKING, AND WORKFLOW APPROVALS.

| | | |
|---|---|---|
| SUBTOTAL | 2,148.95 | |
| TAX1 | 0.00 | |
| TAX2 | 0.00 | |
| SHIPPING | 0.00 | |
| HANDLING | 0.00 | |
| TOTAL | 2,148.95 USD | |

[SAVE]   SEE CONFIGURATION FOR THIS REQUISITION

ADD NON-CATALOG ITEM FOR THIS SUPPLIER...

| PRODUCT DESCRIPTION | | CATALOG NO. | SIZE/PACKAGING | UNIT PRICE | QUANTITY | EXT PRICE ☐ |
|---|---|---|---|---|---|---|
| 1 KIT, LAPTOP COMPUTER 7000 | MORE INFO... | 4333117 | EA | 9.99 | 1 EA | 9.99 ☐ EDIT |
| MANUFACTURER NAME | APPLIED BIOSYSTEMS | ✓ TAXABLE | INTERNAL NOTE | NO NOTE | | |
| MANUFACTURER PART NUMBER | 4333117 | X CAPITAL EXPENSE | INTERNAL ATTACHMENTS | | | |
| UNSPSC: | 43-21-15-03 | MISCELLANEOUS COMMODITY CODE | ADD ATTACHMENT... | | | |
| MORE INFO... | | X REPLENISH STOCK | EXTERNAL NOTE | NO NOTE | | |
| | | | ATTACHMENTS FOR SUPPLIER | | | |
| | | | ADD ATTACHMENT... | | | |
| | | | PO CLAUSES | | | |
| | | | NO CLAUSE | | | |
| 2 KIT, LAPTOP COMPUTER 7000 | MORE INFO... | 4333117 | EA | 9.99 | 1 EA | 9.99 ☐ EDIT |
| MANUFACTURER NAME | APPLIED BIOSYSTEMS | ✓ TAXABLE | INTERNAL NOTE | NO NOTE | | |
| MANUFACTURER PART NUMBER | 4333117 | X CAPITAL EXPENSE | INTERNAL ATTACHMENTS | | | |
| UNSPSC: | 43-21-15-03 | MISCELLANEOUS COMMODITY CODE | ADD ATTACHMENT... | | | |
| MORE INFO... | | X REPLENISH STOCK | EXTERNAL NOTE | NO NOTE | | |
| | | | ATTACHMENTS FOR SUPPLIER | | | |
| | | | ADD ATTACHMENT... | | | |
| | | | PO CLAUSES | | | |
| | | | NO CLAUSE | | | |

|  |  |
|---|---|
| SUPPLIER SUBTOTAL | 19.98 |
| TAX1 | 0.00 |
| TAX2 | 0.00 |
| SHIPPING | 0.00 |
| HANDLING | 0.00 |
| SUPPLIER TOTAL | 19.98 USD |

| | | EDIT |
|---|---|---|
| CONTRACT | NO VALUE | |
| PO NUMBER | TO BE ASSIGNED | |
| QUOTE NUMBER | NO VALUE | |
| PO CLAUSES | | |
| NO CLAUSE | | |

CDW  MORE INFO...                    VIEW/EDIT BY LINE ITEM...

*FIG. 11B (cont)*

| MANUFACTURER PART NUMBER | CCS55121 | COMMODITY CODE | MISCELLANEOUS | EXTERNAL NOTE | NO NOTE |
| --- | --- | --- | --- | --- | --- |
| UNSPSC: | 43-21-16-00 | REPLENISH STOCK | X | ATTACHMENTS FOR SUPPLIER | |
| MORE INFO... | | | | ADD ATTACHMENT... | |
| | | | | PO CLAUSES | |
| | | | | NO CLAUSE | |

| | |
| --- | --- |
| SUPPLIER SUBTOTAL | 9.99 |
| TAX1 | 0.00 |
| TAX2 | 0.00 |
| SHIPPING | 0.00 |
| HANDLING | 0.00 |
| SUPPLIER TOTAL | 9.99 USD |

SHIPPING, HANDLING, AND TAX CHARGES ARE CALCULATED AND CHARGED BY EACH SUPPLIER. THE VALUES SHOWN HERE ARE FOR ESTIMATION PURPOSES, BUDGET CHECKING, AND WORKFLOW APPROVALS.

| | |
| --- | --- |
| SUBTOTAL | 2,148.95 |
| TAX1 | 0.00 |
| TAX2 | 0.00 |
| SHIPPING | 0.00 |
| HANDLING | 0.00 |
| TOTAL | 2,148.95 USD |

SEE CONFIGURATION FOR THIS REQUISITION

PO STATUS FILTERS

INCLUDE PO'S WITH ANY OF THESE STATUSES

—SHOW ALL—

PO DEPARTMENTS
- —WORKFLOW—
- PENDING
- REJECTED
- PARTIALLY REJECTED
- COMPLETE
- —SUPPLIER—
- SENT TO SUPPLIER
- SUPPLIER PROCESSING
- CANCELLED
- PARTIALLY SHIPPED
- FULLY SHIPPED
- OVER SHIPPED
- —RECEIPT—
- PARTIALLY RECEIVED
- FULLY RECEIVED
- OVER RECEIVED
- —INVOICE—
- PARTIALLY INVOICED
- FULLY INVOICED
- OVER INVOICED
- —MATCHING—
- PARTIALLY MATCHED
- FULLY MATCHED
- NO MATCHES
- —A/P STATUS—
- OPEN
- CLOSED

ONLY INCLUDE PO'S WITH THESE STATUSES

—SHOW ALL—

PO STATUS
- NO INVOICES
- NO RECEIPTS
- REQUIRES RECEIPTS
- NO SHIPMENTS
- WITH CREDITS
- WITH RETURNS
- WITH CANCELLATION
- WITH BACKORDERS
- WITH SUPPLIER MODIFICATIONS
- WITH FORCED MATCHES

SEARCH

Business Biography

Required fields are bold.

Business Type: [Computer Software/Technology ▼]
Legal Structure: [Corporation ▼]

**\*Please select your Geographical Service Areas**
☑ Local (USA)  ☑ Regional (USA)  ☑ National (USA)
☐ Mexico Please select areas in which you have Office Locations.
☑ Local (USA)  ☑ Regional (USA)  ☑ National (USA)
☐ Mexico  ☐ Other State or Country of Incorporation: [Texas]
Year Business was Established: [1998]
**\*Number of Employees:** [35]

**\*Select Primary NAICS Code.**
[511210: Software Publishers]

Select Secondary NAICS Code(s)
[                    ]

*Select Commodity Code(s)

Document Management

To remove items from the list above, highlight the commodity code and click the Remove From List button.

Remove From List

*Keyword Description:

Software and Database Services

*Annual Sales For 2009: 5000000
Annual Sales For 2008: 4200000
Annual Sales For 2007: 3800000

References

Only include current customer references that are in the Food or Retail Industry.

| | Company Name | Contact Name | Phone Number |
|---|---|---|---|
| *1. | | | |
| 2. | | | |
| 3. | | | |

Certification Information

*If your company is a minority-owned, woman-owned, or small agency and upload a copy of your certification.

☐ Minority Business Enterprise

☐ Woman Business Enterprise

☑ Small Business Enterprise

Are you SBA CCR listed:　○ Yes　○ No

☐ 8(a)

☐ Small Disadvantaged Business (SDB/SBA)

☐ HUBZone (SBA Certified)

☐ Small, Woman-Owned Business (Self Certified)

☐ Veteran Owned Small Business (VOSB/Self Certified)

☐ Service Disabled Veteran (SDVB/Self Certified)

Save & Continue

Product Catalog

| Add New Product | | | |
|---|---|---|---|
| Product Name | Model # | Brief Description | Price |
| Supplier Data Service | 546 | Supplier Data Service | 2000 |
| Total Supplier Management | 001 | Supplier Portal | 10000 |
| eSourcing | 52 | RFx & Reverse Auction | 5000 |
| Contract Management | 32 | Centralized Repository with Aler and Notification | 3000 |
| Spend Analysis | MD245 | Supplier Diversity Spend Anaylisis | 1000 |

Supplier Profile

| Profile | Products/Services | Contacts | References | Insurance | Certification | More Info |

Owner Ethnicity:
Business Classification: Asian-Pacific
Minority Owned
Small Business
Small Disadvantaged Business
Women-Owned Business

Supplier Classification
The supplier has faxed in a classification form.

Please click to view the form here.

Certifications

| Type | Certified Agency | Certification No | Expiration | Certificate |
|---|---|---|---|---|
| WBENC | Women's Business Enterprise Alliance | 242419 | | View Certification |
| NMSDC | Houston Minority Supplier Development Council | | | View Certification |
| SBA | SDB | WA00091-4015596 | | View Certification |

SYSTEMS AND METHODS FOR MANAGING SUPPLIER INFORMATION BETWEEN AN ELECTRONIC PROCUREMENT SYSTEM AND BUYERS' SUPPLIER MANAGEMENT SYSTEMS

RELATED APPLICATIONS

This application claims the benefit and priority of U.S. Provisional Patent Application Ser. No. 61/325,297, filed on Apr. 17, 2010, which is hereby incorporated entirely herein by reference.

TECHNICAL FIELD

The technical field relates generally to the field of procurement and, in particular, to a system and method for one or more supplier organizations to share their supplier information and catalogs with many buyer/purchasing organizations, in a single transaction using an electronic procurement system, without having to format and transmit the information and catalogs, separately, according to each buyer/purchasing organization's supplier management system.

BACKGROUND

Current e-commerce systems and methods provide consumers and businesses the ability to interface with a buyer/purchasing organization's supplier management system. However, current e-commerce systems do not allow for one or more suppliers to be able to share their supplier information and catalogs with many buyer/purchasing organizations, in a single transaction using an electronic procurement system, without having to format and transmit the information and catalogs, separately, according to each buyer/purchasing organization's supplier management system.

Furthermore, procurement systems also do not currently provide features that allow the automatic mapping of the supplier information and catalogs according to the buyer/purchasing organization's internal data schema used for representing such data in the supplier management system. In addition, procurement systems also do not currently provide for updating the buyer/purchasing organization's hosted supplier information and catalogs automatically when such updates are made on the electronic procurement system. Therefore, there is a need for a system and method that can provide an efficient and simple way for a supplier to send its supplier information and catalogs, in a single transaction, to many buyer/purchasing organizations' supplier management systems, update the same automatically, and also provide a single point-of-access for suppliers and buyer/purchasing organizations to interface, interact, and implement and execute transactions, in accordance with existing or newly defined relationships, using a custom and configurable methodology for realizing their requirements.

SUMMARY

Accordingly, some embodiments are directed to a system and method for sharing supplier information and catalogs with many buyer/purchasing organizations, in a single transaction, with a buyer/purchasing organization's supplier management system that substantially obviates one or more problems due to limitations and disadvantages of the related art.

Some embodiments provide a system and method that can provide an efficient and simple procurement process that is easily customizable and allows the automatic mapping of the supplier information and catalogs according to the buyer/purchasing organization's internal data schema used for representing such data in the supplier management system, and updates the buyer/purchasing organization's hosted supplier information and catalogs automatically.

Additional features and advantages of some embodiments will be set forth in the description which follows, and in part will be apparent from the description, or may be learned by practice of some embodiments. The objectives and other advantages of the some embodiments will be realized and attained by the structure particularly pointed out in the written description and claims hereof as well as the appended drawings.

To achieve these and other advantages and in accordance with the purpose of some embodiments, as embodied and broadly described, a single instance, multi-tenant procurement system includes a server system hosting an electronic procurement system with supplier management services, including an access module for receiving a user request for access to the system and granting access to the system, and a supplier management module for managing the storage, retrieval, and/or transmission of supplier profile data to/from supplier organizations and buyer/purchaser organizations.

According to some implementations, a system includes one or more processing units, and memory storing one or more programs to be executed by the one or more processing units. The one or more programs include instructions to, at a supplier user system, request access to an electronic procurement system and access the electronic procurement system. The one or more programs also include instructions to, at a supplier user system, provide supplier data through a graphical user interface (GUI). The supplier data is provided for storage in one or more databases of the electronic procurement system. The one or more programs also include instructions to, at a supplier user system, designate a subset of the supplier data as protected supplier data and select one or more buyer organization's supplier management systems to receive the provided supplier data.

In another implementation, the protected supplier data is at least one chosen from a group consisting of annual sales data, profit data, employee data, or asset data.

According to some implementations, a system includes one or more processing units, and memory storing one or more programs to be executed by the one or more processing units. The one or more programs include instructions to, at an electronic procurement system, receive a request for access from a supplier user and grant access to the electronic procurement system. The one or more programs also include instructions to, at a supplier user system, receive supplier data and store the received supplier data to one or more databases. The one or more programs also include instructions to, at a supplier user system, receive a designation of a subset of the supplier data as protected supplier data and receive a supplier user's selection of one or more buyer organization's supplier management systems to receive the supplier data. The one or more programs also include instructions to, at a supplier user system, map the supplier data to one or more data schema of the one or more buyer organization's supplier management system and transmit the supplier data to the one or more supplier management systems.

In another implementation, the one or more programs include instructions, at an electronic procurement system, to simulate user interface events at the one or more supplier management systems.

In another implementation, the one or more programs include instructions to, at an electronic procurement system, update automatically the supplier management systems with additional supplier data.

In another implementation, the one or more programs include instructions to, at an electronic procurement system, receive additional supplier data at the electronic procurement system, and update automatically the supplier management systems with the additional supplier data.

In another implementation, the one or more programs include instructions to, at an electronic procurement system, receive additional supplier data at the electronic procurement system, map the additional supplier data to the one or more data schema of the supplier management systems, and update automatically the supplier management systems with the additional mapped supplier data.

In another implementation, the one or more programs include instructions to, at an electronic procurement system, map additional supplier data to the one or more data schema of the supplier management systems, and update automatically the supplier management systems with the additional mapped supplier data.

According to some implementations, a system includes one or more processing units, and memory storing one or more programs to be executed by the one or more processing units. The one or more programs include instructions to, at a supplier management system, request access to an electronic procurement system and access the electronic procurement system. The one or more programs also include instructions to, at a supplier management system, request a subset of the supplier profile data from one or more databases of the electronic procurement system and receive the subset of the supplier profile data mapped to one or more data schema of the supplier management system. The one or more programs also include instructions to, at a supplier management system, store the mapped subset of the supplier profile data in one or more databases of the supplier management system.

In another implementation, the one or more programs include instructions to, at a supplier management system, search the mapped subset of the supplier profile data.

In another implementation, a subset of the stored supplier data is protected.

In another implementation, the one or more programs include instructions to, at a supplier management system, receive, in response to the searching, a list of suppliers ranked according to one or more values of the subset of the supplier profile data, without receiving the values of the subset of the supplier profile data.

According to some implementations, a computer-implemented method includes, at a supplier user system, requesting access to an electronic procurement system and accessing the electronic procurement system. According to some implementations, a computer-implemented method also includes, at a supplier user system, providing supplier data through a graphical user interface (GUI) for storage in one or more databases of the electronic procurement system. According to some implementations, a computer-implemented method also includes, at a supplier user system, designating a subset of the supplier data as protected supplier data and selecting one or more buyer organization's supplier management systems to receive the provided supplier data.

In another implementation, the protected supplier data is at least one chosen from a group consisting of annual sales data, profit data, employee data, or asset data.

According to some implementations, a computer-implemented method includes, at an electronic procurement system, receiving a request for access from a supplier user and granting access to the electronic procurement system. According to some implementations, a computer-implemented method also includes, at an electronic procurement system, receiving supplier data and storing the received supplier data to one or more databases. According to some implementations, a computer-implemented method also includes, at an electronic procurement system, receiving a designation of a subset of the supplier data as protected supplier data and receiving a supplier user's selection of one or more buyer organization's supplier management systems to receive the supplier data. According to some implementations, a computer-implemented method also includes, at an electronic procurement system, mapping the supplier data to one or more data schema of the one or more buyer organization's supplier management system and transmitting the supplier data to the one or more supplier management systems.

In another implementation, transmitting further includes simulating user interface events at the one or more supplier management systems.

In another implementation, the method also includes updating automatically the supplier management systems with additional supplier data.

In another implementation, the method also includes receiving additional supplier data at the electronic procurement system and updating automatically the supplier management systems with the additional supplier data.

In another implementation, the method also includes receiving additional supplier data at the electronic procurement system, mapping the additional supplier data to the one or more data schema of the supplier management systems, and updating automatically the supplier management systems with the additional mapped supplier data.

In another implementation, the method also includes mapping additional supplier data to the one or more data schema of the supplier management systems and updating automatically the supplier management systems with the additional mapped supplier data.

According to some implementations, a computer-implemented method includes, at a supplier management system, requesting access to an electronic procurement system and accessing the electronic procurement system. According to some implementations, a computer-implemented method also includes, at a supplier management system, requesting a subset of the supplier profile data from one or more databases of the electronic procurement system and receiving the subset of the supplier profile data mapped to one or more data schema of the supplier management system. According to some implementations, a computer-implemented method also includes, at a supplier management system, storing the mapped subset of the supplier profile data in one or more databases of the supplier management system.

In another implementation, the method also includes searching the mapped subset of the supplier profile data.

In another implementation, a subset of the stored supplier data is protected.

In another implementation, the method also includes receiving, in response to the searching, a list of suppliers ranked according to one or more values of the subset of the supplier profile data, without receiving the values of the subset of the supplier profile data.

According to some implementations, a non-transitory computer readable storage medium stores one or more programs configured for execution by a computer, the one or more programs when executed cause the computer to, at a supplier user system, request access to an electronic procurement system and access the electronic procurement system. The one or more programs also cause the computer to, at a supplier management system, provide supplier data through a graphical user interface (GUI). The supplier data is provided for storage in one or more databases of the electronic procurement system. The one or more programs also cause the computer to, at a supplier management system, designate a subset of the supplier data as protected supplier data and select one or more buyer organization's supplier management systems to receive the provided supplier data.

According to some implementations, a non-transitory computer readable storage medium stores one or more programs configured for execution by a computer, the one or more programs when executed cause the computer to, at an electronic procurement system, receive a request for access from a supplier user and grant access to the electronic procurement system. The one or more programs also cause the computer to, at an electronic procurement system, receive supplier data and store the received supplier data to one or more databases. The one or more programs also cause the computer to, at an electronic procurement system, receive a designation of a subset of the supplier data as protected supplier data and receive a supplier user's selection of one or more buyer organization's supplier management systems to receive the supplier data. The one or more programs also cause the computer to, at an electronic procurement system, map the supplier data to one or more data schema of the one or more buyer organization's supplier management system and transmit the supplier data to the one or more supplier management systems.

According to some implementations, a non-transitory computer readable storage medium stores one or more programs configured for execution by a computer, the one or more programs when executed cause the computer to, at a supplier management system, request access to an electronic procurement system and access the electronic procurement system. The one or more programs also cause the computer to, at a supplier management system, request a subset of supplier profile data from one or more databases of the electronic procurement system and receive the subset of the supplier profile data mapped to one or more data schema of the supplier management system. The one or more programs also cause the computer to, at a supplier management system, store the mapped subset of the supplier profile data in one or more databases of the supplier management system.

It is to be understood that both the foregoing general description and the following detailed description are exemplary and explanatory and are intended to provide further explanation of some embodiments as claimed.

BRIEF DESCRIPTION OF THE DRAWINGS

The accompanying drawings, which are included to provide a further understanding of some embodiments and are incorporated in and constitute a part of the specification, illustrate some embodiments and together with the description serve to explain the principles of the embodiments. In the drawings:

FIG. 5B illustrates an exemplary roles selection tool;

FIG. 5C illustrates an exemplary email preference tool;

FIG. 5E illustrates an exemplary user purchasing tool;

FIG. 5F illustrates an exemplary punch-out access tool;

FIGS. 5G-5M illustrate exemplary user permission tools;

FIGS. 5N-5O illustrate exemplary materials management tools;

FIGS. 6A-6J illustrate exemplary organization setup tools;

FIGS. 8A-8D illustrate exemplary search engines;

FIGS. 9A-9F illustrate exemplary catalog management tools;

FIGS. 11A-D illustrates an exemplary cart and requisition tool;

FIG. 13 illustrates an exemplary purchase order approval tool;

FIG. 14 illustrates an exemplary history tool;

Figure 47:
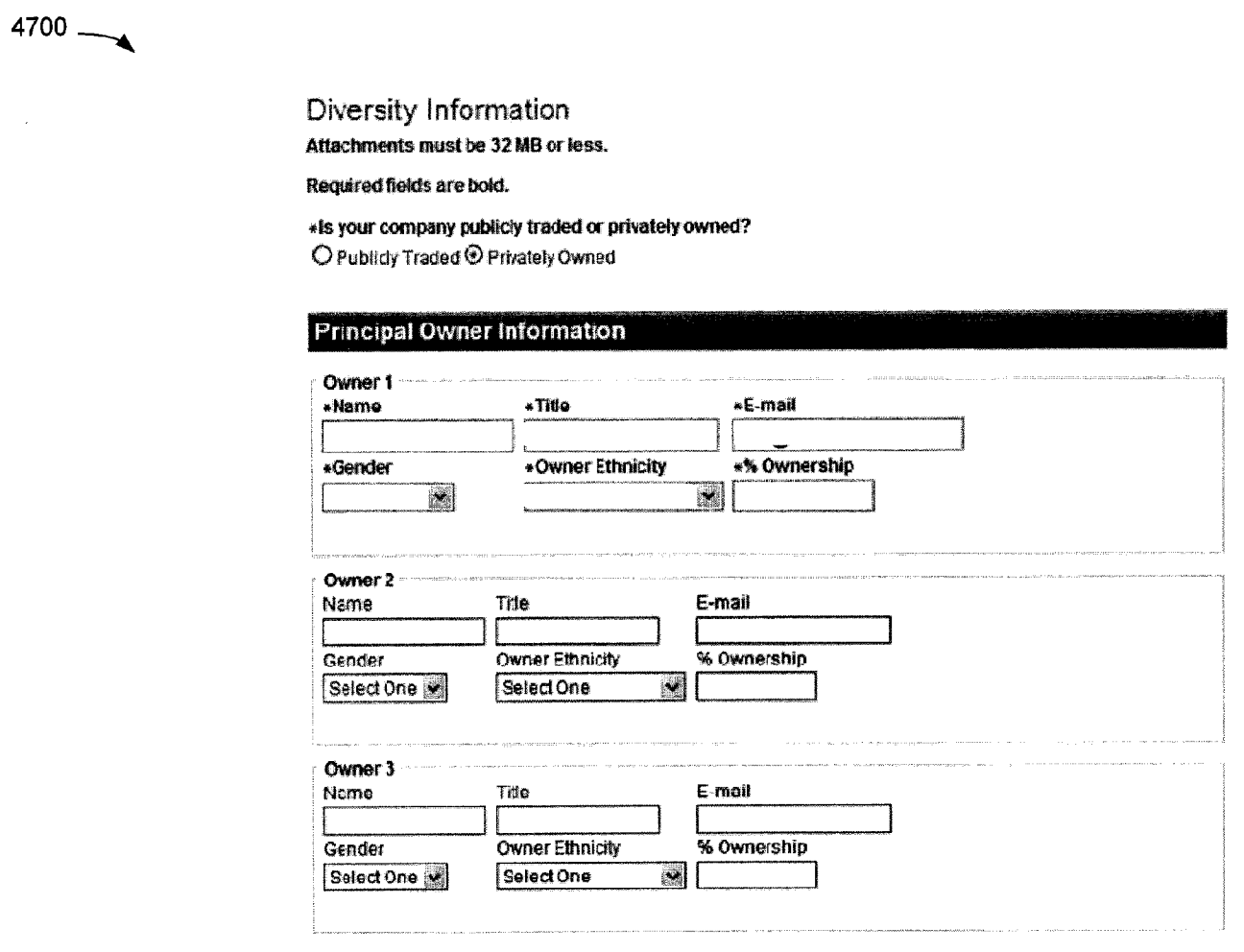
Figure 49:
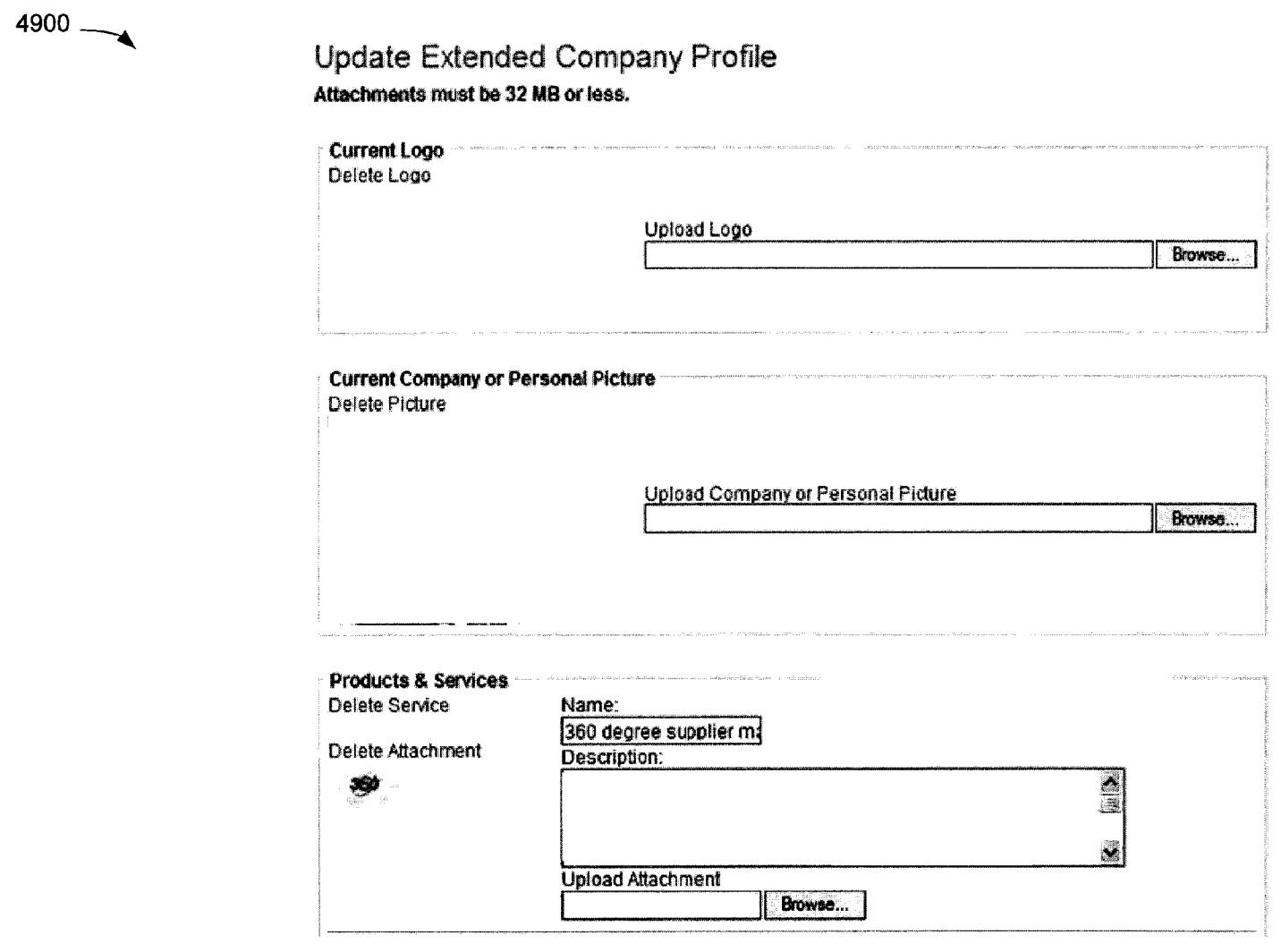

FIGS. 43-49 illustrate exemplary embodiments of a supplier registration interface in accordance with the supplier management features;

FIG. 52 illustrates an exemplary automated submission history feature of a supplier registration interface in accordance with the supplier management features;

FIG. 53 illustrates an exemplary automated submission history feature of a supplier registration interface in accordance with the supplier management features;

FIG. 55 illustrates an exemplary certification(s) feature of a supplier registration interface in accordance with the supplier management features;

FIG. 56 illustrates an exemplary map fields management feature in accordance with the supplier management features;

DETAILED DESCRIPTION

Reference will now be made in detail to embodiments, examples of which are illustrated in the accompanying drawings. In the following detailed description, numerous non-limiting specific details are set forth in order to assist in understanding the subject matter presented herein. It will be apparent, however, to one of ordinary skill in the art that various alternatives may be used without departing from the scope and the subject matter may be practiced without these specific details. For example, it will be apparent to one of ordinary skill in the art that the subject matter presented herein can be implemented on any type of client-server compatible system containing any type of client, network, server, and database elements.

The terms module, engine, and application are used interchangeably herein.

Figure 1:
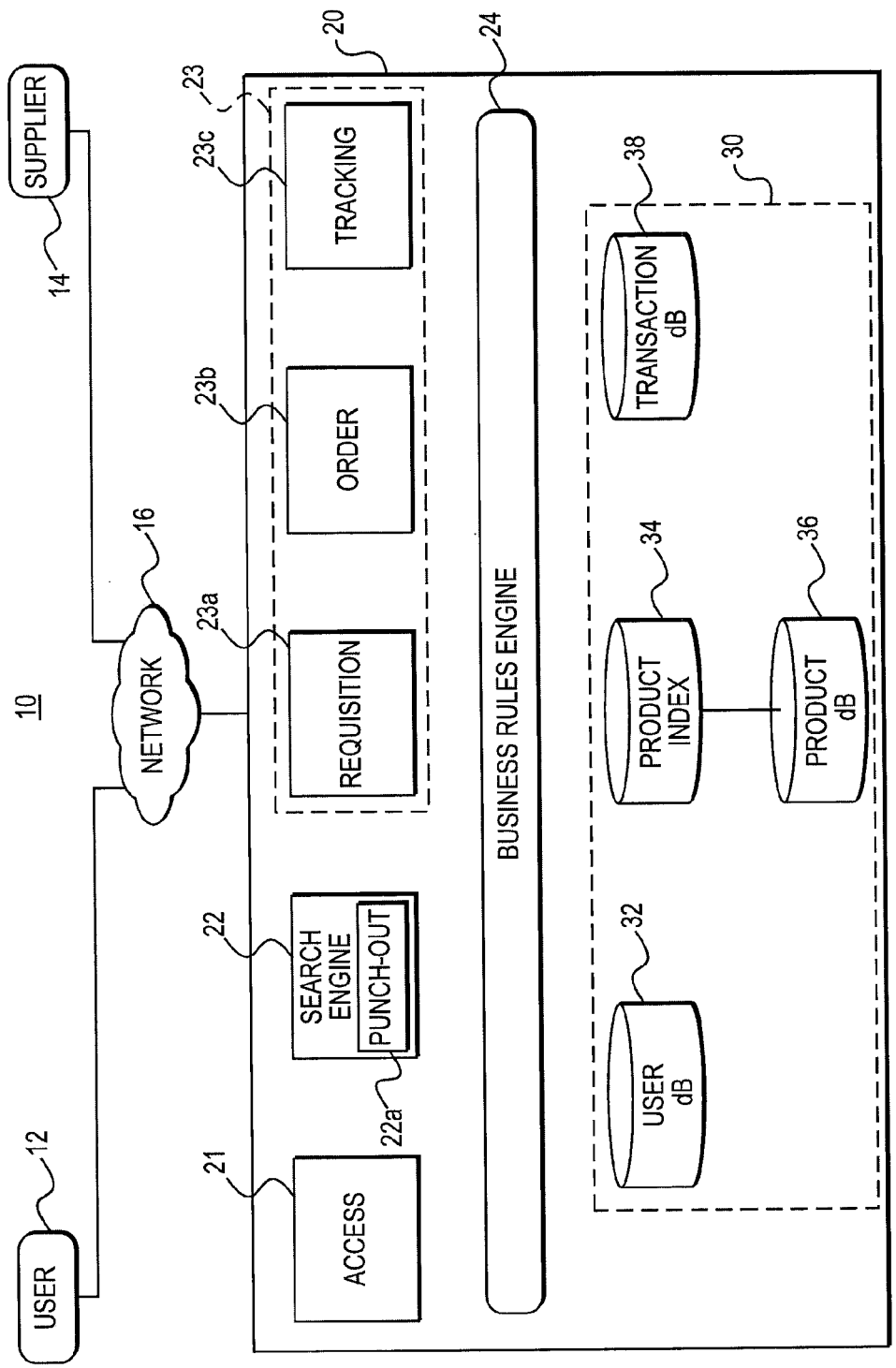
FIG. 1 is a block diagram illustrating an exemplary embodiment of an eProcurement system.

FIG. 1 is a block diagram illustrating an exemplary embodiment of an eProcurement system. The term "eProcurement architecture" used herein refers to a system and method that facilitates customized searching, data modeling, and order processing over an electronic network, using a client-server type architecture, where multi-tenants (e.g., end users/consumers, supplier users, etc.) can realize each of their specific business requirements with respect to the process of initiating and consummating transactions. In general, the eProcurement architecture facilitates transactions between end users and suppliers. The end users may be individual users or members of an organization, such as a company or institution. For example, the end users may be any member of the organization authorized for performing procurement operations for the organization or the end user may be an individual of a sole proprietorship.

In a multi-person organization, procurement operations of the organization are setup in a multi-level structure with a group of individuals who make requests for requisitions and an authorizing entity (e.g., manager) who approve such requests based on the organization's procurement policies. There may be a plurality of individuals assigned as the authorizing entity, and the authorizing entity may itself include multiple levels of authority with each higher level having more control over the procurement operations. The procurement policies may define the levels of authority, such as who can order what, and include one or more contractual relationships between the organization and one or more suppliers. By way of example only, the procurement policy may define that the lowest level end user of a particular department can only order certain products or services while a higher level end user can order or authorize orders of broader categories of products and/or services. In another example, the procurement policy may require that certain products or services be ordered exclusively from a supplier with an exclusive contract with the organization. As another example, the procurement policy may require that a particular product be ordered in a predetermined lot size due to a contractual discount negotiated from a particular supplier. The eProcurement architecture facilitates transactions between multiple end users of any level of any organization with multiple suppliers taking into account the procurement policies associated with each end user and supplier on a single platform (i.e., single instance, multi-tenant architecture).

As shown in FIG. 1, the eProcurement system 10 includes end users 12, supplier users 14, and the procurement module 20 connected over a data communications network 16. The procurement module 20 includes access module 21, search engine 22, transaction module 23, business rules engine 24, and data repository 30. The data repository 30 may include one or more databases to store user data 32, hosted product index 34, product data 36, and transaction data 38.

The access module 21 allows the end users and suppliers to set up and gain access to their respective accounts in the eProcurement system 10. For example, the access module 21 may include registration/account setup procedures to create a new account on the eProcurement system 10. The access module 21 may also include authentication procedures (e.g., login ID and password) to determine the identity of the user and the user's profile (e.g., associated organization, level of access, etc.) before granting access to the procurement module 20. Once granted access, the user may configure the account for customized access. If the user is a "super user" (i.e., a user with higher levels of access, such as a procurement supervisor of an organization), the super user may set conditions for access of other users from his organization. If the user is a supplier, the supplier user may create or update the supplier account or provide/update product/service information (e.g., product catalog).

The search engine 22 allows the user to search through the hosted product index 34 to find a product and/or service provided by the one or more suppliers. In general, the search engine 22 searches through the hosted product index 34, which contains tokenized data of all the products from all the suppliers stored in the product database 36. The search results of the search are processed by the business rules engine 24 and displayed to the user based on the business rules set for the user and the user's organization. The search engine 22 includes a punch-out module 22a that allows the user to "punch-out" to an unhosted supplier catalog for products/services not available through the eProcurement system 10. The user can only access those punch-out suppliers configured for him/her according to the business rules engine 24.

The transaction module 23 includes one or more of requisition module 23a, order module 23b, and tracking module 23c to facilitate a transaction with one or more suppliers. The requisition module 23a processes items selected by the user from the search engine 22 and creates a requisition. If authorization is required, the requisition module 23a notifies the designated authorizing entity of the requisition to obtain authorization. If the requisition is denied, the requisition module 23a sends a notification back to the user of the decision. If the requisition is approved, the user is notified and the requisition either a) is sent to order module 23b, or b) is marked as "complete" based on the business rules engine 24 because not all requisitions are necessarily converted to orders. The order module 23b converts the requisition into a purchase order according to the business rules in the business rules engine 24. The order module 23b sends the purchase order to the appropriate supplier in the proper format(s) designated for that supplier. Once the purchase order has been sent, the tracking module 23 receives confirmation of the purchase orders from the suppliers and keeps track of the purchase orders through the fulfillment process.

In general, a user (i.e., end user, super user, supplier user, etc.) gains access to the procurement module 20 through the access module 21. The access module 21 may include security measures, such as authentication (e.g., providing user ID and password), to identify the user by accessing the user data stored in the user database 32. User accounts may also be created through the access module 21. For example, a user (generally a super user) creates an account on the eProcurement system 10 by registering through the access module 21. The account may also be created by a system administrator of the eProcurement system 10 off-line who gives access to the user via emailing a registration link to the access module 21. Once an account has been created, the user may access the eProcurement system 10 through the access module 21.

Figure 2:
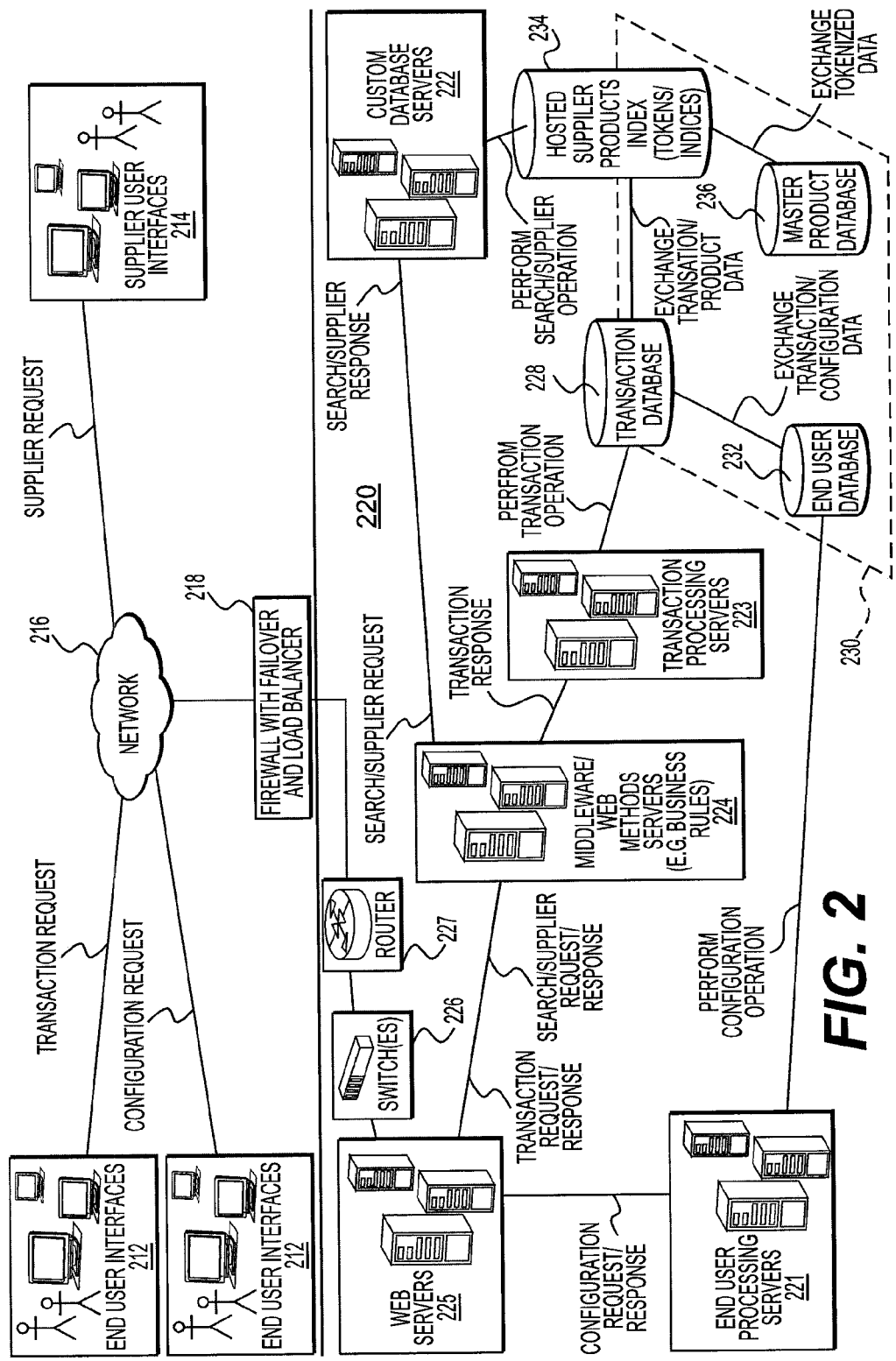
FIG. 2 illustrates an exemplary embodiment of an eProcurement architecture.

FIG. 2 illustrates an exemplary embodiment of an eProcurement architecture. As shown in FIG. 2, the eProcurement architecture may include one or more end user/consumer interfaces 212 and supplier user interfaces 214, which may connect to one or more servers 220 over a wired or wireless network 216. These one or more servers 220 may be for user processing (e.g., end user processing servers 221), product database hosting (e.g., custom database servers 222), transaction processing (e.g., transaction processing servers 223), middleware/web methods (e.g., middleware/web methods servers (e.g., business rules) 224—e.g., for implementing business rules between end users and supplier users), and communication processing (e.g., web servers 225), such as streaming data/media, file hosting (e.g., FTP—File Transfer Protocol—server), web serving (e.g., HTTP/HTTPS, WWW, CGI—Common Gateway Interface, ASP—Active Server Pages, Servlets, JSP—Java Server Pages, etc.), facsimile transmission, proxy, telnet, chat, list, mail (e.g., SMTP—Simple Mail Transfer Protocol), news (e.g., NNTP—Network News Transfer Protocol), groupware, and other communication/data processing purposes. These one or more servers 220 may be hosted behind or outside a firewall 218 with or without failover and/or load balancers. These one or more servers 220 may be hosted over the Internet, within the same Intranet and/or subnet, on different Intranets and/or subnets, or in any other inter-networked configuration of network 216. The servers 220 may be implemented on Microsoft™ Windows NT/2000/XP™/XP Professional/Server™/Vista™ (e.g., Microsoft™ Internet Information Services (IIS)), Apache, Unix™, z/OS™, z/VM™, Linux™, VMS, Netscape Enterprise Server™, iPlanet™ Web Server, Sun Java System Web Server, Oracle™ Server, SQL Server™ (e.g., Microsoft™, Sybase™, MySQL™ etc.), Terradata server applications, or any other compatible server technology.

End user interfaces 212 and supplier user interfaces 214 may be implemented on Internet web browsers such as Microsoft Internet Explorer™, Netscape Navigator™, Mozilla™ Firefox™, Opera, Satori, Blazer, or any other Internet web browser capable of sending and receiving data using the Hypertext Transfer Protocol (HTTP). The data may be transferred over an encrypted and authenticated communication layer (i.e., using secure HTTP, or as more commonly known, HTTPS). End user interfaces 212 and supplier user interfaces 214 may be implemented using a combination of HTML (Hypertext Markup Language), Macromedia Flash™, XML (Extensible Markup Language), CGI (Client Gateway Interface), ASP (Active Server Pages), JSP™ (JavaServer Pages), PHP (Hypertext Preprocessor), Java, C/C++, Visual Basic™, Visual Basic Script, Perl™, Tcl/Tk, SQL (Structured Query Language), and any other relevant markup/programming/scripting/query language or development environment.

Communication from the end user interfaces 212 and supplier user interfaces 214 to the server or plurality of servers 220, via the firewall 218 with failover and load balancer, may be implemented over wired communication protocols through network 216. For example, at the Wide Area Network (WAN) level or at the Local Area Network (LAN) level, routed Internet Protocol (IP) packets may be transported using the IEEE 802.3 Ethernet standard, for example, on the data link network layer. However, any network standard may be used, whether for packet encapsulation, path determination and logical addressing, or physical addressing, at any layer of these layers without departing from the scope. Also, the packet data may be transported over interconnected hubs (not shown), switches 226, routers 227, and other network elements. At the WAN level, protocols such as Packet over Synchronous Optical Network (SONET) or Synchronous Digital Hierarchy (SDH), Asynchronous Transfer Mode (ATM) over SONET, Multi-protocol Label Switching (MPLS), packet over Frame Relay, or other analogous protocols may be used to deliver data over longer distances. Interconnect repeaters, multiplexers (e.g., add/drop), and cross connects may be used to facilitate and ensure accurate transmission over the long-haul from point-to-point.

Communication from the end user interface 212 and supplier user interfaces 214 to the server or plurality of servers 220, via the firewall 218 with failover and load balancer, may also be implemented over wireless communication protocols over network 216. For example, at the LAN level (i.e., WiFi), standards such as 802.11a, 802.11b, 802.11g, and 802.11n may be used to deliver data from point-to-point. Similarly, at the Metropolitan Area Network (MAN)/WAN level, standards such as 802.16e (i.e., WirelessMAN), WiMax, Universal Mobile Telecommunications System (UMTS) over Wideband Code Division Multiple Access (W-CDMA), GSM, GPRS, or EDGE may also be used to deliver data from point-to-point. As with the wired networks, other standards and protocols may be used without departing from the scope.

The eProcurement architecture includes a data repository 230. The data repository 230 may be implemented using one or more databases to store end user data 232, hosted product index 234, master product data 236, and transaction data 238, in accordance with business rules (implemented via, for example, a business rules engine 24). The data repository 230 may be implemented using any type of data storage device without departing from the scope. Moreover, the data repository 230 may be managed by any database platform (e.g., Oracle, Microsoft Access, IBM DB2, etc.) without departing from the scope.

End user interfaces 212 and supplier user interfaces 214 may also allow an implemented feature that enables the setting of user configuration preferences. This feature allows a super user, with enhanced administrative capabilities, to have full access to the features of end user and supplier user interfaces. Some of these features may include: sending an email notification of a specific requisition order, and a corresponding link for accessing the same; full access to the features of the end user and supplier user interfaces; the capability to approve or reject a full order or a specific order item requested by an end user; the capability to take ownership and/or control of a specific requisition order, which may be organized according to a product or supplier category; the capability to expedite or accelerate an order through to specific steps along the ordering process, including the final review step; and, the capability to invoke and view a summary and history of each end user's latest order activity.

Moreover, a super user, for example, may design and/or otherwise configure and customize the style, type, layout, and level of data that is displayed on the respective end user interface 212 and supplier interface 214 for their respective organizations. A super user is also able to invoke a setup feature to choose which end users may have access to specific suppliers. Furthermore, a super user may also determine what information is required from the end users and supplier users of their respective organization, and determine the level of access at which an end user may access a specific supplier within the hosted supplier products catalog. This capability enables a super user to configure, for example, whether an end user can view specific products from specific suppliers, the currencies given for product/item pricing, and place orders. Moreover, the end user interface allows for features to be configured as permission driven. As such, certain features may be accessible to each end user, based on the end user's precedence within the organization, which likely affects his/her corresponding permission level. In addition, each feature is configurable to each end user based on a set of variable options. These variable options may include the ability to set a specific layout/view, a preferred number of search results, a preferred list of products, or a preferred list of suppliers. Also, each feature may include a help function that allows an end user to resolve inquiries or difficulties relating to the feature. The end user interface implementation is usually account login-based and, as described in further detail above, may encompass multiple server types (e.g., running a Linux OS), a redundant firewall and load balancer, and a priority-based software programming architecture (e.g., implemented in JAVA and JSP).

Figure 3:
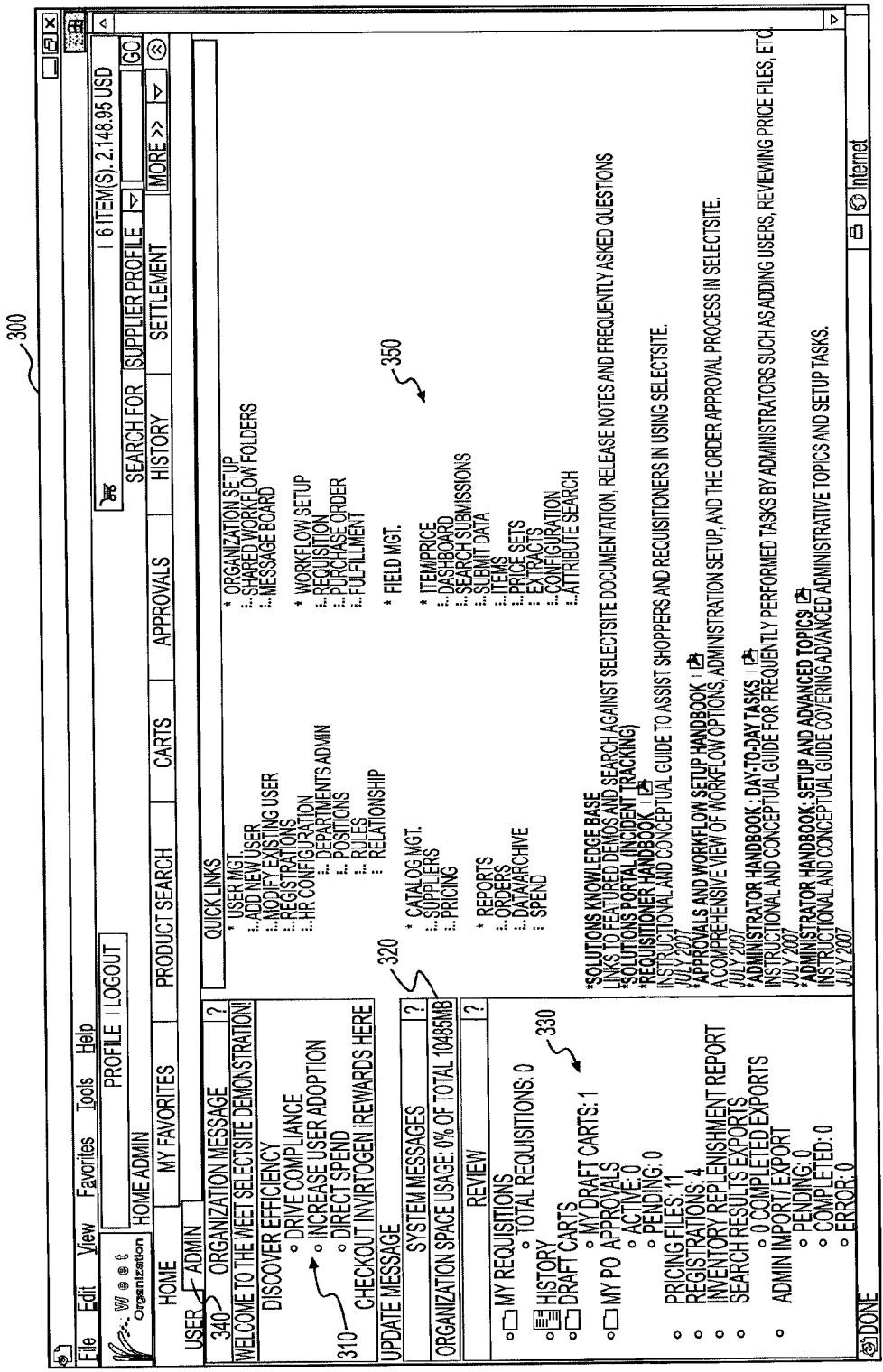
FIG. 3 illustrates an exemplary user interface.

FIG. 3 illustrates an exemplary user interface. For purposes of example only, an end user interface is used to describe various aspects. As shown in FIG. 3, user interface 300 provides customized information for the user. For example, the user is a member of a fictitious group named Weet Organization. The user interface 300 includes one or more of an organizational message area 310, any system message area 320, and task items area 330. In the example shown, the user is a super user and therefore, the "Admin" tab 340 is active. Had the user been an end user, the "User" tab would be active and the "Admin" tab 340 either would not be displayed or would be inactive. All of these areas and information displayed therein may be customized through the access module 21. Any configuration definitions are then stored in the user database 32 and invoked upon access/login.

FIG. 3 illustrates an exemplary embodiment of the configuration tools available to a super user. In general, the eProcurement system 10 provides a super user the tools needed to configure every aspect of the eProcurement process of an organization for complete customization, thereby effectuating a single instance multi-tenant architecture. That is, the eProcurement system 10 establishes a centralized system that is customizable for each user and/or organization, thereby providing a robust and yet an efficient eProcurement system. More specifically, configuration tool 350 allows a super user to customize the configuration of the eProcurement system 10 specifically for an organization and its users. While exemplary configuration tools are shown, other tools may be included without departing from the scope.

Figure 4A:
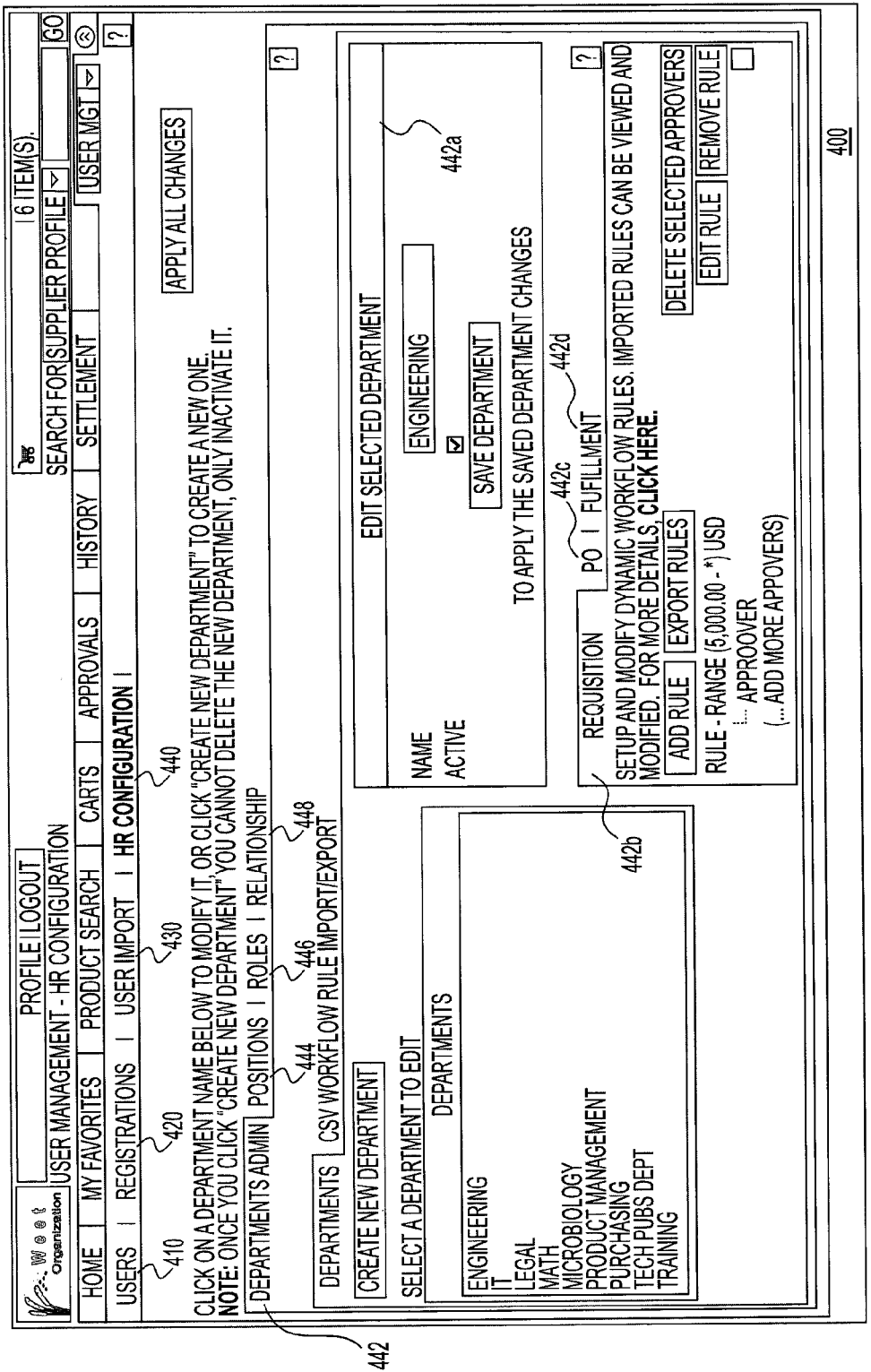
FIGS. 4A-4T illustrate exemplary user management tools.
Figure 4B:
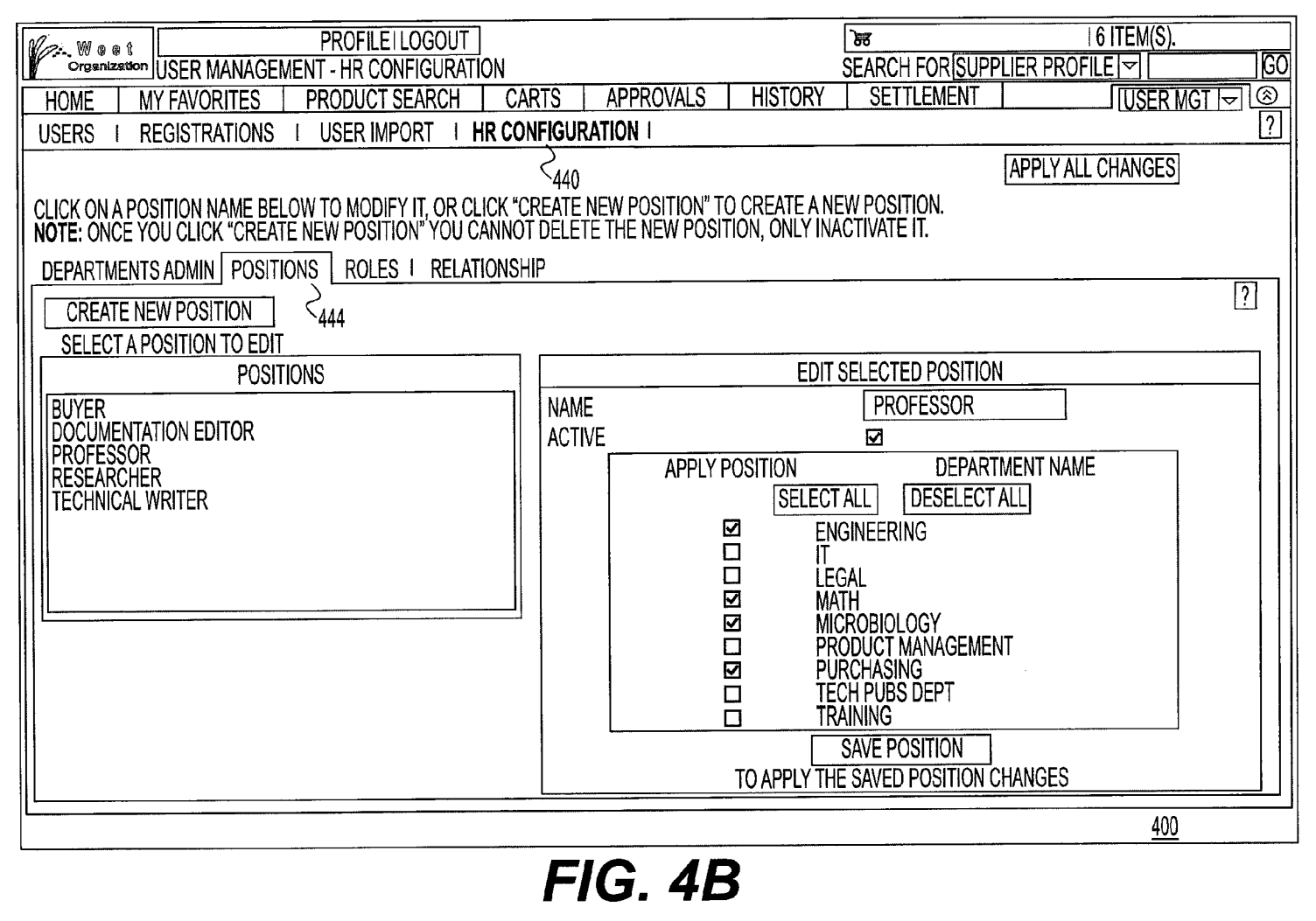
Figure 4C:
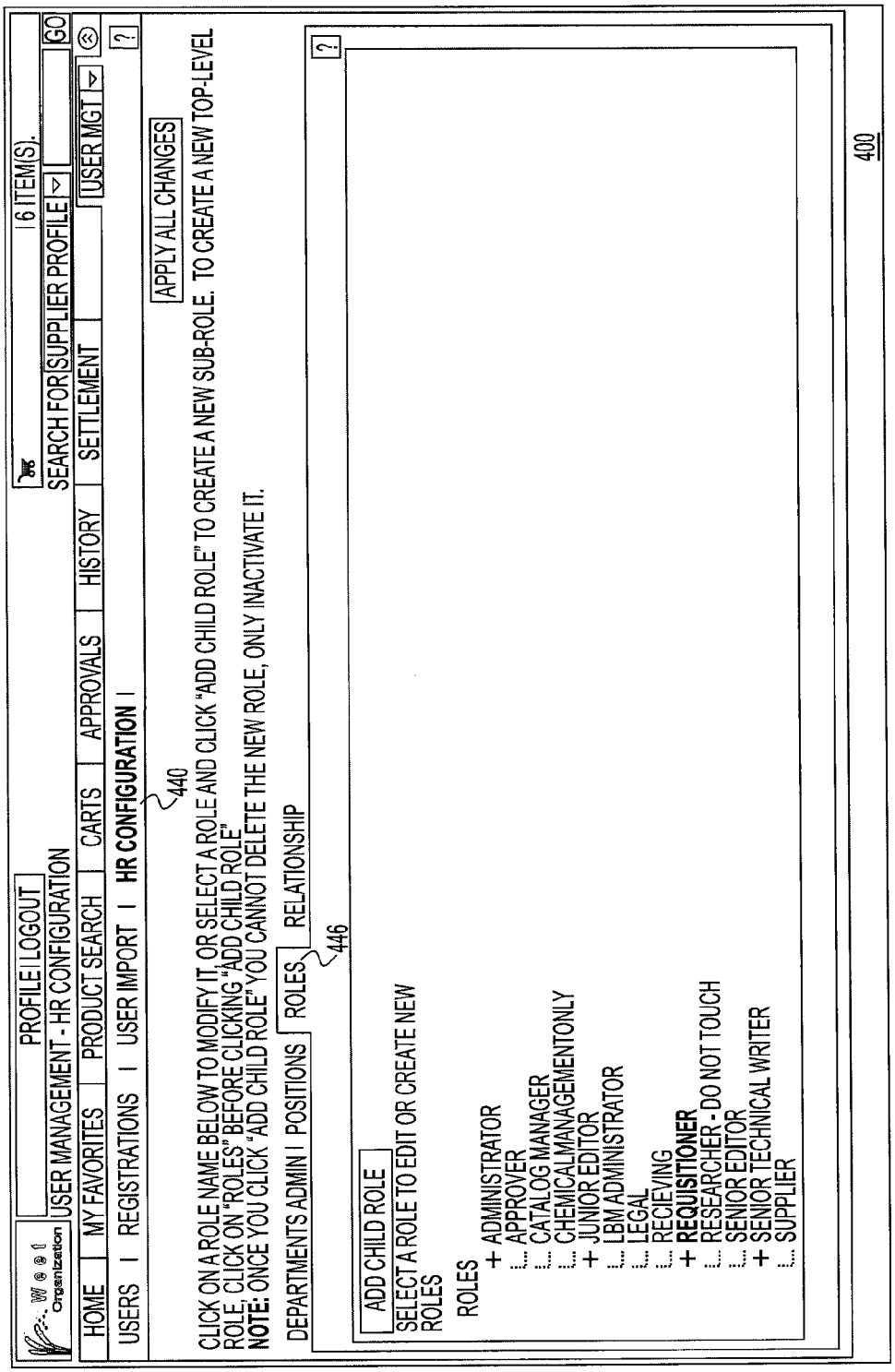

FIG. 4A illustrates an exemplary user management tool 400 to create or modify user access, manage user registration, and define the organizational structure. For example, FIG. 4A illustrates a user access human resources (HR) configuration tool 440. In particular, HR configuration tool 440 allows the super user to establish and describe the organization. For example, the HR configuration tool 440 may be used to define various departments of the organization (442), various positions of the organization (444), various roles of the users in the organization (446), and relationships between the roles, positions, and departments defined for the organization (448). As shown in FIG. 4A, the various departments of the organization that require procurement services may be "Engineering," "IT," "Legal," "Math," etc. As shown in FIG. 4B, there may be various positions within the organization, such as "Buyer," "Documentation Editor," "Professor, "Researcher," etc. As shown in FIG. 4C, the HR configuration tool 440 is used to define various roles of the users within the organization, such as "Administrator," "Approver," "Catalog Manager," etc. As shown in FIG. 4D, the HR configuration tool 440 is used to define the relationship between the department, position, and role of the users. For example, a "Professor" in "Engineering" may be designated as an "Approver" and "Requisitioner" for the organization while a "Researcher" of "Engineering" may only be a "Requisitioner." In this manner, the HR configuration tool 440 provides a simple yet efficient mechanism to define the organization for which the eProcurement system 10 is to be utilized.

Figure 4E:
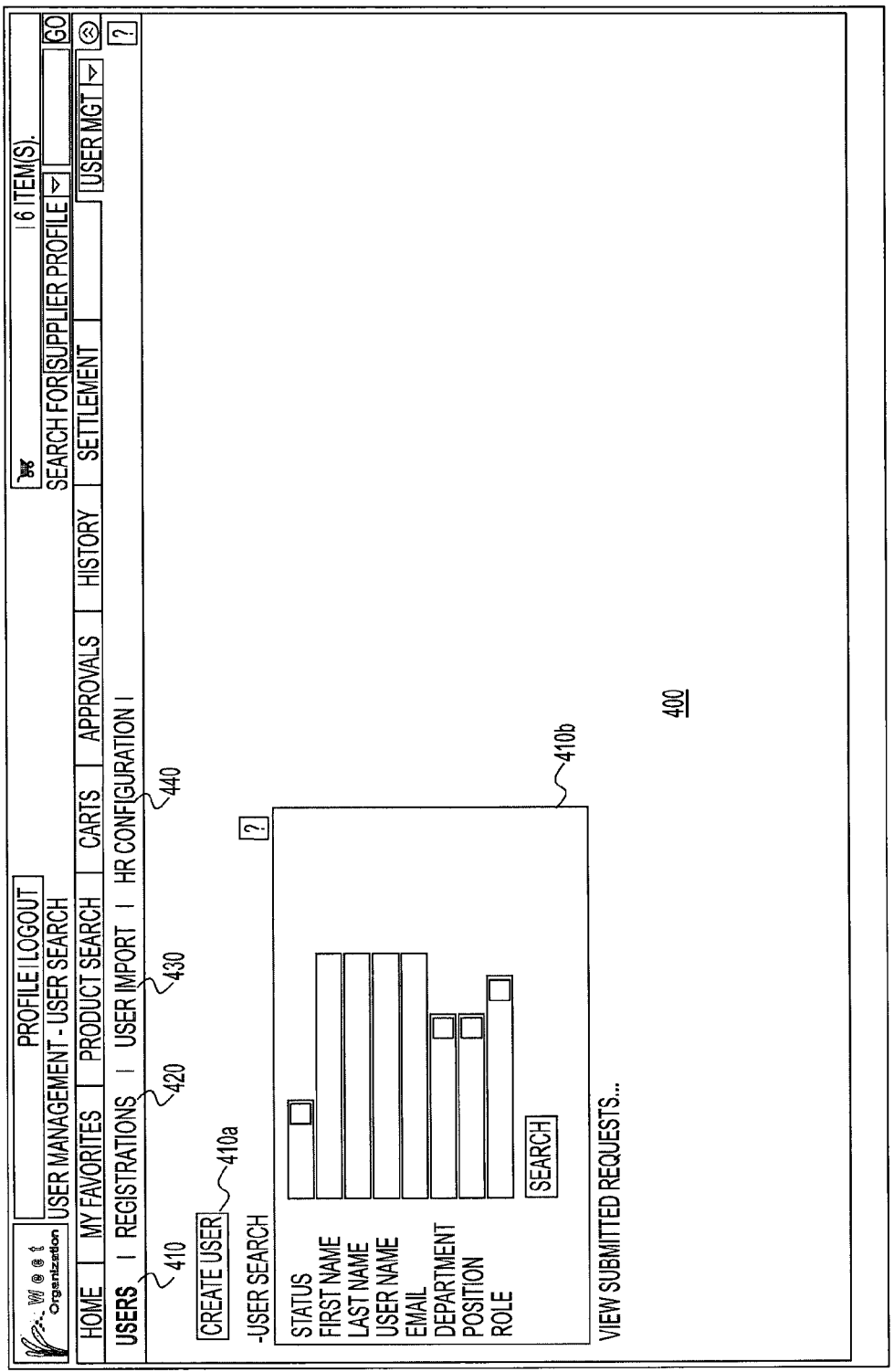
Figure 4F:
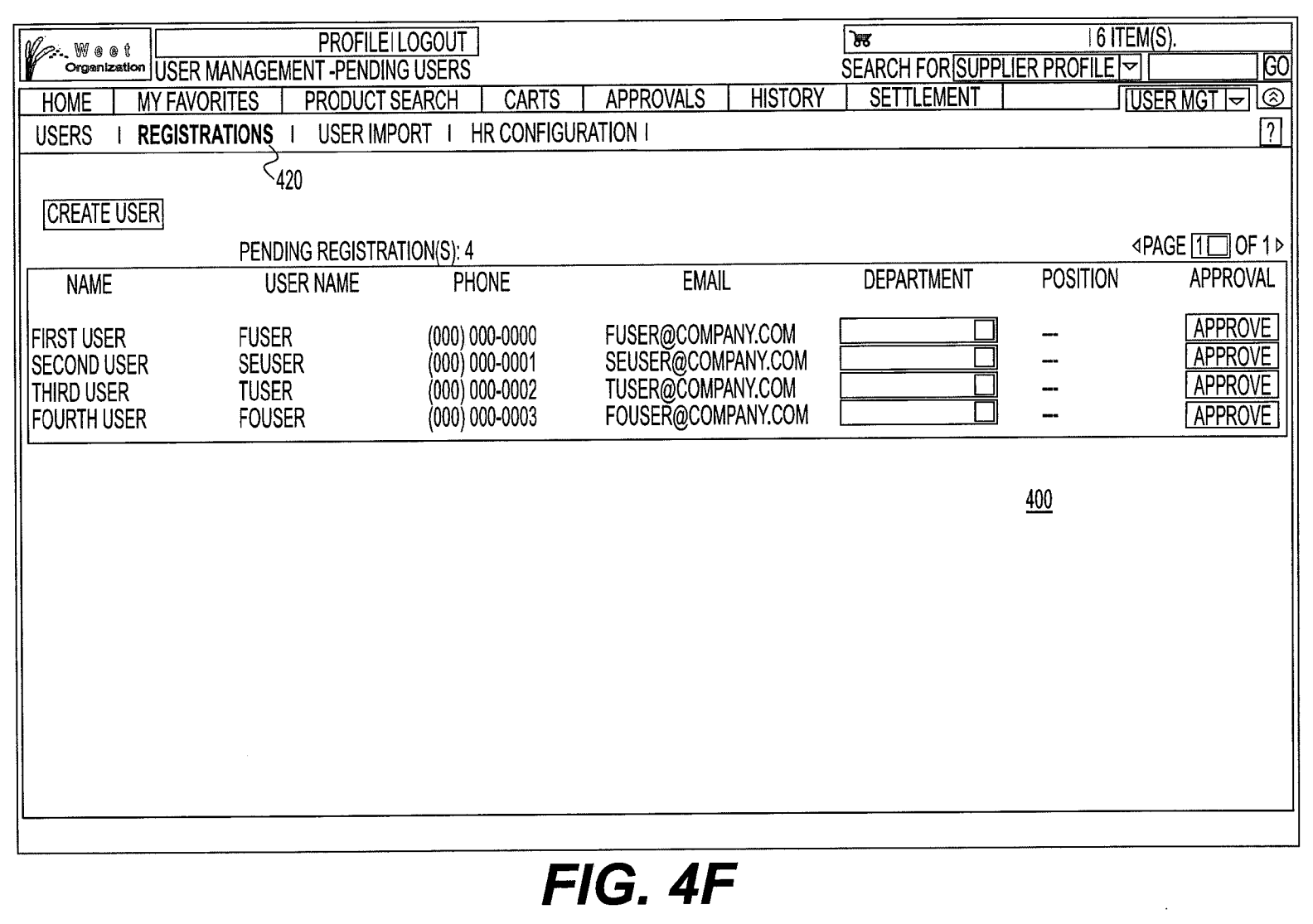

Once the organization has been defined through the HR configuration tool 440, user access tool 410 may be used to create or modify a user's access to the eProcurement system 10 for the user's organization. As shown in FIG. 4E, the user access tool 410 may be used to create a new user access account (410a) or the user database 32 may be searched (410b) for an existing user in the eProcurement system 10. To create a user access account, the user access tool 410 requires entry of the user's personal information (e.g., name, phone number(s), email address) and authentication information (e.g., login ID and password). In addition, the user's department and position information as created through the HR configuration tool 440 is also provided. In an exemplary embodiment, the department and position information created through the HR configuration tool 440 are shown in a drop-down menu for easy selection and entry. To simplify the creation of an account, existing user files may be imported into the user database through the user import 430. Once a user access account has been created, the newly created accounts are activated through the user registration monitor 420. As shown in FIG. 4F, a list of new user access requests is presented in the user registration monitor 420. A designated approver for the organization then reviews and approves the user access account to be activated for the user.

Figure 4G:
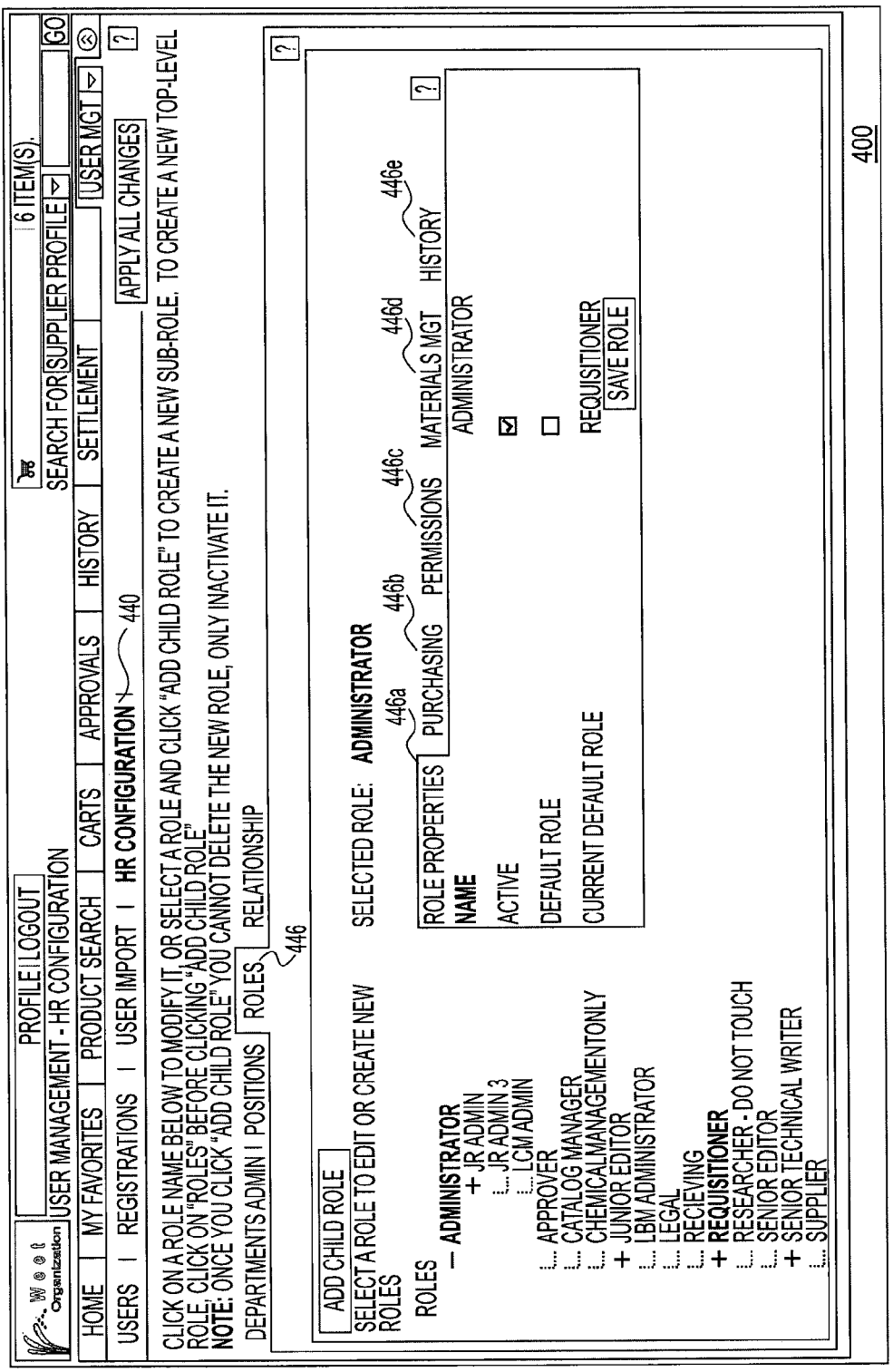

In accordance with an exemplary embodiment, every aspect of the organization may be defined and customized in the eProcurement system 10. For example, as shown in FIG. 4A, once a "Department" has been created for an organization, the created department may be activated (442a). Moreover, each department may be defined with business rules related to the department's requisition (442b), purchase orders (442c), and fulfillment (442d). For example, FIG. 4A shows that the "Engineering" department has been designated as an active department with the "Requisition" and "Purchase Order" rules including a list of approvers for the Engineering department. As shown in FIG. 4B, a created position may be designated for a created department. For example, FIG. 4B shows that the organization has the "Professor" position for the "Engineering," "Math," "Microbiology," and "Purchasing" departments. FIG. 4G illustrates an exemplary embodiment of the HR configuration tool 440 for defining roles of the organization.

Figure 4H:
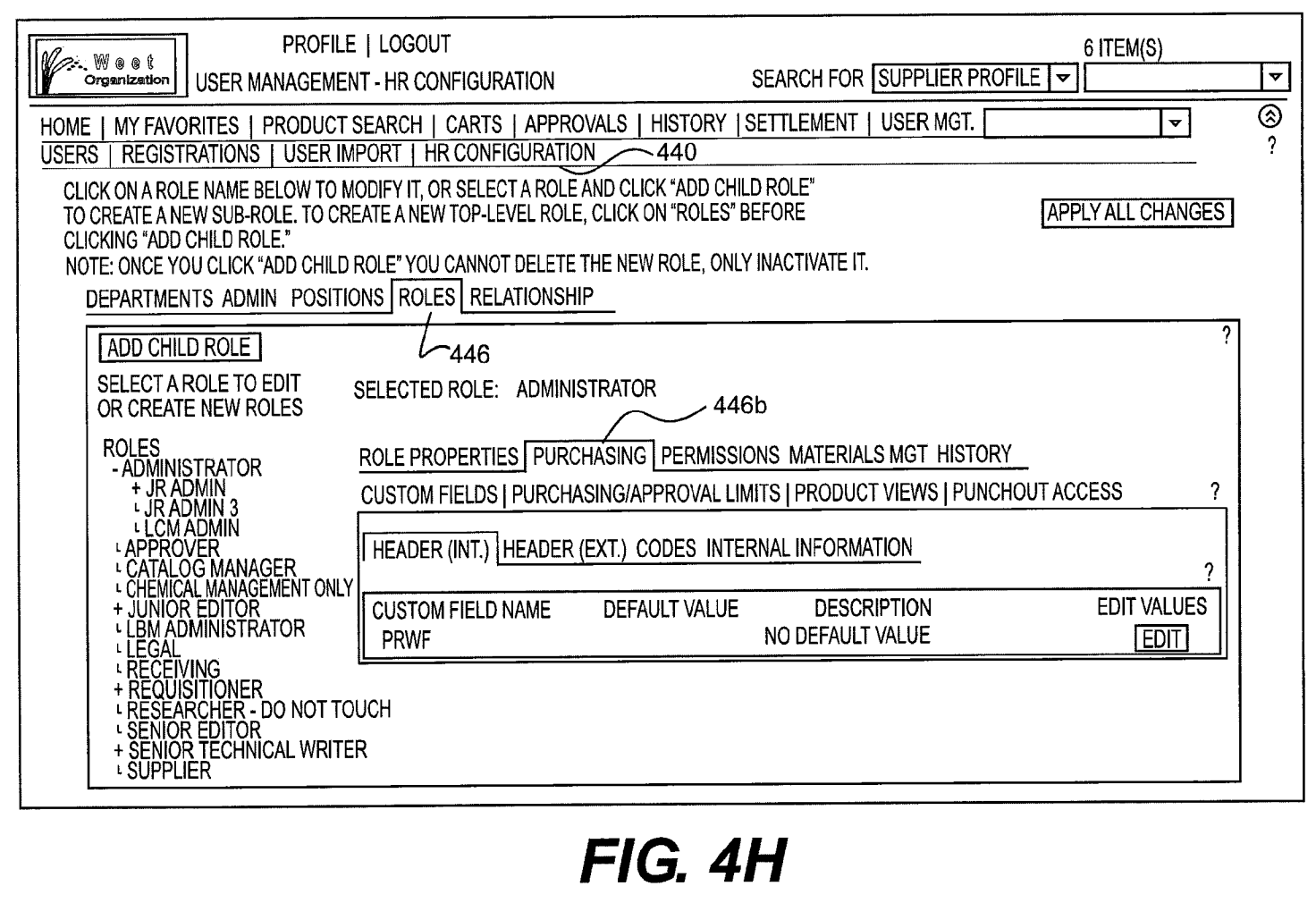
Figure 4I:
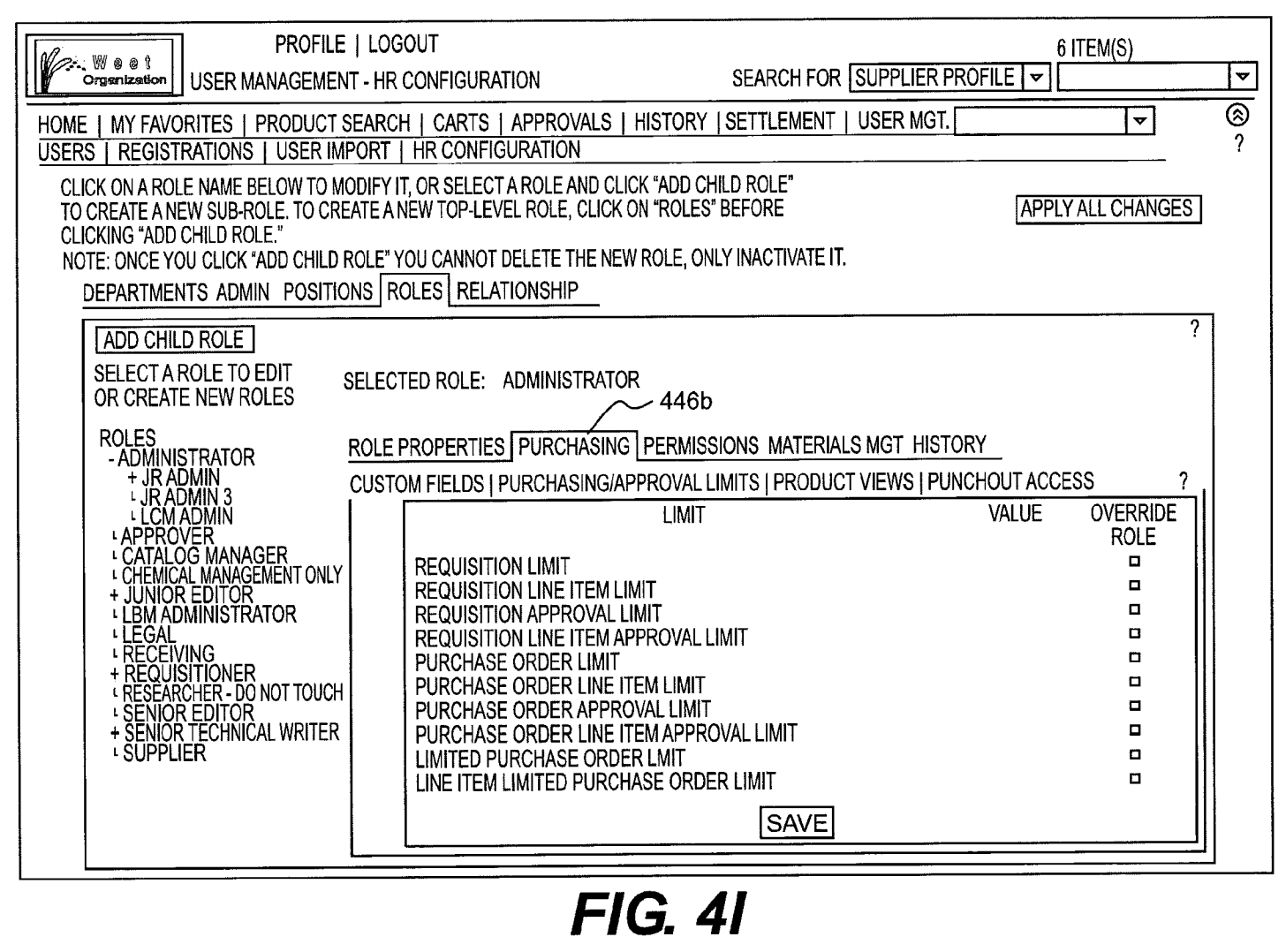
Figure 4J:
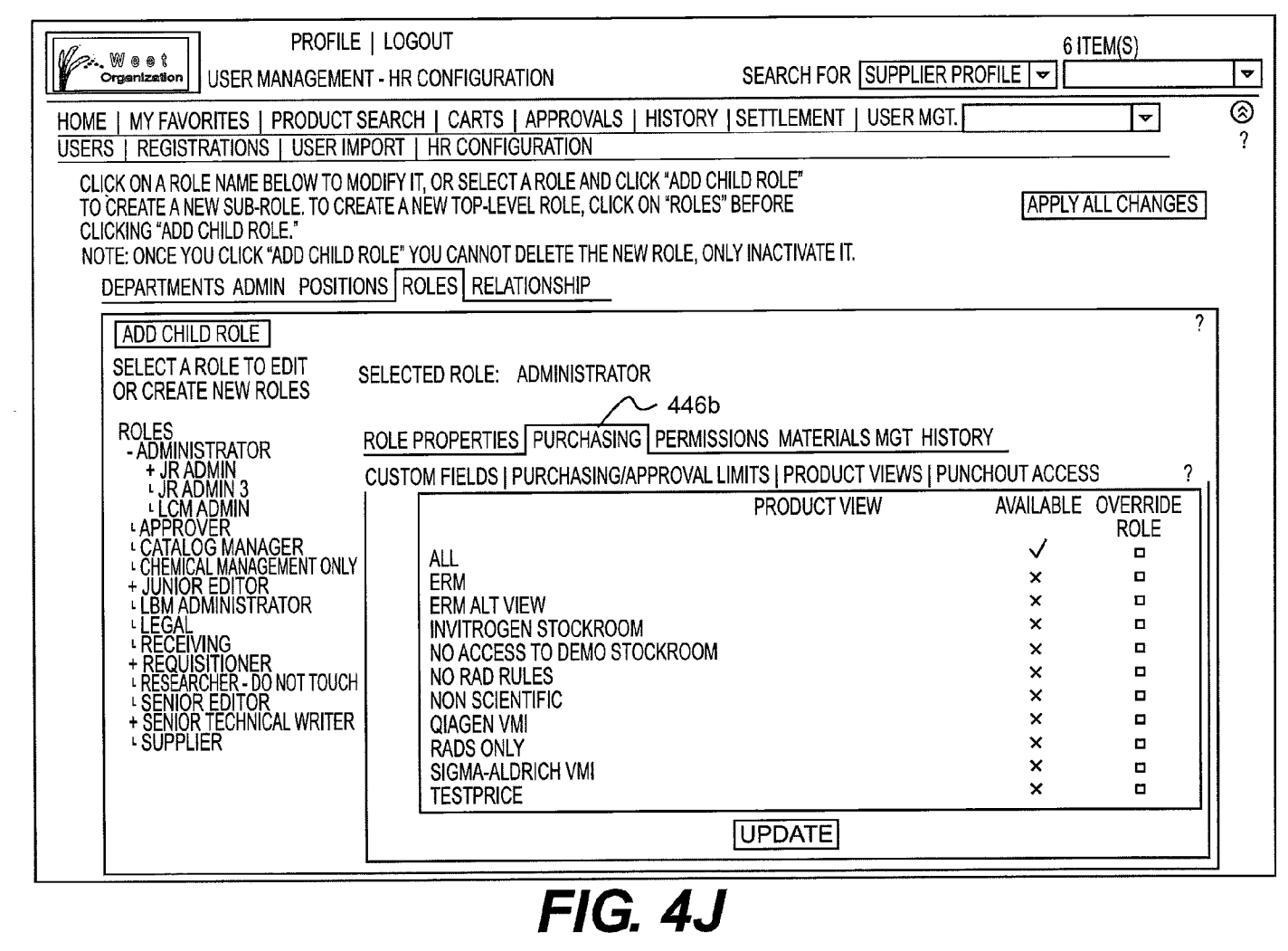
Figure 4K:
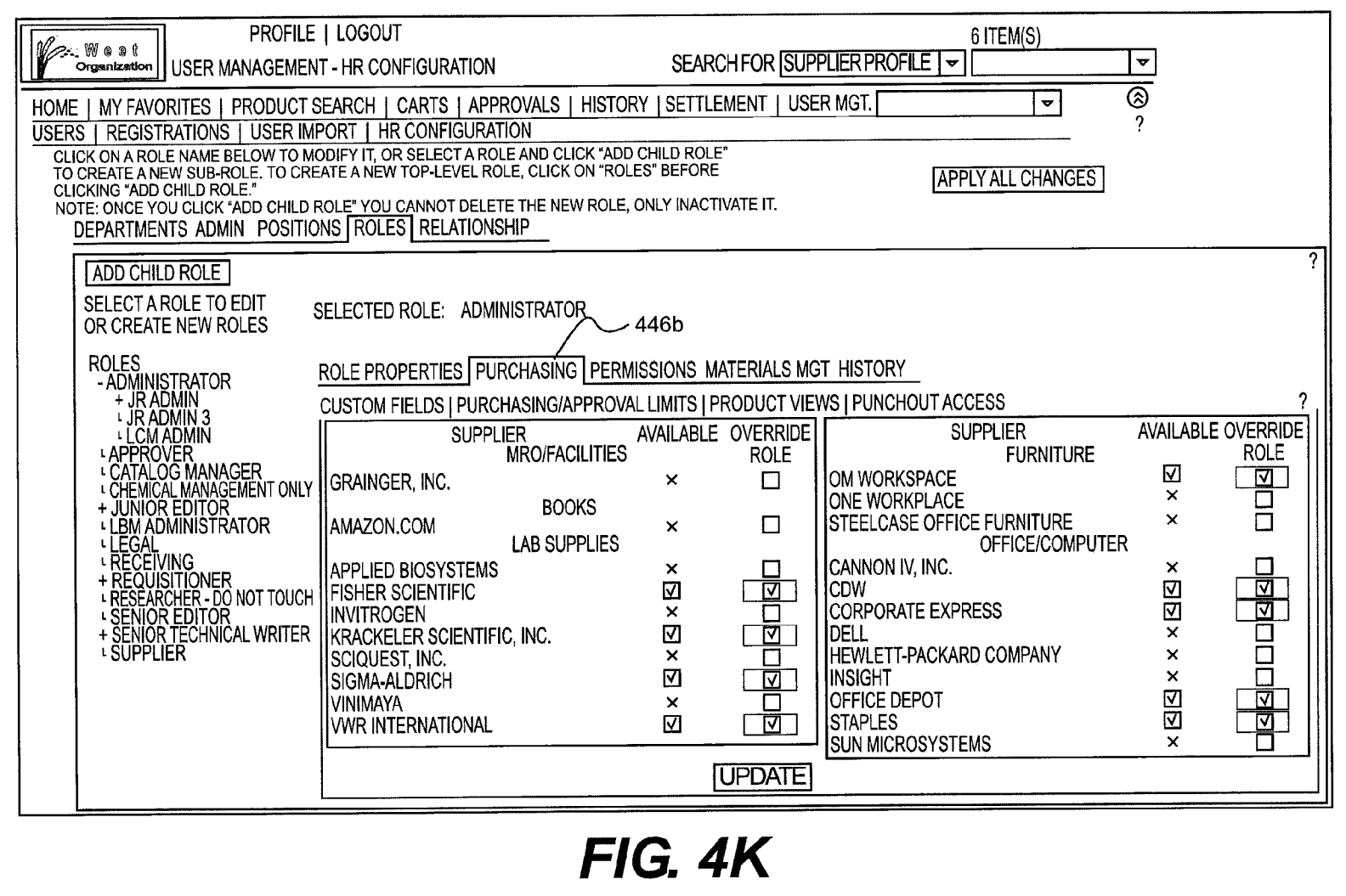
Figure 4L:
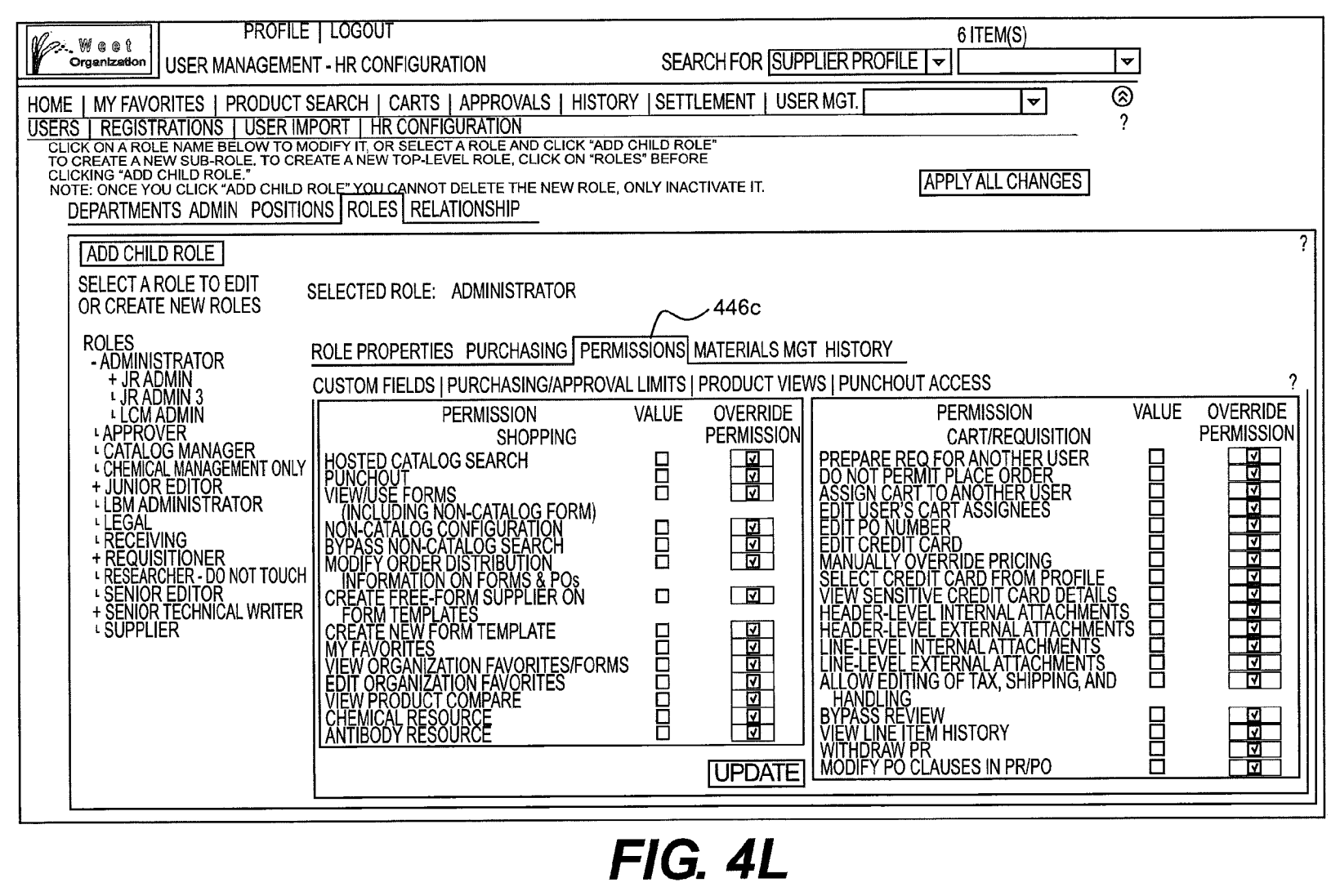
Figure 4M:
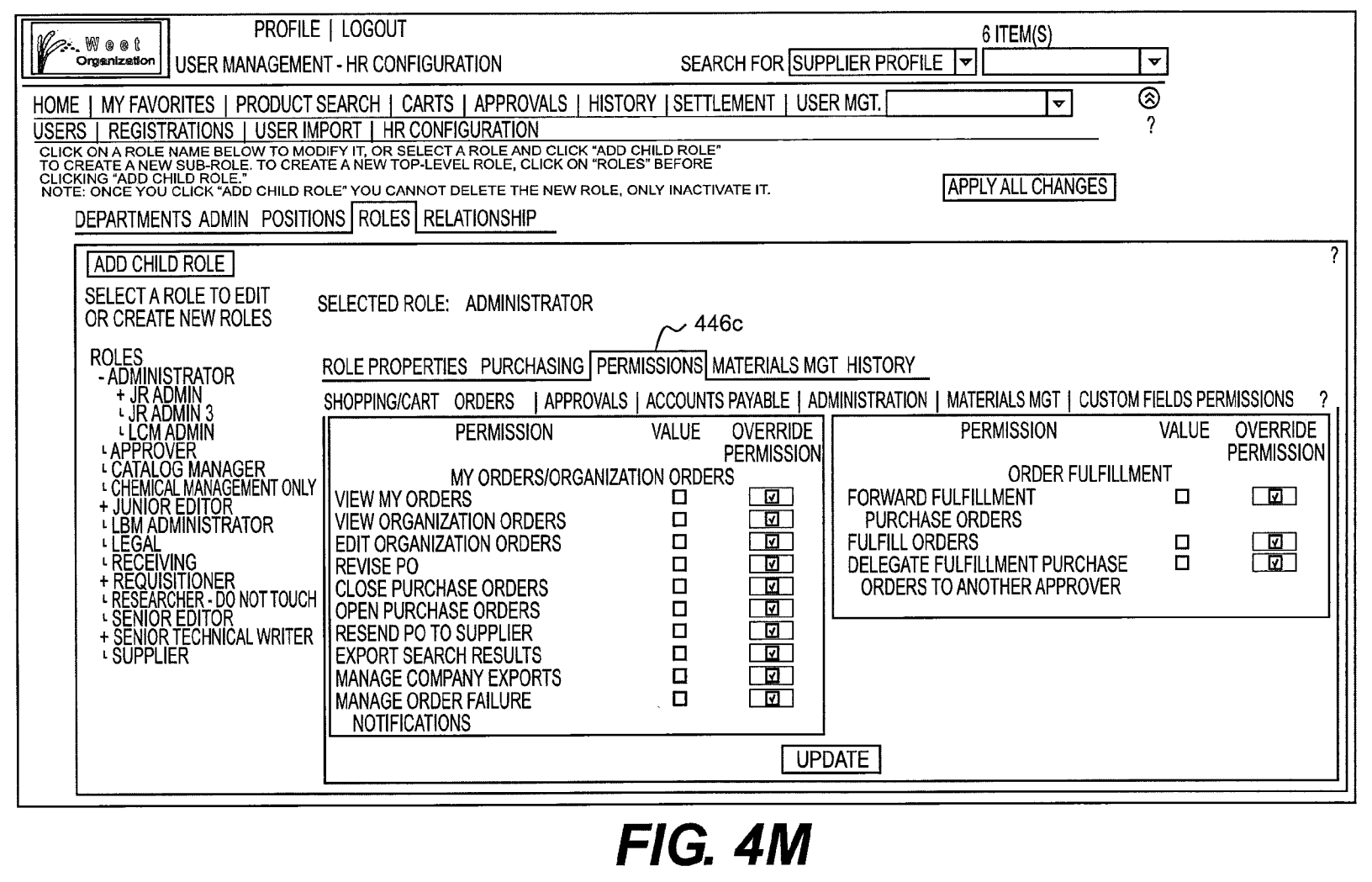
Figure 4N:
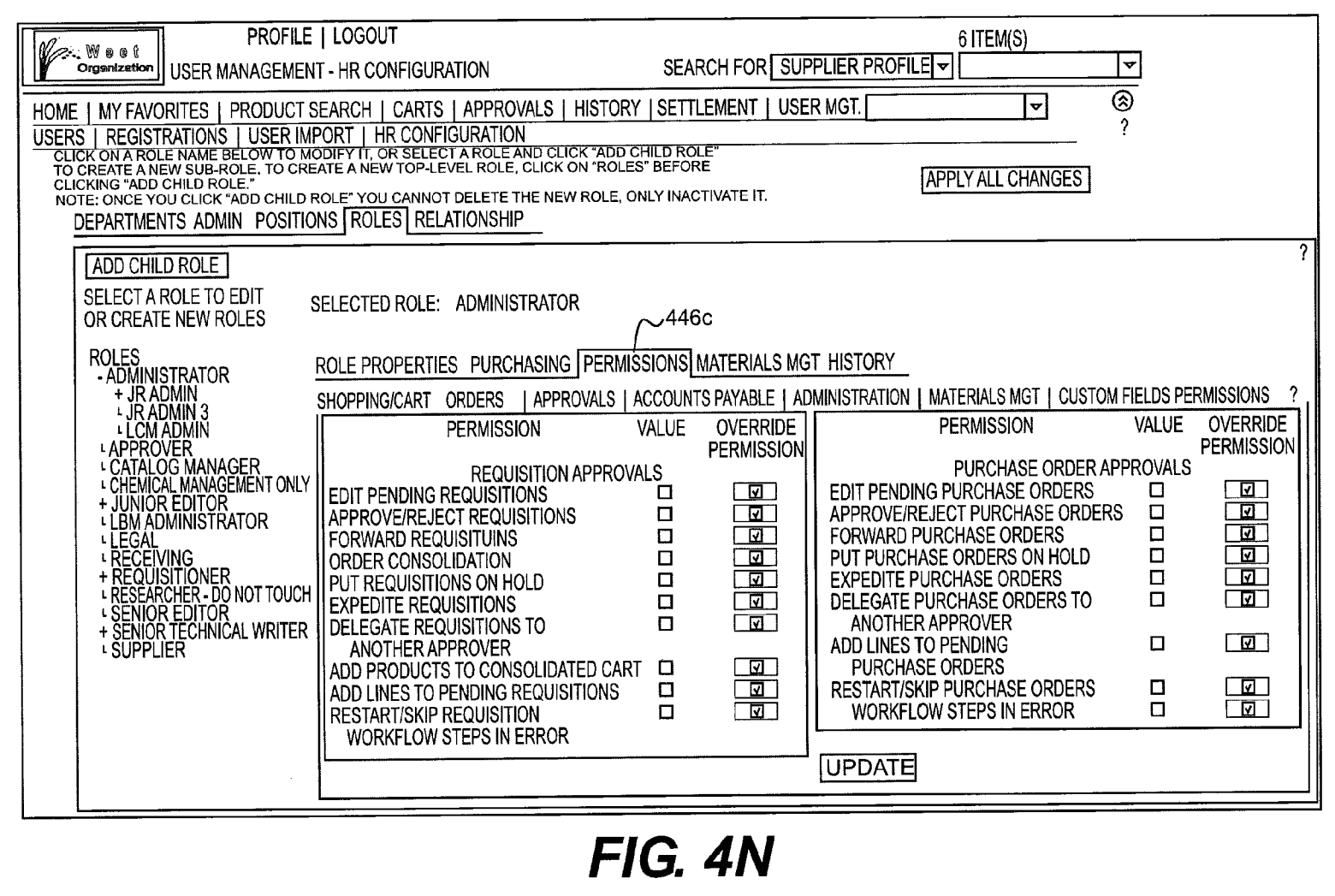
Figure 4P:
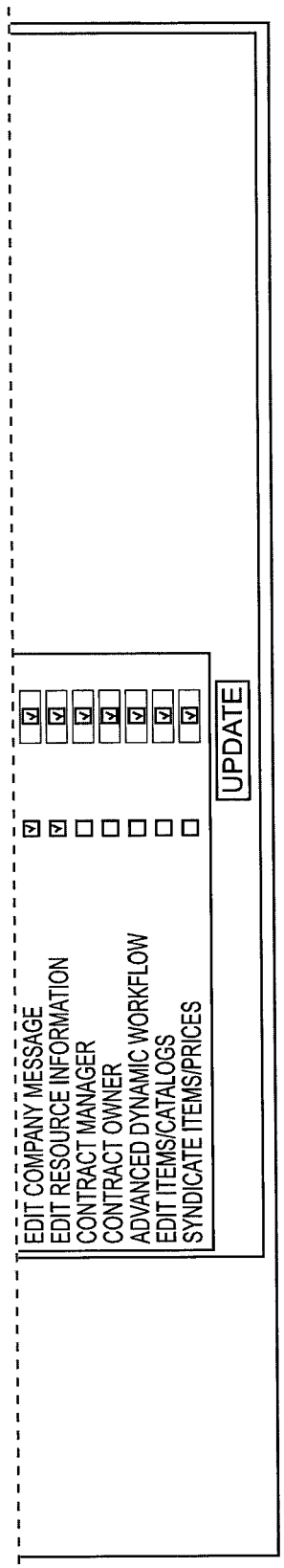
Figure 4Q:
Figure 4R:
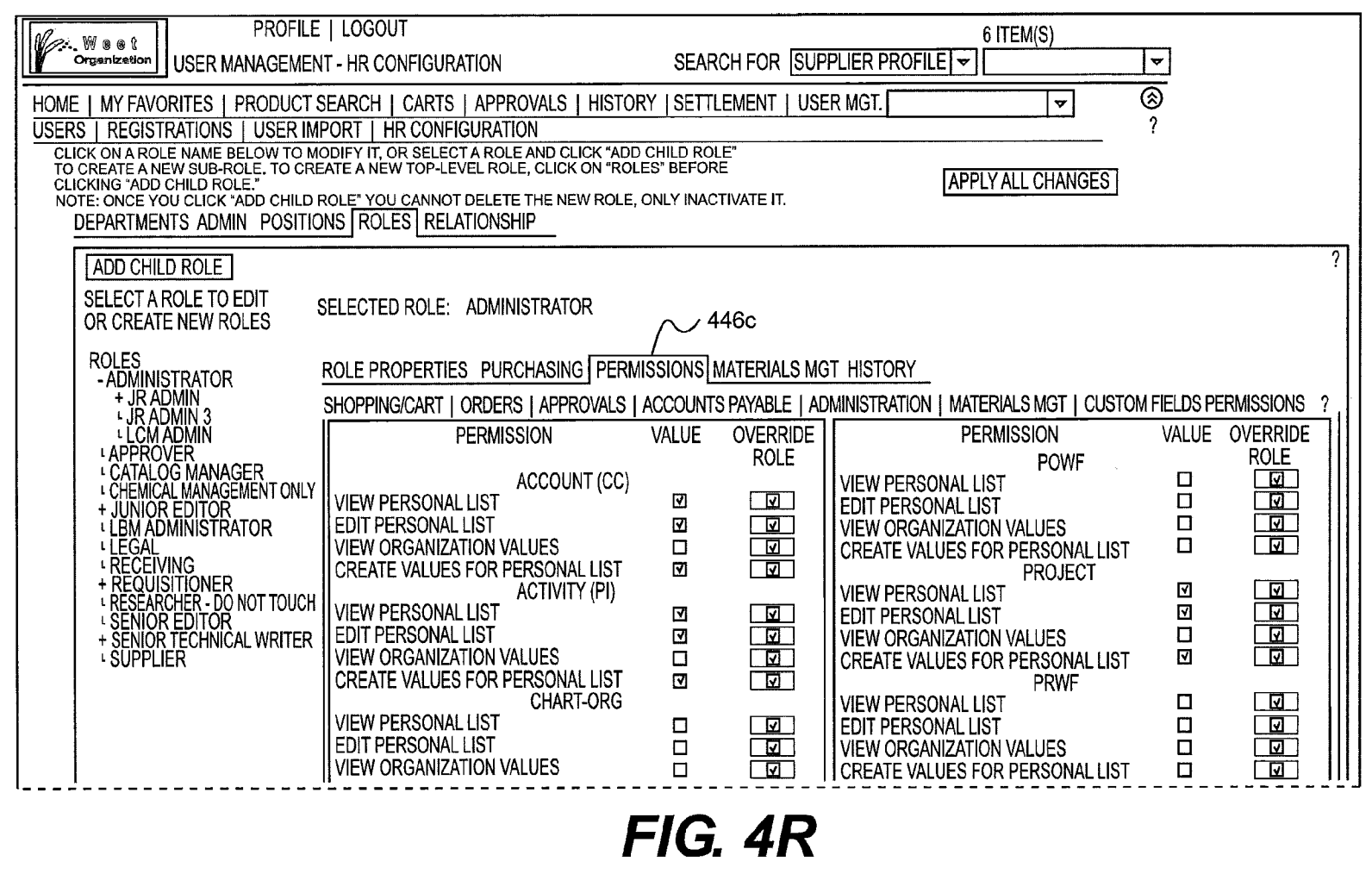
Figure 4R:
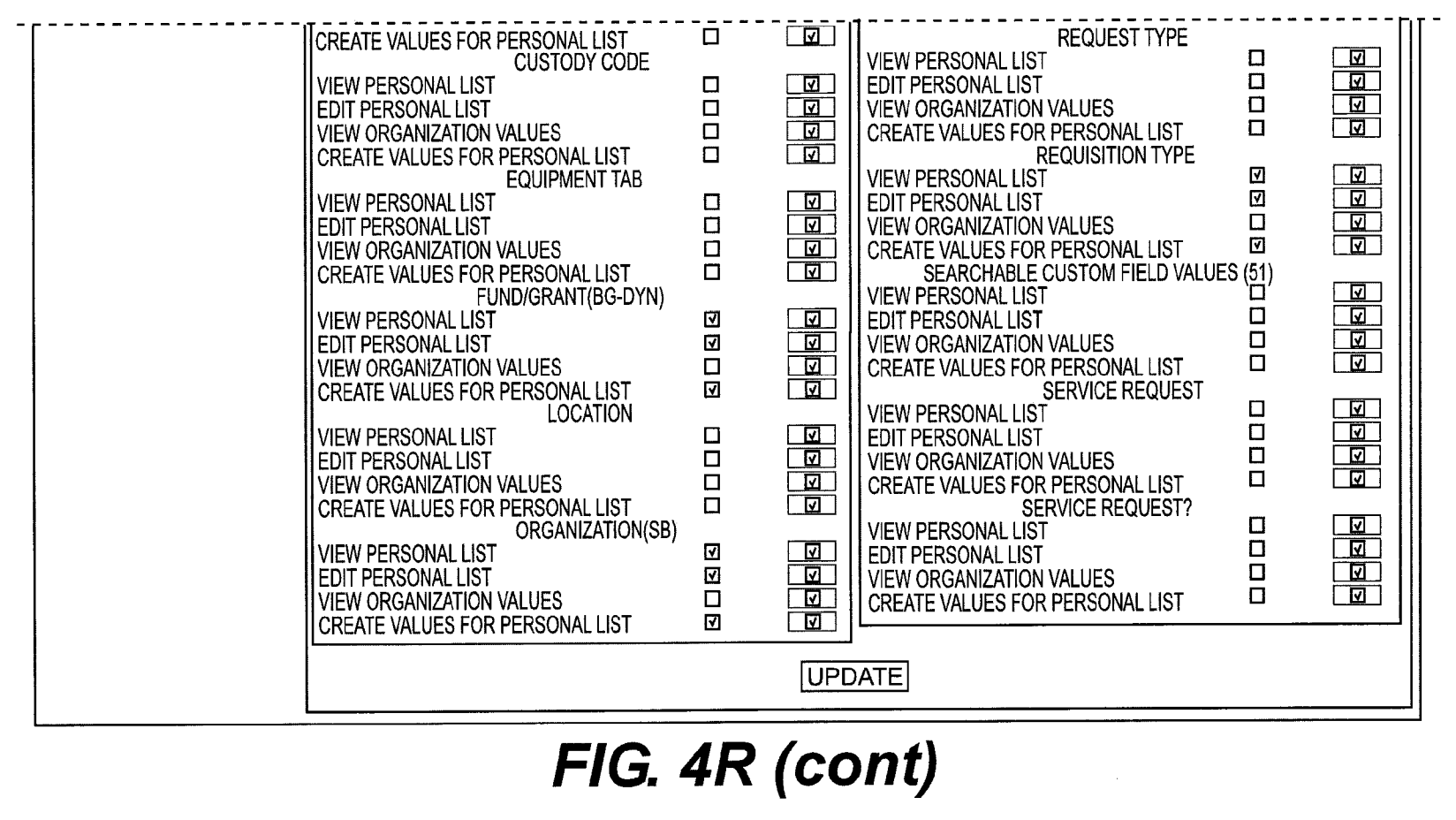
Figure 4S:
Figure 4S:
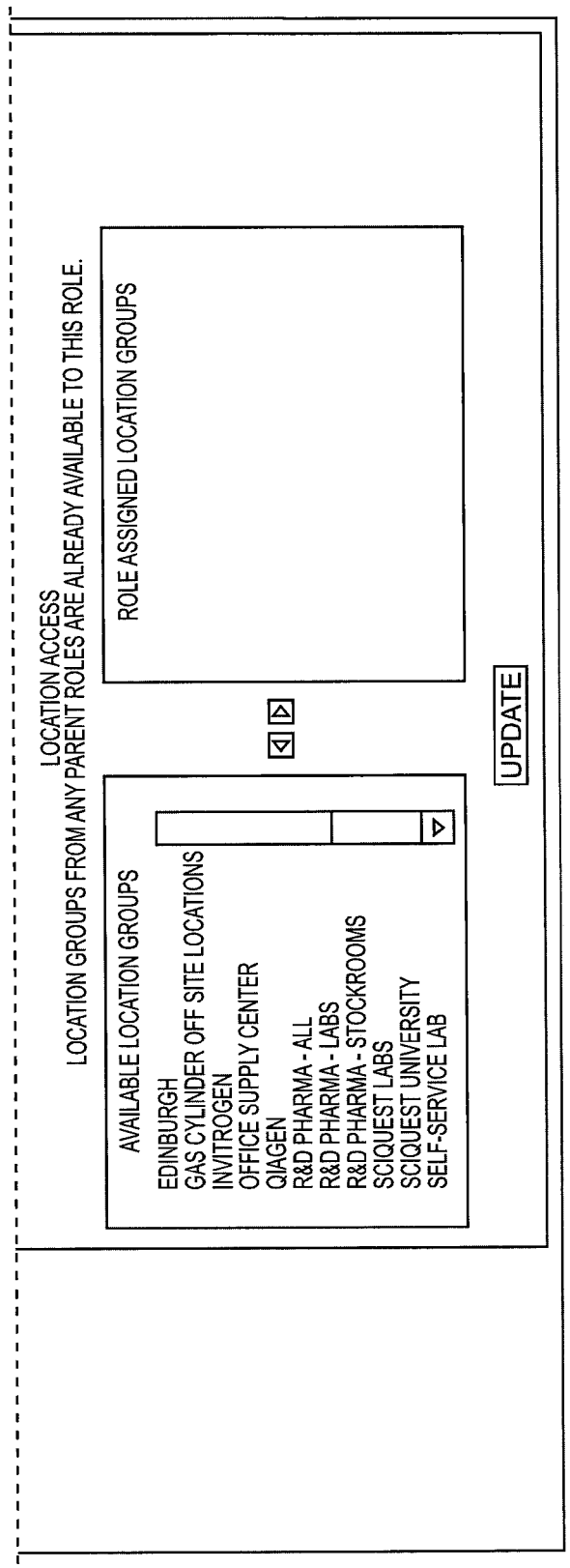
Figure 4T:
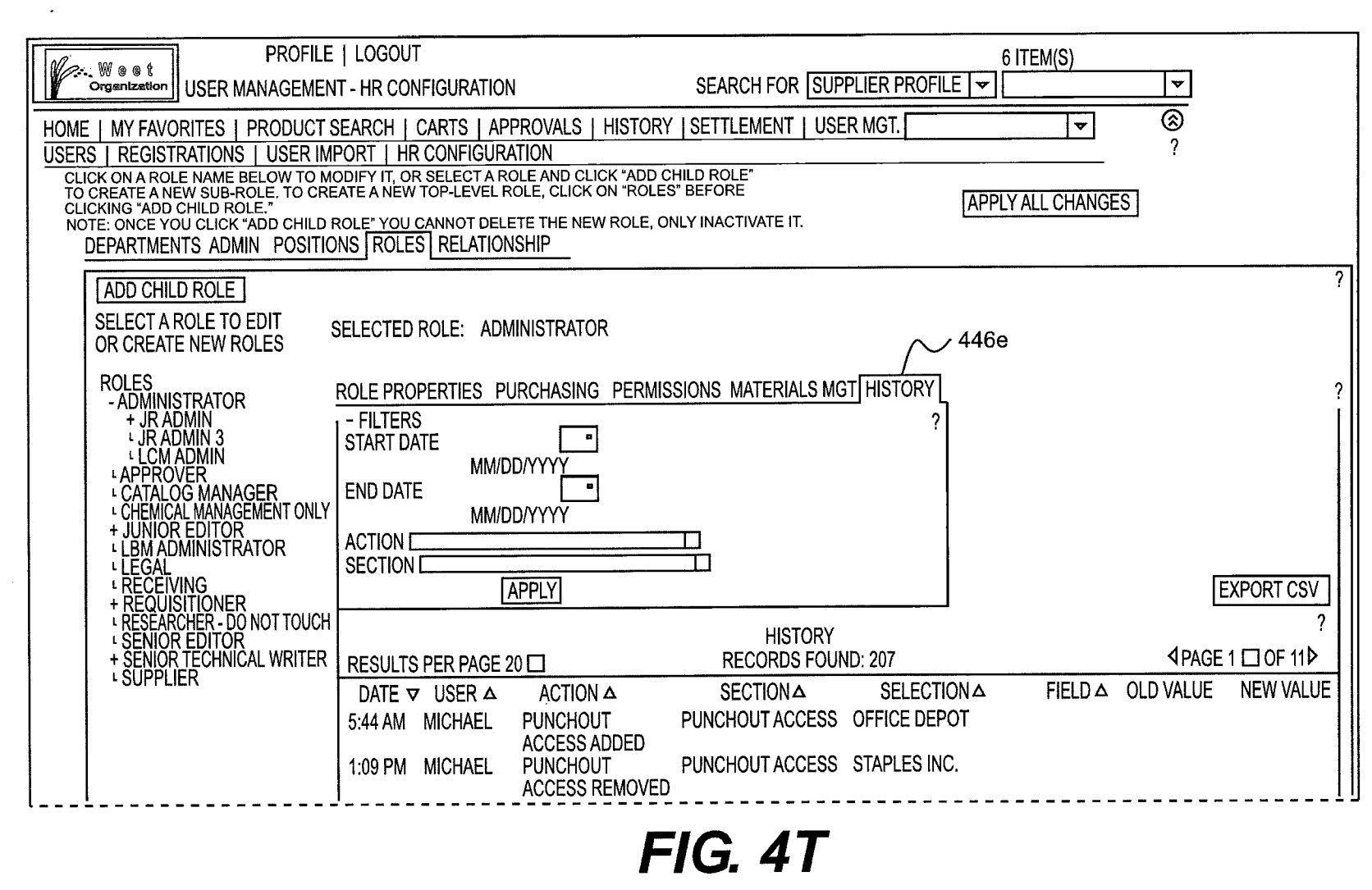

For each role, the roles configuration tool 446 is used to define the role properties (446a), purchasing properties (446b), access permissions (446c), materials management rules (446d), and history of modifications to these definitions (446e). For example, for the role of "Administrator," the role properties 446a (FIG. 4G) may include whether the designated role is active in the organization and the purchasing properties 446b may include definitions of any internal and external purchasing codes and information (e.g., "PRWF") (FIG. 4H), purchasing/approval limits (FIG. 4I), allowed product views (FIG. 4J), and allowed punch-out access (FIG. 4K). The access permissions 446c may be defined for the roles including shopping cart permissions (FIG. 4L), orders (FIG. 4M), approvals (FIG. 4N), accounts payable (FIG. 4O), administration (FIG. 4P), management of materials (FIG. 4Q), and custom fields permissions (FIG. 4R). The materials management 446d defines the available projects and location of groups to the various roles (FIG. 4S). The history section 446e keeps track of a history of all the actions (e.g., modified, created, product view added, product view removed, punch-out access added, punch-out access removed, project added, project removed, location added, location removed, etc.) and the sections to which the actions were applied (e.g., role properties, product views, punch-out access, materials management, permissions, purchasing/approval limits, custom field permission definitions, etc.) including the old value of the parameter and the new value of the parameter (FIG. 4T).

Figure 5A:
FIG. 5A illustrates an exemplary user setting tool.

Once the internal organizational structure and descriptions of key positions of users in the organization have been defined using the user management tool 400, specific users and their level of access may be defined. As discussed above, the level of access of a user may be assigned globally based on their positions and/or roles in the organization. In addition, the eProcurement architecture allows customization down to specific individuals all within the single instance, multi-tenant environment. For example, FIG. 5A illustrates an exemplary user profile tool 500 for defining a user's account in the eProcurement system. As shown, the user profile tool 500 includes one or more of a user setting tool 510 (comprising a user identification tool 510a for entering user identification data), user purchasing tool 520, user permissions tool 530, user materials management tool 540, and user setting history tool 550. These tools provide customization of the user's account for various levels of access to the eProcurement system all within the single instance, multi-tenant environment.

Figure 5B:
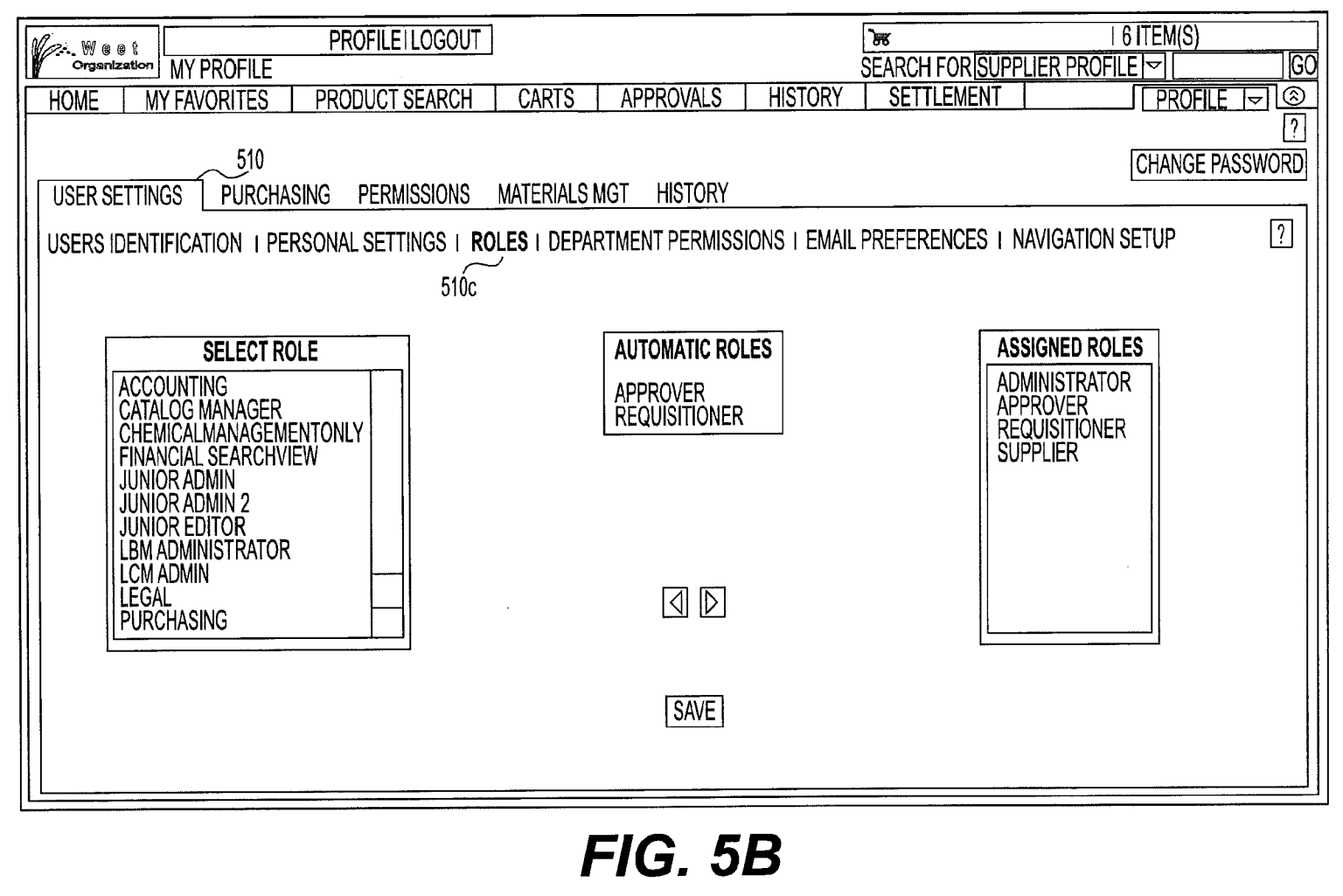
Figure 5C:
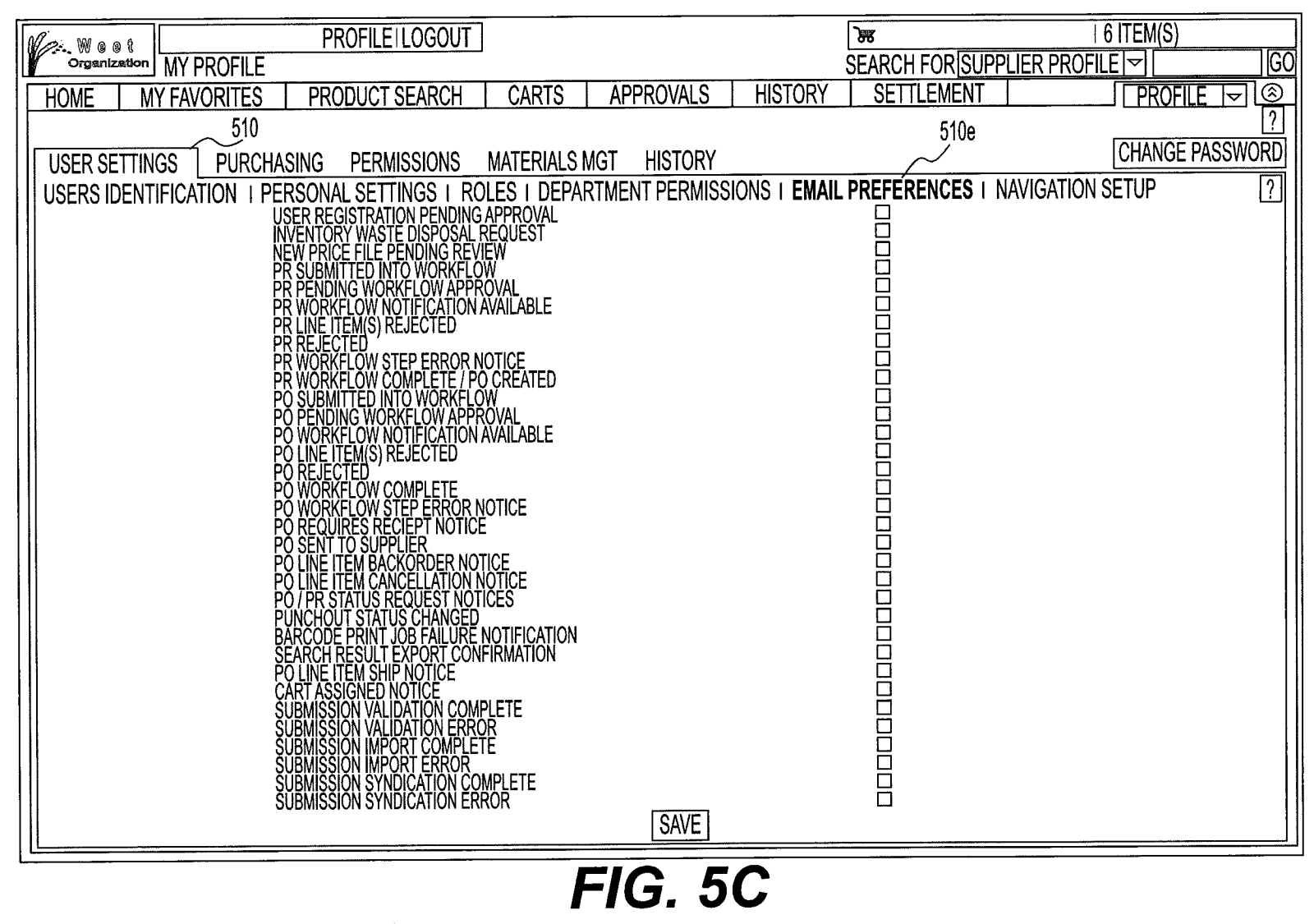
Figure 5D:
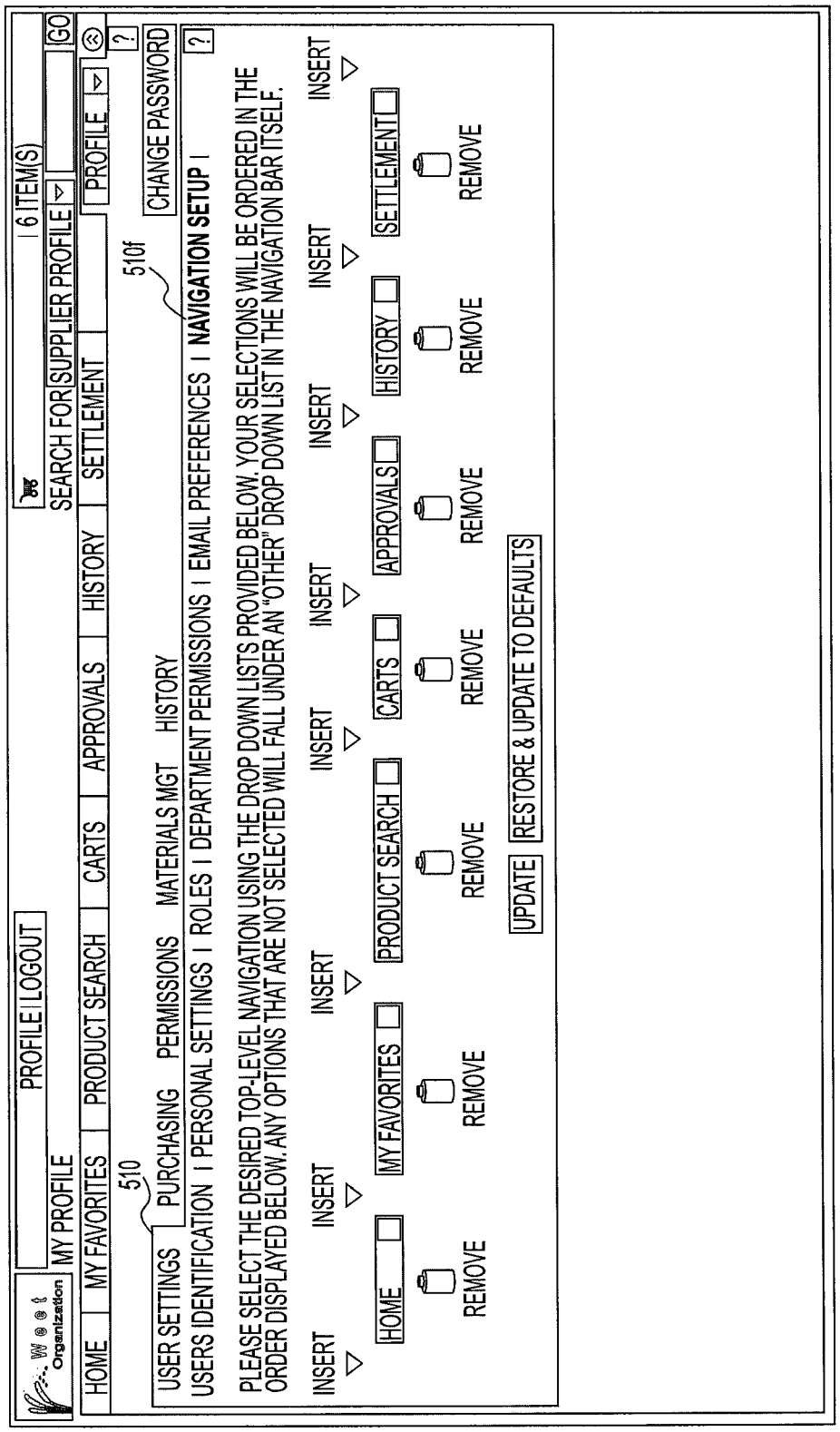
FIG. 5D illustrates an exemplary navigation setup tool.

For example, as shown in FIG. 5A, an exemplary user setting tool 510 shows that the user is a "Professor" in the "Engineering" department. As discussed above, users in this department and position have default levels of access defined by a super user using the user management tool 400. However, because a user may have additional roles assigned to the user that are beyond the normal scope of the user's position, the eProcurement system allows a super user to modify the user's level of access on an individual level. For example, FIG. 5B illustrates an exemplary roles selection tool 510c to modify the roles assigned to the selected user. Through the roles selection tool 510c, a super user may be able to specifically tailor the roles of a user down to the individual level to provide customized access to the eProcurement system. Similarly, the user's departmental permissions may be modified using the department permissions tool 510d. Various aspects of the user's account may also be customized, such as the user's personal settings 510b, email preferences 510e, and navigation setup 510f. As with the user management tool 400 and the roles/permissions tools 510c and 510d, all customizations may be performed by simply activating/deactivating a function available on the eProcurement system. For example, FIG. 5C illustrates an exemplary email preference tool 510e, which lists all of the action notifications that may be received via email. A user only has to activate/deactivate a preference by selecting the notifications the user wishes to receive via email. Similarly, FIG. 5D illustrates an exemplary navigation setup tool 510f. As shown, a user simply selects the navigation tools to be displayed (or removed) from the top-level navigation bar.

Figure 5F:
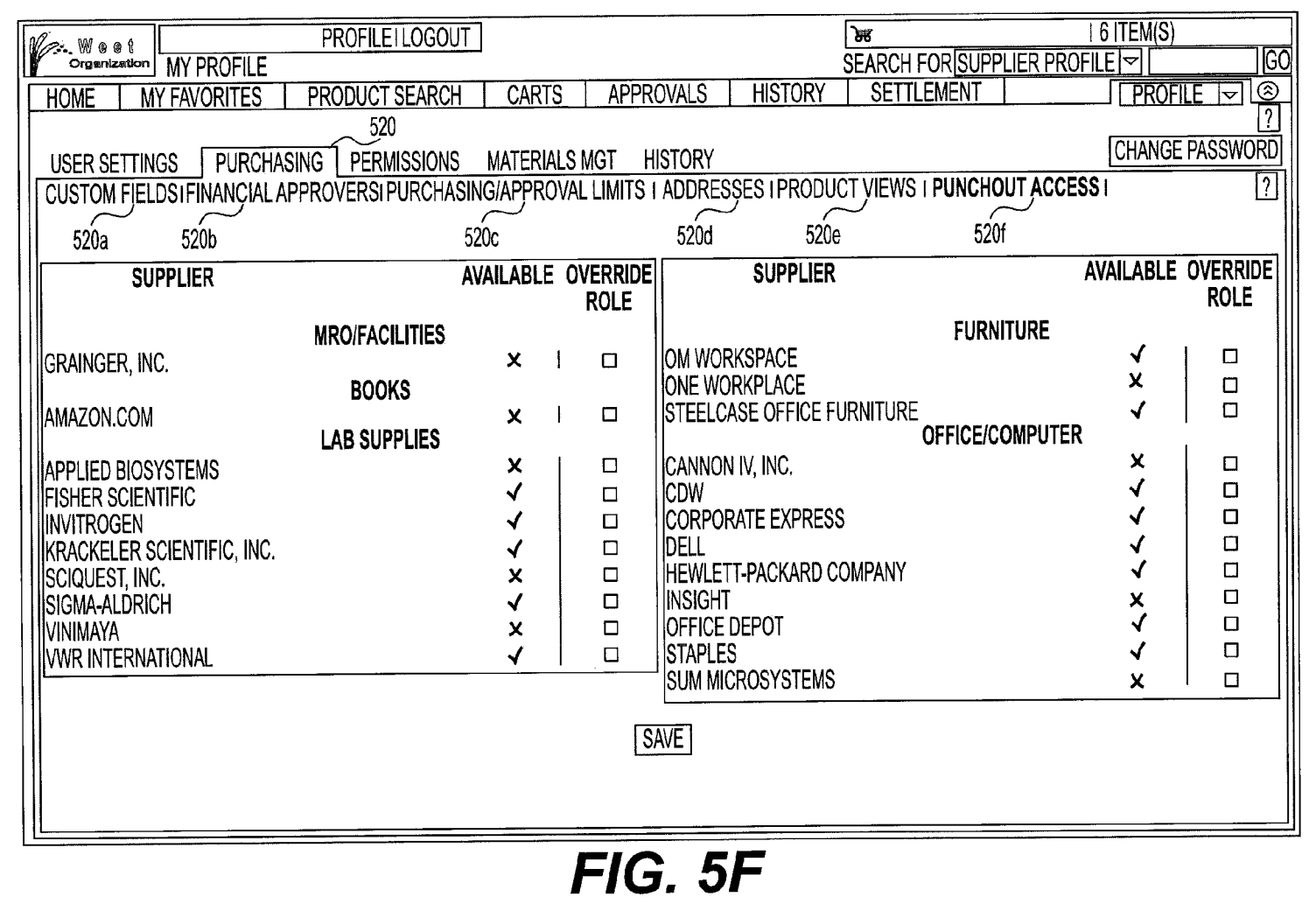

The user purchasing tool 520 shown in FIG. 5E allows a super user to define the purchasing activities of the user. For example, as shown in FIG. 5E, user purchasing tool 520 includes one or more of the custom fields tool 520a, financial approvers tool 520b, purchasing/approval limits tool 520c, shipping/billing address tool 520d, product views tool 520e, and punch-out access tool 520f. The custom fields tool 520a is similar to the purchasing properties tool 446b (FIG. 4H) to define the internal and external codes needed to make a purchase (e.g., product code). The financial approvers tool 520b designates purchase approvers for the user. Default, preferred, and additional approvers may be designated through the financial approvers tool 520b as well as removing approvers for the user. The purchasing/approval limits tool 520c designates the limits of purchases and/or approvals of purchases allowed for the user. FIG. 5E illustrates an exemplary view of the purchasing/approval limits tool 520c. As shown, the limit values of various activities related to purchases may be defined for the user. The shipping/billing address tool 520d designates the shipping/billing address associated with the user. The product views tool 520e designates the type of products the user is allowed to view. The punch-out access tool 520f designates the punch-out catalogs that are allowed to be accessed by the user. For example, FIG. 5F illustrates an exemplary punch-out access tool 520f. As discussed above, these settings may be designated as a default based on the department/position/role assigned to the user. However, these tools may be used to customize the default settings for the specific individual user.

Figure 5G:
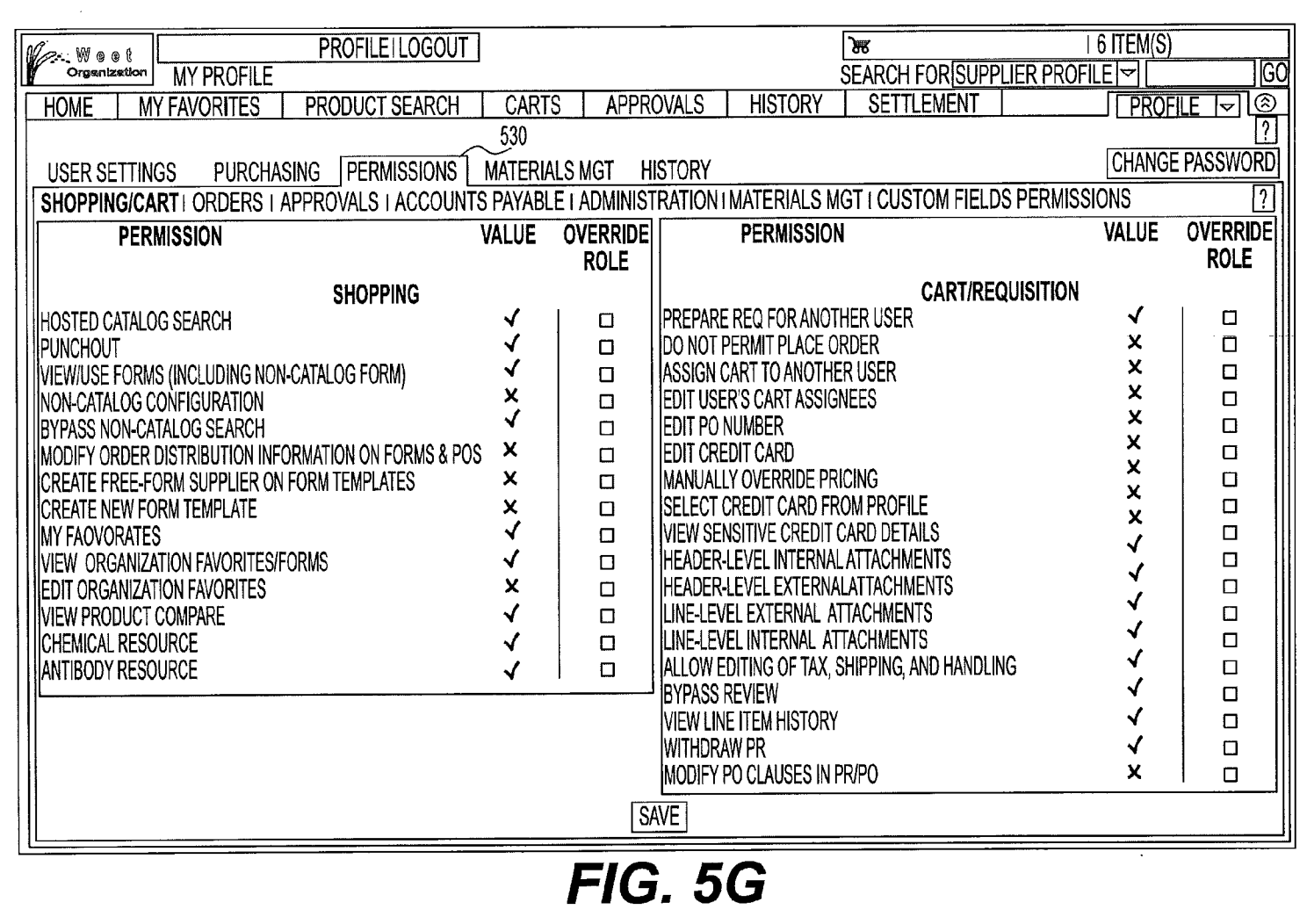
Figure 5I:
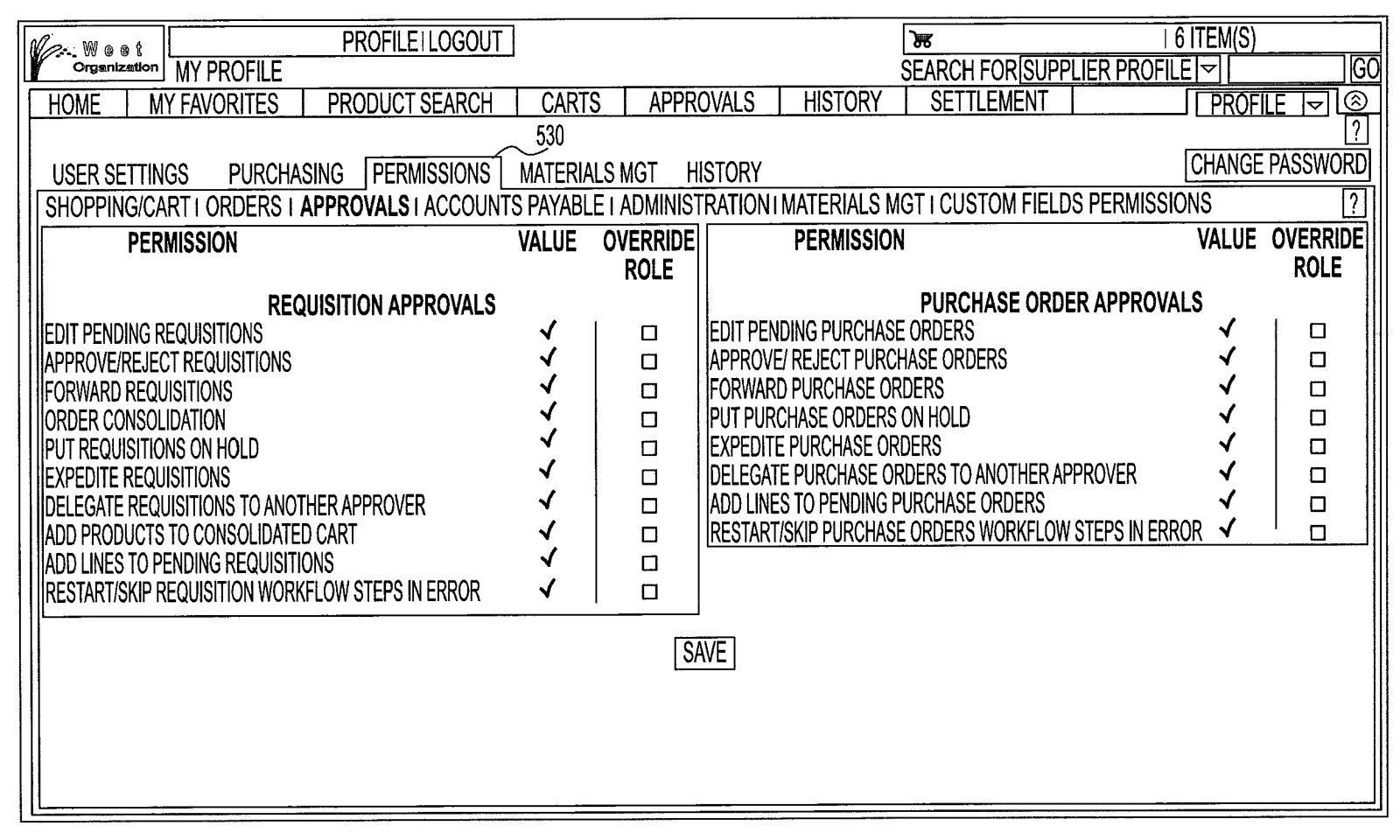
Figure 5K:
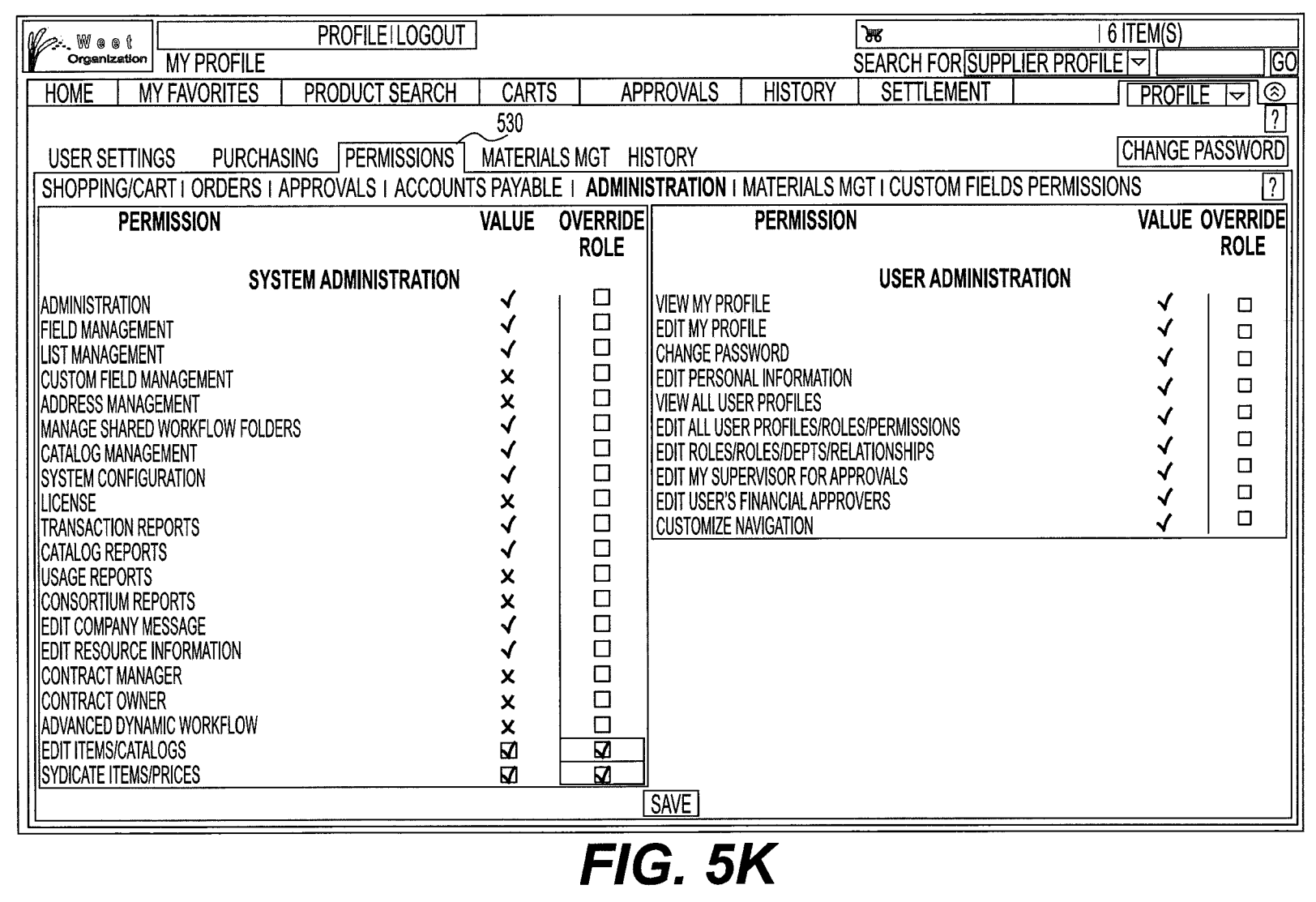
Figure 5M:
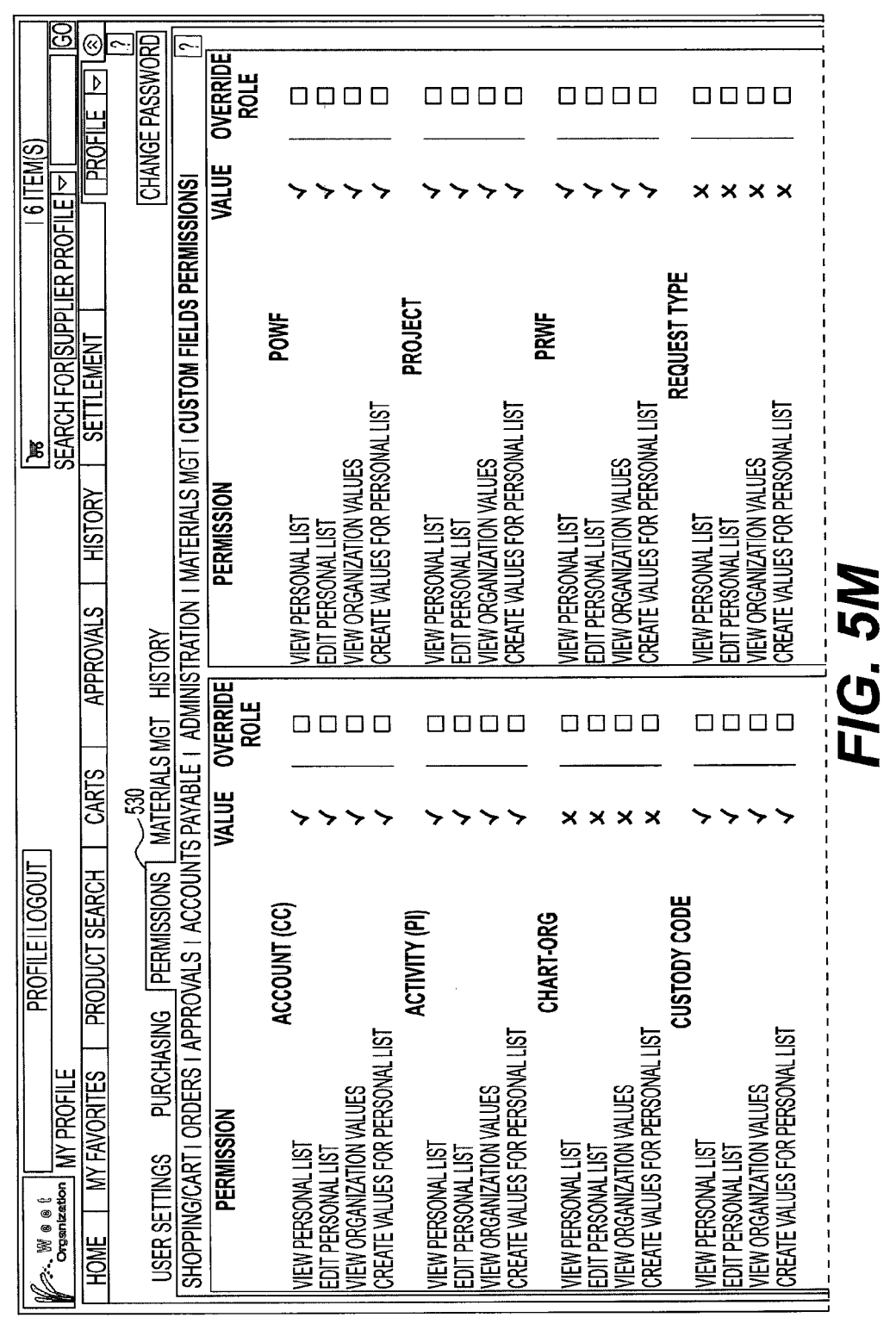
Figure 5N:

In a similar fashion, the user permissions tool 530 includes one or more of tools to customize the user's access to the shopping cart (FIG. 5G), order processing (FIG. 5H), approval processing (FIG. 5I), accounts payable processing (FIG. 5J), administration permissions (FIG. 5K), materials management (FIG. 5L), and custom fields permissions (FIG. 5M). The materials management tool 540 designates inventory locations based on projects and groups (FIG. 5N) as well as default/preferred access locations (FIG. 5O). As discussed above, the history tool 550 keeps track of all actions/changes made to the various parameters.

Figure 6A:
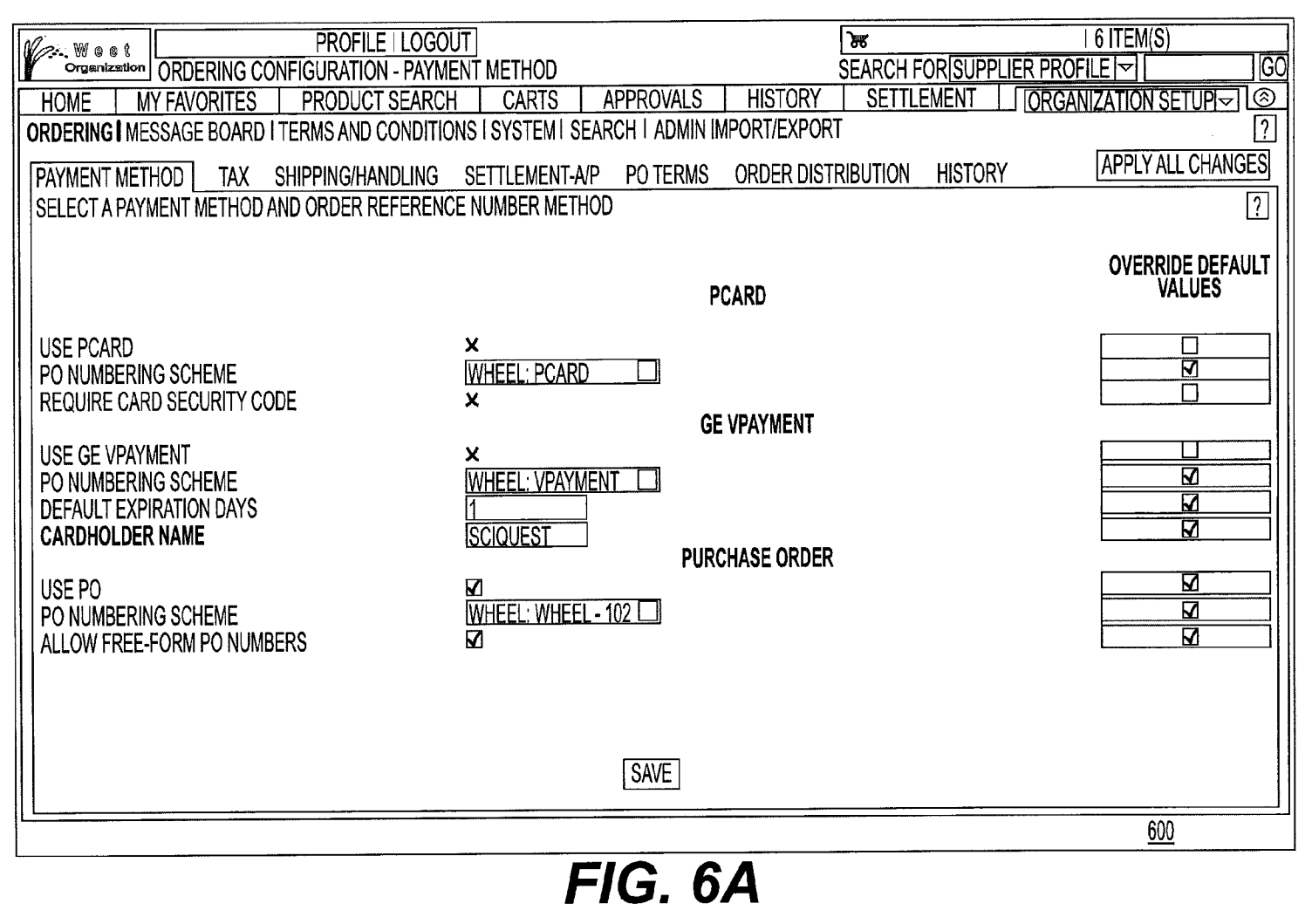
Figure 6B:
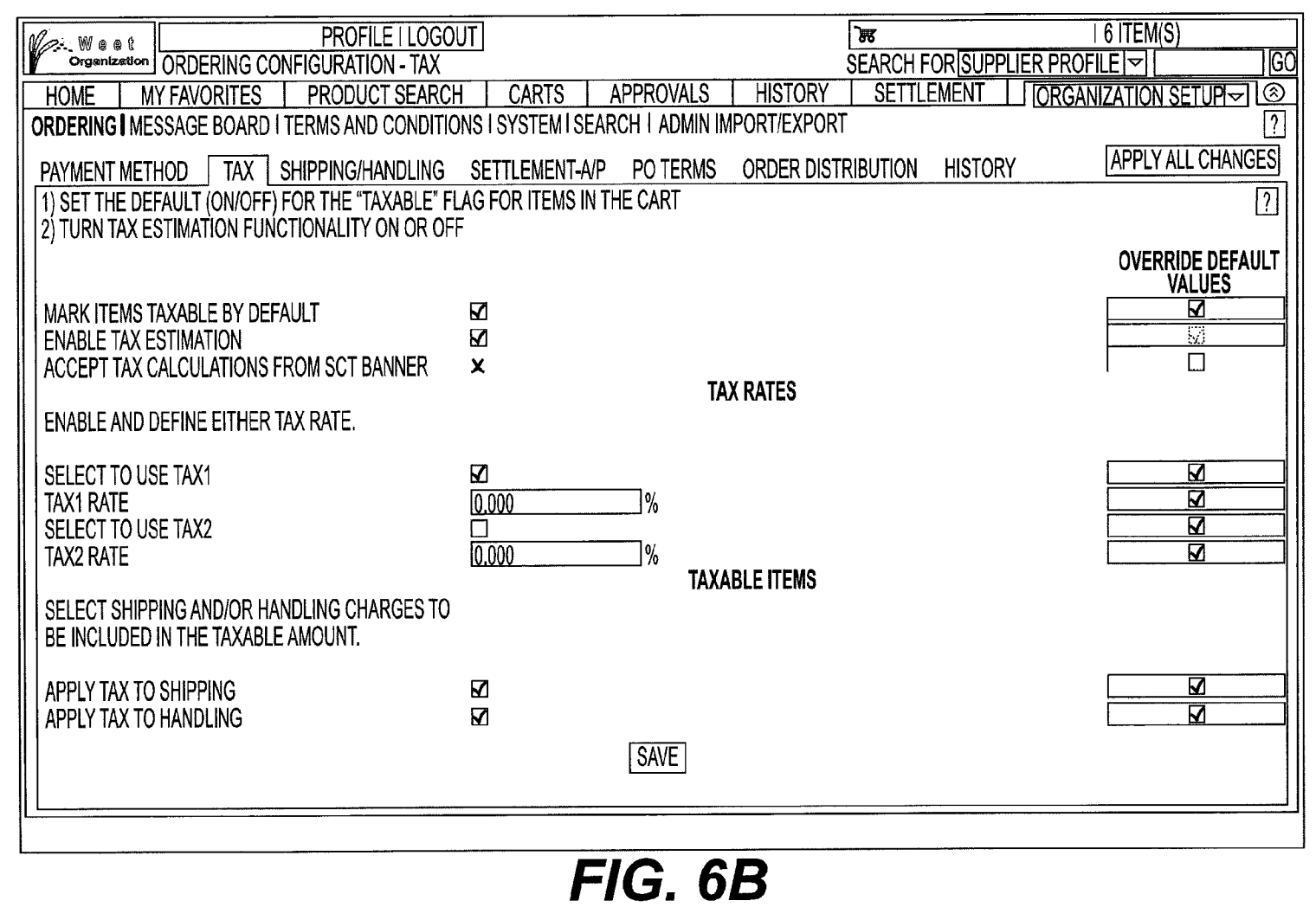
Figure 6C:
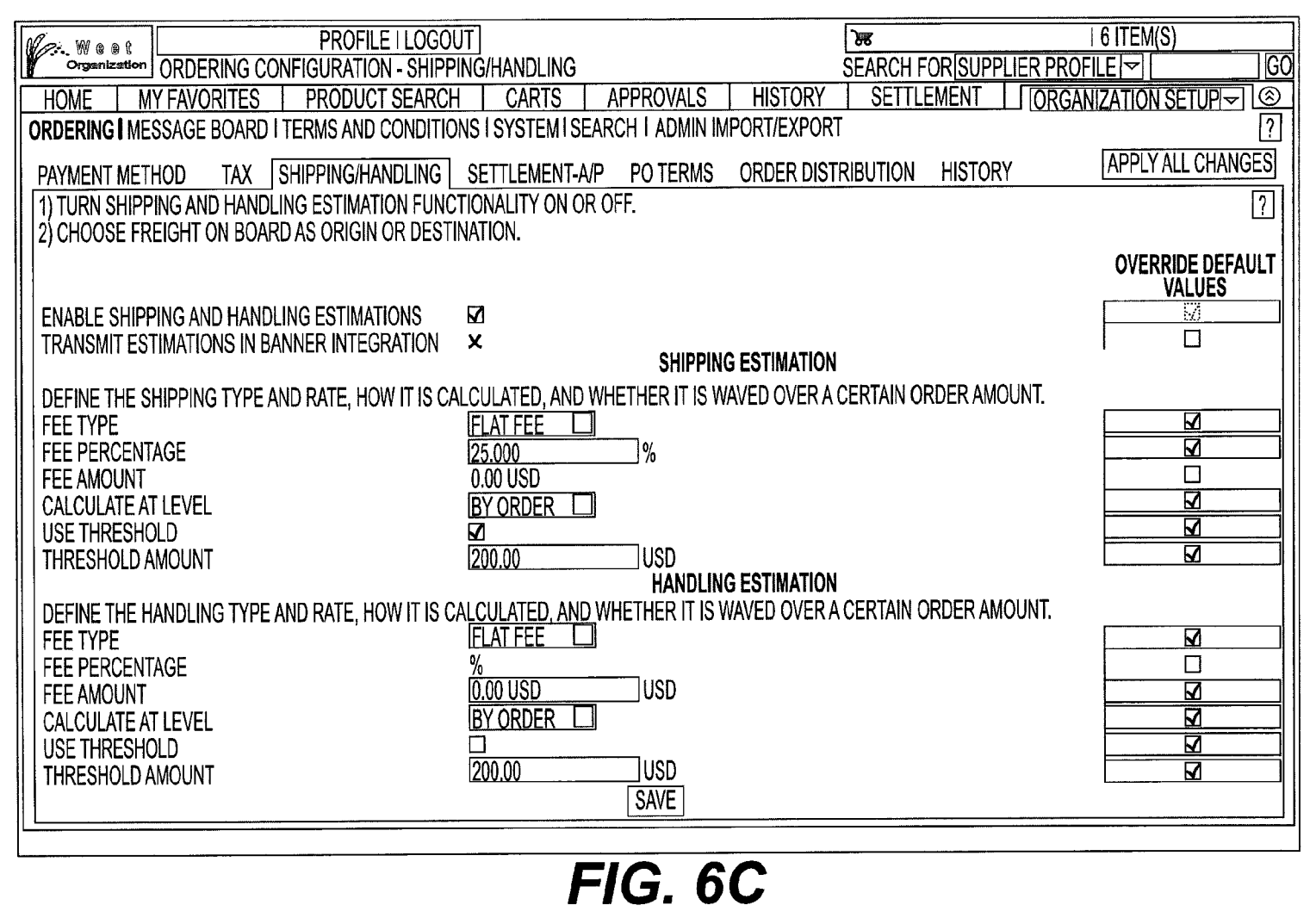
Figure 6D:
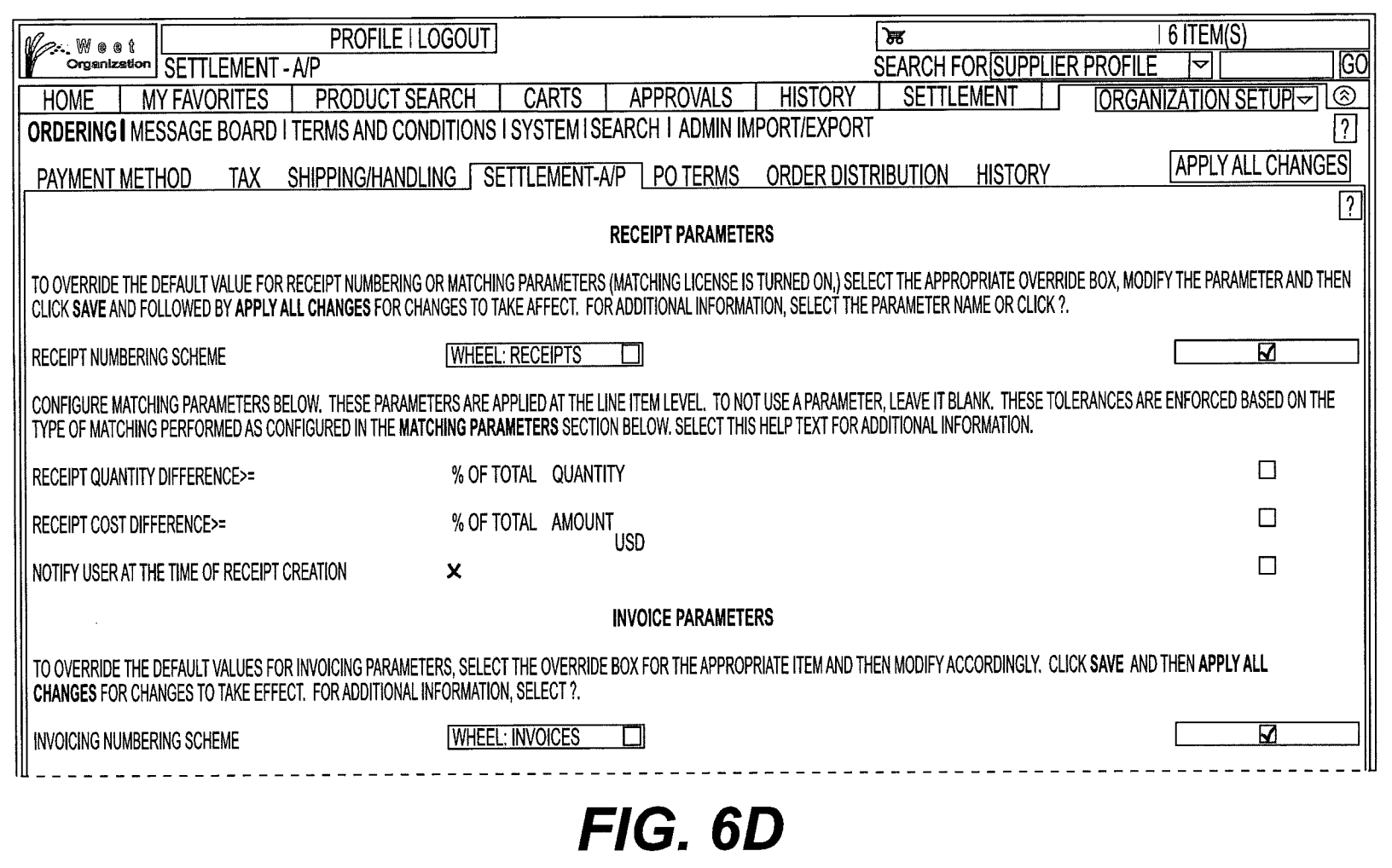
Figure 6E:
Figure 6F:
Figure 6G:
Figure 6H:
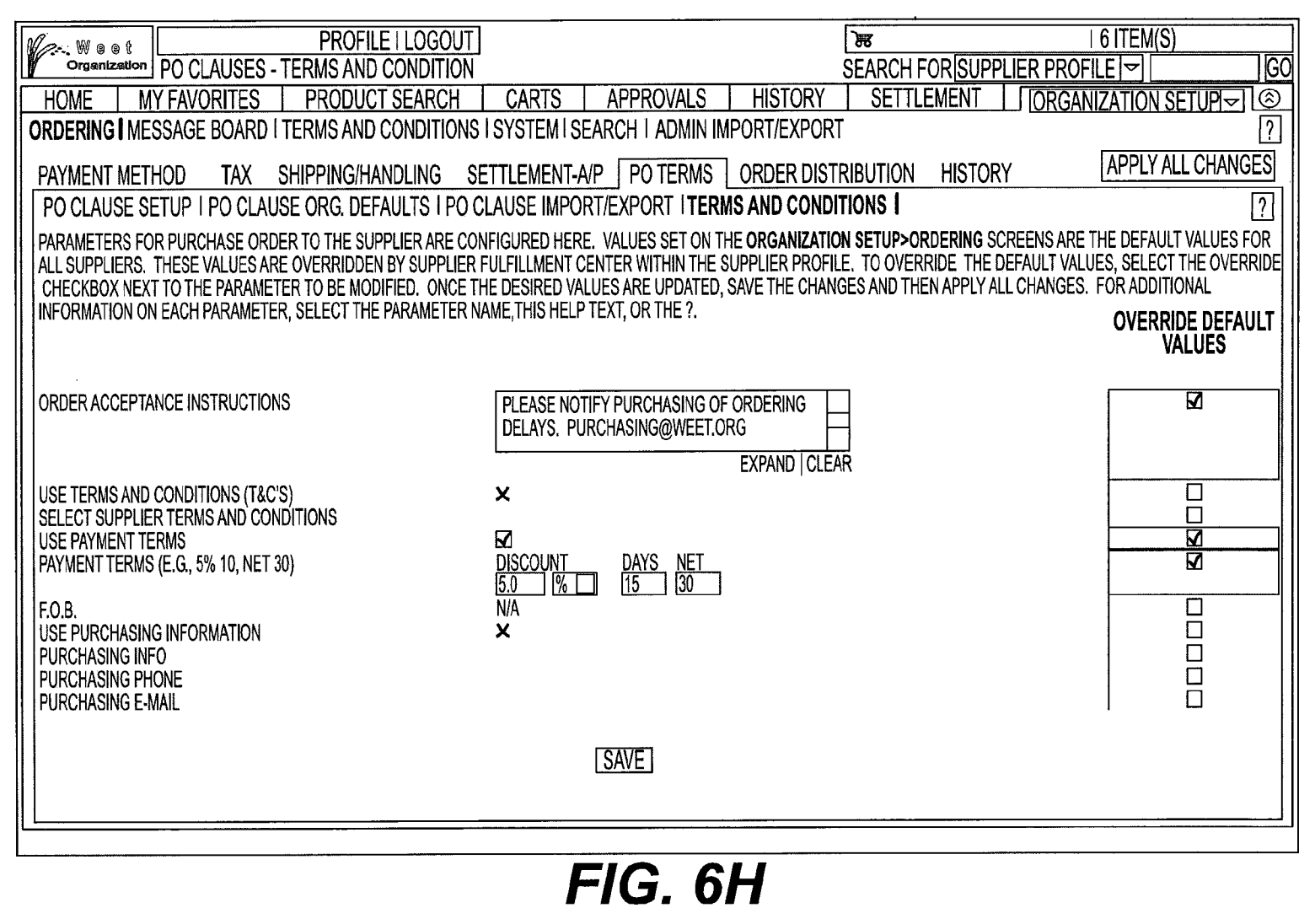
Figure 6J:

FIG. 6A illustrates an exemplary organization setup tool 600 for designating business rules such as method of payment (FIG. 6A), tax (FIG. 6B), shipping/handling (FIG. 6C), settlement (FIG. 6D), purchase order terms (FIGS. 6E-G), order distribution process (FIGS. 6I-J), and history of all actions effectuated through the organization setup tool. By organizing all of the terms and conditions of an order for each organization in a single instance, multi-tenant architecture, each requisition effectuated on the eProcurement system is processed efficiently.

Figure 7:
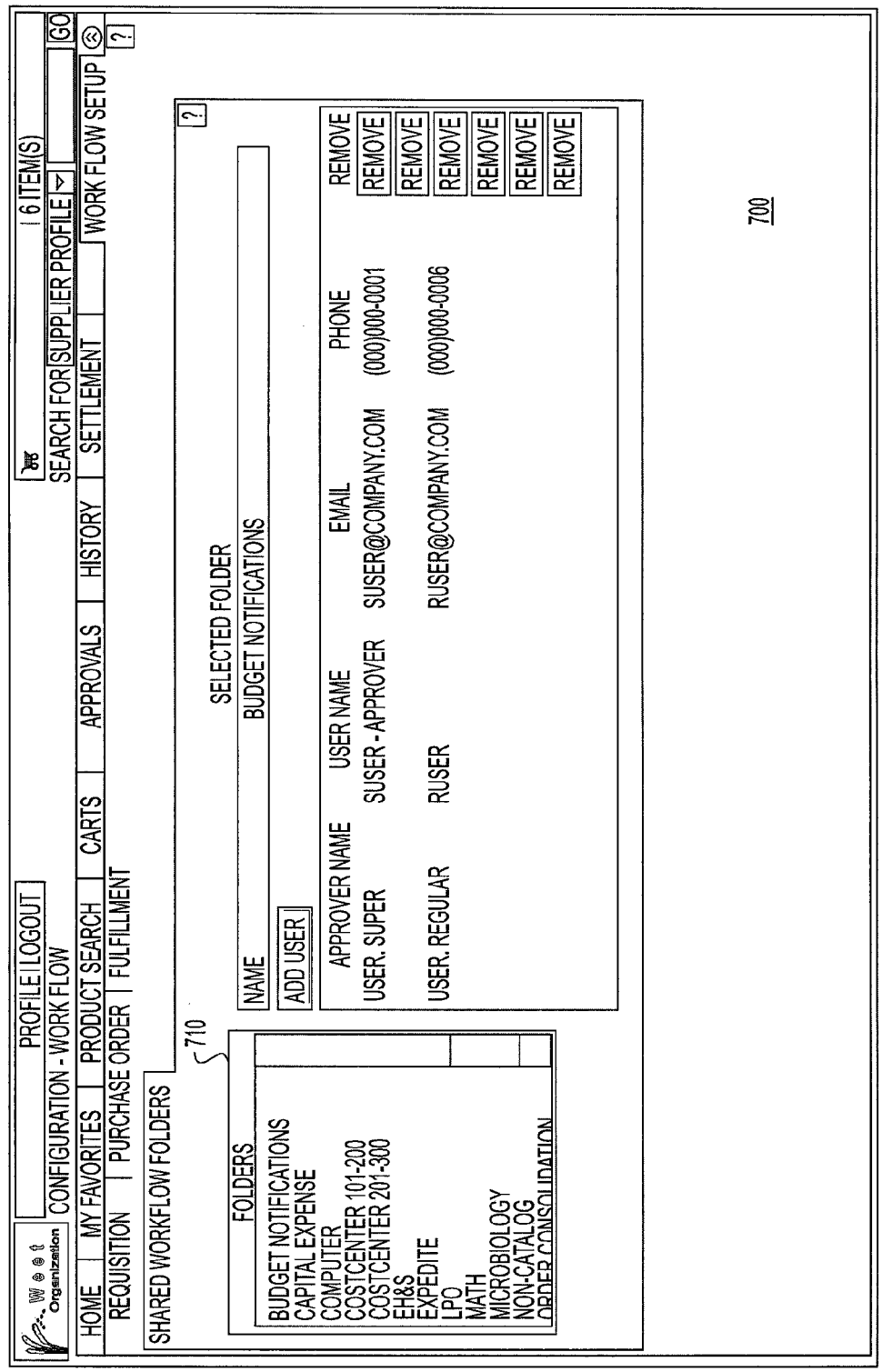
FIG. 7 illustrates an exemplary workflow setup tool.

FIG. 7 illustrates an exemplary workflow setup tool 700 to define the workflow process of a requisition, purchase order, and fulfillment. As shown in FIG. 7, the workflow setup tool 700 creates a shared workflow space 710 and allows for the assignment of users (e.g., individual users, or users of various user roles) to be included in the workflow process.

Other configuration tools include document attachment and setup tool (FIG. 102, document attachment and setup interface) to organize documents related to requisitions, purchase orders, and sales orders for access by the user. The document attachment and setup tool keeps track of the name of the document creator, version number, and any deployment dates, as well as other data related to the document. Moreover, the eProcurement system includes a field management tool (FIG. 100, exemplary field management interface) that allows super users to create, modify, and manage every field/parameter related to the procurement process used on the system. Accordingly, the eProcurement system may be custom tailored for each organization/user role/user while maintaining its single instance, multi-tenant environment.

As shown in FIG. 2, end user interfaces 212 and supplier user interfaces 214 provide access to the plurality of modules of the eProcurement system 10 (FIG. 1). As described above, the end user interface 212 is configurable by both end user and super users. Moreover, the end user interface 212 includes one or more features, for example, such as searching and viewing a hosted supplier products catalog, invoking purchase/requisition orders, consummating sales transactions, invoking status queries and viewing the response, and setting end user configuration preferences as described further below. For example, the search and view feature allows for searching via product description, supplier name, manufacturer name, catalog no. (SKU), a filtering capability, and by browsing: catalog/non-catalog items, suppliers, or contracts. A user may invoke any of these search inputs alone or in combination with others. Also, Boolean and fuzzy logic functionality is available for searching and allows a user to devise targeted search strategies that may return more accurate search results. Once a user has invoked a search using any of the inputs described, the user may then view the returned results. The returned results can be filtered by a user based on category or supplier. Also, a user may choose to organize the returned results such that similar results are listed in proximity of one another. For example, a user may organize returned results by weight, supplier, category, catalog number, product description, UOM, product size, price, quantity, and/or currency.

The catalog may be implemented as single instance but multi-tenant (or, as multiple instance, single-tenant), and may further include custom views of items as set by each internal end user and/or organization. An end user may specify favorites within the catalog. Such favorites are available for later viewing or purchasing by the end user. Any updates made to an end user favorite within the catalog will be automatically propagated to the end user's favorite(s) view as well (FIG. 101, an exemplary update favorite(s) process flow). The catalog may allow for supplier classifications and multiple products may be linked to a single supplier. Also, the catalog can be activated or deactivated through a simple click on the end user interface, and specific product categories can be globally manipulated and applied to affect all end users. Each catalog may contain information regarding one or more suppliers, and a master product database is primarily tasked with populating each hosted supplier products catalog. This master product database is a relatively large database with a plurality of attributes related to one or more specific products.

In addition to the hosted supplier products catalog, punch-out catalogs may also be implemented as an alternative and supplement to the hosted supplier products catalog, and are made available, for example, when the hosted supplier products catalog does not yield sufficient or satisfactory results. The punch-out catalogs link to outside/third-party catalogs, are not hosted, and may also contain end user organization-specific prices. Processing modules executed on the custom database servers invoke each punch-out instance. Multiple punch-out catalogs may be accessible by a single end user. An end user can return from a punch-out catalog to the hosted supplier products catalog, and the remainder of the features of the eProcurement architecture, via a submit feature, which will then return to the processing module that initially invoked the punch-out instance. Punch-out catalogs may be configured to display relevant catalogs to an end user, based on the end user organization. An end user can browse punch-out catalogs to search for more accurate results and may, subsequently, invoke a requisition order via the third-party web site and order processing methods. Also, one or more purchase orders can be sent from one or more punch-out catalogs, but each punch-out order session may generate a single purchase order that may ultimately include orders from non-punch-out or hosted catalogs.

Further, with respect to the hosted supplier products catalog, there may be a feature implemented to allow both its searching and viewing. The search/view catalog feature is invoked via a processing module that executes on the custom database servers. Upon the execution of such a search by an end user, search results can be displayed via the end user interface. The catalog search results can be displayed, for example, using a static or dynamic interactive list or table, attachment, graphic, or link. An end user may also have the option of choosing the appropriate supplier(s) from which to place an order. Upon an end user's selection of a particular supplier, the relevant supplier data is then forwarded to the transaction processing feature. The end user may later invoke a status query, via a processing module executed on the custom database servers, on a preexisting order and, subsequently, receive status notifications regarding the order.

The search feature may be implemented using several sub-features such as, for example, customized annotations (with icons) of preferred/contract suppliers, a product/supplier filter, and a product size filter. The search feature is invoked by a processing module that is executed on the custom database servers. The customized annotations (with icons) of preferred/contract suppliers allows certain products to be highlighted within search results. Furthermore, the product/supplier filter of the search feature allows certain products to be displayed, while others are hidden, depending on specific filter criteria chosen by the end user/organization. Such criteria may include, for example, price thresholds, hazard level, approximate delivery date, product size, supplier, and/or currency.

The search architecture is based upon an indexed, tokenized-type implementation. This search architecture may include a search engine and a tokenization feature, both of which are invoked via processing modules executed on the custom database servers. Product elements such as the product name, industry, price, currency, and availability, among others, are primarily used to generate a product search index (e.g., a token). The process of generating a product search index/token is called "tokenization" and may be executed by a tokenization feature invoked via a processing module. The indices/tokens generated as a result of the tokenization feature, which relate to various products of a multitude of suppliers, may be stored within and executed on the hosted supplier products catalog. Searching is executed against "verticals." A vertical is designed similar to a drill-down menu architecture that consists of root nodes and leaf nodes, which are children of their respective roots. Through the use of tokenization and verticals, a layer of abstraction is added that is unique in comparison to typical text-based searching of a large database, like the master product database. This added layer of abstraction allows for better organization of the underlying data. As a consequence, the use of tokens to search verticals, which organize supplier product data and search the hosted supplier products catalog, enables an efficient and methodical search strategy to be executed. Search results returned from searching the hosted supplier products catalog are forwarded back to the search engine and may appear via the end user or supplier user interfaces. For an end user, designated preferred suppliers usually appear first in the search results.

Further contained within the search architecture, a feature to allow the invocation of status queries and viewing of the response may be implemented. This feature allows a plurality of end users to send queries/requests via middleware/web methods, or direct Internet posting techniques, to the product catalog. The feature is itself invoked by a processing module that executes on the custom database servers. Such queries/requests may be intended for finding, buying, or managing products. Such products may be those of preferred contractors that are matched to the end user based on a plurality of criteria like permission, product type, industry, price, quality control metrics, delivery date, warranty types, currency, and/or locale. Each product catalog may contain information regarding one or more specific products. A master product database populates the hosted supplier products catalog with various types of information relating to one or more specific products. The various types of information may include a "stock keeping unit" (SKU) identifier, supplier information, and product category/description/attribute information.

Further also to the search architecture, an in-stock query feature may be implemented to allow an end user, through the middleware/web methods, or direct Internet posting techniques, to determine whether any supplier might have a particular product in-stock, and/or the warehouse/location where that stock is maintained. The feature is itself invoked by a processing module that executes on the custom database servers. Once the in-stock query feature is invoked, relevant suppliers are sent individual queries. Subsequently, each supplier response to an in-stock query is processed and the appropriate end user is notified after the in-stock query receives the supplier response(s), but before returning to the processing module.

Moreover, a quick order feature may also be implemented to enable several other sub-features such as, for example, searching by product category, SKU identifier, currency, or host product category number/supplier part number. The feature is itself invoked by a processing module that executes on the custom database servers. Subsequently, the order feature is initially invoked by an end user that has completed a quick order search. Thus, the quick order feature enables an end user that may have knowledge of specific product attributes to perform an expedited search, retrieve search results, and proceed to ordering.

The search results of a product search exhibit other features such as those related to the presentation of results. For example, suppliers and categories contained within search results can be displayed using different customizable icons, which may be used to highlight specific suppliers and product categories. Such results can also be ranked according to priority based on whether they are supplied from preferred or contracted suppliers, a preferred category of products from suppliers, or a preferred currency. Non-preferred or non-contracted supplier or currency results may also presented to end users. Moreover, a product comparison chart can be invoked to highlight the differences and similarities among two or more products. The chart can contain static or dynamic presentation attributes based in part on supplier-provided data. For example, the in-stock attribute, a dynamic presentation attribute, can be used to identify whether specific products are actually available in a supplier's inventory, and their corresponding prices and/or currencies. A search result list can be organized by category and/or vendor based on end user preferences. Also, icons can be used to further display and highlight relevant information regarding products such as, for example, whether products are hazardous, toxic, poisonous, or are considered to be controlled substances. A proprietary taxonomy can also be implemented against modeling product categories to enable more efficient searching and, ultimately, user-friendly, organized search results.

Figure 8A:
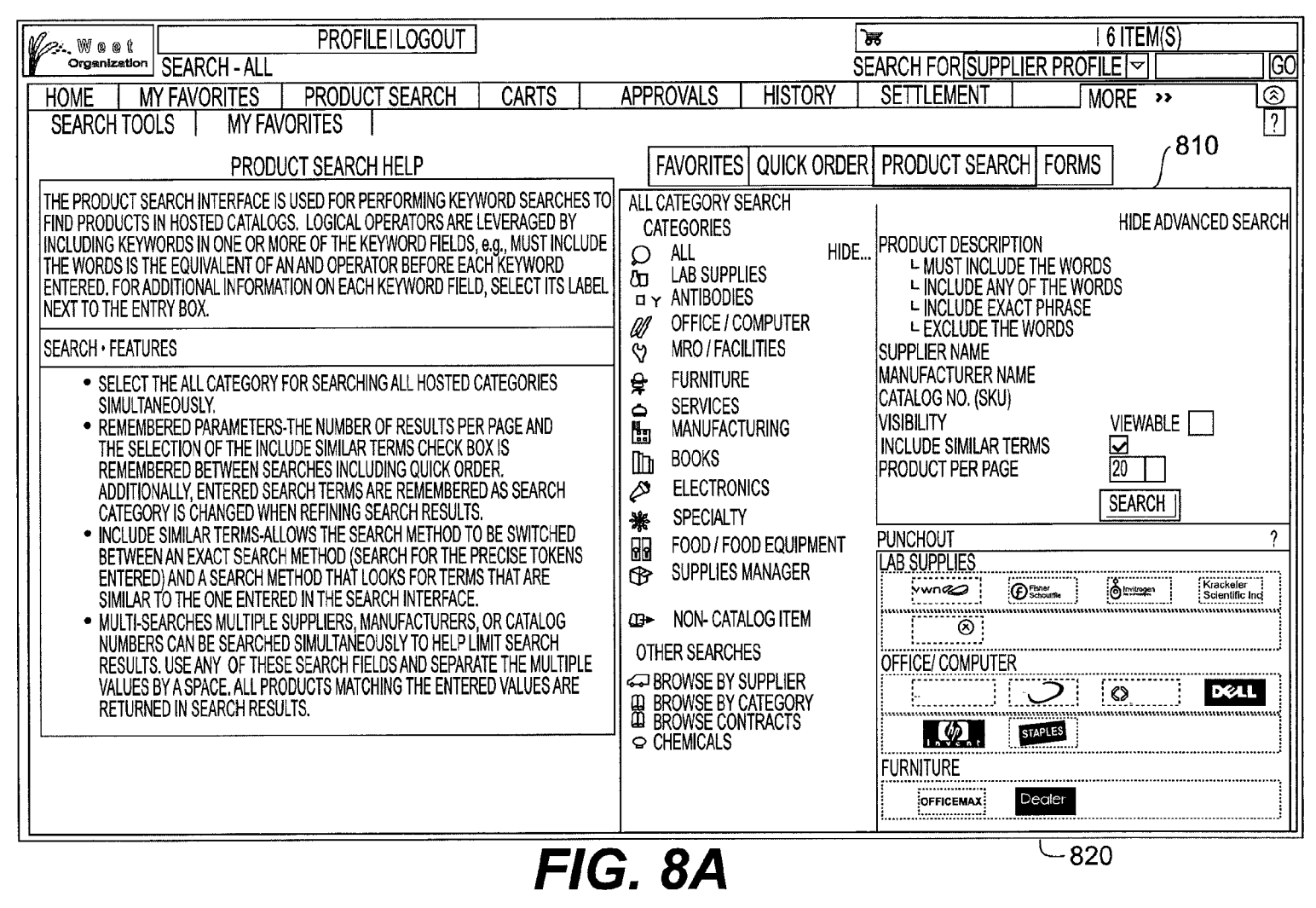
Figure 8B:
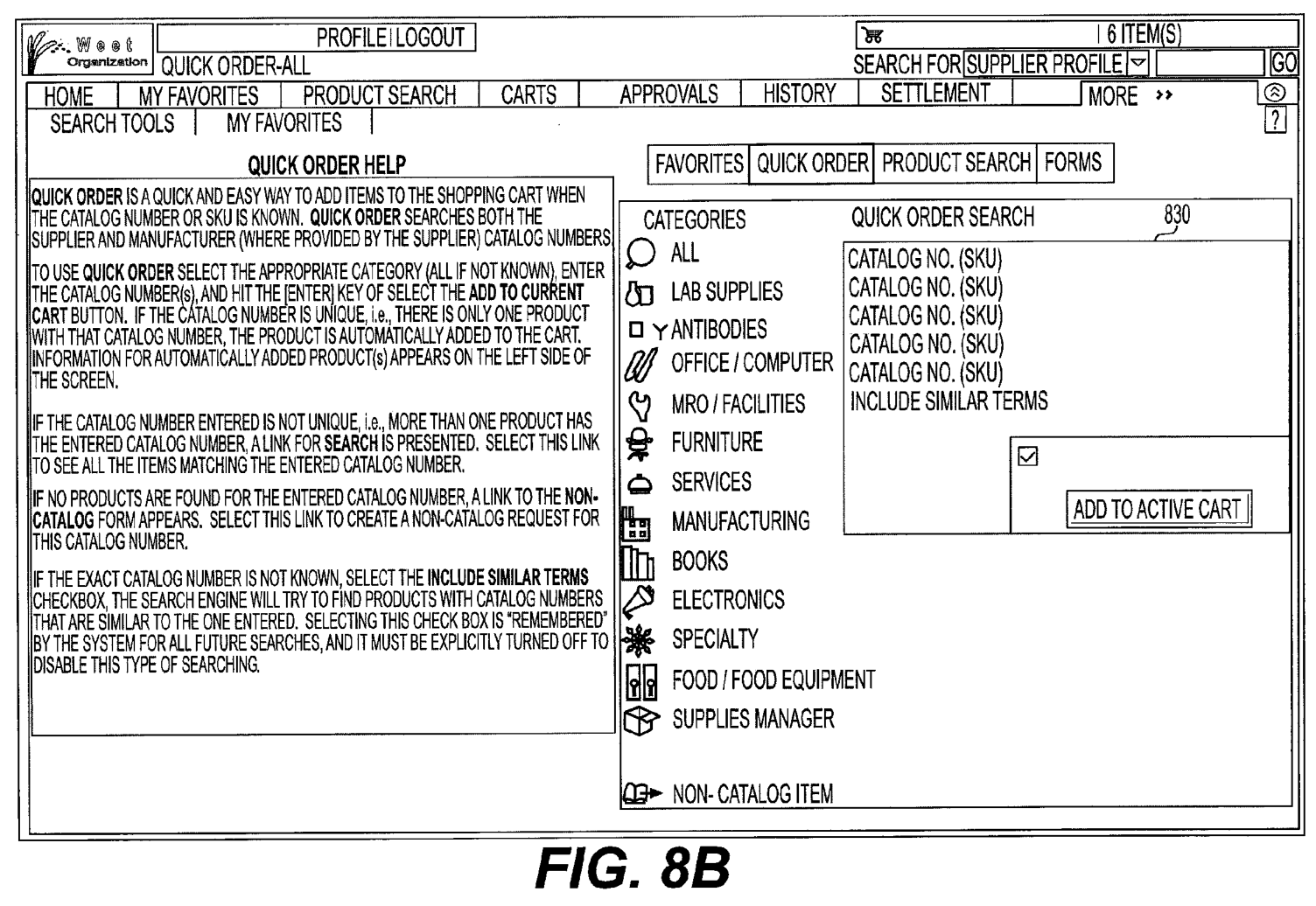
Figure 8C:
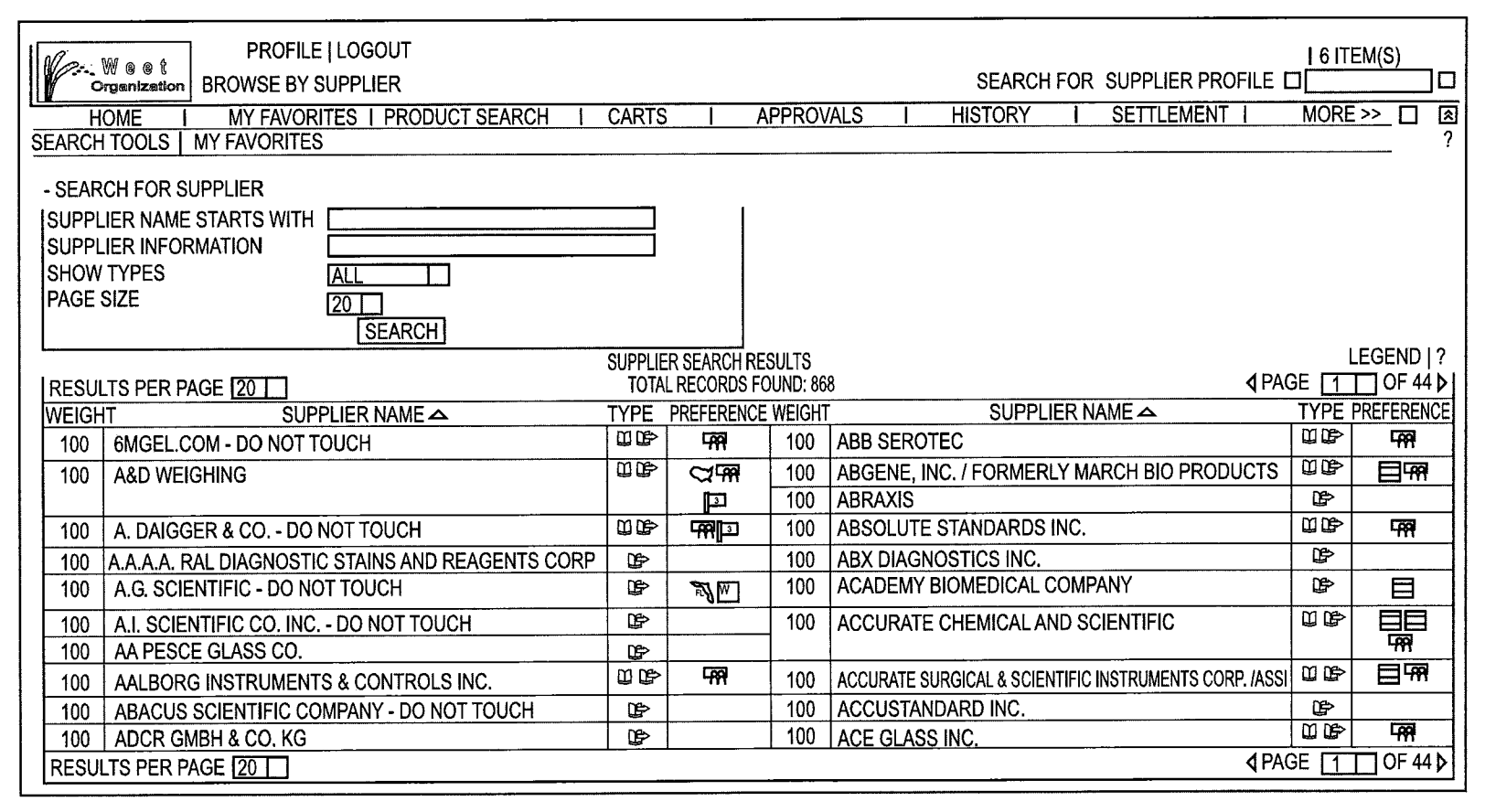

FIGS. 8A-8D illustrate exemplary search engines. For example, FIG. 8A illustrates an exemplary parametric search engine 810 and punch-out catalogs 820. FIG. 8B illustrates an exemplary quick order search engine 830. FIG. 8C illustrates an exemplary browsing engine based on suppliers. FIG. 8D illustrates an exemplary browsing engine based on categories of the products and/or services. Other search engines may be used without departing from the scope. Therefore, an eProcurement system couples the configuration tools described above for customizing access to specified suppliers and/or specified types of products based on department, position, roles, and/or permissions of the user for each organization with various search engines in a single instance, multi-tenant architecture.

As shown in FIG. 2, the supplier user interface 214 and further described below is configurable by supplier users and super users, and includes one or more features, for example, such as accessing a supplier hosted products catalog, viewing and responding to purchase orders, consummating sales transactions, viewing and responding to status queries, and setting supplier user configuration preferences. Each individual end user and supplier user may have a different interface from another end user and supplier user, respectively. Furthermore, the supplier end user interface may allow a plurality of supplier users to send queries/requests via middleware/web methods server 224 to custom database servers 222, and to a hosted supplier products catalog 234 that is multi-tenant managed. A remote supplier user query/request is sent via the supplier end user interface 214 over the Internet, or other networked connection, and is first received by the web servers 225 after passing through the firewall 218. Then, the web server 225 passes the query/request to the middleware/web methods server 224, where business rules may be enforced. Subsequently, depending on whether the query/request is related to a transaction or a user search, it is either forwarded to the transaction processing servers 223 or custom database servers 222, respectively. For either type of query/request, the hosted supplier products catalog 234 is then readily accessible via processing modules for exchanging transaction/product data, or performing a search/supplier operation. The hosted supplier products catalog 234 can serve as a quasi-link between the end user interface and the supplier interface because it is accessible by both interfaces. Supplier users can access the catalog via the middleware/web methods servers 224, which then forward the supplier access request to the custom database servers 222 and processing modules for execution, in order, for example, to update their own supplier data. End users may be able to search multiple suppliers within the catalog via the end user interface 212, subject to access rules set by a super user. End users may search the catalog for specific end user product requirements via the middleware/web methods servers 224, which forward the end user search request to custom database servers 222 and processing modules for execution. Subsequently, the end user may then invoke requisition and purchase orders via the middleware/web methods servers 224, which forward the end user order to the transaction processing servers 223 for execution.

As described above, to support the product search function, the eProcurement system includes a master catalog database of all the products from all the suppliers hosted on the system to implement a single instance, multi-tenant environment. Accordingly, the eProcurement system includes a catalog management tool 900. The catalog management tool 900 includes one or more of supplier tool 910, categories tool 920, supplier classification tool 930, category classification tool 940, product views tool 950, pricing tool 960, map attributes tool 970, and consortium management tool 980.

Figure 9A:
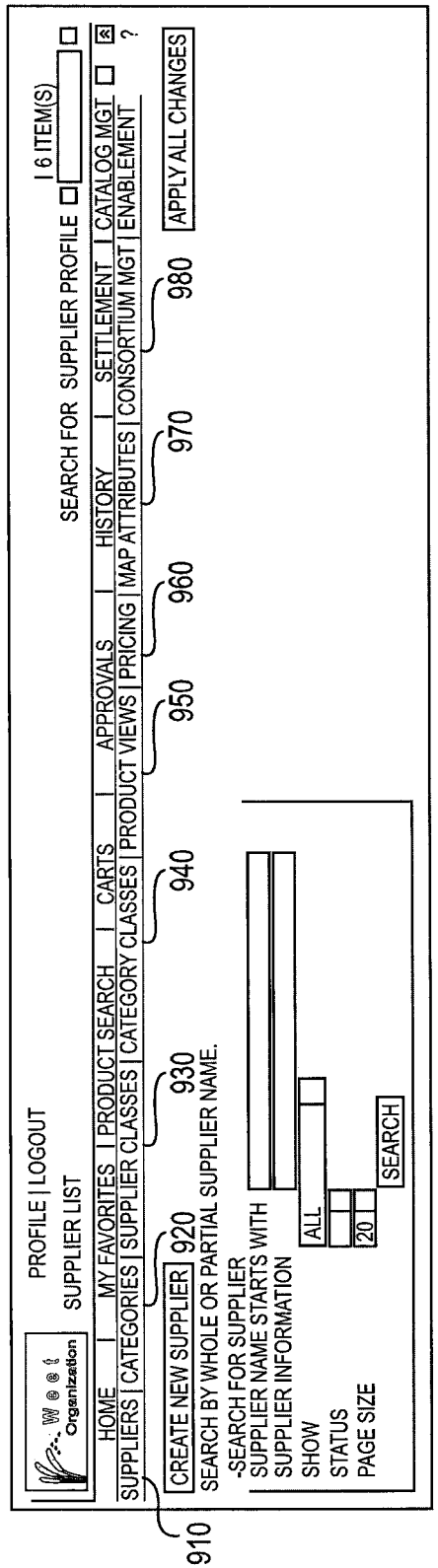
Figure 9B:
Figure 9C:
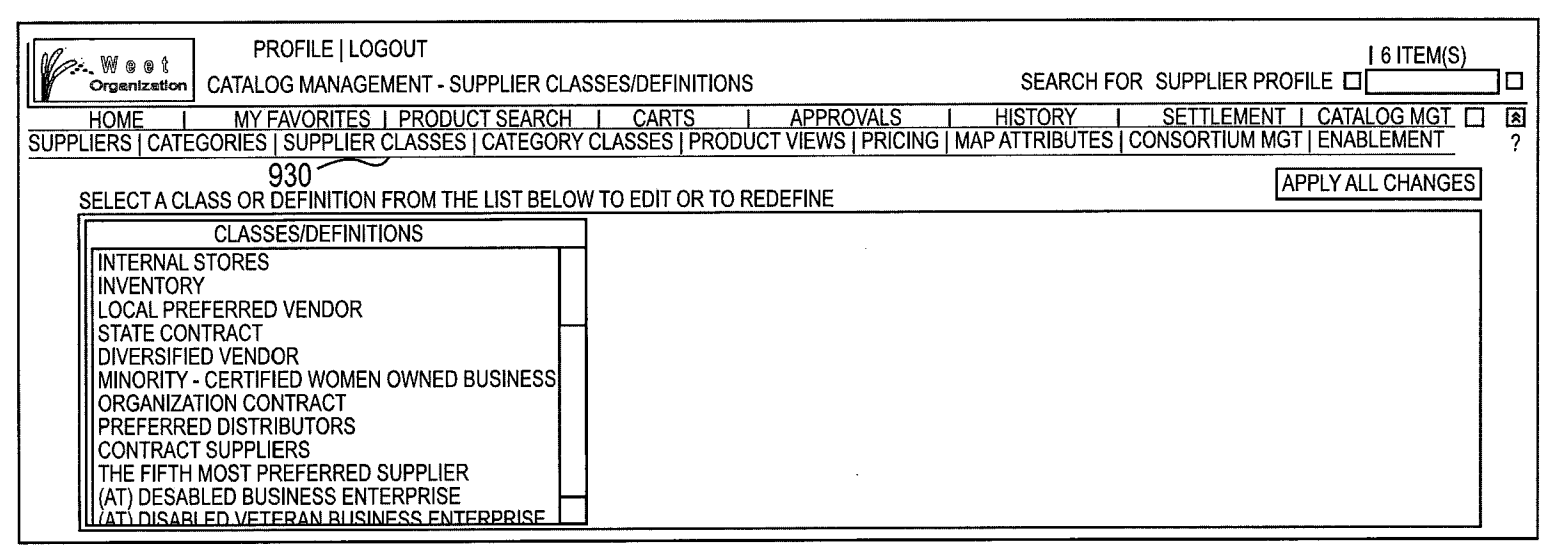
Figure 9D:
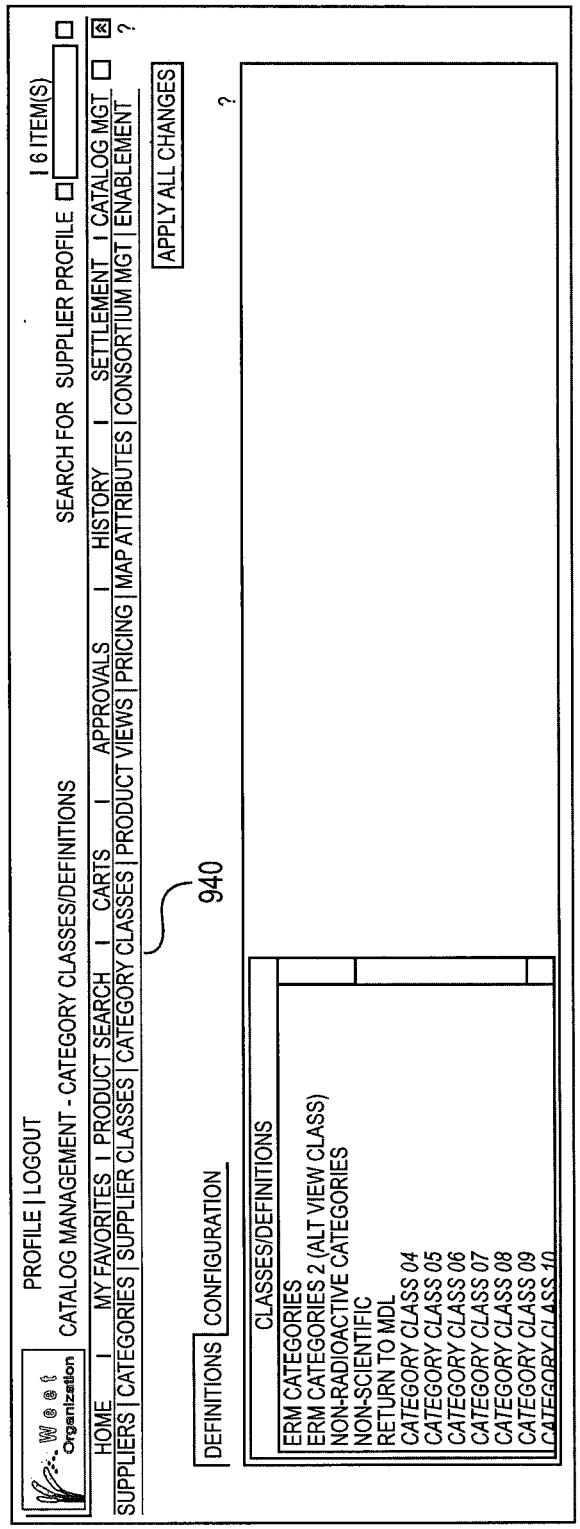
Figure 9E:
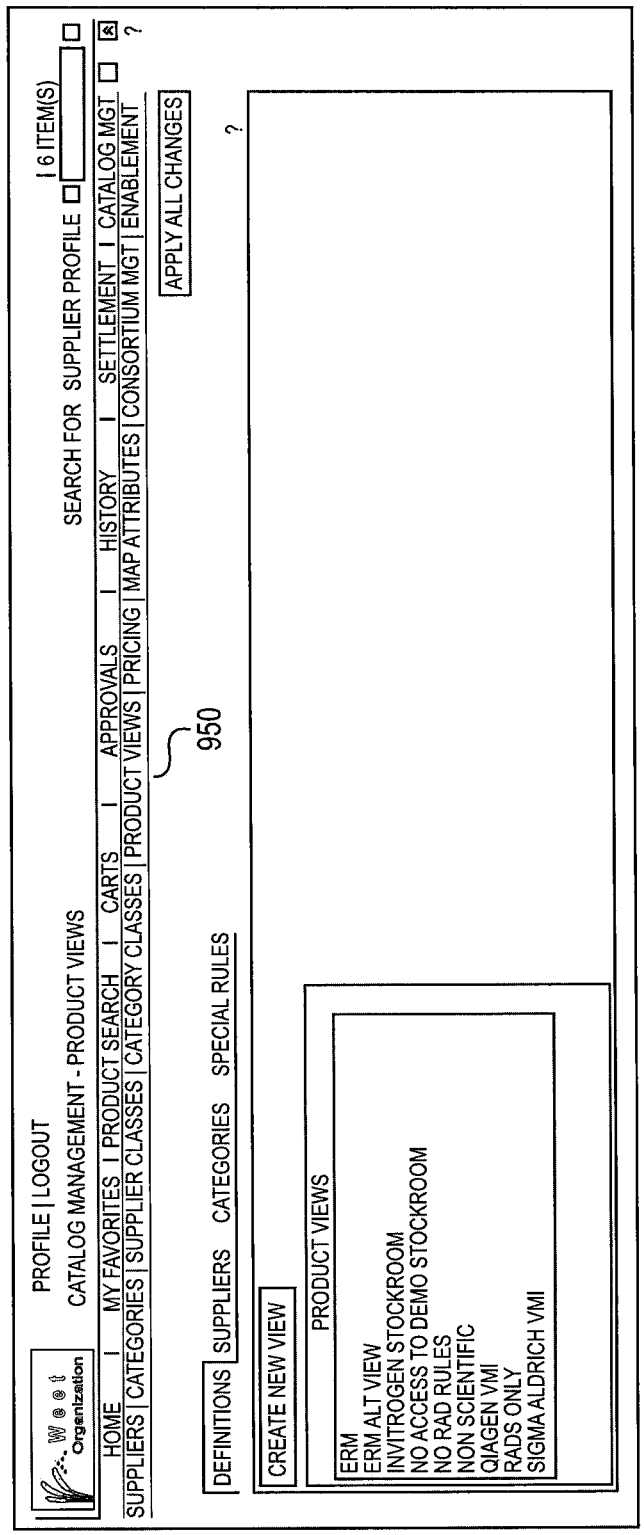

FIG. 9A illustrates an exemplary catalog management tool 900 with an exemplary supplier tool 910 invoked. The supplier tool 910 includes a search engine that searches for existing suppliers hosted in the eProcurement system. Furthermore, the supplier tool 910 adds new suppliers not yet hosted in the system. FIG. 9B illustrates an exemplary categories tool 920 that configures all the products offered from the hosted suppliers into defined categories. Classifications for suppliers and product categories within the system are defined and managed by the supplier classification tool 930 (FIG. 9C) and category classification tool 940 (FIG. 9D). In particular, new classes of suppliers and product categories may be created, defined, and configured as needed through the supplier classification tool 930 and category classification tool 940. In addition, existing classifications of suppliers and product categories may be modified. The product views tool 950 manages the views of products based on the defined supplier and product categories (FIG. 9E).

Figure 9F:
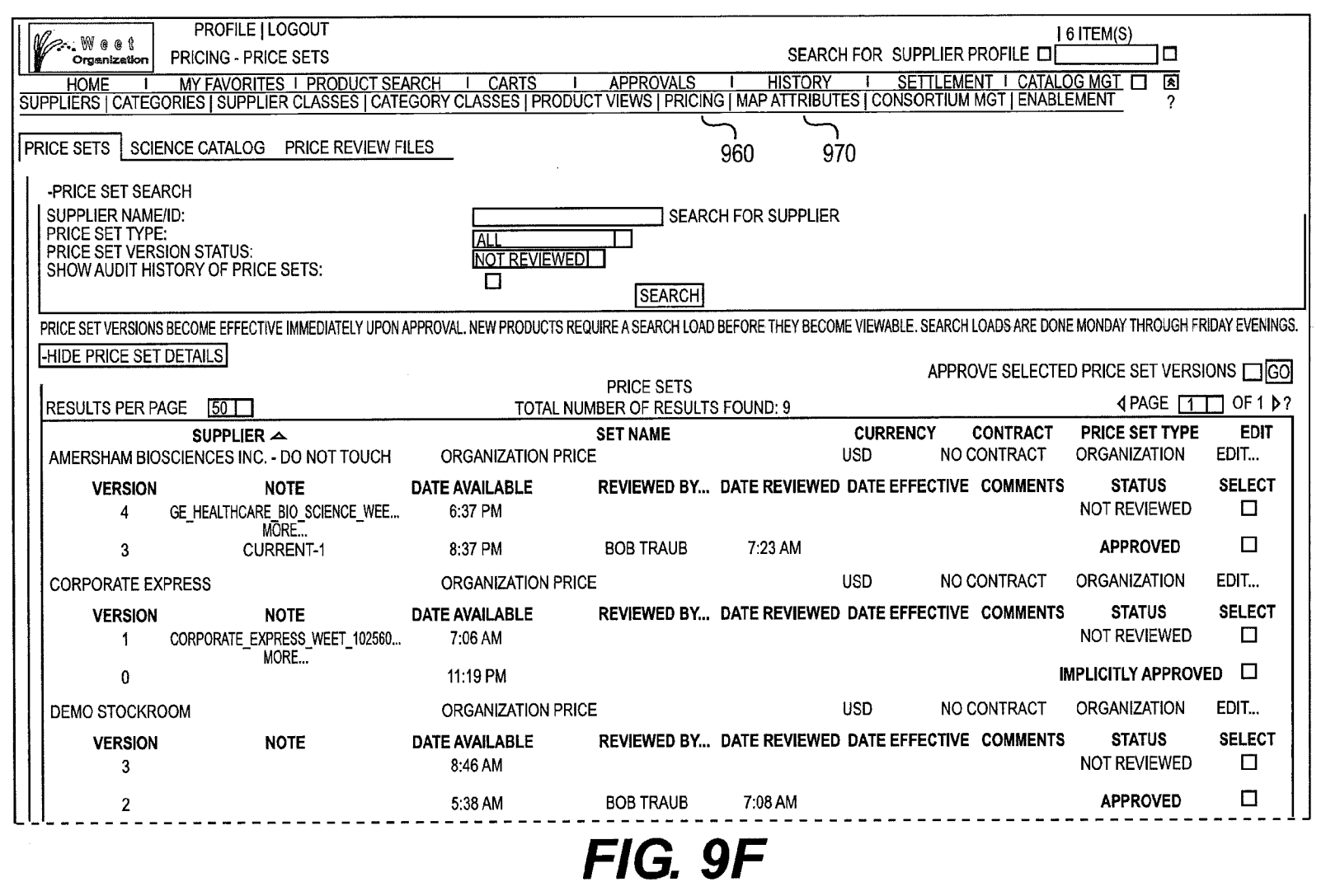

FIG. 9F illustrates an exemplary pricing tool. As shown, pricing tool 960 manages various pricing sets of each hosted supplier for the hosted products (or, the tool 960 may also be applied to non-catalog items, forms, or other non-hosted suppliers or products/items). The pricing set types may include organizational prices, contract prices, list prices, and consortium prices. Other pricing sets may be used without departing from the scope. The pricing tool 960 tracks versions of each type of pricing sets, status of the pricing sets (e.g., implicitly approved, not reviewed, rejected, approved, etc.), as well as the audit history of each pricing set. Accordingly, the appropriate pricing set may be tracked, managed, and invoked for each organization for each type of product.

Other types of catalog management tool 900 include the map attribute tool 970 and consortium tool 980. The map attribute tool 970 manages various parameters of the procurement activity, such as product codes, parameter format, and unit of measure (UOM). For example, commodity code configuration parameters may be set through the map attribute tool 970 to determine if and how the category taxonomy is to be mapped to, for example, an organization's set of category/commodity values. The commodity codes may be modified as categories, sub-categories, and on down to the product level. The list of values may be set manually or imported/exported from/to an already existing file. As another example, universal product codes (e.g., UN/SPSC) and UOM may also be configured to be mapped to an internal organization codes for automatic conversion when searching, viewing, and ordering products. Further, UOM may be mapped from standard UOM to organization specific UOM. The consortium tool 980 defines various consortiums that an organization may be a member of and offer consortium pricing by designating a supplier as a consortium supplier. Hence, all organizations that are members of the consortium will be offered the consortium pricing set when ordering from the designated supplier.

As shown in FIG. 2, the server technology includes a middleware/web methods server 224 that hosts a variety of features related to administrative services management, content management, and application management described above. The middleware/web methods server 224 may, for example, manage business rules (i.e., the relationships) between end users and suppliers based, in part, on contractual terms or other arrangements, as processed according to the price and file management feature. For example, supplier user-side business rules may, for example, designate preferences regarding delivery terms (e.g., restrictions against odd lot sales, FOB preference, carrier preference, etc.), and price and insurance terms (e.g., CIF preference, applicable sales tax, etc.). Similarly, end user-side business rules may, for example, designate preferences regarding preferred suppliers, delivery terms (e.g., FOB preference, default quantity, carrier preference, etc.), and price and insurance terms (e.g., CIF preference, applicable sales tax, etc.). At least one advantage of implementing end user-side and supplier user-side business rules is the capability to generate customized purchase orders in accordance with contractual or default business rules. Such purchase orders are created by the invoke requisition/purchase orders feature, which is invoked via processing modules that are executed on the custom database servers 222. Middleware/web methods server 224 may apply default ordering, sales, delivery, and other terms in the instance where an end user and supplier user do not have existing contractual terms or other arrangements.

Figure 10:
FIG. 10 illustrates an exemplary contracts management tool.

The middleware/web methods server 224, as well as the transaction processing server 223, implements the price and file management feature to access existing contracts between end users and suppliers. The feature is usually implemented as a component of the middleware/web methods server 224, but may also be invoked via transaction processing modules that are executed on the transaction processing servers. Contract management algorithms may also be implemented as a sub-feature of the price and file management feature. For example, the algorithms are usually responsible for accessing, retrieving, and processing data from each respective end user and supplier that might have negotiated a contract. FIG. 10 illustrates an exemplary contracts management tool 1000 that may be used to manage the contracts between an organization and a supplier. The contract data is accessible by the transaction processing servers 223 and transaction database 238. Suppliers are able to submit product prices and other product related data via the price and file management feature. Furthermore, multiple pricing/currency schemes can be created by suppliers for end user organizations and may be based on contractual terms negotiated between end user organizations and suppliers. Individual end users within the same organization, for example, may be assigned different price/currency schemes that may be based on different contractual terms with an individual supplier. A designated end user (e.g., a "contract manager"), akin to a super user, can be assigned the responsibility for managing and choosing the pricing schemes displayed to each individual end user within the organization. The designated end user may also be tasked with ranking the spending thresholds for triggering a new price tier. Individual end users are capable of accessing pricing schemes for supplier products where the end users have been granted access by the designated end user or super user. By default, the lowest supplier pricing scheme available is first displayed to the end user, although other pricing schemes may also be available and accessible.

The following algorithm, for example, may be implemented to determine which pricing scheme should be displayed to an individual end user. First, all pricing schemes for a specific product may be denoted as accessible. A filter-type method may then be used to exclude pricing schemes denoted as inaccessible to the end user organization and, thus, allowing only accessible pricing schemes. Another filter-type method may be used to determine which accessible pricing schemes, if any, are related to contracts negotiated between the end user organization and accessible suppliers. If no pricing schemes are related to any contracts, then a default/general pricing scheme is displayed to the end user. Finally, if at least one pricing scheme is related to any related contracts, then a filter-type method excludes those pricing schemes related to contracts deemed inaccessible to this end user, and permits the accessible pricing schemes to be displayed. The displayed accessible pricing schemes would, however, be subject to the end user spending thresholds, which may be set by a super user. When an end user invokes the generation of a purchase/requisition order, the appropriate pricing scheme is referenced and can be based upon available contractual terms with the appropriate supplier.

An end user organization can manage pricing schemes such that distinct contracts are assigned to specific end users or super users. The feature to manage pricing schemes is invoked via transaction processing modules executed on the transaction processing servers 223. The specific end users or super users have the ability to approve or reject contracts, and set extended dates. Moreover, supplier users have the ability to create multiple pricing/currency schemes that may be based on contractual terms with end user organizations. Whether an individual end user/organization is a constituent of a trade group, department, or other organization, may influence the pricing/currency scheme determination. Supplier users can also have the ability to load single or multiple pricing/currency schemes for end users within the same data sink (e.g., hosted supplier products catalog), which may later be processed by the price and file management feature and assigned to each respective end user. Moreover, end users can designate specific products from supplier pricing/currency schemes as favorites. End user favorites can be dynamically updated with the lowest available supplier pricing scheme.

The transaction processing servers 223 may execute transaction processing modules that query, update, and/or create data model instances within the transaction database 238. Moreover, end users can also approve, request to modify, or reject supplier products within hosted catalogs, and can also assign and route specific supplier products to other appropriate end users for review, dependent upon end user specific attributes like title within the organization. For example, certain end users may be able to access hazardous and/or expensive supplier products, while other end users may not be able to do so based on their precedence/role within the end user organization. Similarly, certain end users may also have the ability to make high-volume orders, while others may not. The hosted supplier products catalog 234 may be routinely updated by each supplier user at his/her discretion, or on a monthly, quarterly, or annual basis, and may contain data from suppliers such as, for example, custom product lists and end user organization-specific prices/currencies.

Figure 11A:
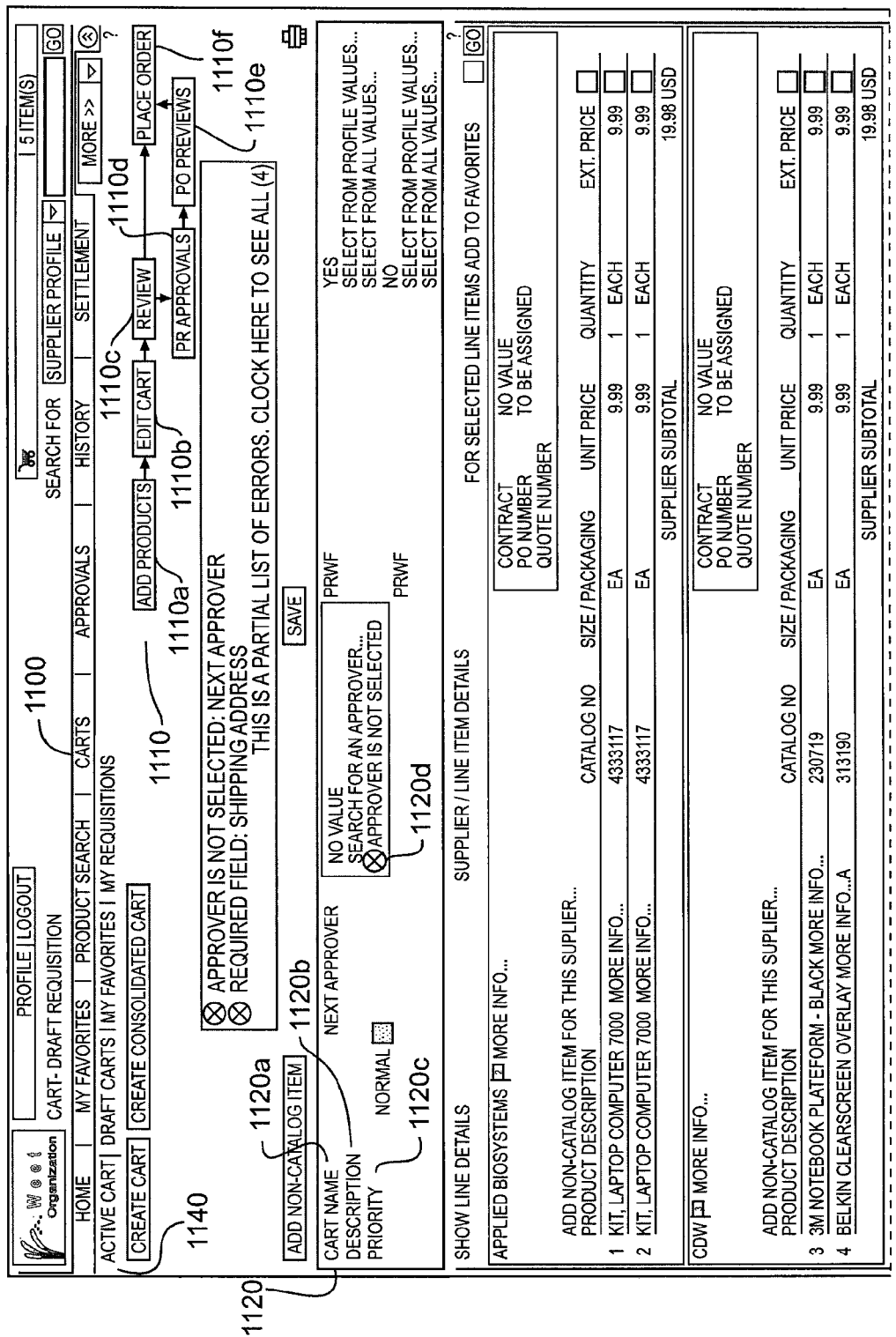

FIG. 11A illustrates an exemplary cart and requisition tool 1100. As shown in FIG. 11A, the cart and requisition tool 1100 includes an active cart 1140 for tracking the items designated for purchase from the search results described above. In an exemplary embodiment illustrated in FIG. 11A, the active cart 1140 includes requisition workflow tool 1110 that displays a live view of the requisition process for the items in the cart. For example, the requisition workflow tool 1110 displays the status of the requisition from the point at which a product is added 1110*a*, the cart is edited 1110*b*, the requisition is reviewed 1110*c*, and the order is placed 1110*f*. The requisition workflow tool 1110 further displays a purchase requisition approval step 1110*d* as well as a purchase order preview step 1110*e*. Each of the status boxes 1110*a*-1110*f* of the requisition workflow tool 1110 may be invoked to activate the tool that manages the corresponding status. For example, invoking the "Add Products" box 1110*a* (e.g., clicking on the box) activates the search engine to search for additional products to be added to the cart 1140. Invoking the "Edit Cart" box 1110*b* activates the active cart 1140 for editing the products in the cart. Invoking the "Review" box 1110*c* activates a summary of the products included in the requisition, including, for example, accounting codes, billing and shipping addresses, and other customizable data elements that may be configured by the user's organization. Invoking the "PR Approvals" box 1110*d* displays the set of workflow/approval steps an invoked requisition will be processed through prior to order creation. Invoking the "PO Preview" box 1110*e* activates a list of purchase orders that are generated if the invoked requisition is approved. Invoking the "Place Order" box 1110*f* submits the invoked requisition to the steps of the workflow/approval process.

Cart information 1120 such as cart name 1120*a*, description 1120*b*, priority 1120*c*, and assigned approver 1120*d* are also displayed and may be edited. The cart information 1120 further includes supplier and line item details organized alphabetically, for example, according to each supplier's name, and lists each chosen product description, catalog number, size and/or packaging data, unit price, quantity ordered, price, and currency. For each supplier there is also a corresponding supplier subtotal that is calculated according to the total of products chosen by the user.

Figure 11B:
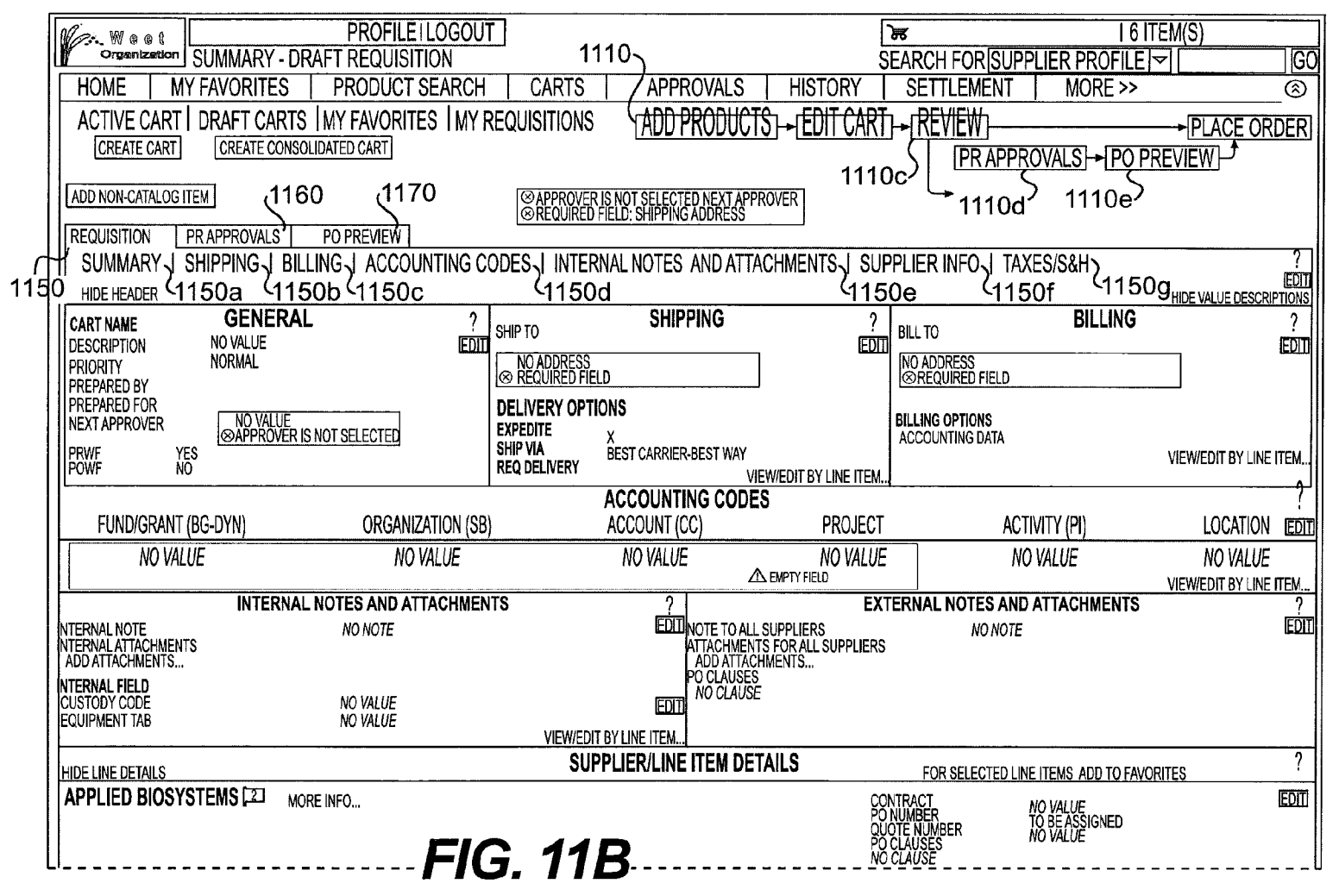

FIG. 11B illustrates further details of the exemplary cart and requisition tool 1100. As shown, the cart and requisition tool 1100 includes a requisition review tool 1150, purchase request approval tool 1160, and purchase order preview tool 1170. As described above, the various status boxes (e.g., 1110c-1110e) in the requisition workflow tool 1110 activate the corresponding tool 1150-1170. As shown in FIG. 11B, the requisition review tool 1150 displays information about the requisition being built. For example, as shown, the requisition review tool 1150 includes a summary page 1150a that displays all the information regarding the requisition being reviewed, such as the general information, shipping information, billing information, accounting codes, internal/external notes and attachments, as well as supplier/line item details of the products in the cart 1140. All of the information shown in the requisition summary page 1150a may be edited by invoking the corresponding tool, such as the shipping/handling tool 1150b, billing tool 1150c, accounting code tool 1150d, notes and attachment tool 1150e, supplier information tool 1150f, and taxes/S&H pricing tool 1150g.

For instance, the shipping/handling tool 1150b may be used to set the shipping address of the products in the purchase order as well as designate delivery options, such as "expedite," "shipping method," and "requested delivery date." The billing tool 1150c may be used to set the billing address and billing options, such as accounting dates. The accounting tool 1150d may be used to designate the accounting information of the requisition, such as any fund/grant contacts, organization information, account numbers, product codes, activity summaries, and location. The notes and attachments tool 1150e may be used to designate any internal codes associated with the products in the purchase order, such as custody codes and equipment codes used in the organization. The supplier information tool 1150f may be used to assign or modify supplier information for the products in the order, such as contract information with the supplier, purchase order number, quote number, and purchase order clauses. The taxes/S&H tool 1150g may be used to define the tax/S&H information related to purchases from a particular supplier, such as tax percentage and/or S&H cost from total purchase price (e.g., 0% tax, free shipping if over $200 purchase, etc.).

Figure 11C:
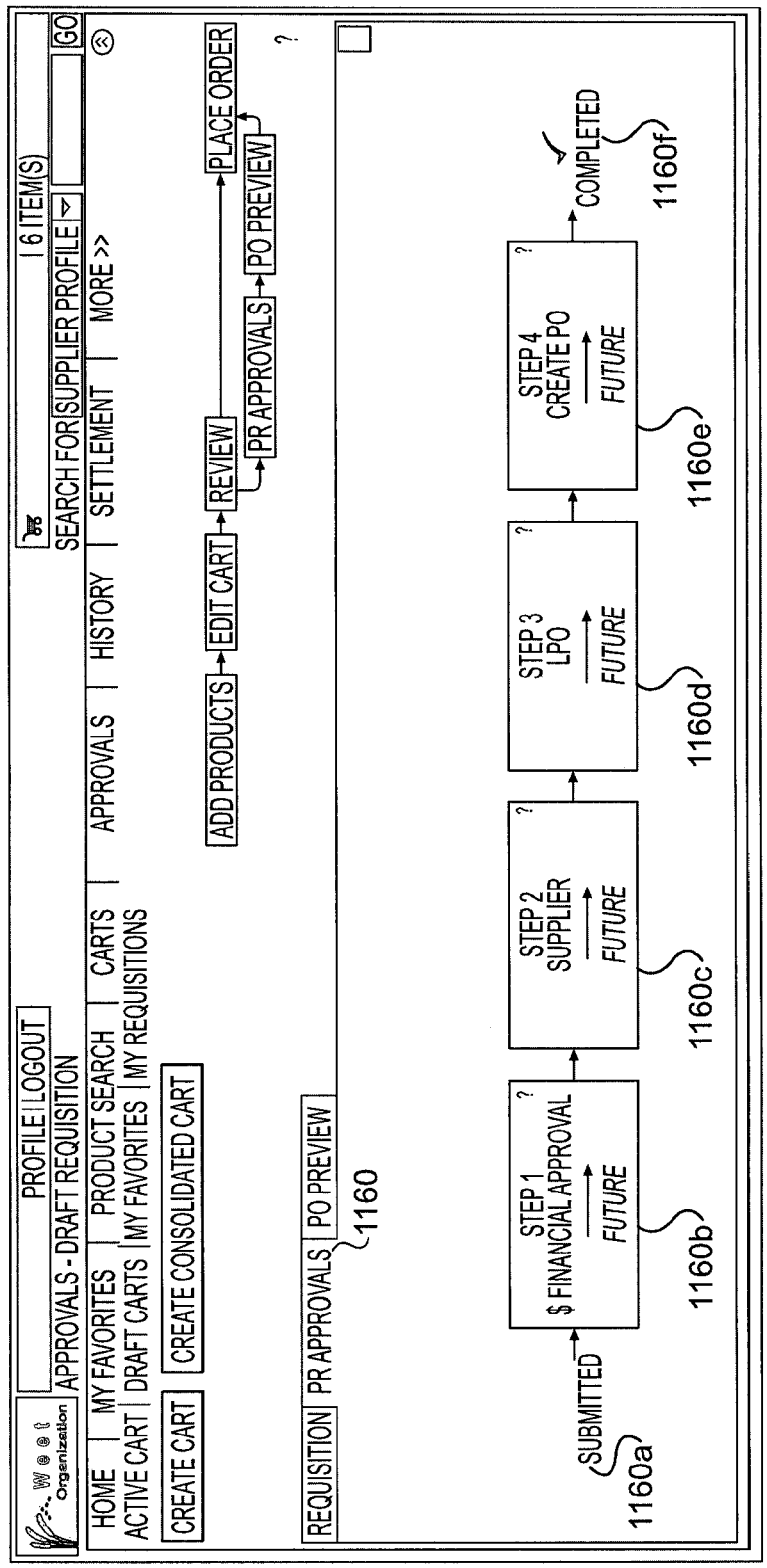

FIG. 11C illustrates an exemplary purchase request approval tool 1160 that corresponds to the purchase requisition approval step 1110d. The exemplary purchase request approval tool 1160 graphically portrays the status of the requisition being reviewed (e.g., submission of the purchase requisition 1160a, financial approval 1160b, supplier approval/processing 1160c, LPO 1160d, purchase order creation 1160e, and completion 1160f). As with the requisition workflow tool 1110 (FIG. 11B), each workflow/approval step status box may be invoked to activate a tool, corresponding to each workflow/approval step, to view the reason(s) underlying the workflow engine's invocation of that step. Other intervening or superseding steps may also be portrayed without departing from the scope.

Figure 11D:
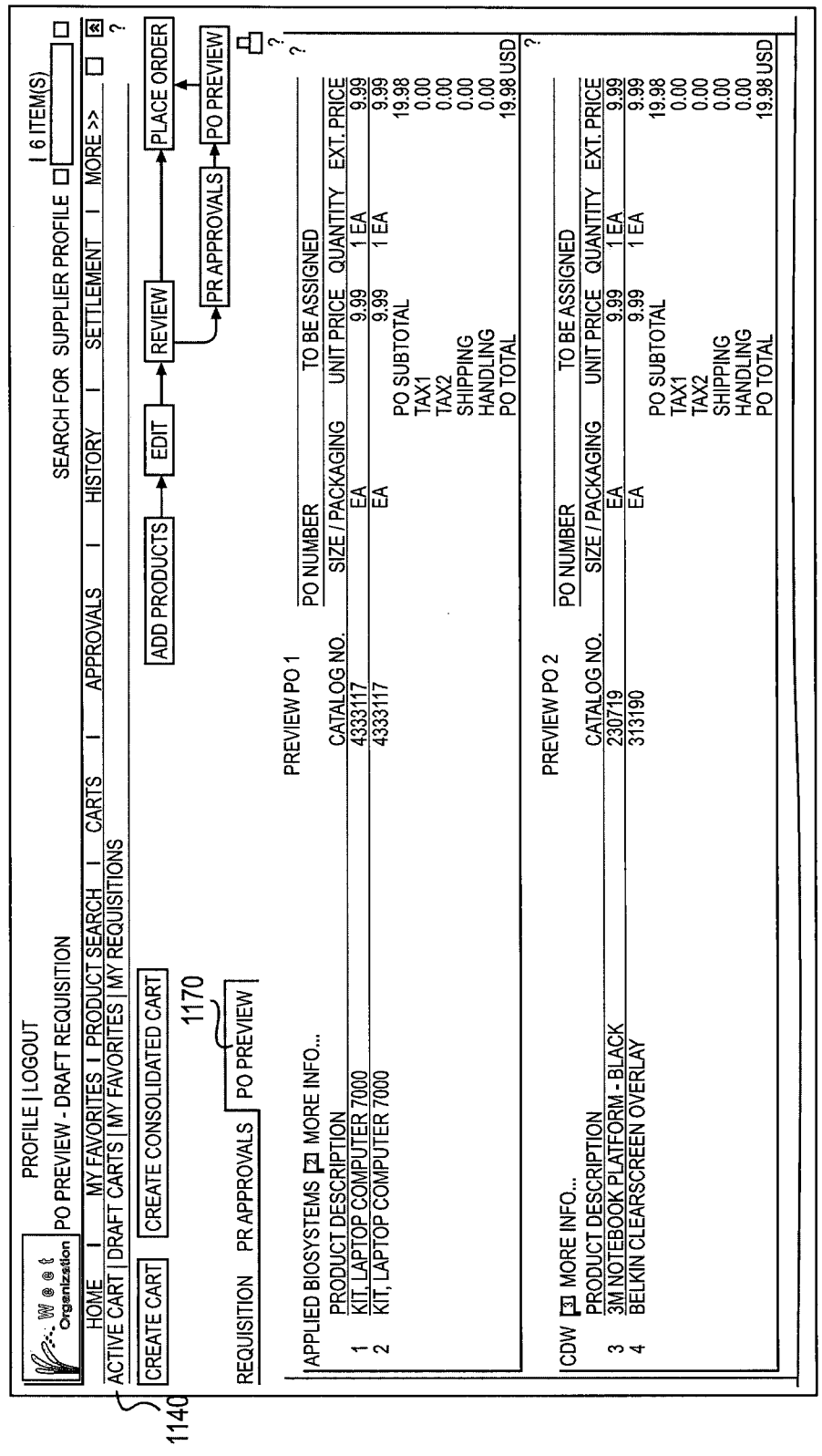

FIG. 11D illustrates an exemplary purchase order preview tool 1170 that corresponds to the purchase order preview step 1110e. The purchase order preview tool 1170 permits the user to preview the purchase orders that will be generated from the current active cart 1140. The active cart 1140 corresponding to that user is queried and the preview purchase orders are displayed, as shown, in alphabetical order according to supplier name. Other methods of ordering or retrieving the purchase orders corresponding to the user may also be used without departing from the scope.

With reference to FIG. 2, the feature to invoke purchase/requisition orders may be hosted on the middleware/web methods servers 224 and managed by the eProcurement architecture such that it is executed consistently with end user and supplier user business rules as described above. From a high-level point-of-view, this feature is implemented based on whether the order information sought to be processed by an end user is internal to the organization or supplier related. If the information is internal, it is processed accordingly via the end user 212, the middleware/web methods servers 224, through to the custom database servers 222, and then to the hosted supplier products catalog 234; otherwise, the information is processed similarly except that the appropriate supplier related databases (e.g., the master product database 236, and the transaction database 238) may also be invoked. During the processing of internal information, the order information sought to be processed may also be directly posted (e.g., locally to an end user).

An auto purchase order feature is available via the middleware/web methods servers 224 and is invoked via transaction processing modules executed on the transaction processing server 223, and can populate entries of a purchase order in accordance with applicable end user and supplier contractual terms. The auto purchase order feature allows for the generation of distribution, and payment, rule-based purchase orders based on the customizations effectuated by a super user of the organization in the manner described above. For example, the feature can automatically insert legal terms (e.g., the right to cure product defects, what constitutes rejection and/or revocation of an order, what may constitute a material defect, the seller's return policy, the buyer's acceptance policy, etc.), as well as other non-legal terms and conditions (e.g., preferred delivery dates, shipping and handling instructions, appropriate contact/authorized personnel, payment and receipt of payment instructions, etc.), based on a contract that may be in place between an end user organization and a supplier. If no contract is in place, then the auto purchase order feature may prompt the user or automatically insert default terms and conditions, whether legal or non-legal. The feature may create receipts for each end user initiated transaction/purchase order and add multiple transactions/purchase orders to a single receipt. For capable suppliers, automated responses can be accepted for display to the end user. Such automated responses may include, for example, order acknowledgement and advanced shipping notice. Also, a document search sub-feature allows searching any existing transactions/purchase orders. The auto purchase order feature also supports supplier pricing schemes modeled using the U.S. Dollar as well as all other currency types (e.g., Euro, Yen, Pound, Peso, etc.).

Figure 12:
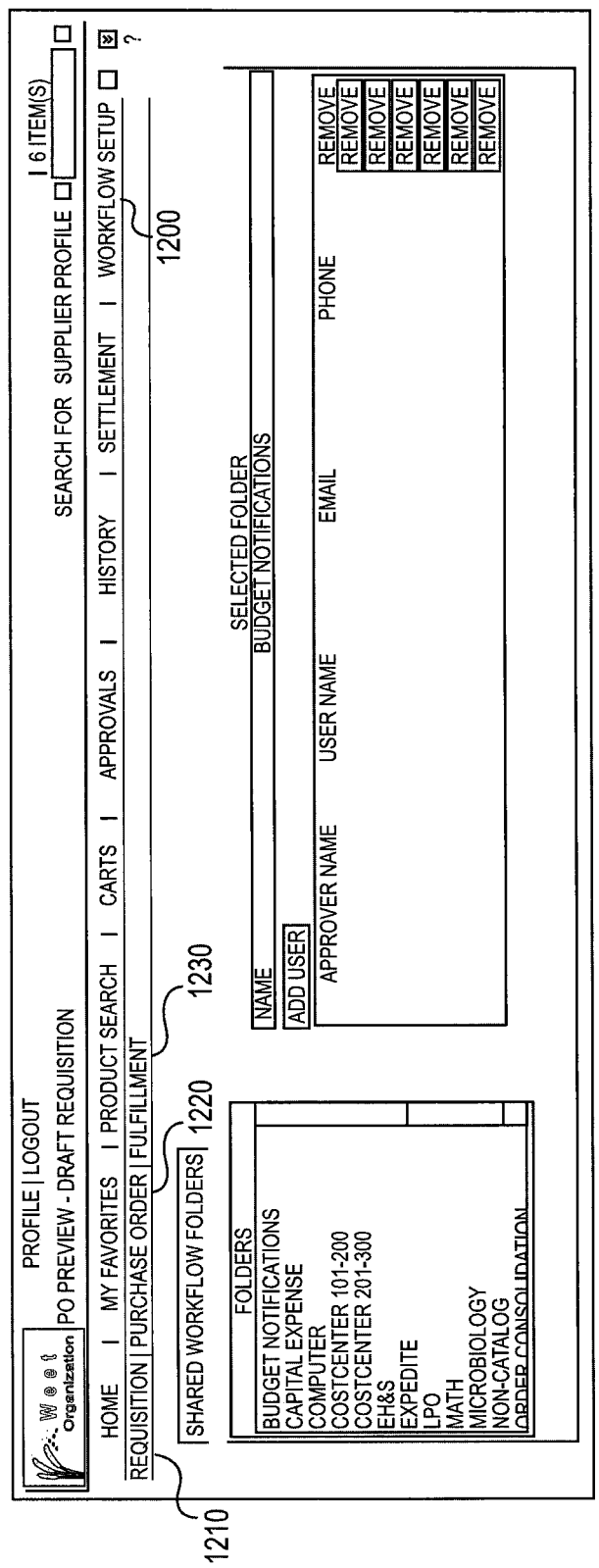
FIG. 12 illustrates an exemplary workflow setup tool.

FIG. 12 illustrates an exemplary workflow setup tool. As shown, the workflow setup tool 1200 includes requisition workflow tool 1210, purchase order setup tool 1220, and fulfillment setup tool 1230. These tools are used to setup various aspects of the workflow process as described above. For example, as shown in FIG. 12, the purchase order setup tool 1220 may be used to designate the names of approvers to review and approve purchase orders for a particular organization. As shown, the approver list may be customized for different departments (e.g., Math), types of products (e.g., non-catalog item), and even for specific users. Similarly, the requisition setup tool 1210 and fulfillment setup tool 1230 may be used to designate approvers for requests and fulfillment processes, respectively. Other workflow parameters may be further defined without departing from the scope.

Figure 13:
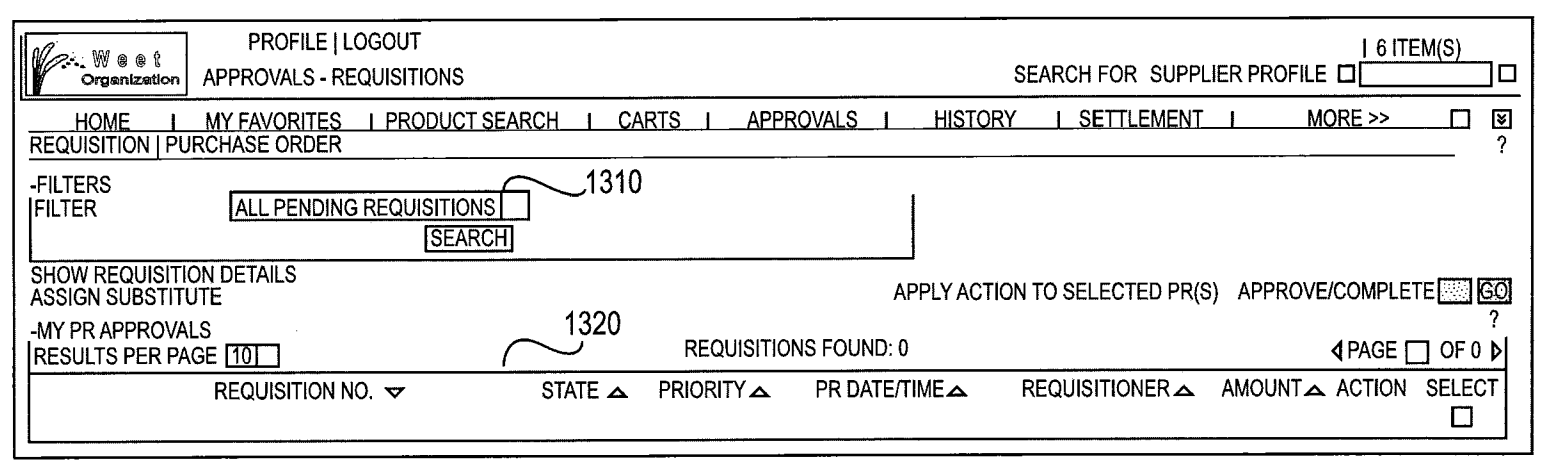

FIG. 13 illustrates an exemplary purchase order approval tool. As shown, purchase order search engine 1310 searches through all of the purchase orders generated by the eProcurement system for each of the hosted organizations. The results of the search may be filtered based on display criteria such as "Approver" (e.g., user responsible for approving the document), "Approval Queues," "All Pending Requisitions," "Urgent Approvals," "Unassigned Approvals," "Future Approvals," and "Manual Filter" options. The result list of the purchase orders are displayed in the display portion 1320 with such information as P.O. number, status of the P.O., priority level of the P.O., the date/time of the submission for approval, the name of the requester, the designated supplier, the amount, and selectable options. Using the purchase order approval tool, the approvers as well as the requisitioners may monitor the status of the requests and ascertain where the request is in the workflow process. Using the tools described above, the user may drill down to the lowest level of the request to determine what needs to be done to move the request along if it becomes bottlenecked in the process, for example.

At the conclusion of the ordering process, an approval/rejection of orders feature may be implemented also through the middleware/web methods server 224, as well as the transaction processing server 223. The approve/reject order feature is invoked via a transaction processing module that is executed on the transaction processing servers 223. This feature can be managed by the middleware/web methods server 224 such that it is executed consistently with end user and supplier user business rules. For example, one advantage of this feature is its ability to provide notice of an approved or rejected order to an end user or super user.

Figure 14:
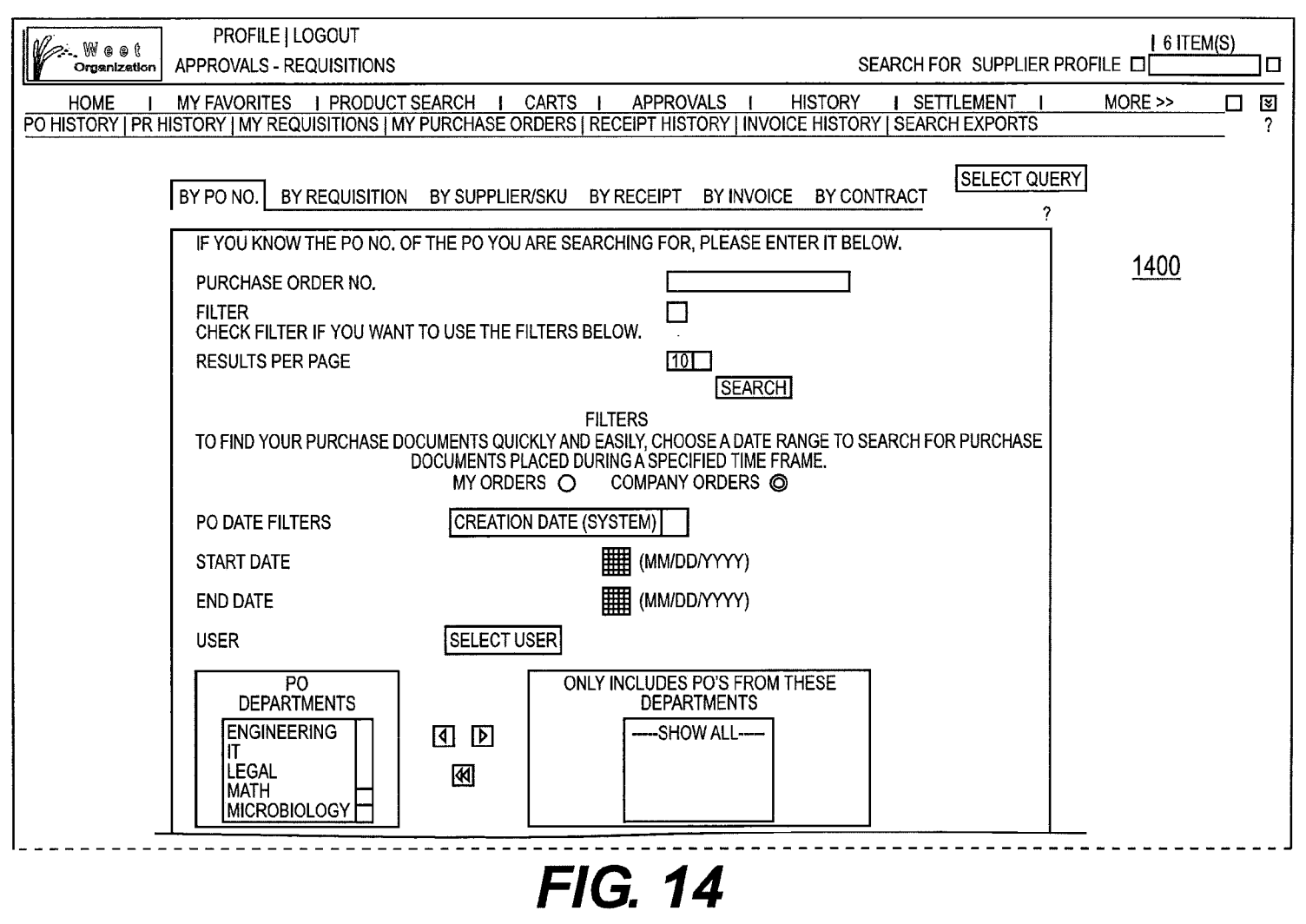

FIG. 14 illustrates an exemplary history tool. The eProcurement system keeps a history of all requests, purchase orders, receipts, invoices, and actions (e.g., edits to parameters) made in the system that may be searched and reviewed. History tool 1400, for example, includes a tool to search for purchase order histories, purchase request histories, receipt histories, and invoice histories. The searches may be made by purchase order number, by requisition, by supplier/SKU numbers, by receipts, by invoices, and by contracts. These parameters may be filtered by dates, users, as well as other specifics of the history being sought.

Finally, a supplier configuration feature may be implemented. This feature allows for the capability to have a supplier master that hosts multiple fulfillment centers. Also, this feature allows for an order processing feature with multiple payment/currency methods for each fulfillment center, the execution of shipping and handling rules, and order distribution features. The order distribution features can include such features as facsimile or email confirmation, as well as other delivery methods, organized hierarchically to ensure purchase order delivery.

Figure 15:
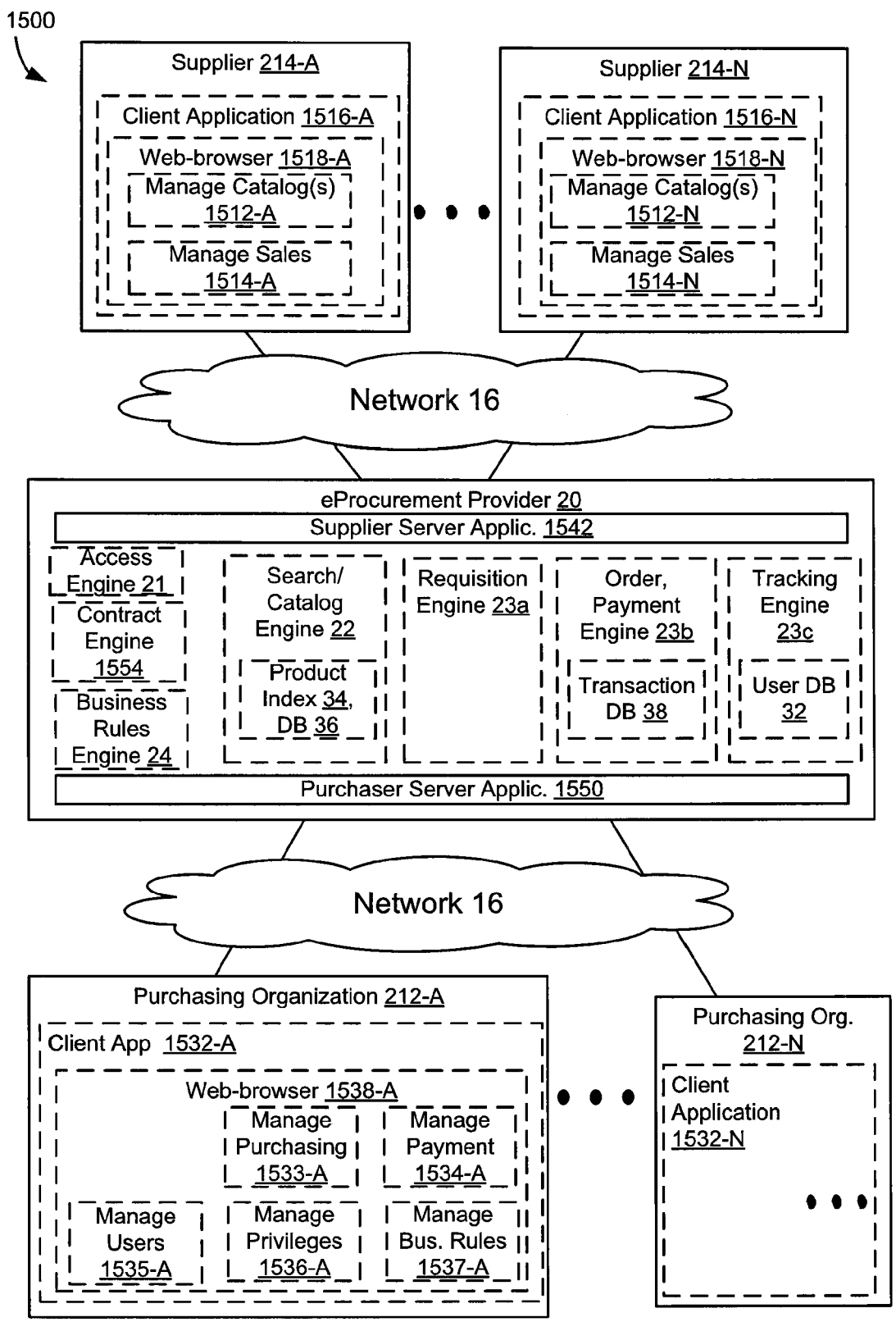
FIG. 15 illustrates the electronic procurement system communicating over a network with suppliers and purchasing organizations.

FIG. 15 is a block diagram 1500 of the electronic procurement system 20 communicating over a network 16 with suppliers 214-A (to 214-N) and purchasing organizations 212-A (to 212-N). The electronic procurement system 20 generally includes a supplier server application 1542 and purchaser server application 1550, which may interface with the access engine 21, contract engine 1554, search/catalog engine 22, requisition engine 23a, order/payment engine 23b, tracking engine 23c, and business rules engine 24.

As described, business rules describe and control the relationships between end users and suppliers based, in part, on contractual terms or other arrangements, as processed according to the price and file management feature. For example, supplier user-side business rules may, for example, designate preferences regarding delivery terms (e.g., restrictions against odd lot sales, FOB preference, carrier preference, etc.), and price and insurance terms (e.g., CIF preference, applicable sales tax, etc.). Similarly, end user-side business rules may, for example, designate preferences regarding preferred suppliers, delivery terms (e.g., FOB preference, default quantity, carrier preference, etc.), and price and insurance terms (e.g., CIF preference, applicable sales tax, etc.). At least one advantage of implementing end user-side and supplier user-side business rules is the capability to be able to generate customized purchase orders, in accordance with contractual or default business rules.

Non-limiting examples of business rules may include:
If the extended price of any line item exceeds the limit set in a user's profile, route to the user's financial approver.
If the total value of the requisition exceeds the limit set in a user's profile, route to the user's financial approver.
If a requisition sent to a user for financial approval exceeds the user's approval authority set in the user's profile, route the requisition to the user's financial approver.
If the requisition contains suppliers classified by a user's organization as "IT Vendors," send the requisition to the CIO.
Requisitions for the Math Department over $10,000 are routed to the Vice Chancellor of Liberal Arts.
If any item on the PO is radioactive, route the PO to the environmental health and safety (EH&S) Department for review and approval.
If any item on the PO is classified as hazardous, notify the EH&S Department. No approval is required.
If the account code for a line item on the requisition has a budget, and the requisition will exceed the budget, route the requisition to the Budget Manager.
If the user adds a non-catalog item to their requisition, route it to the Purchasing Department to validate the information entered.
If a requisition is marked for expediting, skip all rules and route directly to the Purchasing Department.
All the above examples of business rules are exemplary and not intended as limiting.

The supplier server application 1542 and purchaser server application 1550 may also interface with the transaction engine 23, which may include the requisition module 23a, order/payment engine 23b, and the tracking engine 23c. Moreover, the supplier server application 1542 and purchaser server application 1550 may send and receive data from the data repository 30, which includes the user database 32, the product index database 34, the product database 36, and the transaction database 38. The engines may communicate via function/method calls, file libraries, and database queries. The contract engine 1554 executes the necessary functions for implementing the contract management feature, which manages and links new or existing procurement contracts, formed between buyer organizations and supplier organization, with a group. For example, a new or existing contract is initially stored in the contracts database 3200 (as described in FIG. 32) and may routinely be updated in accordance with amendments (e.g., extensions, additions of agreed upon terms, assignments, or the like) or other contractual events (e.g., the expenditure of quantity/time/spending limits (i.e., tiers), price fluctuations—e.g., rebates or price reductions, item changes or additions, etc.); at such time intervals as determined by the contract engine 1554, the group is updated accordingly. The group includes, for example, buyer users, supplier users, the business rules engine 24, items, forms, purchase requisitions/orders, sales orders/invoices, and buyer invoices. Furthermore, the contract engine 1554 also supports contract searching (as described in FIG. 10) based on specific user-specified criteria like, for example, contract number, contract keyword, or supplier/catalog name.

The supplier server application 1542 communicates with a supplier 214-A (to (214-N) over network 16 and the purchaser server application 1550 communicates with a buyer 212-A (also referred to herein as a purchasing organization) over network 16. A supplier user would use a client application 1516-A (to 1516-N) to communicate with, generally, the electronic procurement provider 20 and, specifically, the supplier server application 1542. The client application 1516-A (to 1516-N) may be a web-browser 1518-A (to 1518-N) for the supplier user to use, or may be a standalone application. The web-browser 1518-A or standalone application may display features to manage catalog(s) 1512-A (to 1512-N) and manage sales 1514-A (to 1514-N), which may be communicated via the supplier server application 1542 and displayed to the supplier user. A buyer user would use a client application 1532-A (to 1532-N) to communicate with, generally, the electronic procurement provider 20 and, specifically, the purchaser server application 1550. The client application 1532-A (to 1532-N) may contain a web-browser 1538-A (to 1538-N) for the buyer user to use, or may be a standalone application. The web-browser 1538-A or standalone application may display features to manage purchasing 1533-A (to 1533-N), manage payment 1534-A (to 1534-N), manage users 1535-A (to 1535-N), manage privileges 1536-A (to 1536-N), and/or manage business rules 1537-A (to 1537-N), which may be communicated via the purchaser server application 1550 and displayed to a buyer user. For example, a user that sends a request to the system 20 that is outside the scope of that user's privileges would receive an appropriate denial response from the system 20 and, more specifically, for example, from the manage privileges 1536-A feature.

Figure 16:
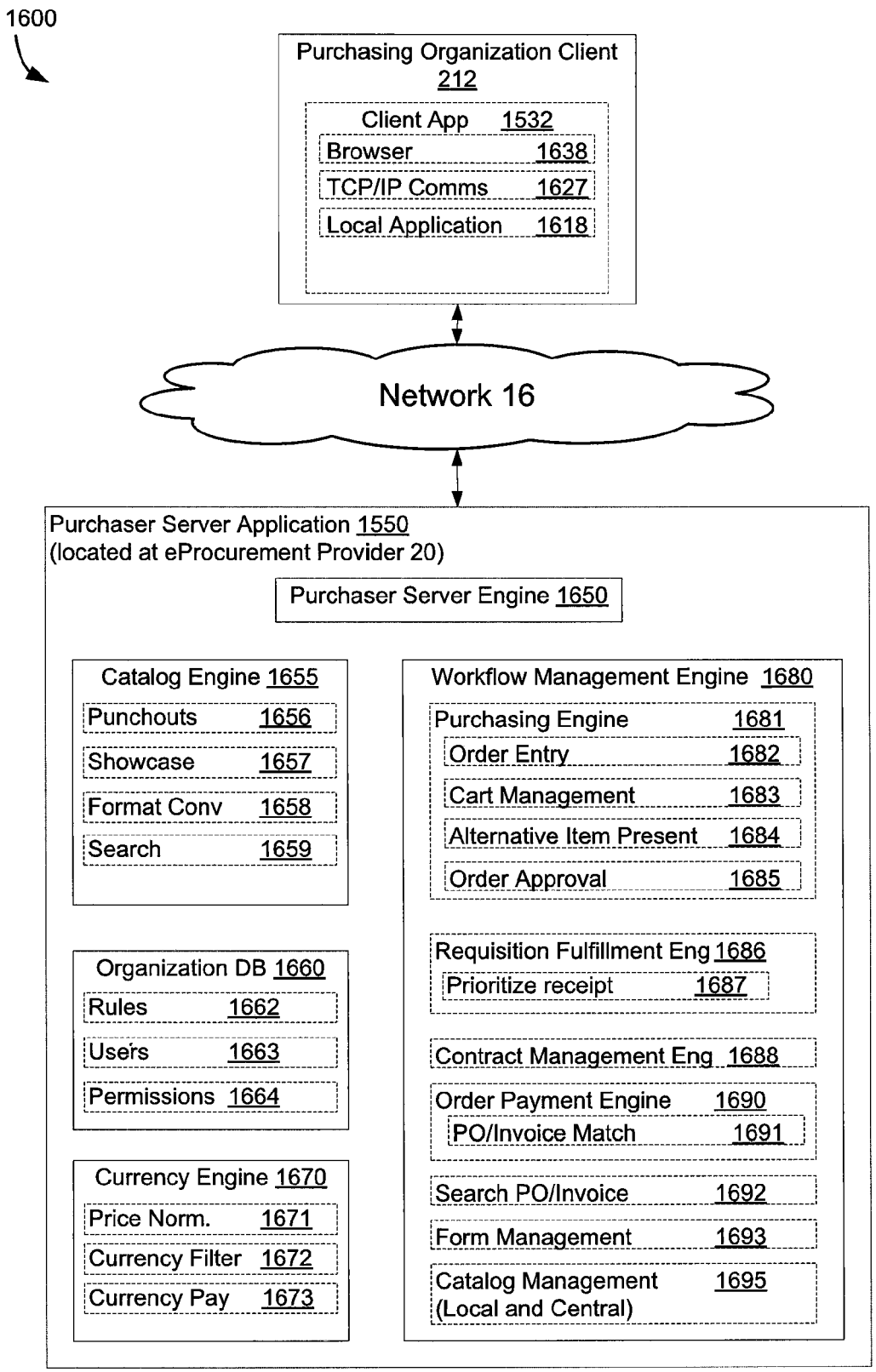
FIG. 16 illustrates the purchasing organization client communicating over a network with the purchaser server application to access the engines of the purchaser server application.

FIG. 16 is a block diagram 1600 of the buyer 212 communicating with the purchaser server application 1550, located at the electronic procurement provider 20, over a network 16, using a client app 1532 such as a browser 1638, TCP/IP communications 1627, and/or a local application 1618. The purchaser server engine 1650 may interface with or include the following modules, or a subset thereof:

- a catalog engine 1655 for managing each supplier catalog by implementing features for uploading catalog data, linking to the proper punch-out catalog(s) (1656) via the punch-out module 22a and back to the buyer, managing supplier showcase promotions and overlays (1657), converting supplier catalog data into a common data format (1658), search (1659), and interfacing with the search engine 22 for searching the master product database or other accessible database of the electronic procurement system 20;
- an organization database 1660 for storing organization specific information like, for example, business rules (1662), user-related data (1663), or permissions (1664);
- a currency engine 1670 for implementing multi-currency features like, for example, normalizing a plurality of currency data (1671) into a default or preferred currency, interfacing with the search engine 22 to return item search results to a buyer user who sent a request to organize/filter the search results (1672) according to a specific currency, or determining the default or preferred currency with which a supplier requests or requires payment (1673); or
- a workflow management engine 1680 for managing the flow of purchase requisitions to the appropriate approver (via the requisition fulfillment engine 1686) (which may be prioritized via the prioritize receipt feature 1687 based on user hierarchy, privileges, or business rules), sending the approved requisition back to the appropriate buyer user (via the requisition fulfillment engine 1686), interfacing with the search engine 22 to locate an appropriate requisition and/or purchase order (via the search PO/Invoice feature 1692), forwarding a purchase order to the appropriate supplier (via the requisition fulfillment engine 1686), forwarding a sales order and/or invoice from the supplier to the appropriate buyer user (via the order payment engine 1690 and using the PO/Invoice match feature 1691 for linking a purchase order on the buyer user side with an incoming invoice from the supplier), or sending event updates to the contract engine 1554 (via the contract management engine 1688).

Moreover, the workflow management engine 1680 may also interface with a purchasing engine 1681 that receives orders (via an order entry feature 1682), manage the items a buyer user places in a cart or moves/assigns to a new cart (via a cart management feature 1683), present alternative items to a buyer in lieu of items chosen for requisitioning that are not available according to privileges, inventory or a contractual agreement (via an alternative item present feature 1684), or approve an order if approved by the appropriate approver user (via an order approval feature 1685). In addition, the workflow management engine 1680 may also interface with a form management engine 1693 for receiving requisitions and orders via user-created custom forms stored in a forms database 2300. Once received, the requisitions and orders are then routed to approvers and suppliers, respectively, according to workflow business rules. And, the workflow management engine 1680 also interfaces with the catalog management feature 1695 for retrieving item data related to the items present in the requisitions, orders, or invoices being processed by the workflow management engine 1680.

Figure 17:
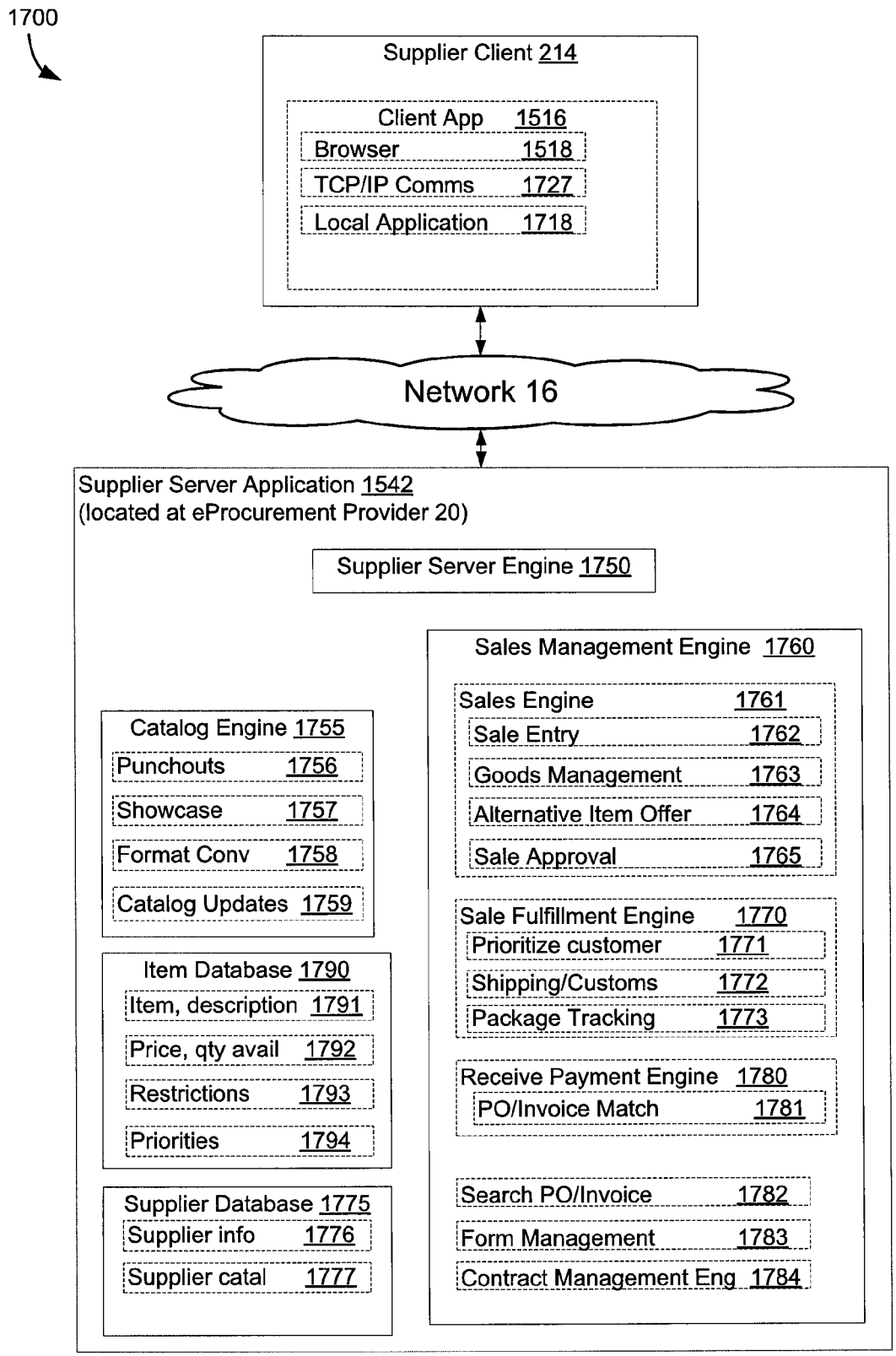
FIG. 17 illustrates the supplier client communicating over a network with the supplier server application to access the engines of the supplier server application.

FIG. 17 is a block diagram of the supplier 214 communicating with the supplier server application 1542, located at the electronic procurement provider 20, over a network 16, using a client app 1516 such as a browser 1518, TCP/IP communications 1727, and/or a local application 1718. The supplier server engine 1750 may interface with or include the following modules, or a subset thereof:

- a catalog engine 1755 for managing each supplier catalog by implementing features for uploading catalog data, linking to the proper punch-out catalog(s) (1756) via the punch-out module 22a and back to the buyer, managing supplier showcase promotions and overlays (1757), converting supplier catalog data into a common data format (1758), and interfacing (1759) with the catalog management feature 1695 for updating the master product database or other accessible supplier-related database of the electronic procurement system 20;
- an item database 1790 for storing item specific information like, for example, item description (1791), price and quantity available (1792), restrictions (1793), or priorities (1794);
- a supplier database 1775 for storing supplier specific information like, for example, detailed supplier data (1776), or supplier catalog data (1777); or
- a sales management engine 1760 for managing the flow of sales orders and sales invoices from the appropriate buyer to the appropriate supplier (via the sale fulfillment engine 1770) (which may be prioritized (via the prioritize customer feature 1771) based on buyer/user hierarchy, privileges, or business rules), shipping (1772) and tracking (1773) the ordered item(s) to the appropriate buyer, interfacing with the search engine 22 to locate an appropriate purchase order and/or invoice (via the search PO/Invoice feature 1782), forwarding an invoice to the appropriate buyer (via the sale fulfillment engine 1770), receiving payment on an invoice from a buyer to the appropriate supplier (via the receive payment engine 1780 and using the PO/Invoice match feature 1781 for linking a sales order on the supplier user side with an outgoing invoice from the supplier), or sending event updates to the contract engine 1554 (via the contract management engine 1784).

Moreover, the sales management engine 1760 may also interface with a sales engine 1761 that receives sales orders (via an sale entry feature 1762), manage the items (e.g., goods and/or services) a buyer user requested via the sales order (via a goods management feature 1763), present alternative items to a buyer in lieu of items chosen for ordering that are not available according to inventory or business rules like a contractual agreement (via an alternative item present feature 1764), or approve a sales order if the item(s) is available and complies with business rules (via a sale approval feature 1765). In addition, the workflow management engine 1680 may also interface with a form management engine 1783 for receiving sales orders via user-created custom forms stored in a forms database 2300. Once received, the sales orders are then routed to the appropriate supplier user(s), respectively, according to workflow business rules. Then, the process of fulfilling the order is initiated and managed by the sales fulfillment engine 1770.

Figure 18:
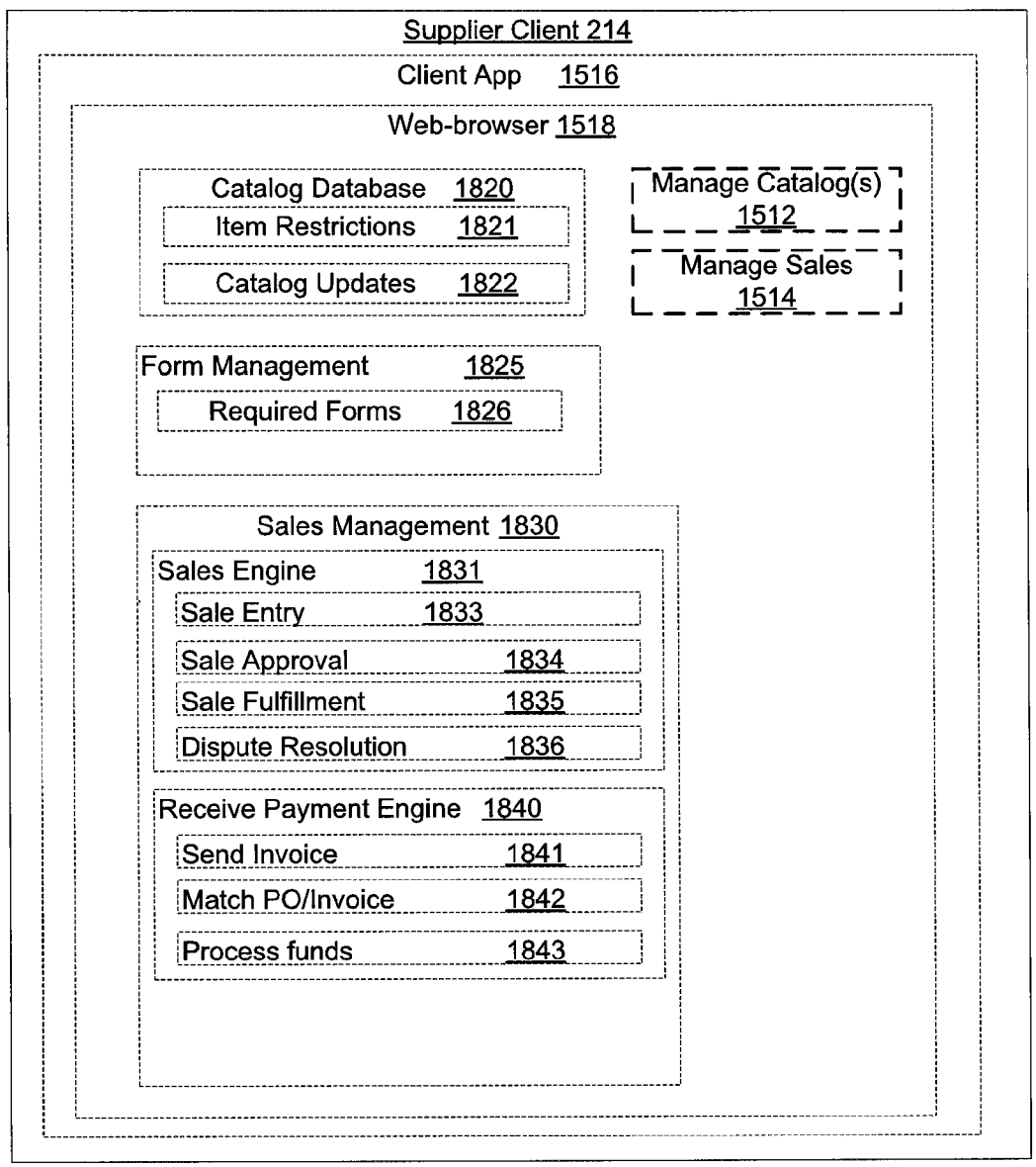
FIG. 18 illustrates the features and database accessible via the supplier client.

FIG. 18 is a block diagram 1800 of a supplier client 214. The client application 1516 may be a web-browser 1518 for the supplier user to use, or may be a standalone application. The web-browser 1518 or standalone application may display features for:
  managing catalog(s) 1512;
  managing sales 1514;
  interfacing with the catalog database 1820 to, for example, input or view item restrictions 1821, or to make catalog updates 1822;
  managing forms 1825 by, for example, customizing required forms 1826;
  managing sales 1830 (e.g., via a sales engine 1831) by, for example, entering sales data 1833, approving sales 1834, fulfilling sales orders 1835, and addressing disputes that may arise 1836; or
  processing invoices and payments 1840 by, for example, sending invoices 1841, matching purchase orders to invoices 1842, or processing funds 1843.

Figure 19:
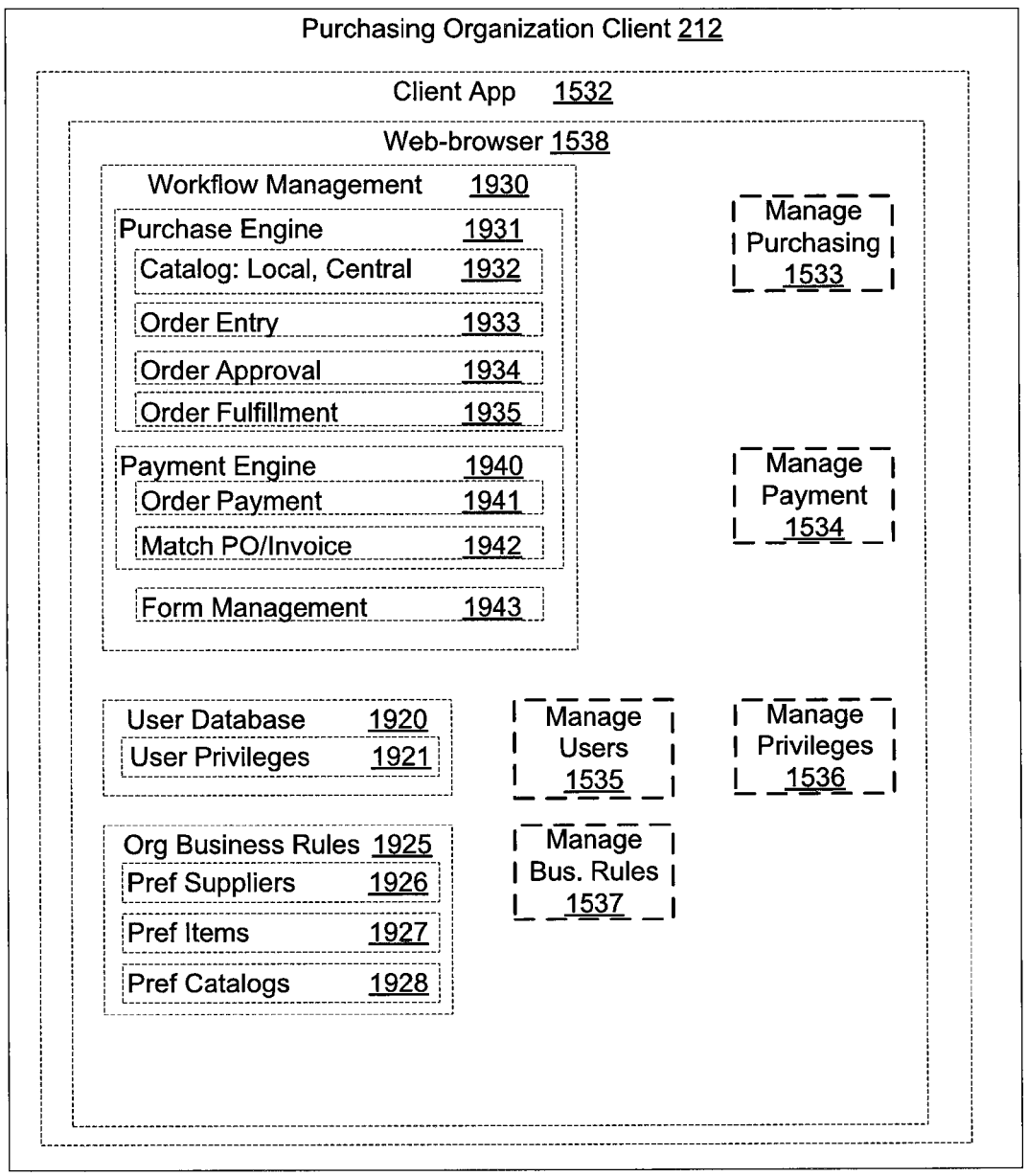
FIG. 19 illustrates the features and database accessible via the purchasing organization client.

FIG. 19 is a block diagram 1900 of a purchasing organization client 212. The client application 1532 may be a web-browser 1538 for the buyer user to use, or may be a standalone application. The web-browser 1538 or standalone application may display features to manage purchasing 1533, manage payment 1534, manage users 1535, manage privileges 1536, or manage business rules 1537. In addition, the web-browser 1538 or standalone application may also display features for:
  interfacing with the user database 1920 to, for example, access or define user privileges 1921;
  managing a buyer organization's business rules 1925 to, for example, define preferred suppliers 1926, items 1927, or catalogs 1928;
  managing workflows 1930 like, for example:
    the flow of purchase requisitions within the buyer organization,
    access to catalogs 1932 as may be necessary (via a purchase engine 1931) for forwarding a purchase requisition or order appropriately for approval,
    order entry 1933, order approval 1934, order fulfillment 1935 (all via a purchase engine 1931), or
    forwarding a sales order and/or invoice from the supplier to the appropriate buyer user (via the payment engine 1940 and using the PO/Invoice match feature 1942 for linking a purchase order on the buyer user side with an incoming invoice from the supplier), processing payment on the order's invoice 1941 (via the payment engine 1940), or forwarding of a user-customized form in accordance with business rules (via form management 1943).

Figure 20:
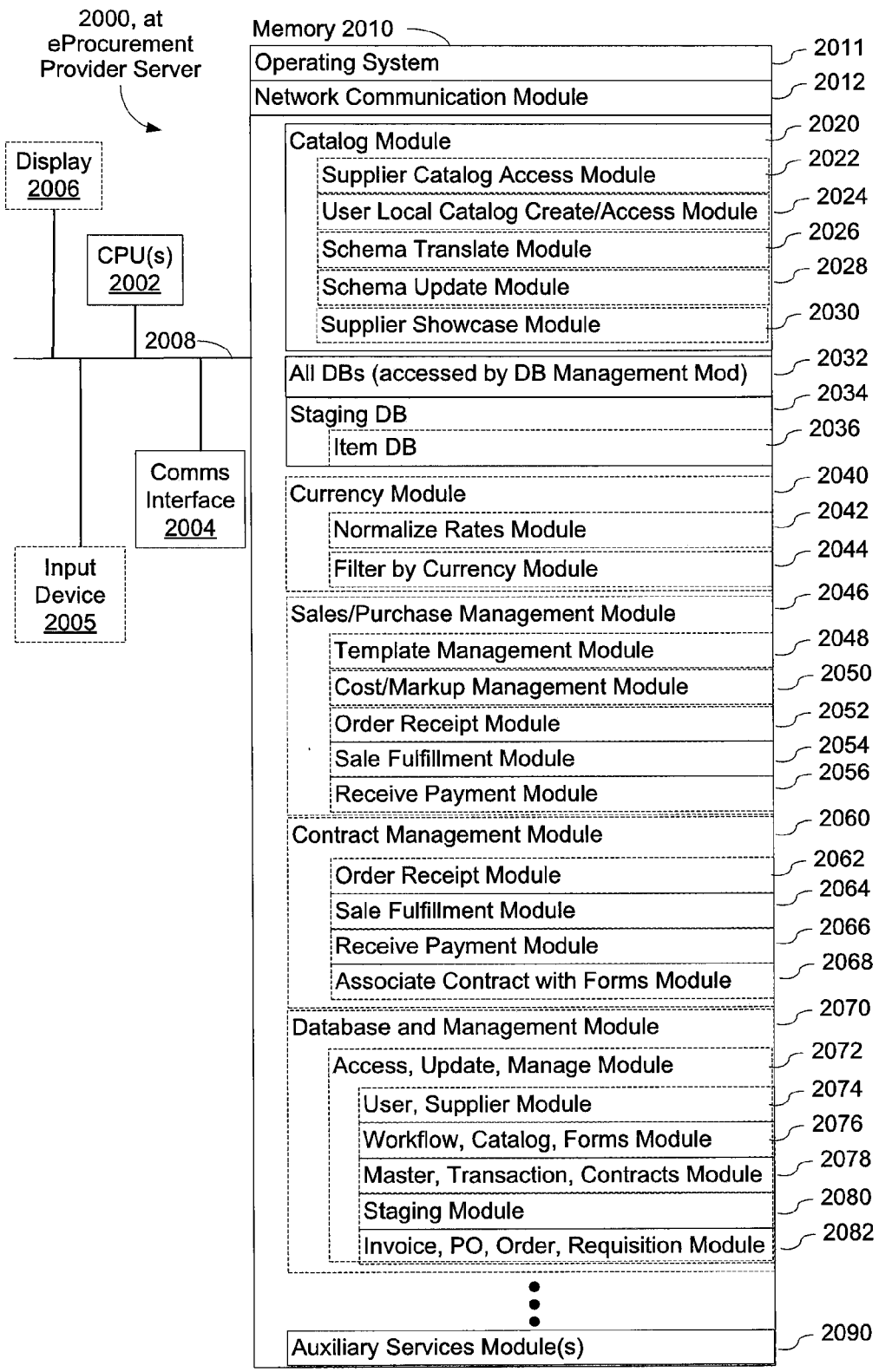
FIG. 20 illustrates a server system hosting an electronic procurement system running on the server.

FIG. 20 is a block diagram of a server system 2000. The server system 2000 generally includes one or more processing units (CPU's) 2002, one or more network or other communications interfaces 2004, memory 2010, and one or more communication buses 2008 for interconnecting these components. The communication buses 2008 may include circuitry (sometimes called a chipset) that interconnects and controls communications between system components. The server system 2000 may optionally include a user interface, for instance a display 2006 and an input device 2005. Memory 2010 may include high speed random access memory and may also include non-volatile memory, such as one or more magnetic disk storage devices. Memory 2010 may include mass storage that is remotely located from the central processing unit(s) 2002. Memory 2010 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices.

In some embodiments, memory 2010 stores the following programs, modules and data structures, or a subset thereof:
  an operating system 2011 that includes procedures for handling various basic system services and for performing hardware dependent tasks;
  a network communication module 2012 that is used for connecting the server system 2000 to other computers via the one or more communication network interfaces 2004 (wired or wireless) and one or more communication networks, such as the Internet, other wide area networks, local area networks, metropolitan area networks, and so on;
  a catalog module 2020 that provides information and prices about products in hosted supplier product catalogs;
  databases 2032;
  a staging database 2034;
  a currency module 2040;
  a sales/purchase management module 2046;
  a contract management module 2060;
  a database and management module 2070; and
  auxiliary services modules 2090.

The catalog module 2020 may include the following modules, or a subset thereof:
  supplier catalog access module 2022 for providing suppliers with access to their respective hosted supplier product catalogs;
  a user local catalog create/access module 2024 for providing users (purchasing organizations) with local catalogs, in one embodiment generated by the respective users, from which the users can order products from suppliers who are not associated with hosted supplier product catalogs. In one embodiment, a supplier in the local catalogs is a local service provider (e.g. catering or a limousine service) from which a user wants to order products and services using the electronic procurement system;

a schema translate module 2026 for translating catalog data provided by suppliers or purchasing data provided by users into a common format associated with the electronic procurement system;

a schema update module 2028 for updating data in the common format associated with the electronic procurement system in response to changes in the respective catalog data or purchasing data; and a supplier showcase module 2030 for promoting certain suppliers to users of a purchasing organization, which in an embodiment may be performed according to business rules.

The databases 2032 may include all databases used by the system. These databases may in one embodiment be stored as logical partitions in a memory. These databases may in another embodiment be stored as tables in a larger database. These databases may in yet another embodiment be stored in separate memory or storage devices.

The staging database 2034 may comprise a catalog development environment (i.e., a staging area) for catalogs associated with suppliers. The data in the staging area may include complete catalogs, incomplete catalogs in development, partially uploaded catalogs, etc. A supplier can choose to make any or all portions of their respective catalog(s) in the staging database 'live' by syndicating the respective portions. A live catalog is one from which a user or purchasing organization may order items. The item database 2036, which may be a subset of the staging database 2034, contains descriptions, characteristics, price, pictures and other pertinent information for items listed in the catalogs.

The currency module 2040 may include the following modules, or a subset thereof:

a normalize rates module 2042 for normalizing currency rates visible by a purchaser of goods and/or services, purchasing from suppliers using different currencies to that of the purchaser, or by a supplier of goods and services selling to purchasers using different currencies to the supplier; and a filter by currency module for allowing purchasers to filter suppliers according to currencies they do business in, or allowing suppliers to filter purchasers similarly.

The sales/purchase management module 2046 may include the following modules, or a subset thereof:

a template management module 2048, for managing templates used by suppliers or purchasers of the system in placing orders for goods or services;

a cost/markup management module 2050 for determining characteristics (e.g., average cost) of inventory and managing the inventory based on the characteristics and a markup rate;

order receipt module 2052 for determining that an order has been received, and preparing to fulfill the order;

sale fulfillment module 2054 for fulfilling the order, including invoicing and shipping goods to the purchaser; and a receive payment module 2056 for receiving payment associated with an order (both for fulfilled and unfulfilled orders).

The contract management module 2060 may include the following modules, or a subset thereof:

order receipt module for 2062 for determining that an order has been received and matching the order to a contract;

sale fulfillment module 2064 for associating fulfillment of an order with a contract and verifying that the received order complies with the contract;

receive payment module 2066 for associating payments with a contract and verifying that appropriate discounts and terms of the contract are reflected in the payment; and associate contract with forms module 2068 for associating the contract with forms used by a supplier or purchaser, such that terms of the contract apply to the form.

The database and management module 2070 may include the following modules, or a subset thereof:

Access, update and manage database module 2072 for accessing, updating and managing databases in the system, including:

user (purchaser) and supplier module 2074, for managing user database 32 as described, which is accessed by a buyer user 12 or supplier user 14 through access module 21 as described;

workflow, catalog and forms module 2076, for managing workflow database 3000, catalog database 2400, and forms database 2300 as described;

master, transaction and contracts module 2078, for managing master database 236, transaction database 238 ad contracts database 3200 as described;

staging module 2180, for managing staging database 3100 as described; and invoice, purchase order, order, and requisition module 2082, for managing invoice databases 3300 and 3400, order database 2900 and 2500, requisition database 2700 as described.

The auxiliary services module may include additional features or services related to operation, management, security, authentication, maintenance or other aspects of the electronic procurement system.

Figure 21:
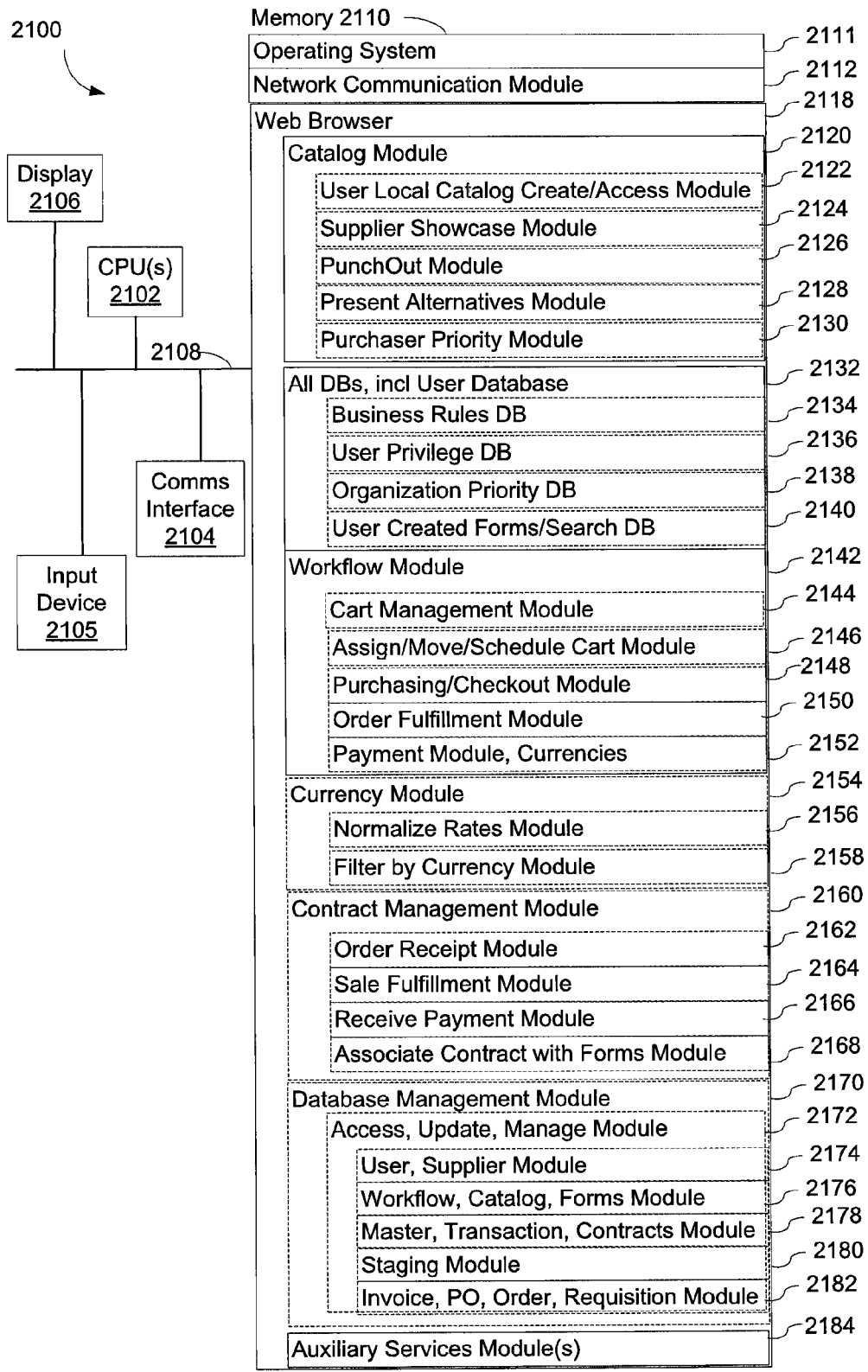
FIG. 21 illustrates a client system providing access to an electronic procurement system running on a server.

FIG. 21 is a block diagram of a server system 2100. The server system 2100 generally includes one or more processing units (CPU's) 2102, one or more network or other communications interfaces 2104, memory 2110, and one or more communication buses 2108 for interconnecting these components. The communication buses 2108 may include circuitry (sometimes called a chipset) that interconnects and controls communications between system components. The system 2100 may optionally include a user interface, for instance a display 2106 and an input device 2105. Memory 2110 may include high speed random access memory and may also include non-volatile memory, such as one or more magnetic, optical, or solid state disk storage devices. Memory 2110 may include mass storage that is remotely located from the central processing unit(s) 2102. Memory 2110 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices.

In some embodiments, memory 2110 stores the following programs, modules and data structures, or a subset thereof:

an operating system 2111 that includes procedures for handling various basic system services and for performing hardware dependent tasks;

a network communication module 2112 that is used for connecting the server 2000 to other computers via the one or more communication network interfaces 2004 (wired or wireless) and one or more communication networks, such as the Internet, other wide area networks, local area networks, metropolitan area networks, and so on;

a web browser 2118 or other tool for providing client access and visibility to the electronic procurement system, where in some embodiments some or all of the operations of the electronic procurement system are performed at a server, and in some embodiments some of the operations of the electronic procurement system are performed at the client;

a catalog module 2120 that provides information and prices about products in hosted supplier product catalogs;

databases 2132;

a workflow module 2142;

a currency module 2154;

a contract management module 2160;

a database management module 2170; and auxiliary services modules 2184.

The catalog module 2120 may include the following modules, or a subset thereof:

a user local catalog create/access module 2122, in some embodiments similar to module 2024, for providing users (purchasing organizations) with local catalogs, in one embodiment generated by the respective users, from which the users can order products from suppliers who are not associated with hosted supplier product catalogs. In one embodiment, a supplier in the local catalogs is a local service provider (e.g. catering) from which a user wants to order products and services using the electronic procurement system;

a supplier showcase module 2124, in some embodiments similar to module 2030, for promoting certain suppliers to users of a purchasing organization, which in an embodiment may be performed according to business rules;

a Punch Out module 2126 for providing access to a catalog or website separate from the hosted supplier product catalogs, and allowing a purchaser to purchase an item from that catalog or website, and process the purchase through the electronic purchasing system;

a present alternatives module 2128, for presenting alternative items to a prospective purchaser upon determining that an item requested by the purchaser cannot be fulfilled or that a better item might be available; and a purchaser priority module 2130 for prioritizing purchasers or purchaser orders associated with a user or purchasing organization.

The databases 2132 may include all databases used by the system, both on the server side and client side. These databases may in one embodiment be stored as logical partitions in a memory. These databases may in another embodiment be stored as tables in a larger database. These databases may in yet another embodiment be stored in separate memory or storage devices. The databases may include the following databases or modules, or a subset thereof:

business rules database 2134 for storing business rules associated with a user, purchasing organization or supplier, wherein in some embodiments the business rules may be set by a super-user or administrator associated with an organization;

user privilege database 2136 for storing privileges associated with users, such as purchasing privileges, approval privileges, etc.;

organization priority database 2138 for storing priority information associated with users or purchasing organizations in the electronic procurement system; and user created forms/search database 2140 for storing forms, search queries, etc associated with a user or purchasing organization, or associated with a supplier.

The workflow module 2142 may include the following modules, or a subset thereof:

cart management module 2144 for allowing a user or organization to manage a shopping cart associated with the purchase of items;

assign/move/schedule cart module 2146 for allowing a user or organization to assign a cart to another user, to move items from one cart to another (including a new) cart, and to schedule a cart for purchasing;

purchasing/checkout module 2148 for allowing a user to checkout one or more carts and purchase the items in the one or more carts;

order fulfillment module 2150 for verifying that an order has been received and processed for fulfillment, wherein in some embodiments this may be similar to sale fulfillment module 2054 for fulfilling the order; and payment module/currencies 2152 for processing payment for an order, including converting currencies if necessary.

The currency module 2154 may include the following modules, or a subset thereof:

a normalize rates module 2156 (in some embodiments similar to module 2042) for normalizing currency rates visible by a purchaser of goods and/or services, purchasing from suppliers using different currencies to that of the purchaser, or by a supplier of goods and services selling to purchasers using different currencies to the supplier; and a filter by currency module 2158 (in some embodiments similar to module 2044) for allowing a purchasers to filter suppliers according to currencies they do business in, or allowing suppliers to filter purchasers similarly.

The contract management module 2160 may include the following modules, or a subset thereof:

an order receipt module 2162 (in some embodiments similar to module 2062) for determining that an order has been received and matching the order to a contract;

a sale fulfillment module 2164 (in some embodiments similar to module 2064) for associating fulfillment of an order with a contract and verifying that the received order complies with the contract;

a receive payment module 2166 (in some embodiments similar to module 2066) for associating payments with a contract and verifying that appropriate discounts and terms of the contract are reflected in the payment; and an associate contract with forms module 2168 (in some embodiments similar to module 2068) for associating the contract with forms used by a supplier or purchaser, such that terms of the contract apply to the form.

The database management module 2170 may include the following modules, or a subset thereof:

Access, update and manage database module 2172 (in some embodiments similar to module 2072) for accessing, updating and managing databases in the system, including:

user (purchaser) and supplier module 2174 for managing user database 32 as described, which is accessed by a buyer user 12 or supplier user 14 through access module 21 as described;

workflow, catalog and forms module 2176 for managing workflow database 3000, catalog database 2400, and forms database 2300 as described;

master, transaction and contracts module 2178 for managing master database 236, transaction database 238 ad contracts database 3200 as described;

staging module 2080 for managing staging database 3100 as described; and an invoice, purchase order, order, requisition module 2182 for managing invoice databases 3300 and 3400, order database 2900 and 2500, requisition database 2700 as described.

The auxiliary services modules 2184 (in some embodiments similar to module 2090) may include additional features or services related to operation, management, security, authentication, maintenance or other aspects of the electronic procurement system.

Figure 22:
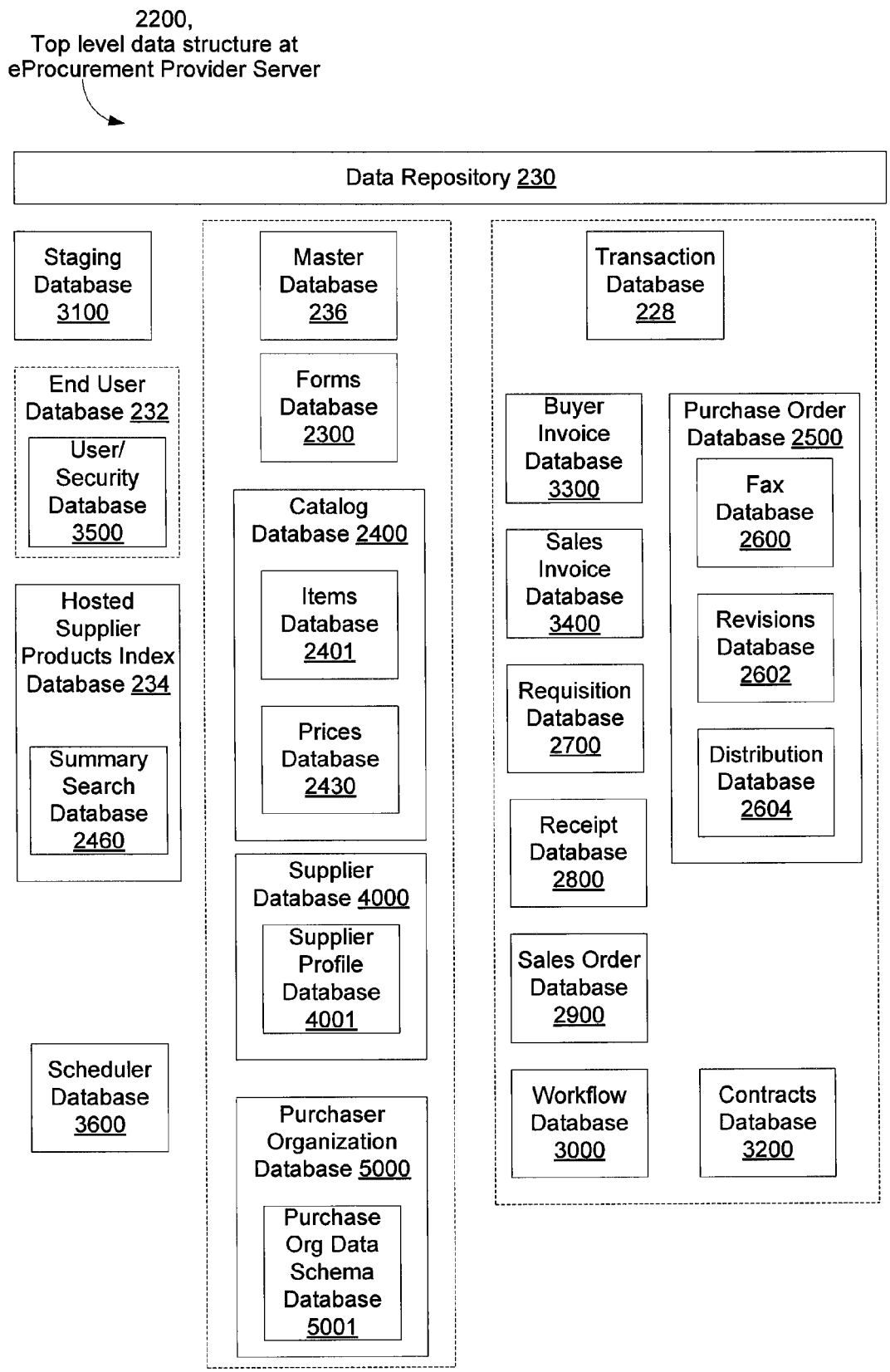
FIG. 22 illustrates a top-level data structure for electronic procurement system.

FIG. 22 shows a top level data structure 2200 at an electronic procurement provider server. The data structure includes data repository 230, end user database 232, hosted supplier product index 234, master product database 236, and transaction database 238. The end user database 232 may in an embodiment include user/security database 3500. The hosted product index 234 may in an embodiment include summary search database 2460. The data structure further includes staging database 3100, and scheduler database 3600.

The master database is associated with (and may in some embodiments include one or more of) a forms database 2300 and a catalog database 2400, which in an embodiment includes items database 2401 and prices database 2430. The master database is also associated with (and may in some embodiments include one or more of) a supplier database 4000 and a purchaser organization database 5000, where the supplier database 4000 may in some embodiments include a supplier profile database 4001 and where the purchaser organization database 5000 may in some embodiments include a purchase organization data schema database 5001.

The transaction database is associated with (and may in some embodiments include one or more of) buyer invoice database 3300, sales invoice database 3400, requisition database 2700, receipt database 2800, sales order database 2900, workflow database 3000, contracts database 3200, and purchase order database 2500. The purchase order database 2500 may in an embodiment include the fax database 2600, revisions database 2602, and distribution database 2604.

Figure 23:
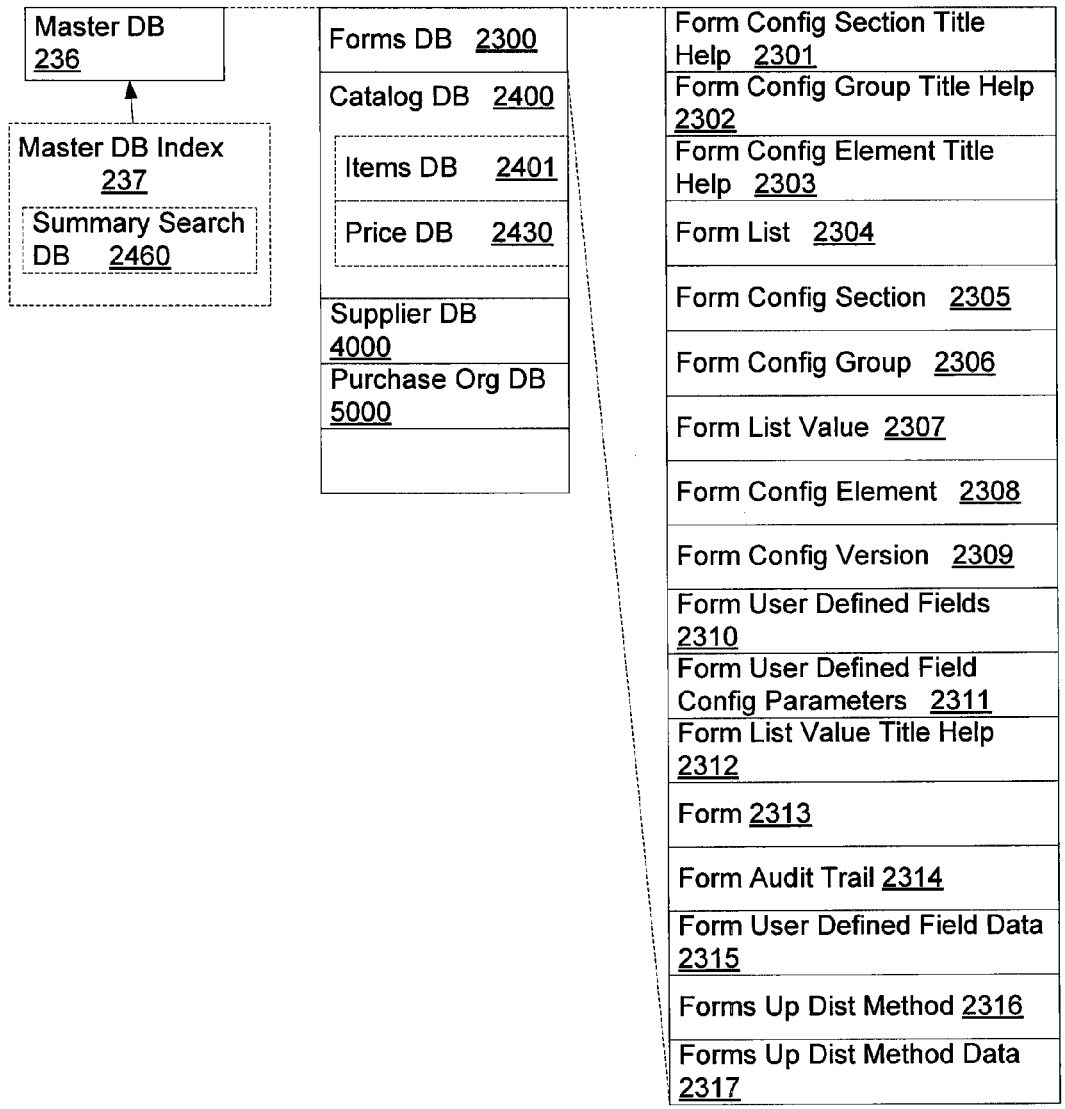
FIG. 23 illustrates a data structure for a master database, showing contents of a forms database.

FIG. 23 shows a database diagram 2300 including the master database 236, with master database index 237 indexing into the master database. Master database index 237 includes summary search database 2460. Master database 236 may in some embodiments include a supplier database 4000 and a purchaser organization database 5000.

In an embodiment, forms database 2300 includes one or more of:

Form Config Section Title Help 2301, in some embodiments help information for configuring a form section title;

Form Config Group Title Help 2302, in some embodiments help information for configuring a form group title;

Form Config Element Title Help 2303, in some embodiments help information for configuring a form element;

Form List 2304, in some embodiments a list of forms;

Form Config Section 2305, in some embodiments configuration of a form section;

Form Config Group 2306, in some embodiments configuration of a form group;

Form List Value 2307;

Form Config Element 2308, in some embodiments configuration of a form element;

Form Config Version 2309, in some embodiments configuration of a form version;

Form User Defined Fields 2310, in some embodiments user defined fields in a form;

Form User Defined Field Config Parameters 2311, in some embodiments parameters for configuring user defined fields in a form;

Form List Value Title Help 2312;

Form 2313;

Form Audit Trail 2314, in some embodiments a list of changes to a form for auditing purposes;

Forms User Defined Field Data 2315;

Forms Up Dist Method 2316, in some embodiments forms update distribution method details; and Forms Up Dist Method Data 2317, in some embodiments forms update distribution method data.

Figure 24:
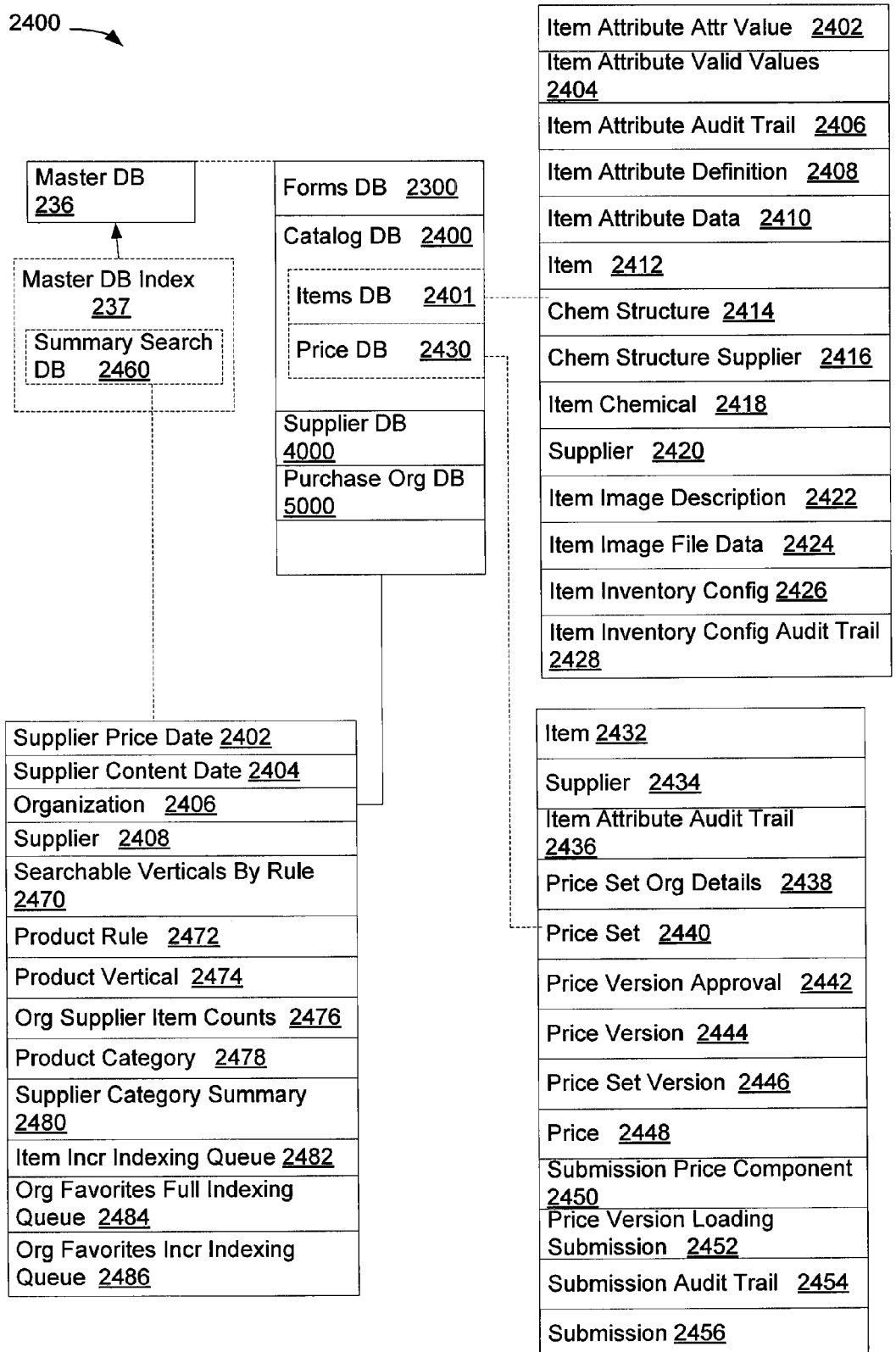
FIG. 24 illustrates a data structure for a master database, showing contents of a catalog database and search database for indexing the master database.

FIG. 24 shows a database diagram 2400 including the master database 236, with master database index 237 indexing into the master database. Master database index 237 includes summary search database 2460.

As described, the search architecture is based upon an indexed, tokenized-type implementation. This search architecture may include a search engine and a tokenization feature, both of which are invoked via processing modules executed on the custom database servers. Product elements such as the product name, industry, price, and availability, among others, are primarily used to generate a product search index (e.g., a token). The process of generating a product search index/token is called "tokenization" and may be executed by a tokenization feature invoked via a processing module. The indices/tokens generated as a result of the tokenization feature, which relate to various products of a multitude of suppliers, may be stored within and executed on the hosted supplier products catalog. Searching is actually executed against what are termed as "verticals." A vertical is designed similar to a drill-down menu architecture that consists of root nodes and leaf nodes, which are children of their respective roots.

The forms database 2300, and catalog database 2400 are associated with the master database. The catalog database includes items database 2401 and price database 2430.

In an embodiment, items database 2401 includes one or more of the following:

Item Attribute Attr Value 2402, in some embodiments a value for an item attribute;

Item Attribute Valid Values 2404, in some embodiments valid values value for an item attribute;

Item Attribute Audit Trail 2406, in some embodiments a list of changes to an item attribute for auditing purposes;

Item Attribute Definition 2408;

Item Attribute Data 2410;

Item 2412;

Chem Structure 2414, in some embodiments a description of a chemical structure that may be ordered through the procurement system;

Chem Structure Supplier 2416, in some embodiments a supplier of a chemical structure;

Item Chemical 2418, in some embodiments a commercial item of a chemical structure, e.g., a container of a certain chemical structure.

Supplier 2420;

Item Image Description 2422, in some embodiments a description of an image or picture associated with an item;

Item Image File Data 2424, in some embodiments an image data file (e.g., a JPEG image or GIF image, as commonly used in web applications);

Item Inventory Config 2426, in some embodiments data for configuring inventory of an item; and Item Inventory Config Audit Trail 2428, in some embodiments a list of changes to data for configuring inventory of an item.

In an embodiment price database 2430 includes one or more of the following:

Item 2432, in some embodiments an item for which a price is stored in the price database;

Supplier 2434, in some embodiments a supplier associated with the item;

Item Attribute Audit Trail 2436, in some embodiments a list of changes to an attribute associated with an item, for which a price is stored in the price database;

Price Set Org Details 2438, in some embodiments details of an organization price;

Price Set 2440, in some embodiments a price for the item;

Price Version Approval 2442, in some embodiments approval for a version of a price associated with the item;

Price Version 2444, in some embodiments a version of a price associated with the item;

Price Set Version 2446;

Price 2448, in some embodiments a price for the item;

Submission Price Component 2450;

Price Version Loading Submission 2452;

Submission Audit Trail 2454, in some embodiments for auditing submissions; and Submission 2456.

In an embodiment summary search database 2460 includes one or more of the following:

Supplier Price Date 2462, in some embodiments a date associated with a supplier price;

Supplier Content Date 2464, in some embodiments a date associated with supplier content (e.g., description);

Organization 2466;

Supplier 2468, in some embodiments a supplier of an item;

Searchable Verticals By Rule 2470, in some embodiments supporting rule-based searching;

Product Rule 2472, in some embodiments a rule related to a product;

Product Vertical 2474, in some embodiments supporting product-based searching;

Org Supplier Item Counts 2476, in some embodiments a count of items stored at an organization supplier;

Product Category 2478, in some embodiments a category related to a product;

Supplier Category Summary 2480, in some embodiments a summary of a supplier category;

Item Incr Indexing Queue 2482, in some embodiments a queue for incrementally indexing items;

Org Favorites Full Indexing Queue 2484, in some embodiments a full-indexing queue for organizational favorites; and Org Favorites Incr Indexing Queue 2486, in some embodiments an incremental-indexing queue for organizational favorites.

Figure 25:
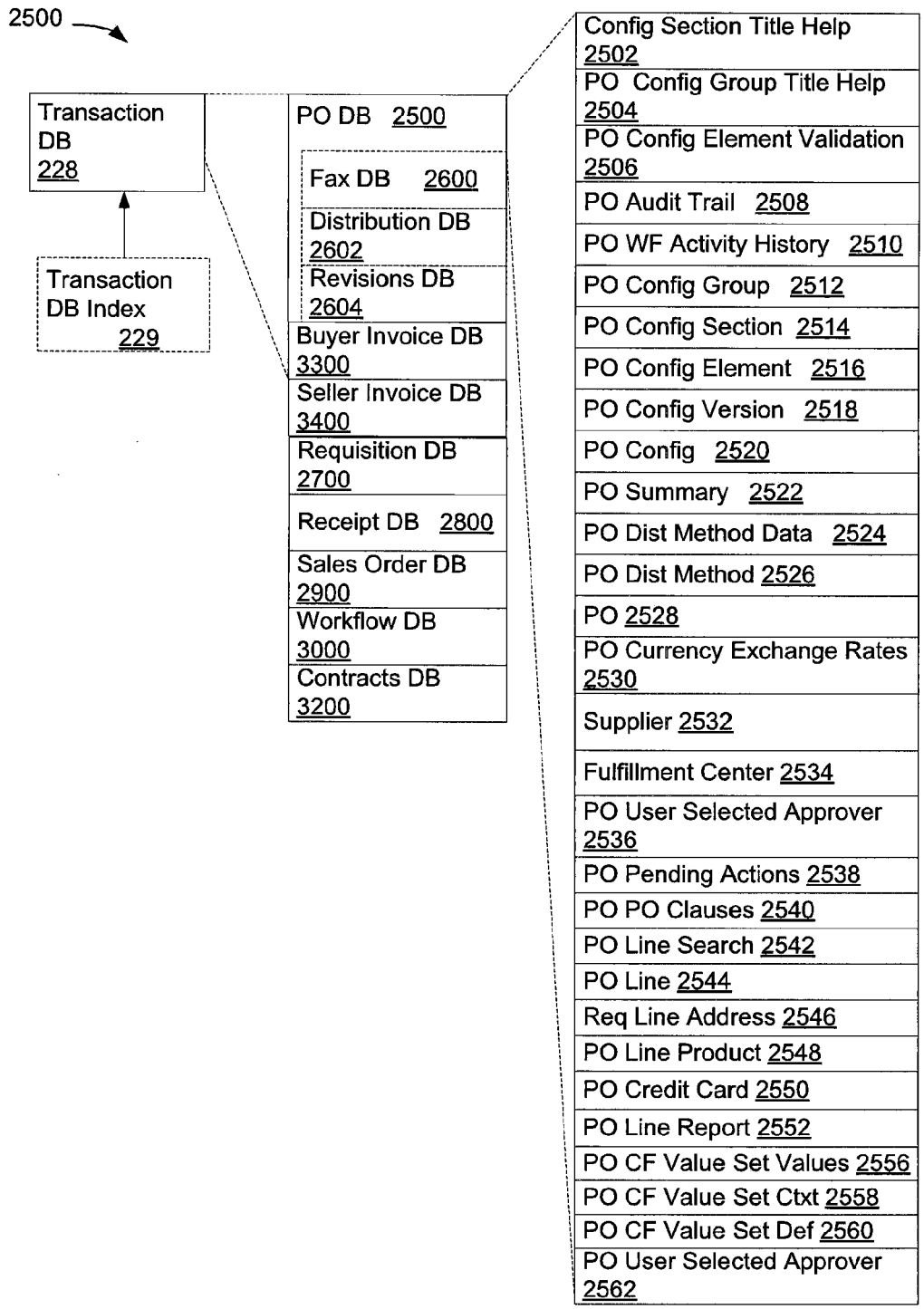
FIG. 25 illustrates a data structure for a transaction database, showing contents of a purchase order database.

FIG. 25 shows a database diagram 2500 including the transaction database 228, with transaction database index 229 indexing into the transaction database 228. Transaction database 228 is associated with (and in some embodiments includes one or more of) the following databases:

Purchase Order (PO) DB 2500, in some embodiments a database of purchase orders;

Fax DB 2600, in some embodiments a database of faxes;

Distribution DB 2602, in some embodiments for storing order distributions, where the order distribution features can include such features as facsimile or email confirmation, as well as other delivery methods, organized hierarchically to ensure purchase order delivery, as described;

Revisions DB 2604, in some embodiments for storing revisions to sales or purchase documents;

Buyer Invoice DB 3300, in some embodiments for storing buyer invoices;

Seller Invoice DB 3400, in some embodiments for storing seller invoices;

Requisition DB 2700, in some embodiments for storing purchase requisitions;

Receipt DB 2800, in some embodiments for storing receipts;

Sales Order DB 2900, in some embodiments for storing sales orders;

Workflow DB 3000, in some embodiments for storing workflow data relating to sales, purchases and transactions, etc.; and Contracts DB 3200, in some embodiments for storing contracts.

In an embodiment, Purchase Order (PO) DB 2500 includes one or more of:

Config Section Title Help 2502, in some embodiments help information for configuring a section title;

PO Config Group Title Help 2504, in some embodiments help information for configuring a purchase order group title;

PO Config Element Validation 2506, in some embodiments validation information for configuring a purchase order element;

PO Audit Trail 2508, in some embodiments a purchase order audit trail;

PO WF Activity History 2510, in some embodiments a purchase order workflow activity history;

PO Config Group 2512, in some embodiments configuration of a purchase order group;

PO Config Section 2514, in some embodiments configuration of a purchase order section;

PO Config Element 2516, in some embodiments configuration of a purchase order element;

PO Config Version 2518, in some embodiments configuration of a purchase order version;

PO Config 2520, in some embodiments configuration of a purchase order;

PO Summary 2522, in some embodiments a purchase order summary;

PO Dist Method Data 2524, in some embodiments data for a purchase order distribution method;

PO Dist Method 2526, in some embodiments a purchase order distribution method;

PO 2528, in some embodiments a purchase order;

PO Currency Exchange Rates 2530;

Supplier 2532;

Fulfillment Center 2534;

PO User Selected Approver 2536, in some embodiments a user-selected approver for a purchase order;

PO Pending Actions 2538, in some embodiments pending actions relating to a purchase order;

PO PO Clauses 2540, in some embodiments clauses relating to a purchase order;

PO Line Search 2542, in some embodiments line search details relating to a purchase order;

PO Line 2544, in some embodiments a line of a purchase order;

Req Line Address 2546, in some embodiments an address line relating to a purchase requisition;

PO Line Product 2548, in some embodiments a product line relating to a purchase order;

PO Credit Card 2550, in some embodiments a credit card associated with a purchase order;

PO Line Report 2552, in some embodiments a report line relating to a purchase order;

PO CF Value Set Values 2556, in some embodiments to set the value of a custom field value in a purchase order;

PO CF Value Set Ctxt 2558, in some embodiments to set the context of a custom field value in a purchase order;

PO CF Value Set Def 2560, in some embodiments to set the definition of a custom field value in a purchase order; and PO User Selected Approver 2562, in some embodiments a user-selected approver of the purchase order.

Figure 26:
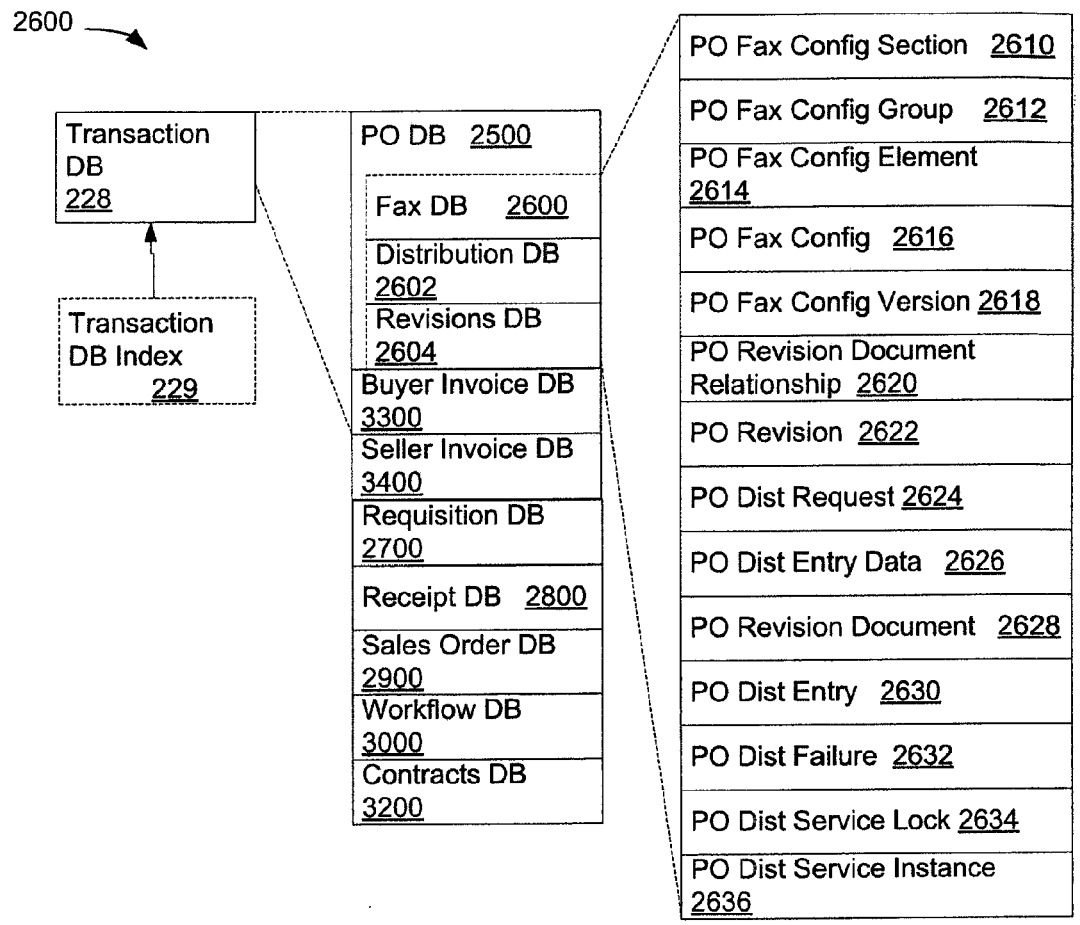
FIG. 26 illustrates a data structure for a transaction database, showing contents of a fax, distribution and revisions databases.

FIG. 26 shows a database diagram 2600 including the transaction database 228, with transaction database index 229 indexing into the transaction database. The fax database 2600, distribution database 2602 and revisions database 2604 are associated with the transactions database 228.

In an embodiment, the fax database 2600, distribution database 2602 and revisions database 2604 include one or more of:

PO Fax Config Section 2610, in some embodiments configuration of a purchase order fax section;

PO Fax Config Group 2612, in some embodiments configuration of a purchase order fax group;

PO Fax Config Element 2614, in some embodiments configuration of a purchase order fax element;

PO Fax Config 2616, in some embodiments configuration of a purchase order fax;

PO Fax Config Version 2618, in some embodiments configuration version of a purchase order fax;

PO Revision Document Relationship 2620, in some embodiments a document relationship of a purchase order revision PO Revision 2622, in some embodiments a purchase order revision;

PO Dist Request 2624, in some embodiments a purchase order distribution request;

PO Dist Entry Data 2626, in some embodiments purchase order entry data;

PO Revision Document 2628, in some embodiments a purchase order document revision;

PO Dist Entry 2630, in some embodiments entry of a purchase order distribution;

PO Dist Failure 2632, in some embodiments failure of a purchase order distribution;

PO Dist Service Lock 2634, in some embodiments locking of a purchase order distribution service; and PO Dist Service Instance 2636, in some embodiments an instance of a purchase order distribution service.

Figure 27:
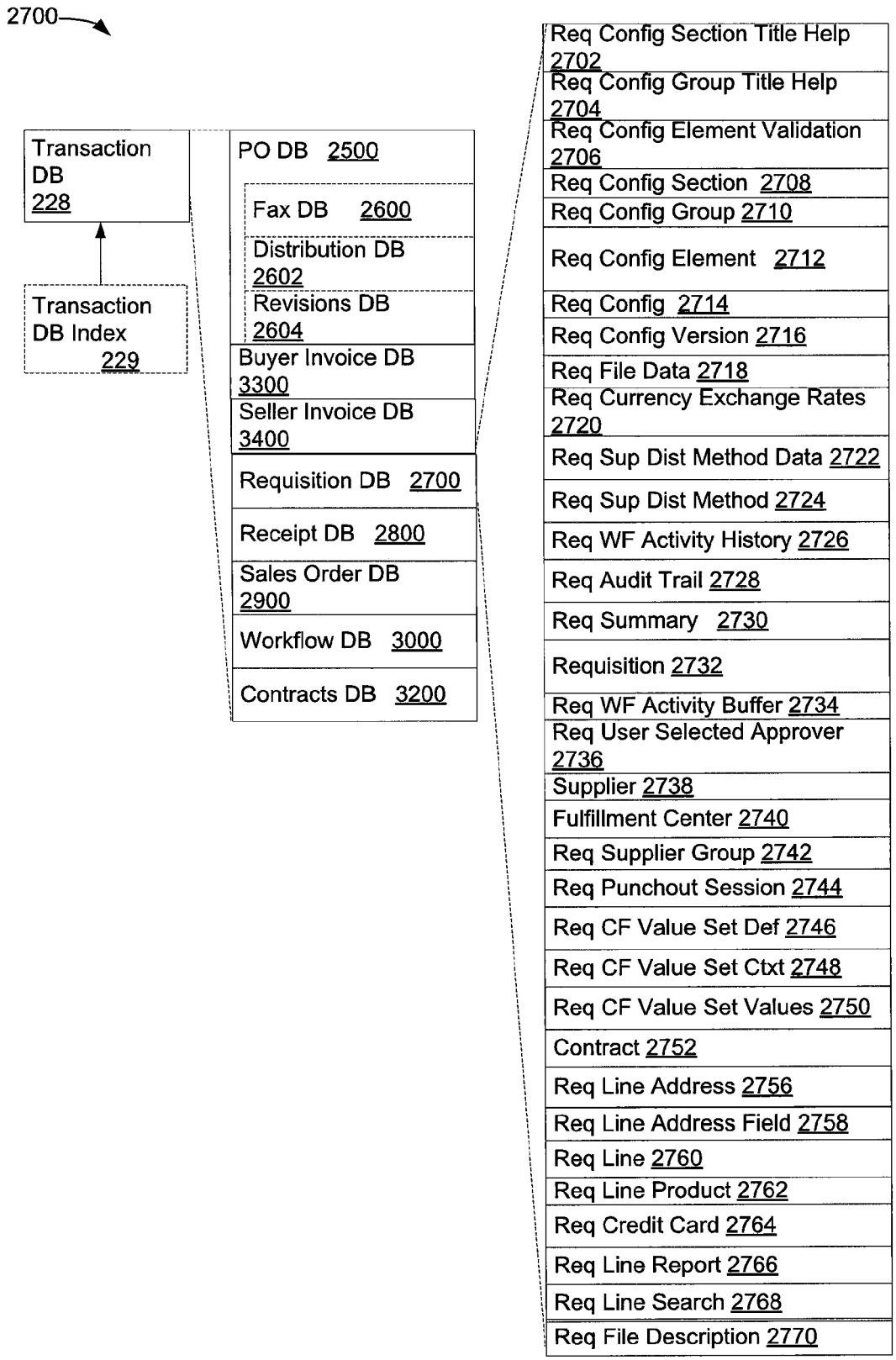
FIG. 27 illustrates a data structure for a transaction database, showing contents of a requisition database.

FIG. 27 shows a database diagram 2700 including the transaction database 228, and requisition database 2700 associated with the transaction database.

In an embodiment, requisition database 2700 includes one or more of:

Req Config Section Title Help 2702, in some embodiments help information for configuring a purchase requisition section title;

Req Config Group Title Help 2704, in some embodiments help information for configuring a purchase requisition group title;

Req Config Element Validation 2706, in some embodiments help information for configuring a purchase requisition element validation;

Req Config Section 2708, in some embodiments configuration of a purchase requisition section;

Req Config Group 2710, in some embodiments configuration of a purchase requisition group;

Req Config Element 2712, in some embodiments configuration of a purchase requisition section element;

Req Config 2714, in some embodiments configuration of a purchase requisition;

Req Config Version 2716, in some embodiments configuration of a purchase requisition version;

Req File Data 2718, in some embodiments purchase requisition file data;

Req Currency Exchange Rates 2720, in some embodiments purchase requisition currency exchange rates;

Req Sup Dist Method Data 2722, in some embodiments data for a purchase requisition distribution method;

Req Sup Dist Method 2724, in some embodiments a purchase requisition distribution method;

Req WF Activity History 2726, in some embodiments purchase requisition workflow activity history;

Req Audit Trail 2728, in some embodiments changes to a purchase requisition for auditing purposes;

Req Summary 2730, in some embodiments a summary of a purchase requisition;

Requisition 2732;

Req WF Activity Buffer 2734, in some embodiments a purchase requisition workflow activity buffer;

Req User Selected Approver 2736, in some embodiments a purchase requisition user-selected approver;

Supplier 2738;

Fulfillment Center 2740, in some embodiments a fulfillment center for a purchase requisition;

Req Supplier Group 2742, in some embodiments a supplier group for a purchase requisition;

Req Punchout Session 2744, in some embodiments a punchout session for a purchase requisition;

Req CF Value Set Def 2746, in some embodiments for setting a definition of a purchase requisition custom field value;

Req CF Value Set Ctxt 2748, in some embodiments for setting a context of a purchase requisition custom field value;

Req CF Value Set Values 2750, in some embodiments for setting a value of a purchase requisition custom field value;

Contract 2752;

Req Line Address 2756, in some embodiments an address line for a purchase requisition;

Req Line Address Field 2758, in some embodiments an address field line for a purchase requisition;

Req Line 2760, in some embodiments a line for a purchase requisition;

Req Line Product 2762, in some embodiments a product line for a purchase requisition;

Req Credit Card 2764, in some embodiments a credit card for a purchase requisition;

Req Line Report 2766, in some embodiments a report line for a purchase requisition;

Req Line Search 2768; in some embodiments a search line for a purchase requisition; and Req File Description 2770, in some embodiments a file description for a purchase requisition.

Figure 28:
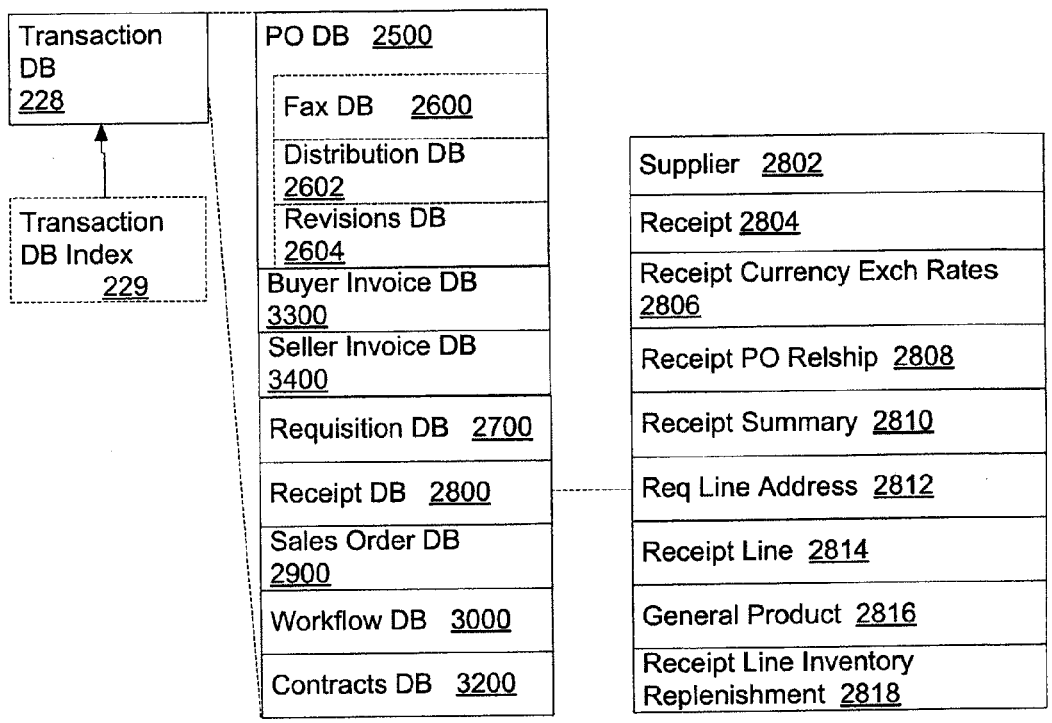
FIG. 28 illustrates a data structure for a transaction database, showing contents of a receipt database.

FIG. 28 shows a database diagram 2800 including the transaction database 228, and receipt database 2800 associated with the transaction database.

In an embodiment, receipt database 2800 includes one or more of:

Supplier 2802, in some embodiments a supplier for a receipt;
Receipt 2804;
Receipt Currency Exch Rates 2806, in some embodiments currency exchange rates associated with a receipt;
Receipt PO Relship 2808, in some embodiments a relationship between a purchase order and a receipt;
Receipt Summary 2810, in some embodiments a summary of a receipt;
Req Line Address 2812, in some embodiments an address line for a purchase requisition;
Receipt Line 2814;
General Product 2816; and
Receipt Line Inventory Replenishment 2818, in some embodiments an inventory replenishment line for a receipt.

Figure 29:
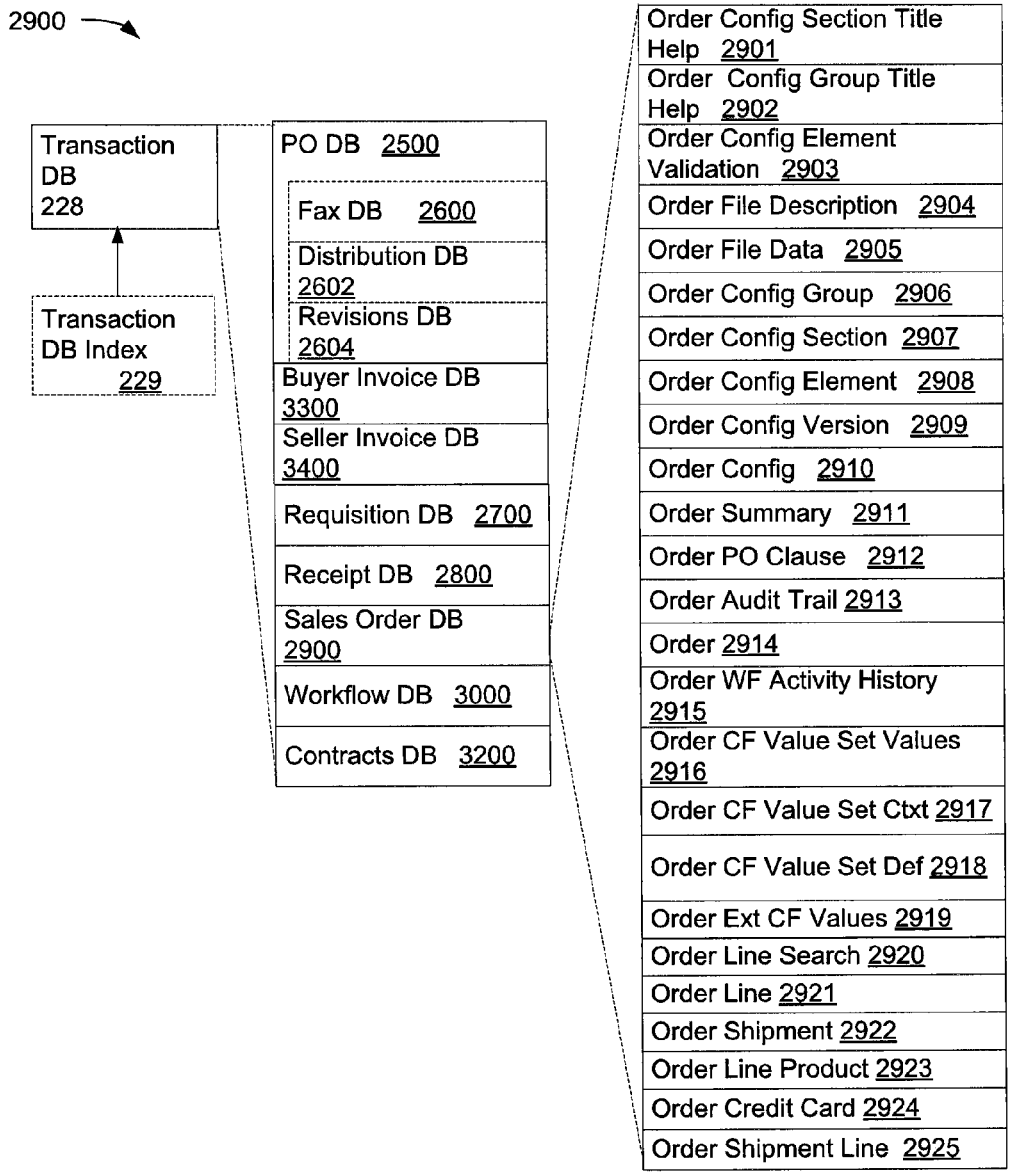
FIG. 29 illustrates a data structure for a transaction database, showing contents of a sales order database.

FIG. 29 shows a database diagram 2900 including the transaction database 228, and sales order database 2900 associated with the transaction database.

In some embodiments, the transaction database 228 and sales order database 2900 are accessed by transaction processing servers 223 and middleware/web methods servers 224.

In an embodiment, sales order database 2900 includes one or more of:

Order Config Section Title Help 2901, in some embodiments help information for configuring a sales order section title;
Order Config Group Title Help 2902, in some embodiments help information for configuring a sales order group title;
Order Config Element Validation 2903, in some embodiments validation for configuring a sales order element;
Order File Description 2904;
Order File Data 2905;
Order Config Group 2906, in some embodiments configuration of a sales order group;
Order Config Section 2907, in some embodiments configuration of a sales order section;
Order Config Element 2908, in some embodiments configuration of a sales order element;
Order Config Version 2909, in some embodiments configuration of a sales order version;
Order Config 2910;
Order Summary 2911;
Order PO Clause 2912, in some embodiments a purchase order clause;
Order Audit Trail 2913, in some embodiments changes for auditing a sales order;
Order 2914;
Order WF Activity History 2915, in some workflow activity history for a sales order;
Order CF Value Set Values 2916, in some embodiments values for a sales order custom field;
Order CF Value Set Ctxt 2917, in some embodiments context for a sales order custom field;
Order CF Value Set Def 2918, in some embodiments definition for a sales order custom field;
Order Ext CF Values 2919;
Order Line Search 2920, in some embodiments a search line for a sales order;
Order Line 2921;
Order Shipment 2922, in some embodiments a shipment for a sales order;
Order Line Product 2923, in some embodiments a product for a sales order;
Order Credit Card 2924, in some embodiments a credit card for a sales order; and
Order Shipment Line 2925, in some embodiments a shipment line for a sales order.

Figure 30:
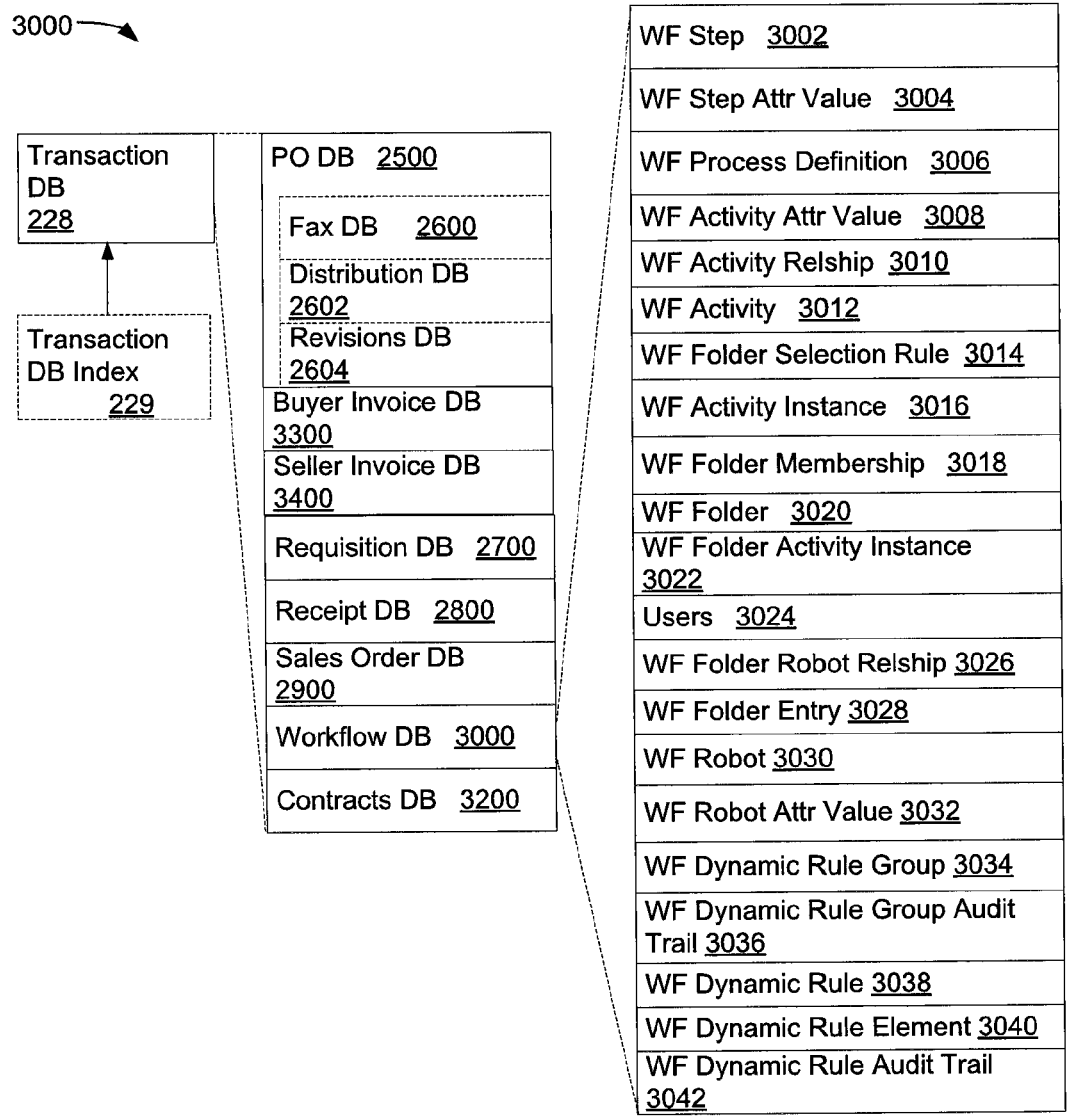
FIG. 30 illustrates a data structure for a transaction database, showing contents of a workflow database.

FIG. 30 shows a database diagram 3000 including the transaction database 228, and workflow database 3000 associated with the transaction database. In some embodiments, the transaction database 228 and workflow database 3000 are accessed by transaction processing servers 223 and middleware/web methods servers 224.

As described, supplier users can access the catalog via the middleware/web methods servers 224, which then forward the supplier access request to the custom database servers 222 and processing modules for execution, in order, for example, to update their own supplier data. End users may be able to search multiple suppliers within the catalog via the end user interface 212, subject to access rules set by the super user. End users may search the catalog for specific end user product requirements via the middleware/web methods servers 224, which forward the end user search request to custom database servers 222 and processing modules for execution. Subsequently, the end user may then invoke requisition and purchase orders via the middleware/web methods servers 224, which forward the end user order to the transaction processing servers 223 for execution.

In an embodiment, workflow database 3000 includes one or more of:

Workflow Step 3002;
Workflow Step Attr Value 3004, in some embodiments an attribute value for a workflow step;
Workflow Process Definition 3006;
Workflow Activity Attr Value 3008, in some embodiments an attribute value for a workflow activity;
Workflow Activity Relship 3010, in some embodiments an relationship for a workflow activity;
Workflow Activity 3012;
Workflow Folder Selection Rule 3014, in some embodiments a selection rule for a workflow folder;
Workflow Activity Instance 3016, in some embodiments an instance of workflow activity;
Workflow Folder Membership 3018, in some embodiments membership of a workflow folder;
Workflow Folder 3020;
Workflow Folder Activity Instance 3022, in some embodiments an activity instance for a workflow folder;
Users 3024;
Workflow Folder Robot Relship 3026;
Workflow Folder Entry 3028;
Workflow Robot 3030;
Workflow Robot Attr Value 3032;
Workflow Dynamic Rule Group 3034, in some embodiments an dynamic rule group associated with the workflow;
Workflow Dynamic Rule Group Audit Trail 3036, in some embodiments an audit trail for a dynamic rule group associated with the workflow;
Workflow Dynamic Rule 3038;
Workflow Dynamic Rule Element 3040, in some embodiments an element of a dynamic rule associated with the workflow; and Workflow Dynamic Rule Audit Trail 3042, in some embodiments an audit trail for a dynamic rule associated with the workflow.

Figure 31:
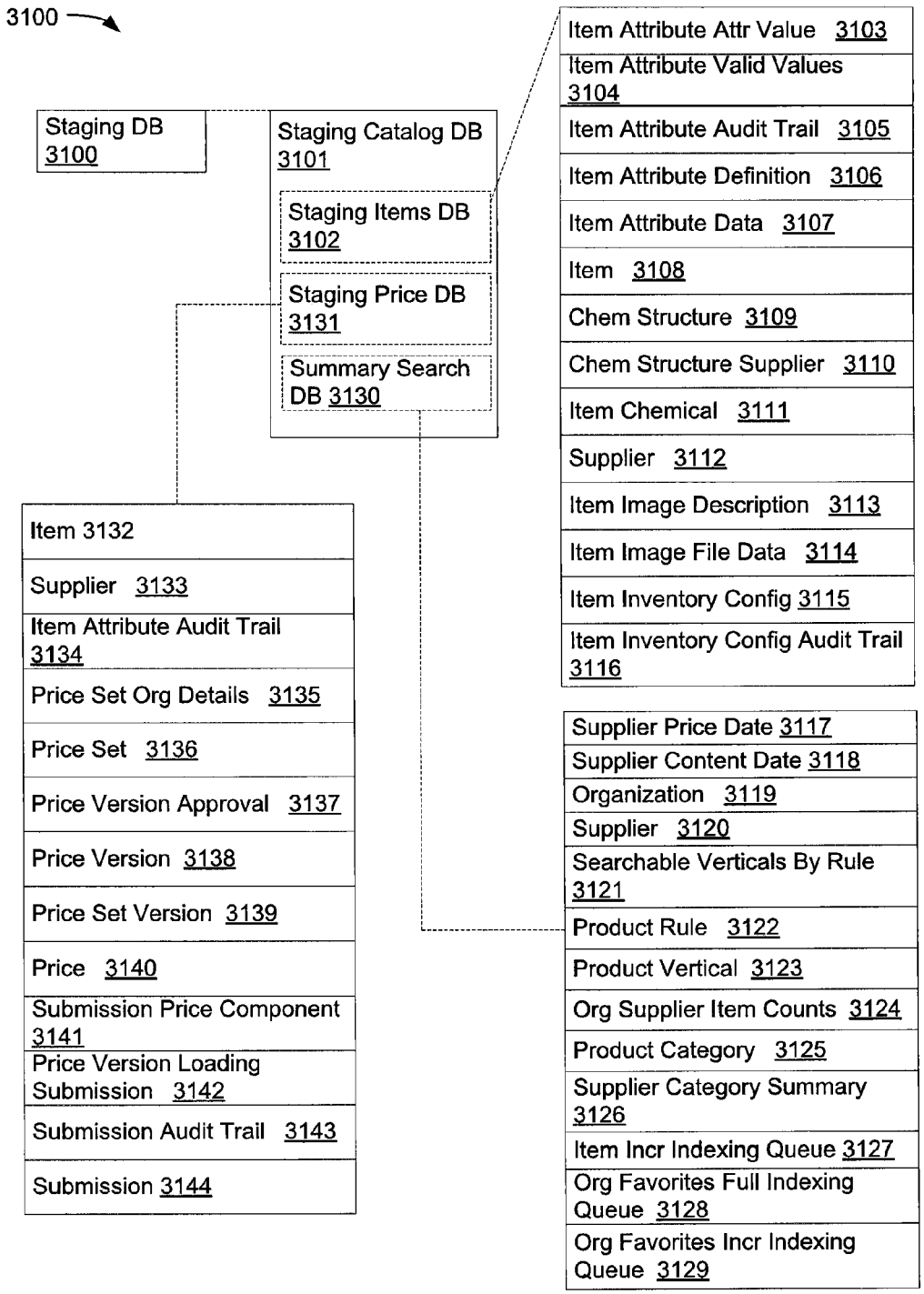
FIG. 31 illustrates a data structure for a staging database, showing contents of a staging catalog database.

FIG. 31 shows a database diagram 3100 including the staging database 3100, and staging catalog database 3101, associated with the staging database 3100.

In an embodiment, the staging catalog database 3101 includes one or more of a staging items database 3102, a staging price database 3131, and a summary search database 3130.

In an embodiment, staging items database 3102 includes one or more of:
  Item Attribute Attr Value 3103, in some embodiments a value for an item attribute;
  Item Attribute Valid Values 3104, in some embodiments a set of valid values for an item attribute;
  Item Attribute Audit Trail 3105, in some embodiments an audit trail for an item attribute;
  Item Attribute Definition 3106, in some embodiments a definition for an item attribute;
  Item Attribute Data 3107, in some embodiments data for an item attribute;
  Item 3108;
  Chem Structure 3109, in some embodiments a description of a chemical structure that may be ordered through the procurement system;
  Chem Structure Supplier 3110, in some embodiments a supplier of a chemical structure;
  Item Chemical 3111 in some embodiments a commercial item of a chemical structure e.g., a container of a certain chemical structure;
  Supplier 3112;
  Item Image Description 3113, in some embodiments a description of an image or picture associated with an item;
  Item Image File Data 3114, in some embodiments an image data file (e.g., a JPEG image or GIF image, as commonly used in web applications);
  Item Inventory Config 3115, in some embodiments data for configuring inventory of an item; and
  Item Inventory Config Audi Trail 3116, in some embodiments a list of changes to data or an audit trail for configuring inventory of an item.

In an embodiment, staging price database 3131 includes one or more of:
  Items 3132;
  Supplier 3133;
  Item Attribute Audit Trail 3134, in some embodiments a list of changes to data or an audit trail for an item attribute;
  Price Set Org Details 3135, in some embodiments details of a price setting organization;
  Price Set 3136, in some embodiments a set price;
  Price Version Approval 3137, in some embodiments approval for a price version;
  Price Version 3138;
  Price Set Version 3139;
  Price 3140;
  Submission Price Component 3141;
  Price Version Loading Submission 3142;
  Submission Audit Trail 3143, in some embodiments a list of changes to data or an audit trail for a submission; and
  Submission 3144.

In an embodiment, summary search database 3130 includes one or more of:
  Supplier Price Date 3117, in some embodiments a data associated with a supplier price;
  Supplier Content Date 3118;
  Organization 3119;
  Supplier 3120;
  Searchable Verticals by Rule 3121, in some embodiments supporting rule-based searching;
  Product Rule 3122, in some embodiments a rule related to a product;
  Product Vertical 3123, in some embodiments supporting product-based searching;
  Org Supplier Item Counts 3124, in some embodiments a count of items stored at an organization supplier;
  Product Category 3125, in some embodiments a category related to a product;
  Supplier Category Summary 3126, in some embodiments a summary of a supplier category;
  Item Incr Indexing Queue 3127, in some embodiments a queue for incrementally indexing items;
  Org Favorites Full Indexing Queue 3128, in some embodiments a full-indexing queue for organizational favorites; and
  Org Favorites Incr Indexing Queue 3129, in some embodiments an incremental-indexing queue for organizational favorites.

Figure 32:
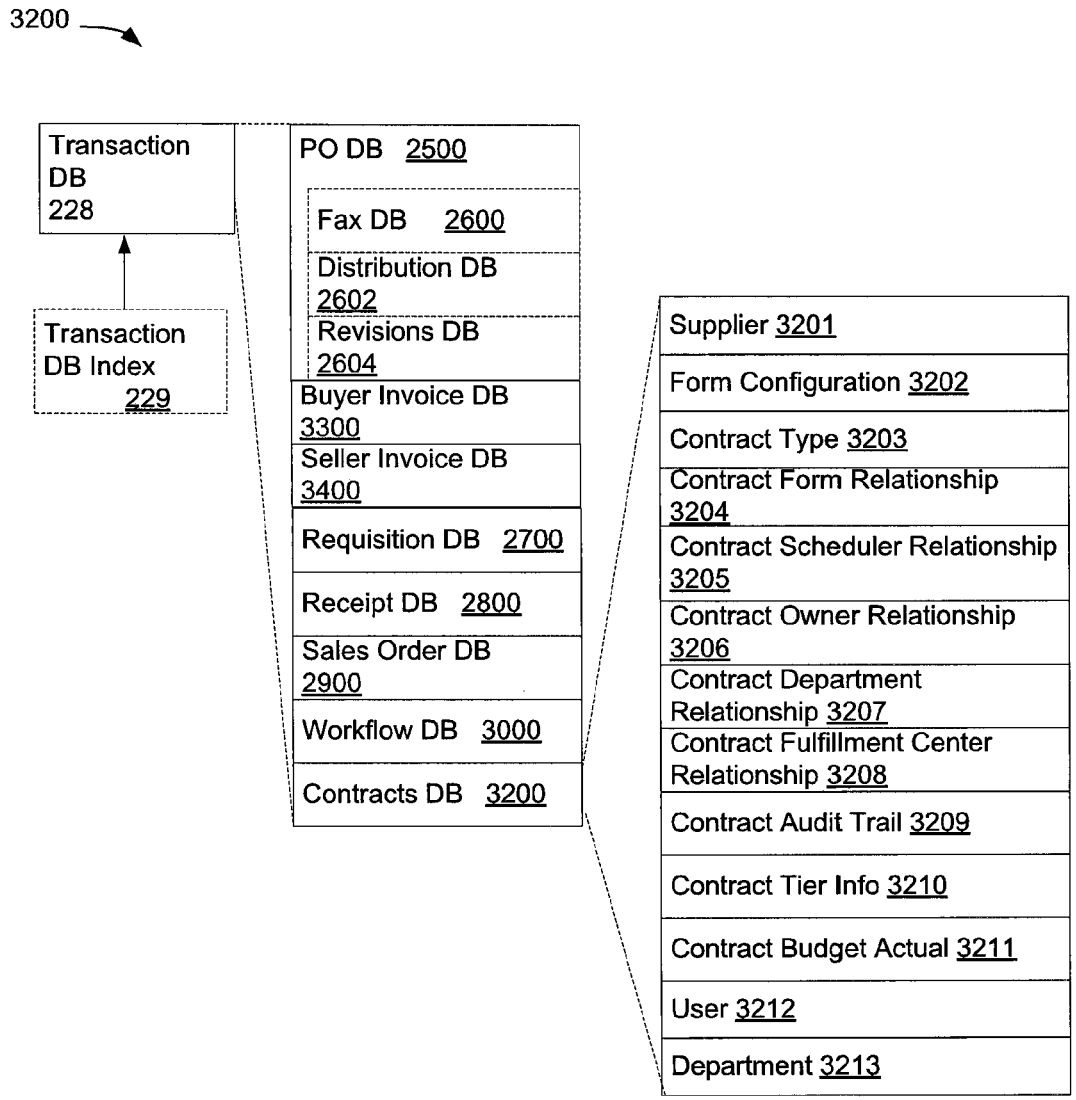
FIG. 32 illustrates a data structure for a transaction database, showing contents of a contracts database.

FIG. 32 shows a database diagram 3200 including the transaction database 228, PO database 2500, buyer invoice database 3300, seller invoice database 3400, requisition database 2700, receipt database 2800, sales order database 2900, workflow database 3000, and contracts database 3200, associated with the transaction database 228.

In an embodiment, the contracts database 3200 includes one or more of:
  Supplier 3201;
  Form Configuration 3202;
  Contract Type 3203;
  Contract Form Relationship 3204, in some embodiments an relationship between a contract and a form;
  Contract Scheduler Relationship 3205, in some embodiments an relationship between a contract and a scheduler;
  Contract Owner Relationship 3206, in some embodiments an relationship between a contract and an owner;
  Contract Department Relationship 3207, in some embodiments an relationship between a contract and a department;
  Contract Fulfillment Center Relationship 3208, in some embodiments an relationship between a contract and a fulfillment center;
  Contract Audi Trail 3209, in some embodiments a list of changes to data or an audit trail for a contract;
  Contract Tier Info 3210, in some embodiments tier information for a contract;
  Contract Budget Actual 3211, in some embodiments an actual budget for a contract;
  User 3212; and
  Department 3213.

Figure 33:
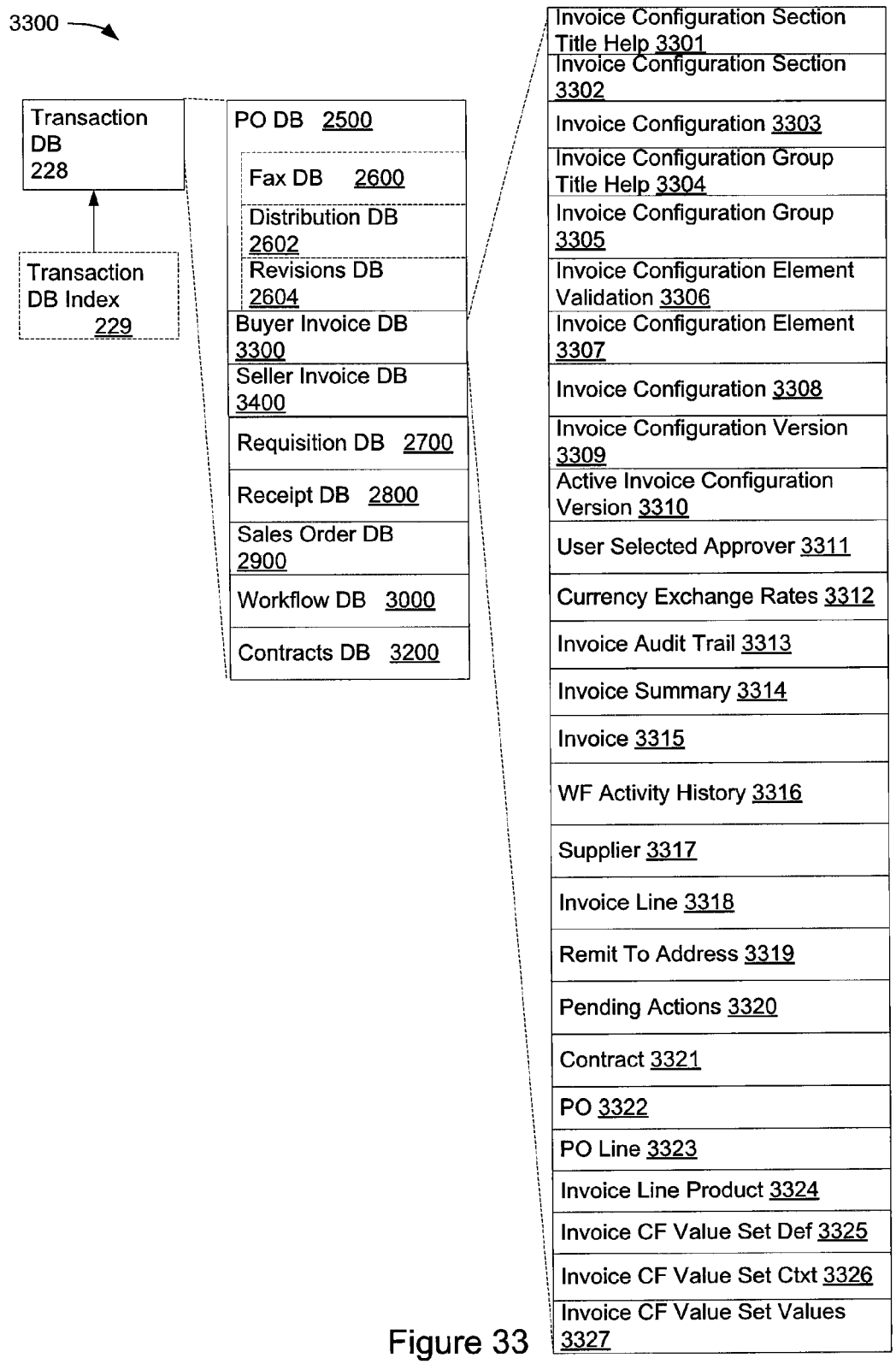
FIG. 33 illustrates a data structure for a transaction database, showing contents of a buyer invoice database.

FIG. 33 shows a database diagram 3300 including the transaction database 228, PO database 2500, buyer invoice database 3300, seller invoice database 3400, requisition database 2700, receipt database 2800, sales order database 2900, workflow database 3000, and contracts database 3200, associated with the transaction database 228.

In an embodiment, the buyer invoice database 3300 includes one or more of:
  Invoice Configuration Section Title Help 3301, in some embodiments help information for configuring an invoice section title;

Invoice Configuration Section 3202, in some embodiments configuration of a invoice section;
Invoice Configuration 3203;
Invoice Configuration Group Title Help 3304, in some embodiments help information for configuring an invoice group title;
Invoice Configuration Group 3305, in some embodiments configuration of an invoice group;
Invoice Configuration Element Validation 3306;
Invoice Configuration Element 3307, in some embodiments configuration of an invoice element;
Invoice Configuration 3308;
Invoice Configuration Version 3309;
Active Invoice Configuration Version 3310;
User Selected Approver 3311;
Currency Exchange Rates 3312;
Invoice Audit Trail 3313, in some embodiments a list of changes (audit trail) to an item attribute for auditing purposes;
Invoice Summary 3314;
Invoice 3315;
Workflow Activity History 3316;
Supplier 3317;
Invoice Line 3318;
Remit to Address 3319;
Pending Actions 3320, in some embodiments pending actions relating to an invoice;
Contract 3321;
PO 3322, in some embodiments a purchase order;
PO Line 3323, in some embodiments a purchase order line;
Invoice Line Product 3324, some embodiments a product line relating to an invoice;
Invoice CF Value Set Def 3325, in some embodiments to set the definition of a custom field value in an invoice;
Invoice CF Value Set Ctxt 3326, in some embodiments to set the context of a custom field value in an invoice; and
Invoice CF Value Set Value 3327, in some embodiments to set the value of a custom field value in an invoice.

Figure 34:
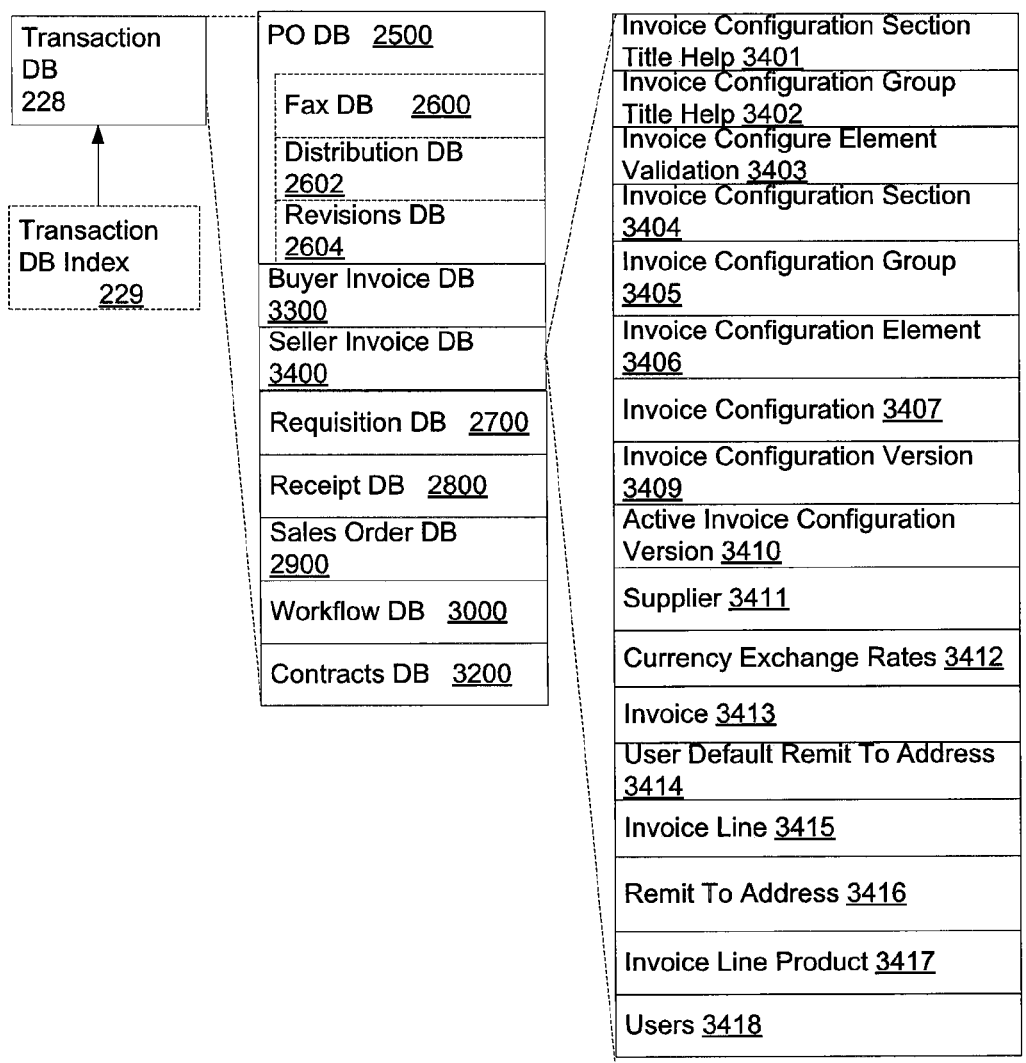
FIG. 34 illustrates a data structure for a transaction database, showing contents of a seller invoice database.

FIG. 34 shows a database diagram 3400 including the transaction database 228, PO database 2500, buyer invoice database 3300, seller invoice database 3400, requisition database 2700, receipt database 2800, sales order database 2900, workflow database 3000, and contracts database 3200, associated with the transaction database 228.

In an embodiment, the seller invoice database 3400 includes one or more of:
Invoice Configuration Section Title Help 3401, in some embodiments help information for configuring an invoice section title;
Invoice Configuration Group Title Help 3402, in some embodiments help information for configuring an invoice group title;
Invoice Configure Element Validation 3403;
Invoice Configuration Section 3404, in some embodiments configuration of an invoice section;
Invoice Configuration Group 3405, in some embodiments configuration of an invoice group;
Invoice Configuration Element 3406, in some embodiments configuration of an invoice element;
Invoice Configuration 3407, in some embodiments configuration of an invoice;
Invoice Configuration Version 3409, in some embodiments configuration version of an invoice;
Active Invoice Configuration Version 3410, in some embodiments configuration of an active invoice;
Supplier 3411;
Currency Exchange Rates 3412, in some embodiments currency exchange rates associated with an invoice;
Invoice 3413;
User Default Remit To Address 3414, in some embodiments a default remit-to address for a user associated with an invoice;
Invoice Line 3415;
Remit To Address 3416, in some embodiments a remit-to address associated with an invoice;
Invoice Line Product 3417; and
User 3418.

Figure 35:
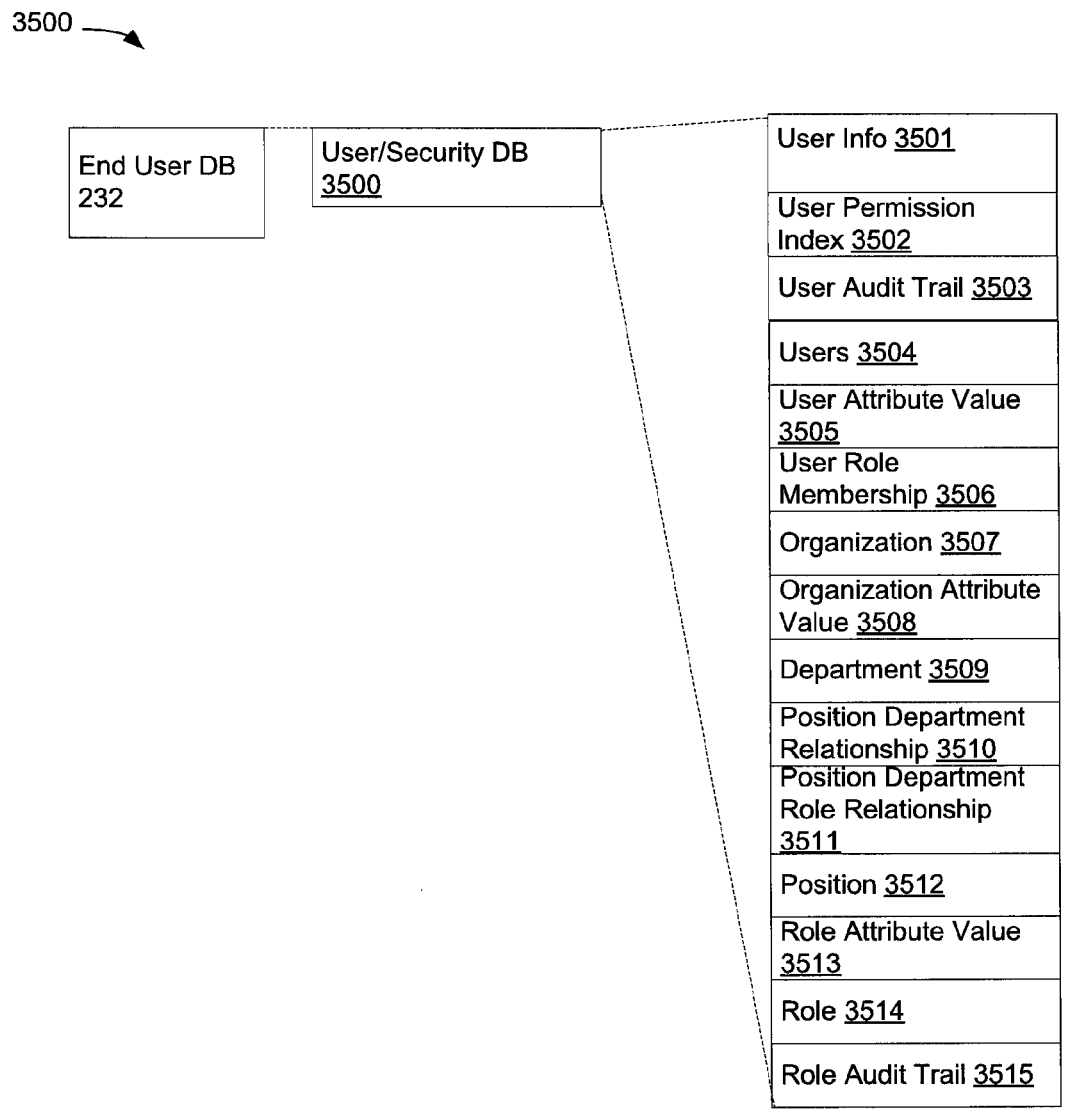
FIG. 35 illustrates a data structure for an end user database, showing contents of a user/security database.

FIG. 35 shows a database diagram 3500 including the end user database 232, associated with the user/security database 3500. In an embodiment, the user/security database 3500 includes one or more of:
User Info 3501, in some embodiments information relating to a user;
User Permission Index 3502, in some embodiments an index of permissions relating to a user;
User Audit Trail 3503, in some embodiments a list of changes (audit trail) for a user for auditing purposes;
Users 3504;
User Attribute Value 3505, in some embodiments the value of an attribute associated with a user;
User Role Membership 3506, in some embodiments membership associated with a user role;
Organization 3507;
Organization Attribute Value 3508, in some embodiments a value of an attribute associated with an organization;
Department 3509;
Position Department Relationship 3510, in some embodiments a relationship between a position and a department;
Position Department Role Relationship 3511, in some embodiments a relationship between a position and a department role;
Position 3512;
Role Attribute Value 3513, in some embodiments the value of an attribute associated with a role;
Role 3514; and
Role Audit Trail 3515, in some embodiments a list of changes (audit trail) for a role for auditing purposes.

Figure 36:
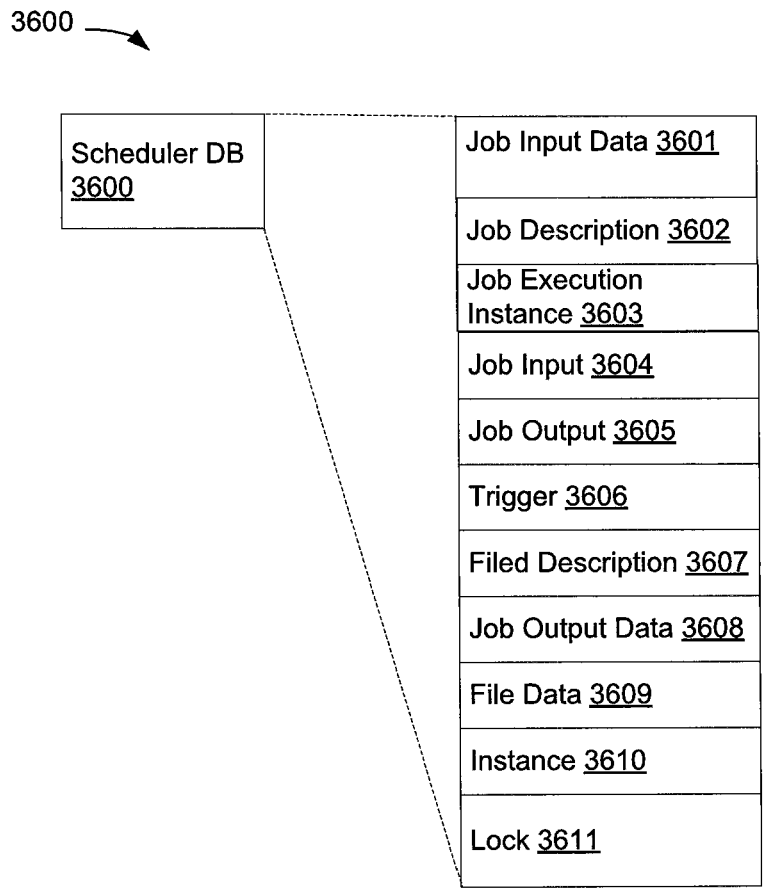
FIG. 36 illustrates a data structure for a scheduler database, showing contents of the scheduler database.

FIG. 36 shows a database diagram 3600 including the scheduler database 3600. In an embodiment, the scheduler database 3600 includes one or more of:
Job Input Data 3601, in some embodiments data relating to a job input;
Job Description 3602, in some embodiments a description relating to a job;
Job Execution Instance 3603, in some embodiments an execution instance relating to a job;
Job Input 3604;
Job Output 3605;
Trigger 3606;
Filed Description 3607;
Job Output Data 3608, in some embodiments data relating to a job output;
File Data 3609;
Instance 3610; and
Lock 3611.

Each of the above identified elements may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 2010 and 2110 may store a subset of the modules and data structures identified above. Furthermore, memory 2010 and 2110 may store additional modules and data structures not described above.

Figure 37:
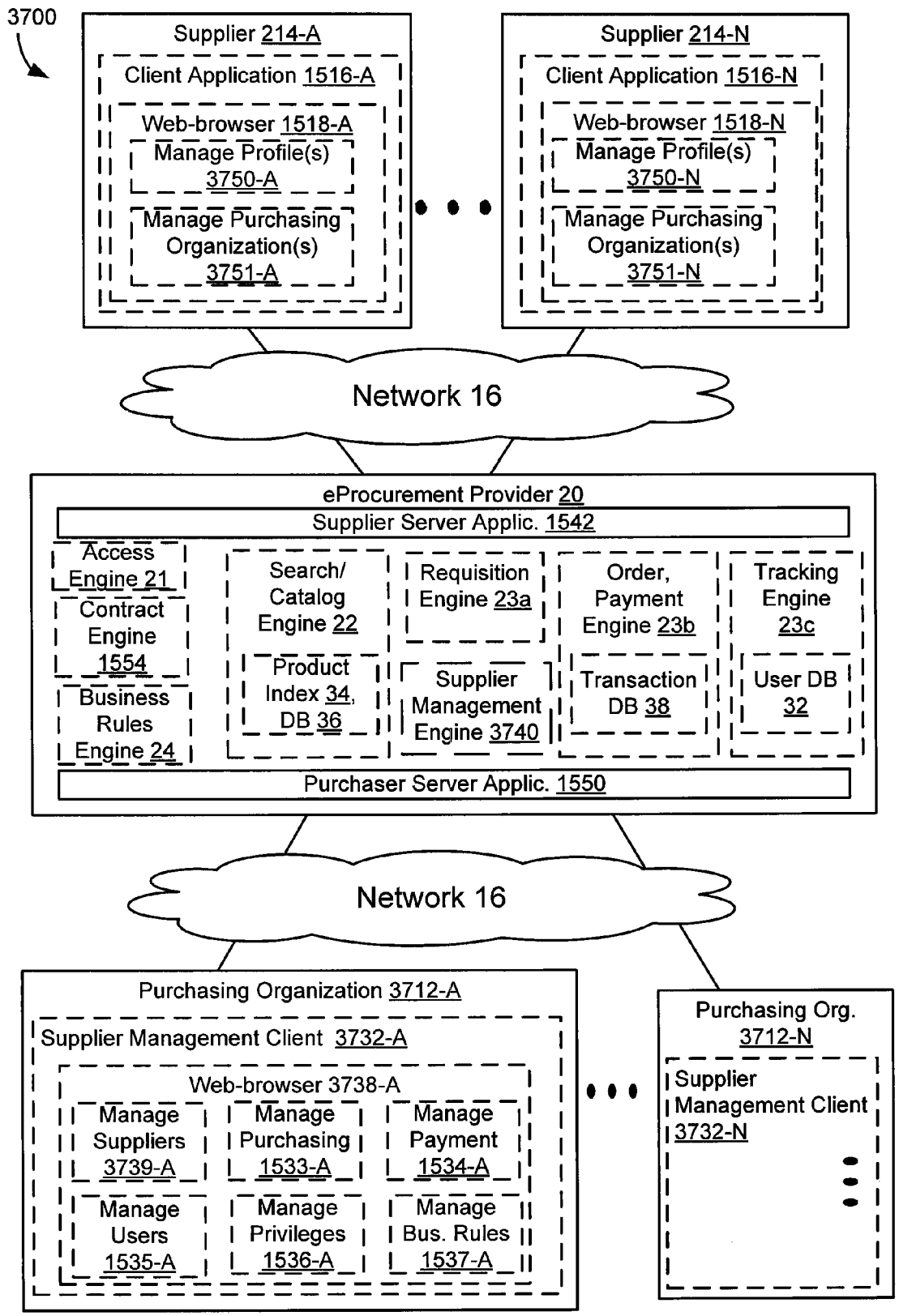
FIG. 37 illustrates the electronic procurement system, with supplier management capability, communicating over a network with suppliers and purchasing organizations.

FIG. 37 is a block diagram 3700 of the electronic procurement system 20, with supplier management capability, communicating over a network 16 with suppliers 214-A (to 214-N) and purchasing organizations 3712-A (to 3712-N). The electronic procurement system 20 generally includes a supplier server application 1542 and purchaser server application 1550, which may interface with the access engine 21, contract engine 1554, search/catalog engine 22, requisition engine 23a, order/payment engine 23b, tracking engine 23c, business rules engine 24, and supplier management engine 3740.

The supplier management engine 3740 provides the capability for a supplier 214-A to register with the electronic procurement system 20 for the purpose, for example, of submitting supplier profile data associated with the supplier 214-A (via, for example, the manage profiles engine 3750-A), and designating (or, allowing) one or more purchasing organizations 3712-A (to 3712-N) to receive access to the set or a subset (i.e., protected) of the supplier profile data (via, for example, manage purchasing organizations(s) engine 3751-A) that may be stored in one or more databases (e.g., master database 236 and, specifically, supplier database 4000) of the electronic procurement system 20. The manage profiles engine 3750-A and the manage purchasing organization(s) engine 3751-A may execute locally in web-browser 1518-A or using a standalone application.

Purchasing organization 3712-A, interfacing with supplier management engine 3740 using, for example, the supplier management client 3732-A (to 3732-N), which may execute a manage suppliers engine 3739-A locally in web-browser 3738-A or using a standalone application, is able to search and select from the available one or more suppliers 214-A (to 214-N) from which to receive the set or subset of supplier profile data that may be stored in the one or more databases (e.g., master database 236 and, specifically, supplier database 4000) of the electronic procurement system 20. After selecting one or more suppliers 214-A (to 214-N), the purchasing organization 3712-A, again interfacing with supplier management engine 3740 using, for example, the supplier management client 3732-A (to 3732-N) may invoke an auto submission feature, implemented via the supplier management engine 3740, to allow updated or new supplier profile data to be transmitted automatically over network 16 to the purchasing organization 3712-A and stored in the one or more databases of the purchasing organization 3712-A.

In some embodiments, one or more databases of the purchasing organization 3712-A and/or one or more servers, which may interface with the electronic procurement system 20 via, for example, the supplier management client 3732-A interacting with the supplier management engine 3740, may be referred to herein as the buyer/purchasing organization's 3712-A "supplier management system." In some embodiments, a "supplier management system" may be a client or standalone application, not provided by the electronic procurement system 20, that interfaces with the electronic procurement system 20 using a web-browser interface, a database interface, and/or an API interface. In some embodiments, the "supplier management system" may be hosted at the purchasing organization 3712-A or elsewhere, but accessible by the purchasing organization 3712-A.

The supplier server application 1542 and purchaser server application 1550 may also interface with the supplier management engine 3740, which may include a manage profiles engine (e.g., 3750-A) and manage purchasing organization engine (e.g., 3751-A). Additional details regarding the operation of the electronic procurement system 20 are provided, for example, in the description for FIG. 15.

The supplier server application 1542 communicates with a supplier 214-A (to (214-N) over network 16 and the purchaser server application 1550 communicates with a buyer 212-A (also referred to herein as a purchasing organization) over network 16. A supplier user would use a client application 1516-A (to 1516-N) to communicate with, generally, the electronic procurement provider 20 and, specifically, the supplier server application 1542. The client application 1516-A (to 1516-N) may be a web-browser 1518-A (to 1518-N) for the supplier user to use, or may be a standalone application. The web-browser 1518-A or standalone application may display features to manage profile(s) 3750-A (to 3750-N) and manage purchasing organization(s) 3751-A (to 3751-N), which may be communicated via the supplier server application 1542 and displayed to the supplier user. A buyer user would use a supplier management client application 3732-A (to 3732-N) to communicate with, generally, the electronic procurement provider 20 and, specifically, the purchaser server application 1550. The supplier management client application 3732-A (to 3732-N) may contain a web-browser 3738-A (to 3738-N) for the buyer user to use, or may be a standalone application. The web-browser 3738-A or standalone application may display features to manage purchasing 1533-A (to 1533-N), manage payment 1534-A (to 1534-N), manage users 1535-A (to 1535-N), manage privileges 1536-A (to 1536-N), manage business rules 1537-A (to 1537-N), and/or manage suppliers 3739-A (to 3739-N), which may be communicated via the purchaser server application 1550 and displayed to a buyer user. For example, a user that sends a request to the system 20, e.g., to access a specific supplier organization's profile data, that is outside the scope of that user's accessible suppliers, would receive an appropriate denial response from the system 20 and, more specifically, for example, from the manage suppliers 3739-A features (or, alternatively, the manage privileges 1536-A feature).

Figure 38:
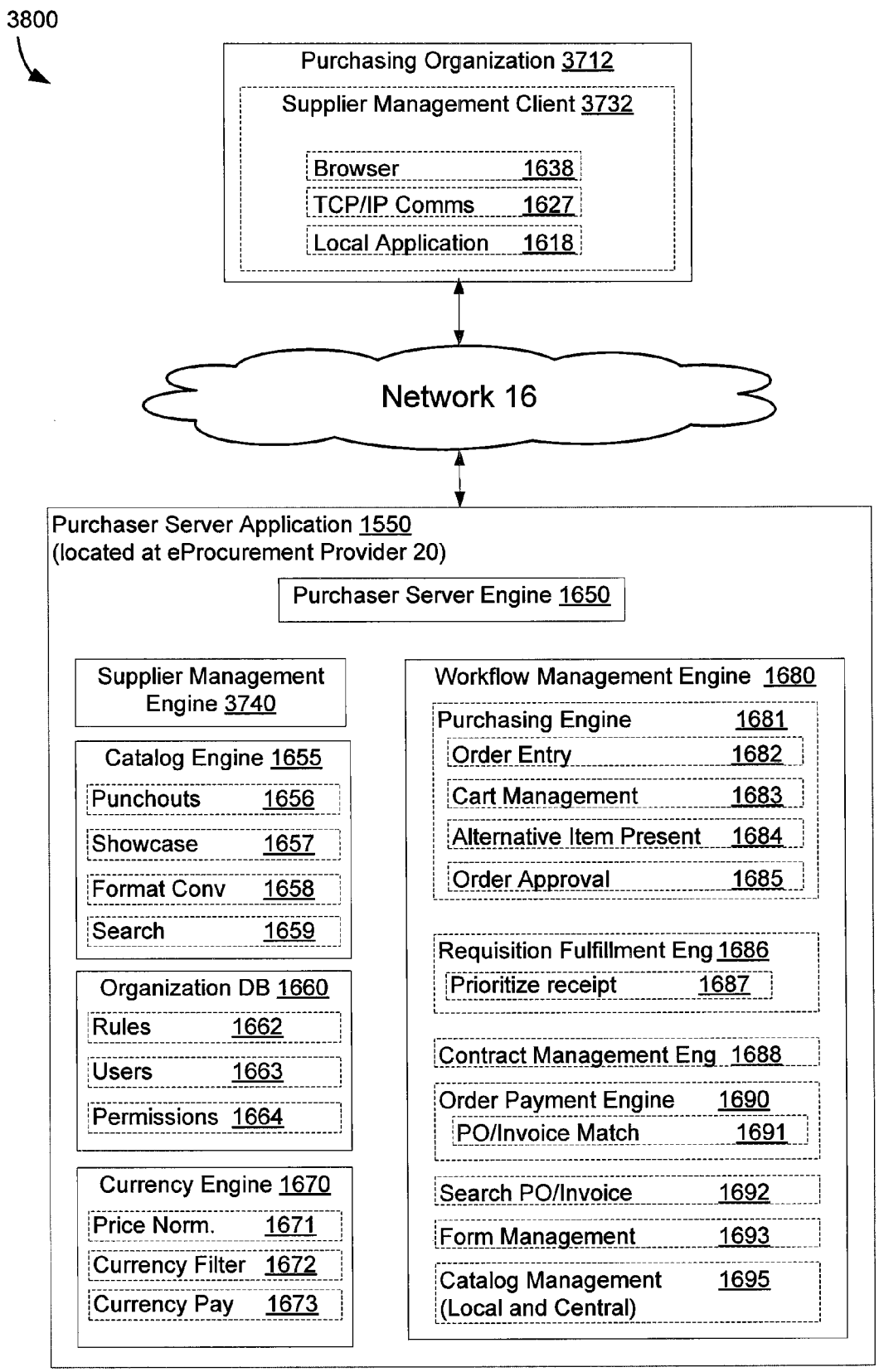
FIG. 38 illustrates the purchasing organization client communicating over a network with the purchaser server application to access the engines of the purchaser server application, which include a supplier management engine.

FIG. 38 is a block diagram 3800 of the buyer/purchasing organization 3712 communicating with the purchaser server application 1550, located at the electronic procurement provider 20 with supplier management capability, over a network 16, using a client app 3732 such as a browser 1638, TCP/IP communications 1627, and/or a local application 1618. The purchaser server engine 1650 may interface with or include the following modules, or a subset thereof:

a supplier management engine 3740 for providing supplier management capabilities to the purchasing organization 3712 through its supplier management client 3732, which may send and receive data over network 16 using TCP/IP communications 1627 using either a web-browser 1638 or a standalone application 1618.

Some of the features provided by the supplier management engine 3740, which may include a manage suppliers engine 3739, to the purchasing organization 3712 include, but are not limited to: responding to a request from the supplier management client 3732 for a set or subset of supplier profile data from one or more databases (e.g., master database 235 and, specifically, supplier database 4000) of the electronic procurement system 20; sending the set or subset of the supplier profile data mapped by the supplier management engine 3740 according to one or more data schema of the supplier management system based on the purchasing organization's 3712 representation of data, or based on a native representation of supplier profile data. The supplier profile data may be retrieved from the supplier database 4000 and, specifically, the supplier profile database 4001. The data schema for the particular purchasing organization 3712 may be retrieved from the purchaser organization database 5000 and, specifically, the purchase organization data schema database 5001. The purchasing organization 3712 may store the mapped or native set or subset of the received supplier profile data in, for example, one or more databases accessible by its supplier management client 3712.

Additional details regarding the operation of the purchaser server application 1550 and purchaser server engine 1650 are provided, for example, in the description for FIG. 16.

Figure 39:
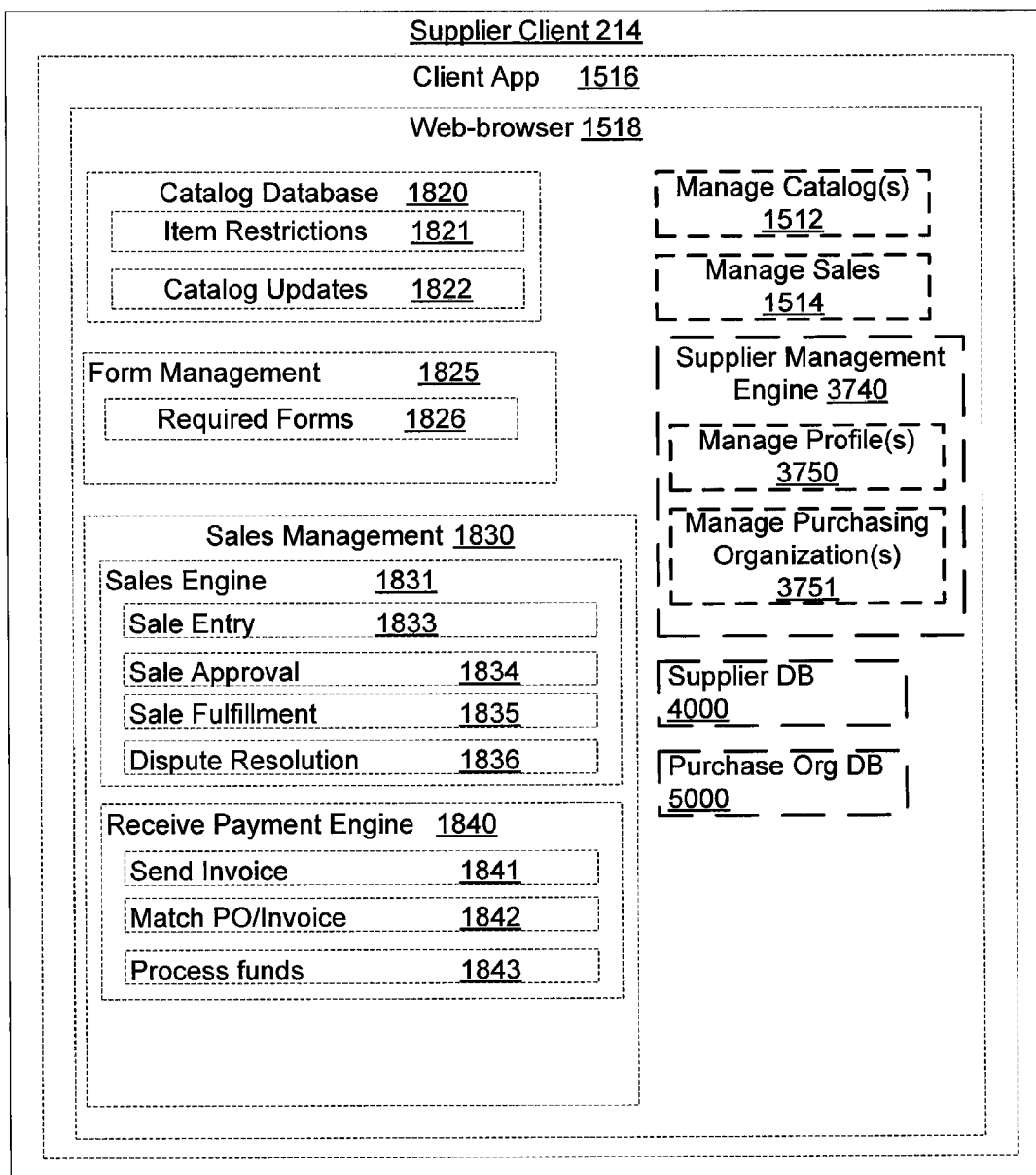
FIG. 39 illustrates the features and database accessible via the supplier client interfacing with the supplier management capability.
Figure 40:
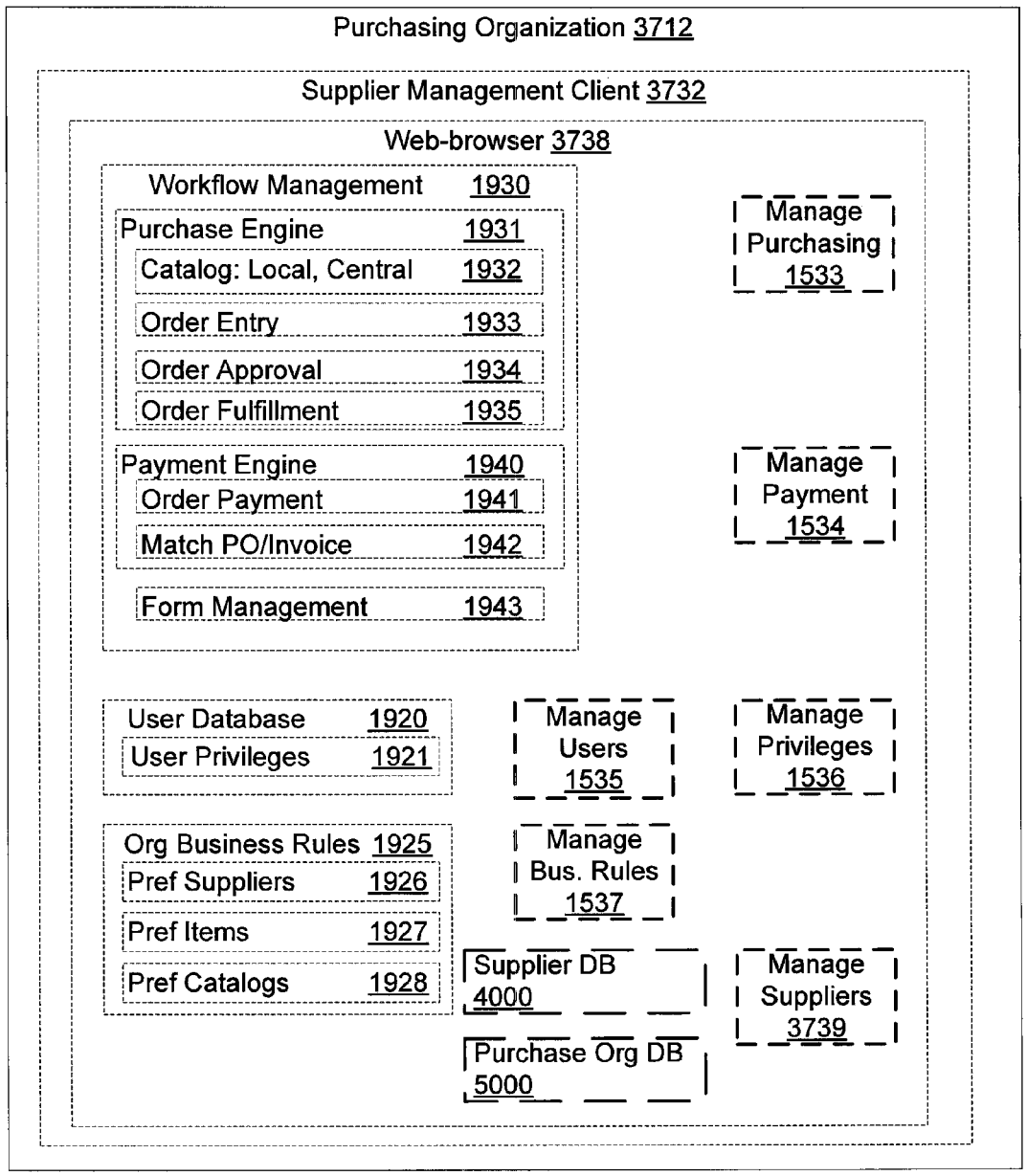

FIG. 39 is a block diagram 3900 of a supplier client 214. The client application 1516 may be a web-browser 1518 for the supplier user to use, or may be a standalone application. The web-browser 1518 or standalone application may display features for:

supplier management 3740 (as described);
  manage profile(s) 3750 (as described); and
  manage purchasing organization(s) 3751 (as described).

Figure 40:
FIG. 40 illustrates the features and database accessible via the purchasing organization client interfacing with the supplier management capability.

FIG. 40 is a block diagram 4000 of a purchasing organization client 3712. The client application 3732 may be a web-browser 3738 for the buyer user to use, or may be a standalone application. The web-browser 3738 or standalone application may display features to manage purchasing 1533, manage payment 1534, manage users 1535, manage privileges 1536, or manage business rules 1537. In addition, the web-browser 3738 or standalone application may also display features for:

managing suppliers 3739 by, for example, interfacing with the supplier database 4000 to request supplier profile data or configure automated submission of such data, or to submit purchaser organization data for storage in the purchaser organization database 5000.

Figure 41:
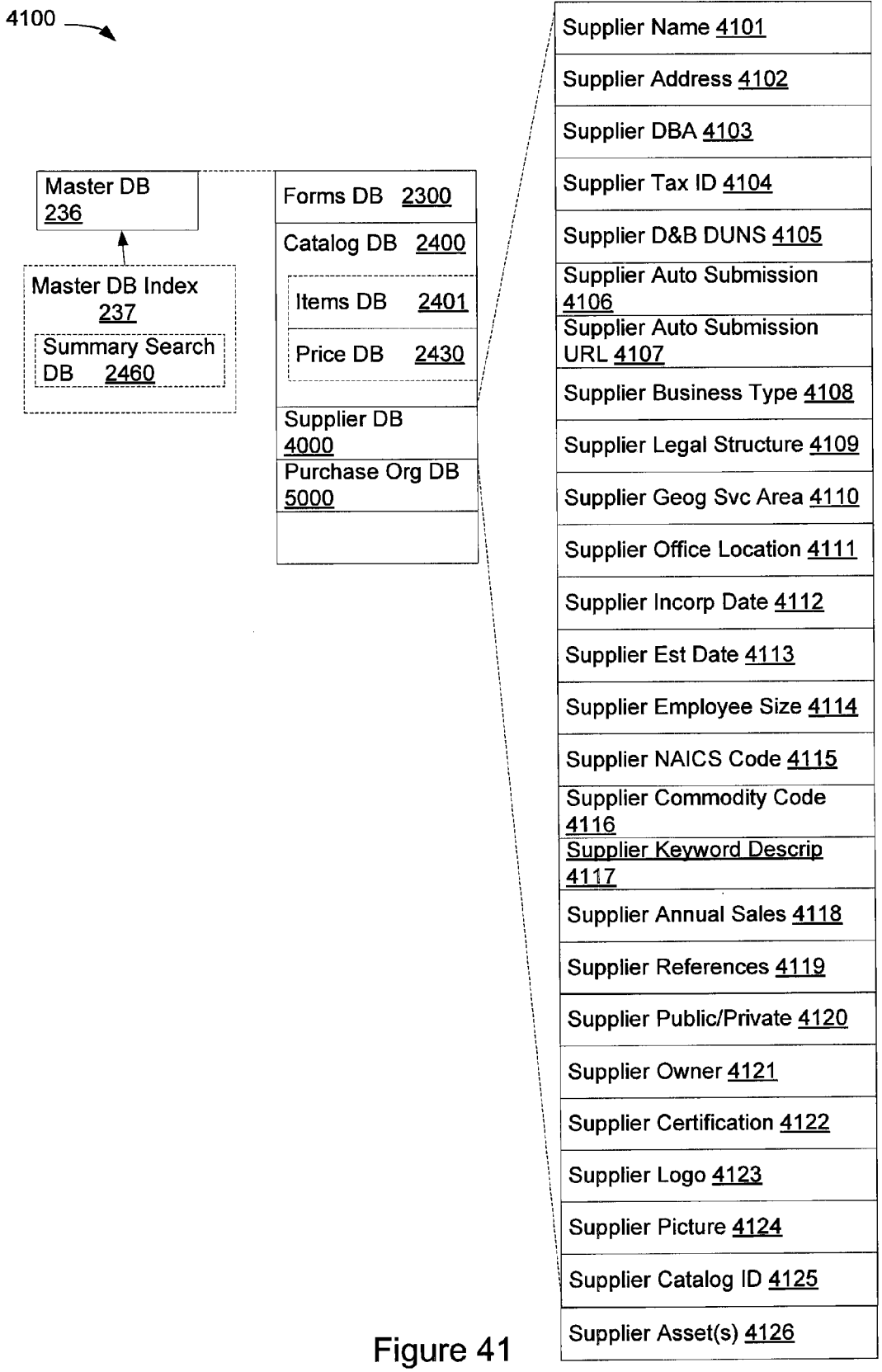
FIG. 41 illustrates a data structure for a master database, showing contents of a supplier database (including supplier profile data)

FIG. 41 shows a database diagram 4100 including the master database 236, with master database index 237 indexing into the master database. Master database index 237 includes summary search database 2460. Master database 236 may in some embodiments include a supplier database 4000 and a purchaser organization database 5000.

In an embodiment, supplier database 4000 includes one or more of:

Supplier Name 4101, in some embodiments the name of a supplier organization;
Supplier Address 4102, in some embodiments the address of a supplier organization;
Supplier DBA 4103, in some embodiments the doing business as (DBA) name of a supplier organization;
Supplier Tax ID 4104, in some embodiments the supplier organization federal/state tax identification;
Supplier D&B DUNS 4105, in some embodiments the supplier organization's Dun & Bradstreet (D&B) DUNS;
Supplier Auto Submission 4106, in some embodiments the supplier organization's auto submission site;
Supplier Auto Submission URL 4107, in some embodiments the supplier organization's auto submission site's Uniform Resource Locator (URL);
Supplier Business Type 4108, in some embodiments the supplier organization's type of business;
Supplier Legal Structure 4109, in some embodiments the supplier organization's legal structure/entity type;
Supplier Geographical Service Area 4110, in some embodiments the supplier organization's geographical service area(s);
Supplier Office Location 4111, in some embodiments the supplier organization's office location(s);
Supplier Incorporate Date 4112, in some embodiments the supplier organization's date of incorporation/formation;
Supplier Established Date 4113, in some embodiments the supplier organization's date of establishment;
Supplier Employee Size 4114, in some embodiments the supplier organization's employee size;
Supplier NAICS Code 4115, in some embodiments the supplier organization's NAICS code;
Supplier Commodity Code 4116, in some embodiments the supplier organization's commodity code(s); and
Supplier Keyword Description 4117, in some embodiments the supplier organization's keyword description;
Supplier Annual Sales 4118, in some embodiments the supplier organization's annual sales (or, alternatively, profits);
Supplier References 4119, in some embodiments the supplier organization's references;
Supplier Public/Private 4120, in some embodiments the supplier organization's public or private entity classification/status;
Supplier Owner 4121, in some embodiments the supplier organization's owner;
Supplier Certification 4122, in some embodiments the supplier organization's certification(s);
Supplier Logo 4123, in some embodiments the supplier organization's logo;
Supplier Picture 4124, in some embodiments the supplier organization's picture;
Supplier Catalog ID 4125, in some embodiments the supplier organization's catalog identification; and
Supplier Asset(s) 4126, in some embodiments the supplier organization's asset(s).

Figure 42:
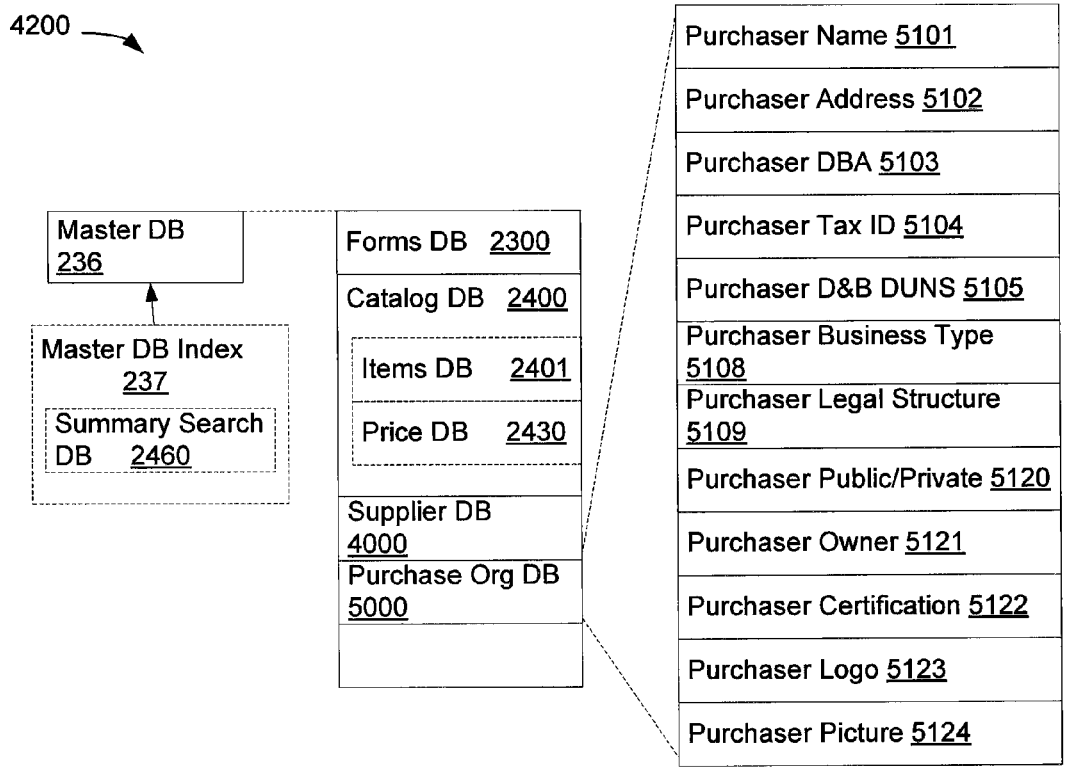
FIG. 42 illustrates a data structure for a master database, showing contents of a buyer/purchase organization database (including buyer/purchase organization profile data)

FIG. 42 shows a database diagram 4200 including the master database 236, with master database index 237 indexing into the master database. Master database index 237 includes summary search database 2460. Master database 236 may in some embodiments include a supplier database 4000 and a purchaser organization database 5000.

In an embodiment, purchaser organization database 5000 includes one or more of:

Purchaser Name 5101, in some embodiments the name of a purchaser organization;
Purchaser Address 5102, in some embodiments the address of a purchaser organization;
Purchaser DBA 5103, in some embodiments the doing business as (DBA) name of a purchaser organization;
Purchaser Tax ID 5104, in some embodiments the purchaser organization federal/state tax identification;
Purchaser D&B DUNS 5105, in some embodiments the purchaser organization's Dun & Bradstreet (D&B) DUNS;
Purchaser Business Type 5108, in some embodiments the purchaser organization's type of business;
Purchaser Legal Structure 5109, in some embodiments the purchaser organization's legal structure/entity type;
Purchaser Public/Private 5120, in some embodiments the purchaser organization's public or private entity classification/status;
Purchaser Owner 5121, in some embodiments the purchaser organization's owner;
Purchaser Certification 5122, in some embodiments the purchaser organization's certification(s);
Purchaser Logo 5123, in some embodiments the purchaser organization's logo; and
Purchaser Picture 5124, in some embodiments the purchaser organization's picture.

FIGS. 43-49 illustrate exemplary embodiments of a supplier registration interface in accordance with the supplier management features. Each of the exemplary embodiments 4300-4900 may be implemented using one or more of the modules/engines and databases described herein. Specifically, the exemplary supplier registration interfaces 4300-4900 may be served to one or more suppliers 214-A (to 214-N) and their features implemented using, for example, the electronic procurement system 20 and, more specifically, the supplier server application 1542, and even more specifically, the supplier management engine 3740, over network 16. For a more detailed description of the interaction between suppliers 214-A (to 214-N) and the electronic procurement system 20, refer to the description accompanying FIGS. 37 and 39.

In some embodiments, the purchasing organization 3712 may be able to access similar buyer registration interfaces. The interaction between purchasing organizations 3712-A (to 3712-N) and the electronic procurement system 20 may be implemented in a manner similar to that described in the description accompanying FIGS. 38 and 40.

Figure 43:
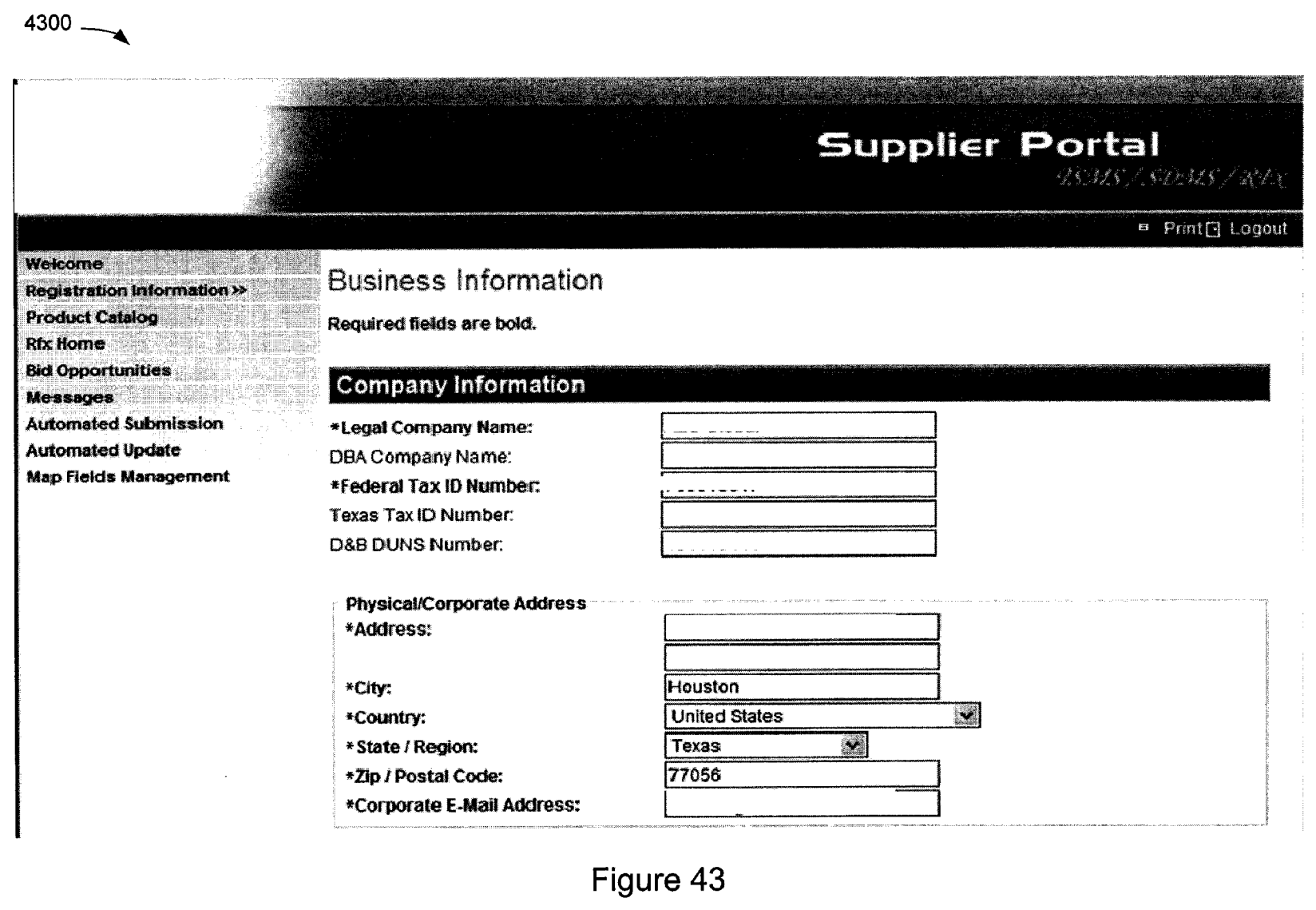

As shown in FIG. 43, in the exemplary embodiment of a supplier registration interface 4300, a supplier 214-A may access the supplier portal and enter information into each of the text boxes and pull down menus such that the entered supplier data is stored in the supplier database 4000 (see description accompanying FIG. 41), for later transmission and/or access to/by one or more purchasing organizations 3712-A (to 3712-N). The bolded fields are required, as shown in FIG. 43. The non-bolded fields are optional and may remain blank.

In some embodiments, some of the supplier data entered may be designated by the supplier 214-A as protected. Protected supplier data may be available for searching by the one or more purchasing organizations 3712-A (to 3712-N) but may not be accessed or received by the purchasing organizations. In some embodiments, a supplier 214-A may designate one or more purchasing organizations 3712-A (to 3712-N) as capable of receiving access to protected supplier data. The search results that a purchasing organization 3712-A may receive by invoking a search for a supplier based on stored supplier profile data may include a list of suppliers that are ranked according to one or more values. The values may be based upon a subset of the supplier profile data, and may include protected supplier data that would be utilized for ranking the search results but not shown to the purchasing organization 3712-A.

Figure 44:
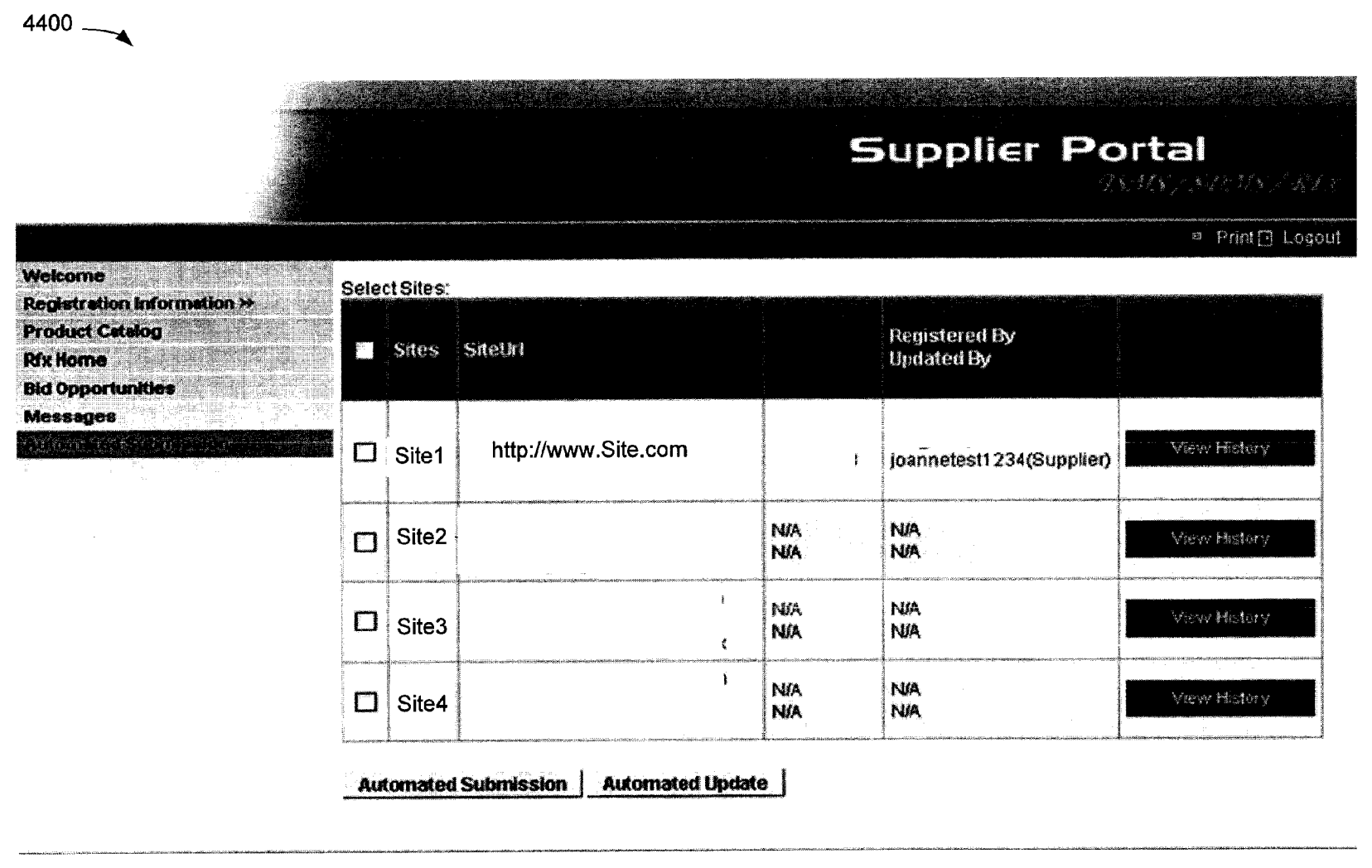

FIG. 44 illustrates the automated submission feature of an exemplary embodiment of a supplier registration interface 4400, where a supplier 214-A may enter the data for one or more sites, where the data includes the site name, site uniform resource locator (URL), site registered date, and site registered by information. The entered data becomes a part of the supplier profile data that is stored in the supplier database 4000. The sites designated using the automated submission feature would be capable of requesting/receiving the supplier's 214-A supplier profile data over network 16. In some embodiments, each site corresponds to a purchasing organization 3712-A. The purchasing organization 3712-A may access, request or receive the supplier profile data by the supplier management client 3732 and, more specifically, the manage suppliers engine 3739, interfacing with the purchaser server application 1550 and, more specifically, the purchaser server engine 1650 and, even more specifically, the supplier management engine 3740. Any updates to the supplier's 214-A supplier profile data may also be sent automatically to the sites/purchasing organizations 3712-A (to 3712-N) designated using the automated submission feature.

Figure 51:
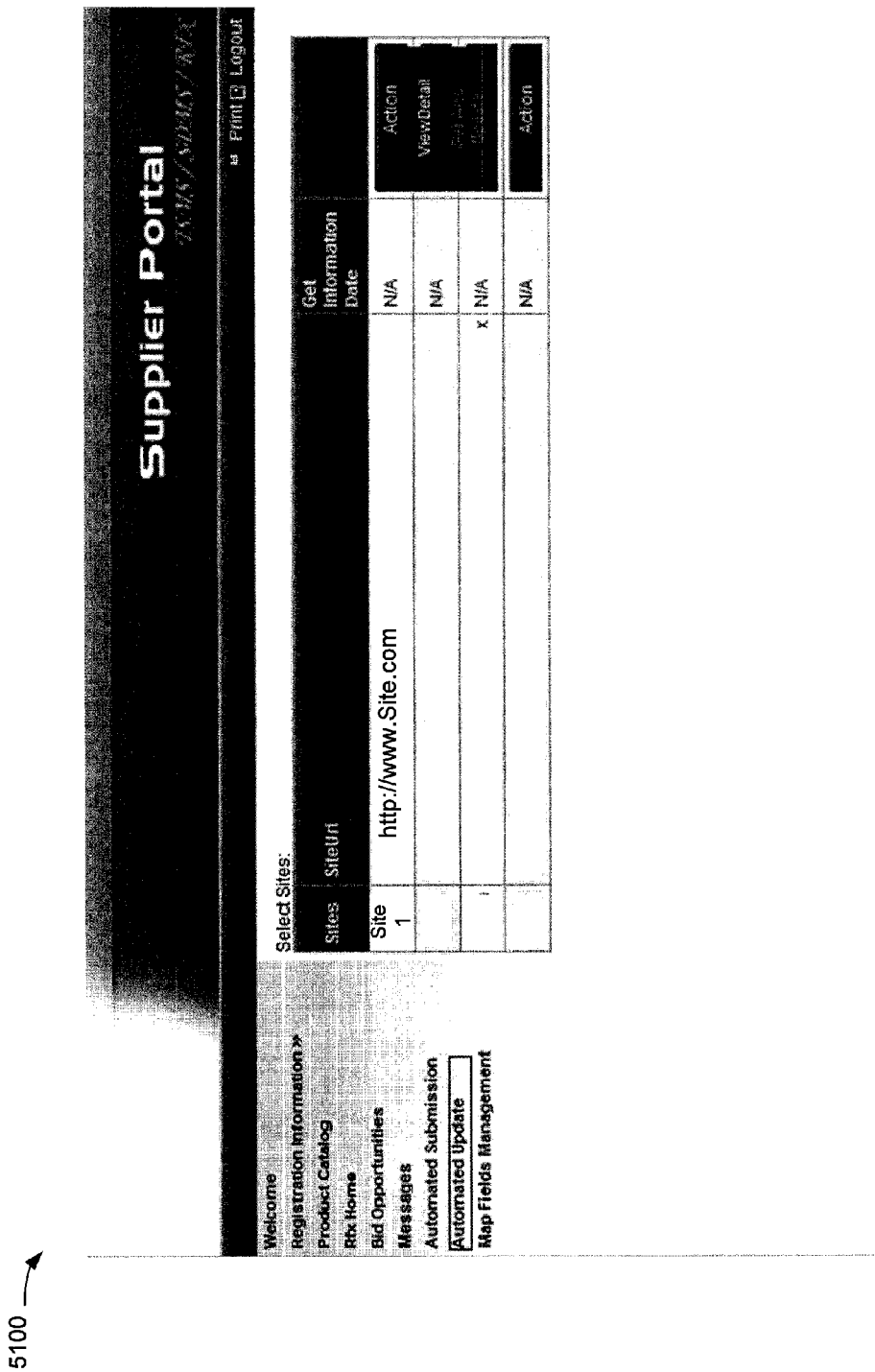
FIG. 51 illustrates an exemplary automated update feature of a supplier registration interface in accordance with the supplier management features.

In some embodiments, the updates are sent only to sites/purchasing organizations 3712-A (to 3712-N) designated using an automated update feature (see FIG. 44). FIG. 51 illustrates an exemplary, alternative embodiment of an automated update feature 5000 of a supplier registration interface. The automated update feature, shown in FIG. 44 and FIG. 51, may be implemented in a manner to the automated submission feature, as described above. The supplier 214-A may, using a get-and-update feature shown in FIG. 51 and implemented, for example, using the supplier management engine 3740, cause the one or more designated sites/purchasing organizations 3712-A (to 3712-N) to receive the supplier's profile data upon invoking the get-and-update feature.

FIGS. 45-49 illustrate additional exemplary embodiments of supplier registration interfaces 4500-4900, through which additional supplier profile data may be input or uploaded, as shown and described above.

Figure 50:
FIG. 50 illustrates an exemplary product catalog feature of a supplier registration interface in accordance with the supplier management features.

FIG. 50 illustrates an exemplary product catalog feature 5000 of a supplier registration interface in accordance with the supplier management features. A supplier 214-A may invoke an add new product feature to add one or more products to the supplier's catalog. As described above for FIG. 2, suppliers can access the catalog via the middleware/web methods servers 224, which then forward the supplier access request to the custom database servers 222 and processing modules for execution, in order, for example, to update their own supplier data. In some embodiments, updates to supplier data may also be handled by the supplier management engine 3740. Each new product that a supplier 214-A may update or add to its catalog may be stored in one or more databases of the electronic procurement system 20, such as, for example, the master database 236 and, more specifically, the catalog database 2400. The supplier database 4000 includes an entry for each supplier 214-A (to 214-N) that identifies the supplier catalog ID 4125 (see description accompanying 41), which may be used to identify the catalog that belongs to a supplier 214-A.

Figure 52:
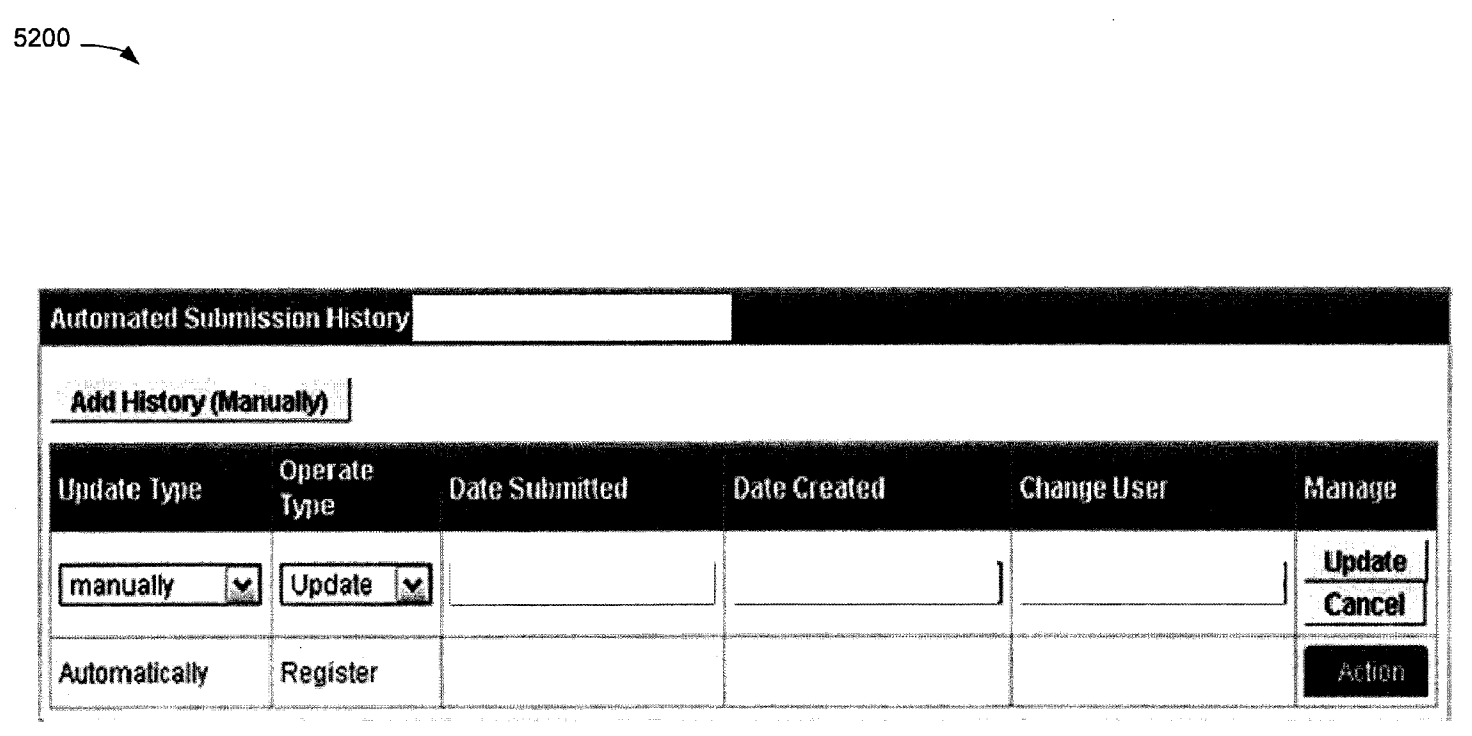
Figure 53:
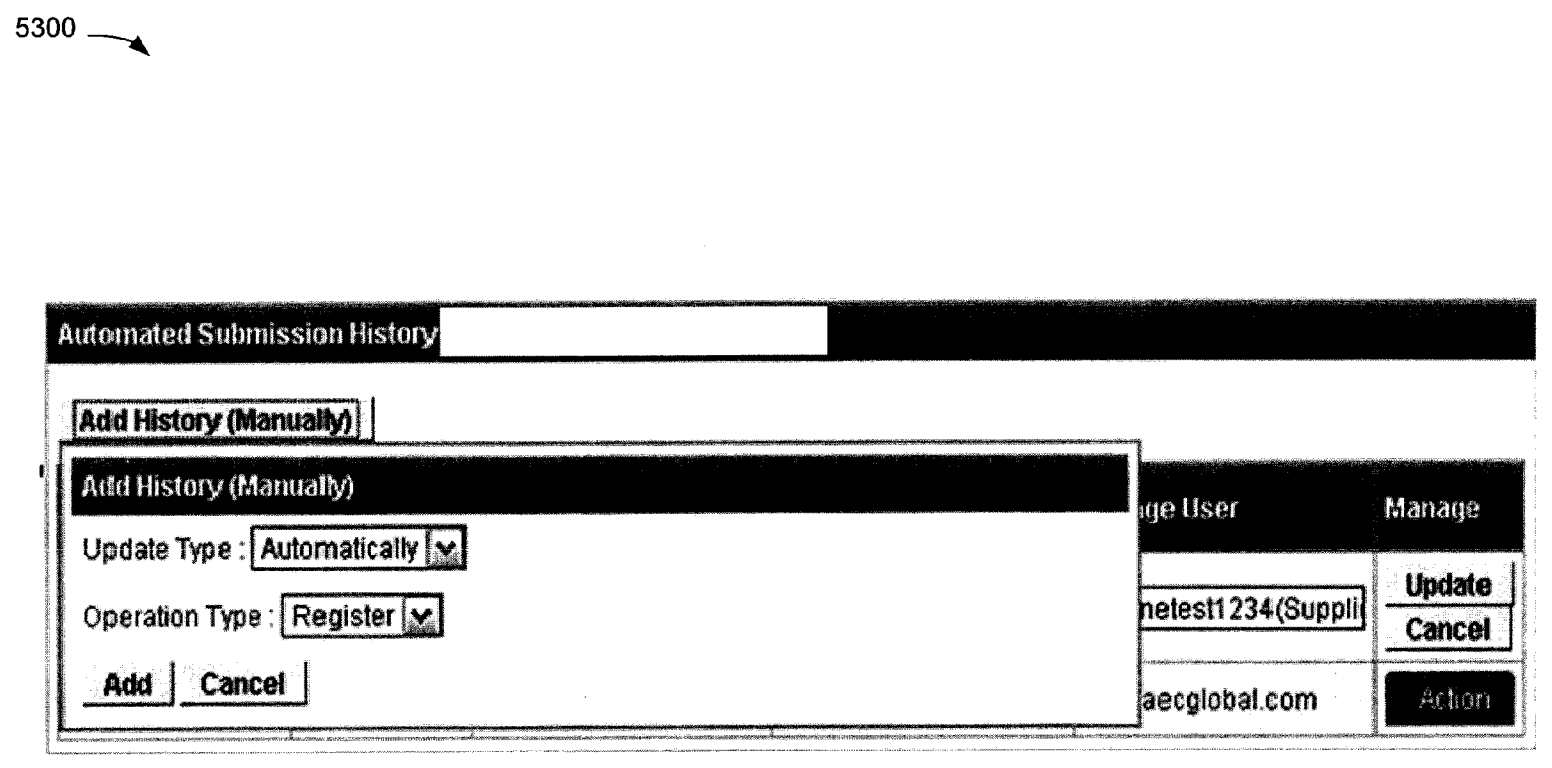
Figure 54:
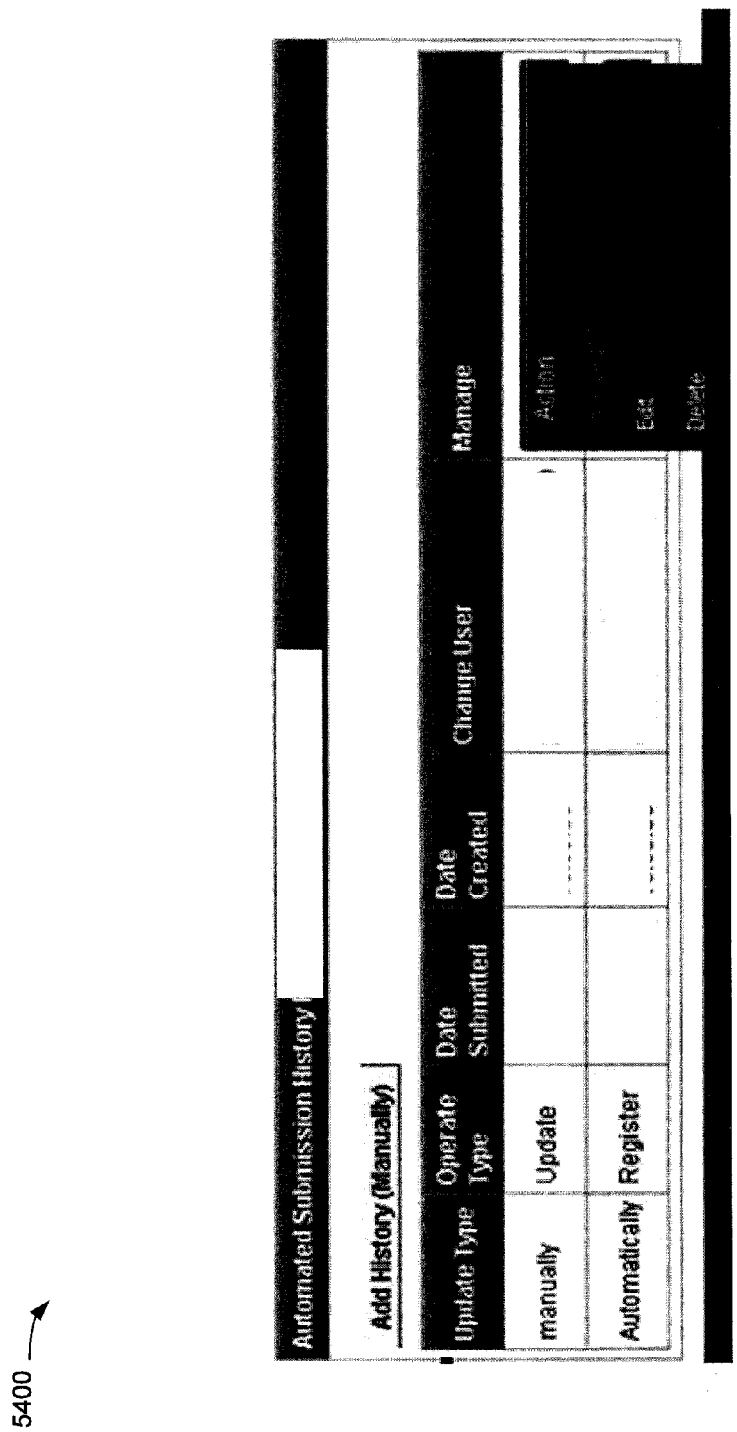
FIG. 54 illustrates an exemplary automated submission history feature of a supplier registration interface in accordance with the supplier management features.

FIGS. 52-54 illustrate exemplary automated submission history features 5200-5400 of a supplier registration interface in accordance with the supplier management features. Each of the exemplary embodiments 5200-5400 may be implemented using one or more of the modules/engines and databases described herein. Specifically, each of the exemplary embodiments 5200-5400 may be served to one or more suppliers 214-A (to 214-N) and their features implemented using, for example, the electronic procurement system 20 and, more specifically, the supplier server application 1542, and even more specifically, the supplier management engine 3740, over network 16. The automated submission history feature 5200 allows a supplier 214-A to designate an update type and an operate type using, for example, a pull-down menu. The update type may be set to manually or automatically. The operate type may be set to register or update. When the update type is set to manually, the supplier profile data of the supplier 214-A is not sent to a purchasing organization 3712-A until the supplier 214-A invokes the update feature manually. When the update type is set to automatically, the supplier profile data of the supplier 214-A is sent to the one or more purchasing organizations 3712-A (to 3712-N) when the supplier 214-A makes changes or edits to its supplier profile data/catalog. When the operate type is set to update, this is an indication to the supplier management engine 3740 that the supplier profile data of the supplier 214-A was sent to a purchasing organization 3712-A on at least one other occasion. When the operate type is set to register, this is an indication to the supplier management engine 3740 that the supplier profile data of the supplier 214-A is being sent to the one or more purchasing organizations 3712-A (to 3712-N) to register the supplier 214-A on the organizations' supplier management systems.

FIG. 55 illustrates an exemplary certification(s) feature 5500 of a supplier registration interface in accordance with the supplier management features. The certification feature 5500 may be implemented in a manner similar to the automated submission history features 5200-5400. By using the certification feature 5500, a supplier 214-A may input data related to the supplier's certifications, such as, for example, the type of certifications the supplier holds, the certification agency, the certification number, and the expiration date. Through the certification feature 5500, the supplier 214-A may be able to upload an actual copy of the certificate. Certification information may be helpful to the one or more purchasing organizations 3712-A (to 3712-N) when choosing a supplier. The supplier database 4000 may store certification information for each supplier in a supplier certification 4122 field (see FIG. 41 and accompanying description).

Figure 56:
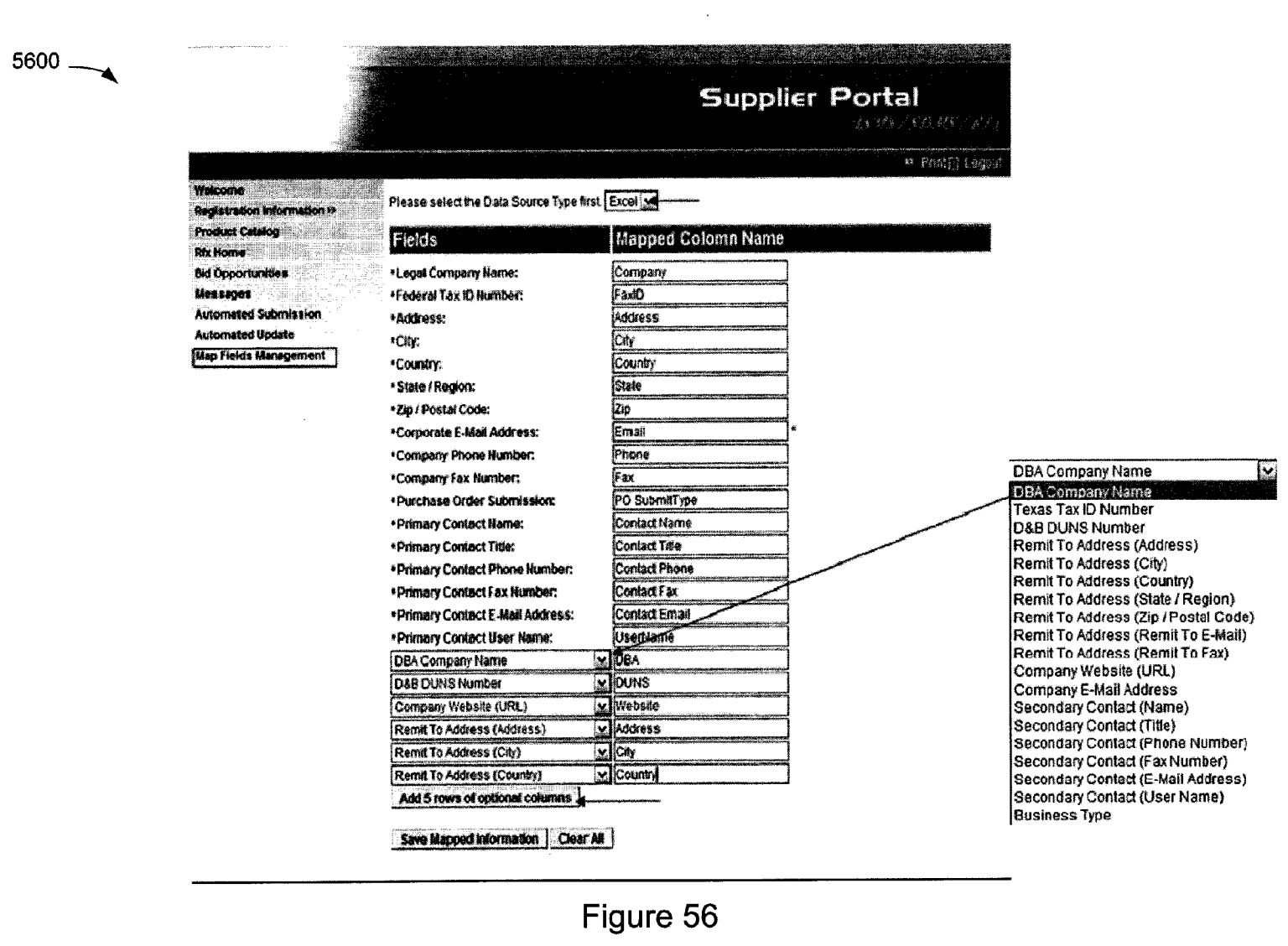

FIG. 56 illustrates an exemplary map fields management feature 5600 in accordance with the supplier management features. The map fields management feature 5600 may be implemented using one or more of the modules/engines and databases described herein. The feature 5600 provides the capability for a purchasing organization 3712-A to customize how the supplier data it receives should be formatted, on a field-by-field basis. Similarly, the feature 5600 provides the capability for a supplier 214-A to customize how its own supplier data should be formatted, on a field-by-field basis. The data schema generated by a supplier 214-A or purchasing organization 3712-A using the feature 5600, or the data schema that may be accessible in one or more databases of the electronic procurement system 20, may be stored in the purchase organization database 5000, and specifically, in the purchase organization data schema database 5001. The exemplary embodiment illustrating the map fields management feature 5600 may be served to one or more suppliers 214-A (to 214-N) and implemented using, for example, the electronic procurement system 20 and, more specifically, the supplier server application 1542, and even more specifically, the supplier management engine 3740, over network 16.

Figure 57:
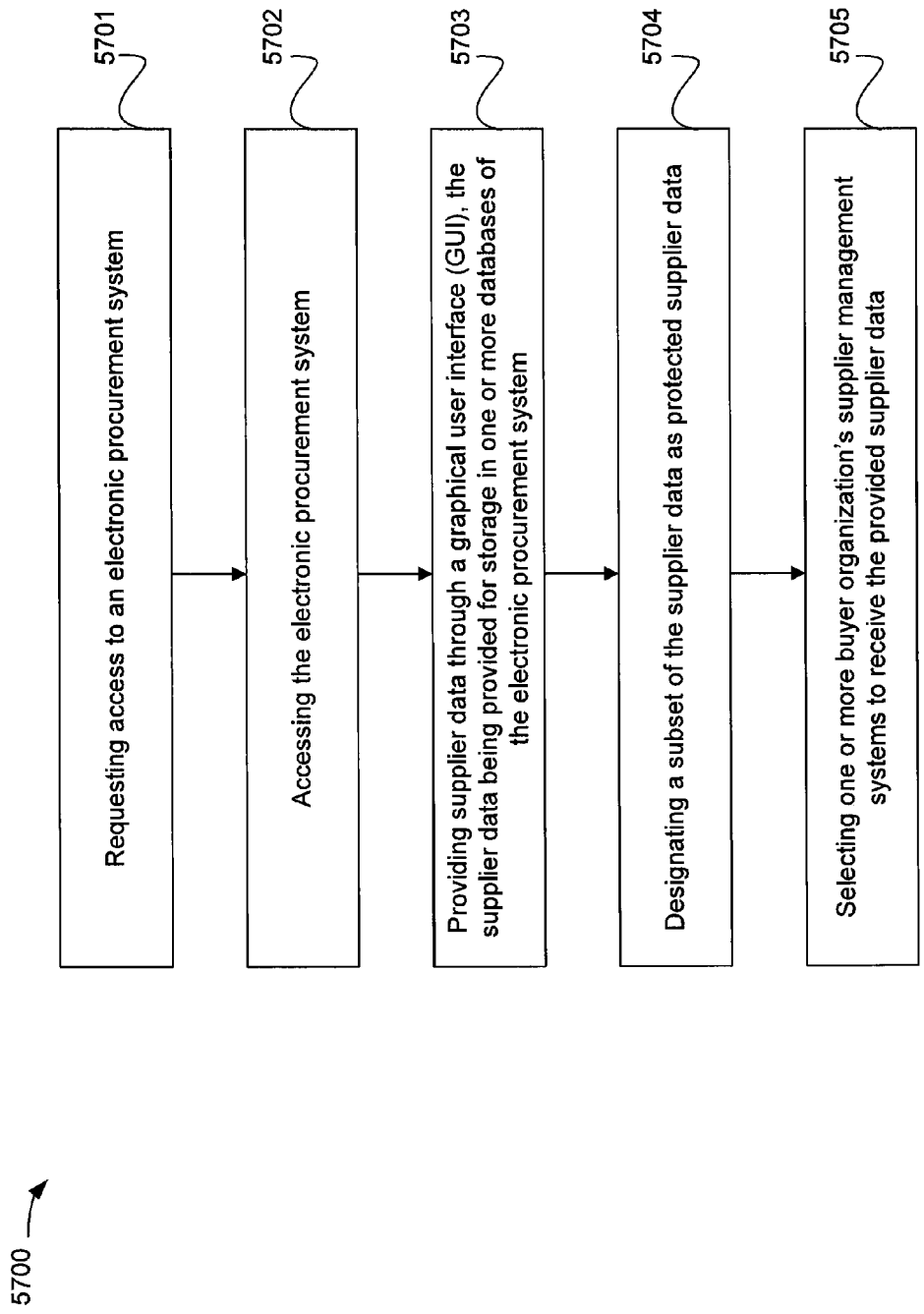
FIG. 57 is a flowchart representing a method for providing supplier data through a graphical user interface (GUI) for storage in a database of an electronic procurement system, with supplier management capability.

FIG. 57 is a flowchart 5700 representing a method for providing supplier data through a graphical user interface (GUI) for storage in a database of an electronic procurement system. The method includes the steps of, at a supplier user system, requesting access to an electronic procurement system 5701; accessing the electronic procurement system 5702; providing supplier data through a graphical user interface (GUI), the supplier data being provided for storage in one or more databases of the electronic procurement system 5703; designating a subset of the supplier data as protected supplier data 5704; and selecting one or more buyer organization's supplier management systems to receive the provided supplier data 5705.

Figure 58:
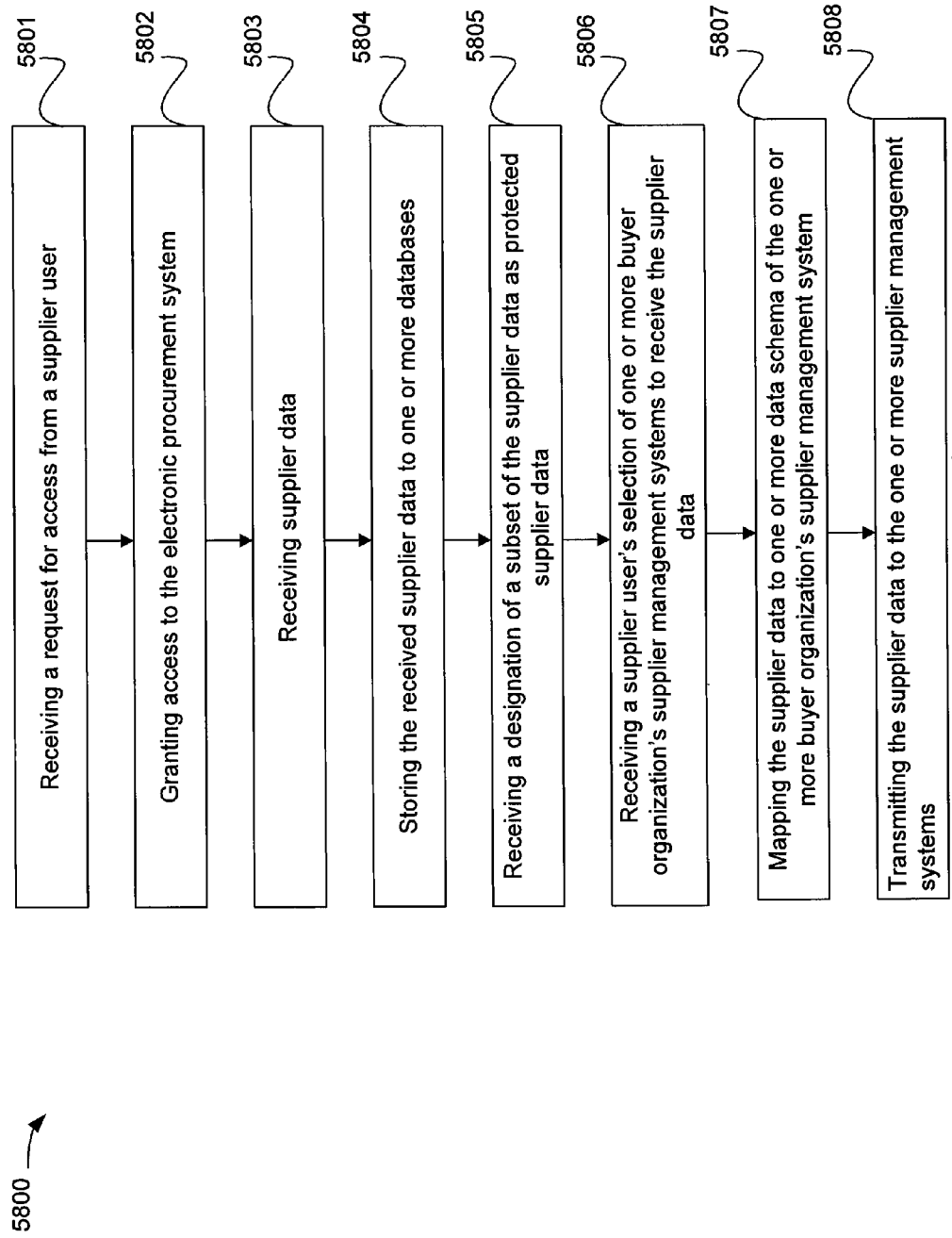
FIG. 58 is a flowchart representing a method for receiving supplier data through a graphical user interface (GUI) for storage in a database of an electronic procurement system, with supplier management capability.

FIG. 58 is a flowchart 5800 representing a method for receiving supplier data through a graphical user interface (GUI) for storage in a database of an electronic procurement system. The method includes the steps of, at an electronic procurement system, receiving a request for access from a supplier user 5801; granting access to the electronic procurement system 5802; receiving supplier data 5803; storing the received supplier data to one or more databases 5804; receiving a designation of a subset of the supplier data as protected supplier data 5805; receiving a supplier user's selection of one or more buyer organization's supplier management systems to receive the supplier data 5806; mapping the supplier data to one or more data schema of the one or more buyer organization's supplier management system 5807; and transmitting the supplier data to the one or more supplier management systems 5808.

Figure 59:
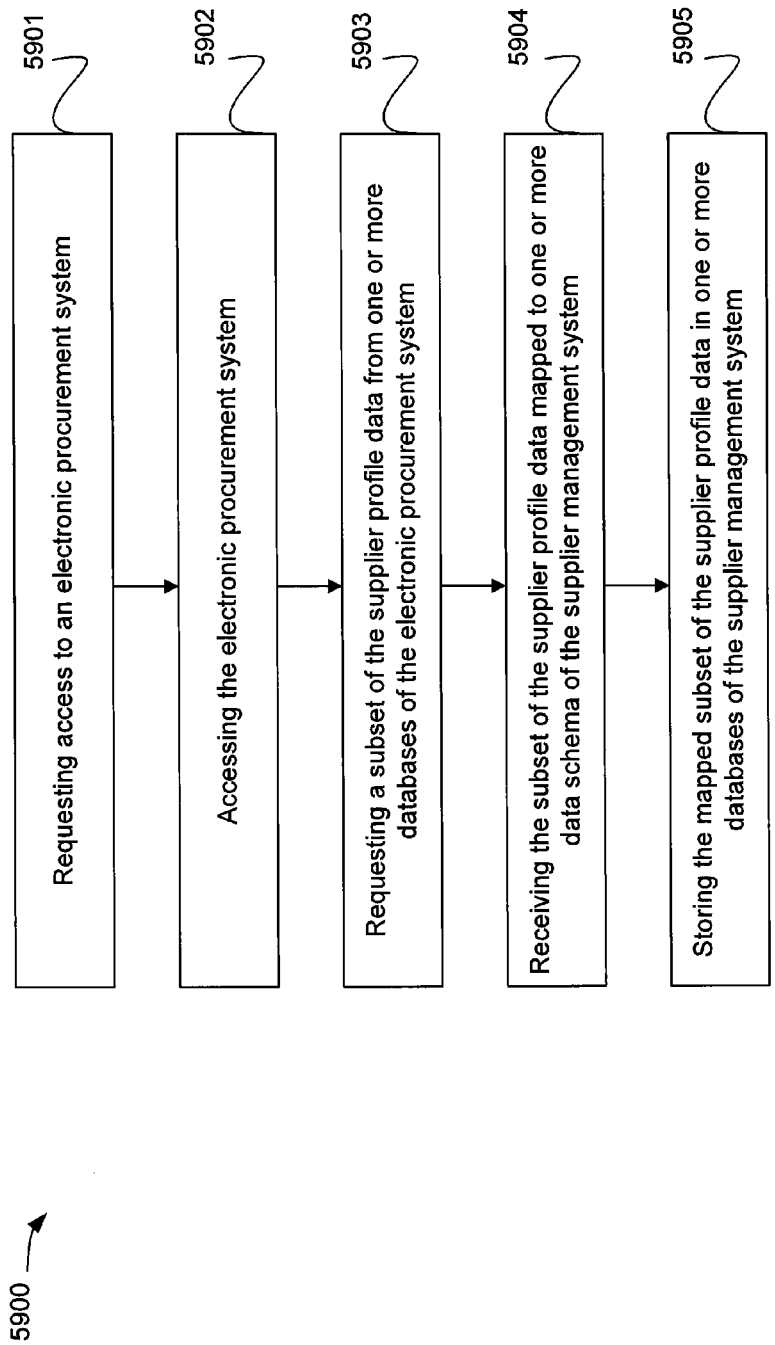
FIG. 59 is a flowchart representing a method for requesting a subset of the supplier profile data from one or more databases of an electronic procurement system, with supplier management capability.

FIG. 59 is a flowchart 5900 representing a method for requesting a subset of the supplier profile data from one or more databases of an electronic procurement system. The method includes the steps of, at a supplier management system, requesting access to an electronic procurement system 5901; accessing the electronic procurement system 5902; requesting a subset of the supplier profile data from one or more databases of the electronic procurement system 5903; receiving the subset of the supplier profile data mapped to one or more data schema of the supplier management system 5904; and storing the mapped subset of the supplier profile data in one or more databases of the supplier management system 5905.

Figure 60:
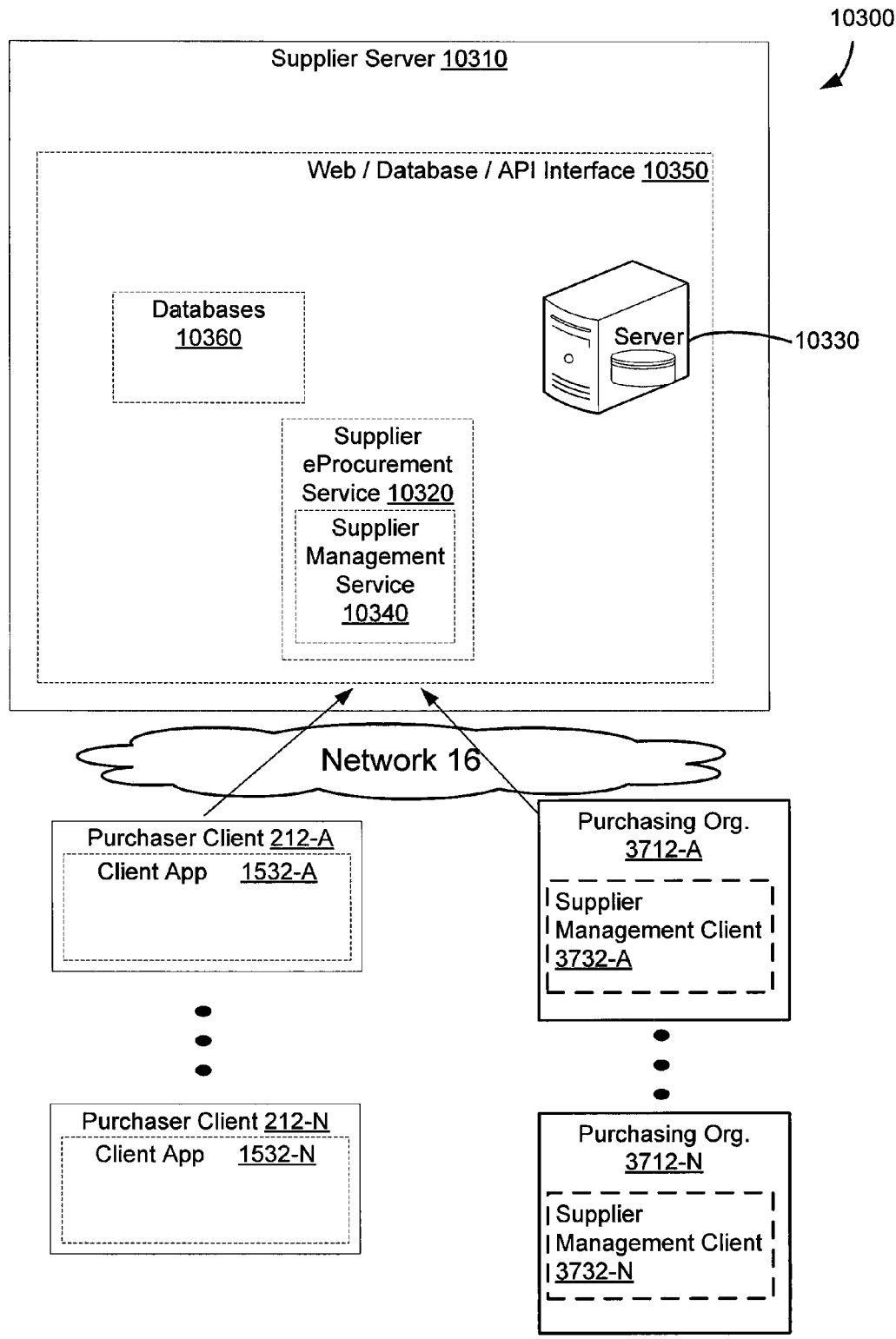
FIG. 60 illustrates an electronic procurement system, with supplier management capability, hosted at a supplier server.

FIG. 60 illustrates a system 10300 hosted at a supplier server 10310, which interacts over a network 16 with a plurality of purchaser clients 212, both as described earlier. The purchaser clients run client applications 1532. This application may include a web-browser interface or a stand alone application, for accessing the supplier electronic procurement service 10320, supplier management service 10340, and server 10330. The server 10330 may provide a web/database/API interface 10350 as described earlier. The electronic procurement provider 10320 hosts a plurality of databases 10360, including databases 2200 as described earlier.

Figure 61:
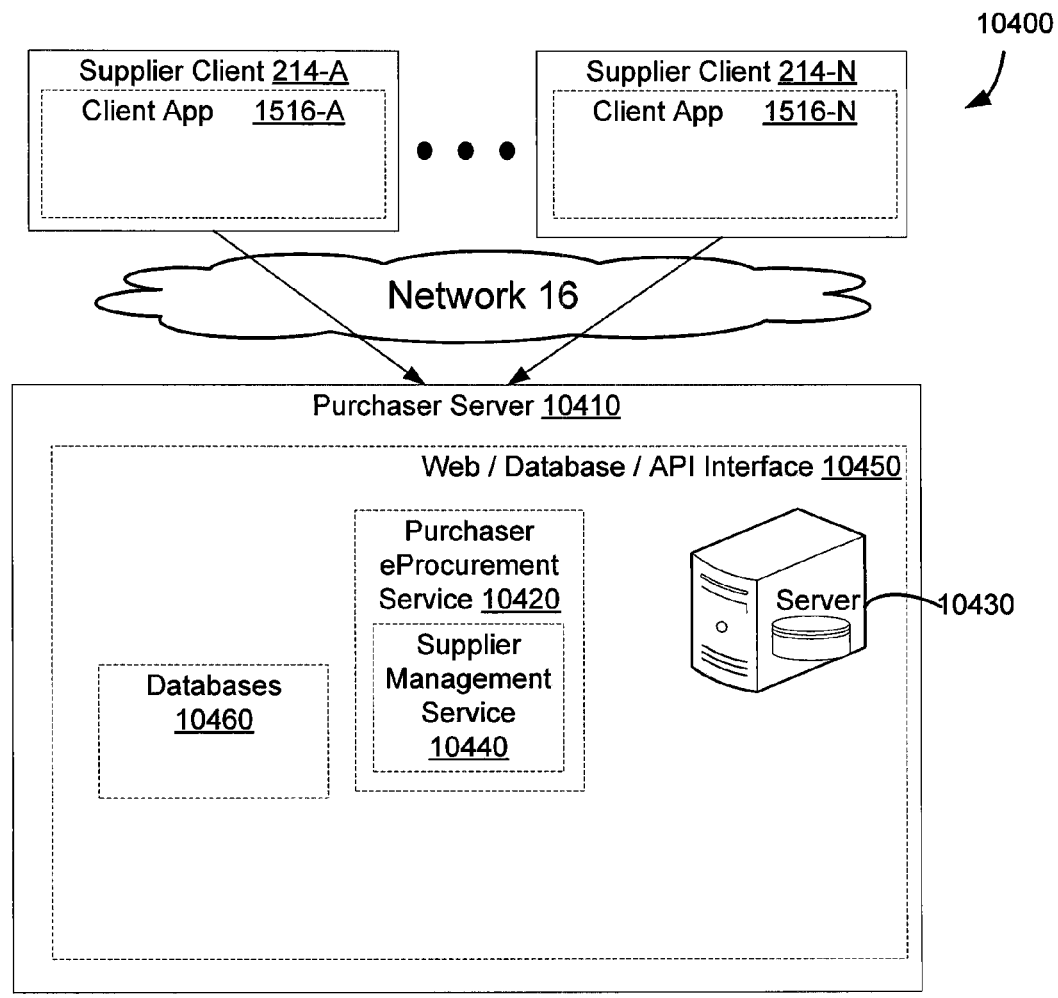
FIG. 61 illustrates an electronic procurement system, with supplier management capability, hosted at a purchaser server.

FIG. 61 illustrates a system 10400 hosted at a purchaser server 10410, which interacts over a network 16 with a plurality of supplier clients 214, both as described earlier. The supplier clients run client applications 1516. This application may include a web-browser interface or a stand alone application, for accessing the purchaser electronic procurement service 10420, supplier management service 10440, and server 10430. The server 10430 may provide a web/database/API interface 10450 as described earlier. The electronic procurement provider 10420 hosts a plurality of databases 10460, including databases 2200 as described earlier.

In some embodiments, the electronic procurement system 20 is a single instance multi-tenant system. In some embodiments the electronic procurement system 20 is a web-based system.

In some embodiments the electronic procurement system 20 is located independently from suppliers and purchasers of the electronic procurement system. In some embodiments the electronic procurement system 20 is located at a supplier of the electronic procurement system. In some embodiments the electronic procurement system 20 is located at a purchaser of the electronic procurement system.

It will be apparent to those skilled in the art that various modifications and variations can be made without departing from the spirit or scope. Thus, it is intended that the exemplary embodiments cover modifications and variations provided they come within the scope of the appended claims and their equivalents.

I claim:

1. A computer-implemented method, comprising:
    at an electronic procurement system:
        receiving a request for access from a supplier user;
        granting access to the electronic procurement system;
        receiving supplier data;
        storing the received supplier data to one or more databases;
        receiving a designation of a subset of the supplier data as protected supplier data;

receiving a supplier user's selection of one or more buyer organization's supplier management systems to receive the supplier data;

mapping the supplier data to one or more data schema of the one or more buyer organization's supplier management system, wherein a respective data schema of one of the respective buyer organizations describes an internal data model of the respective buyer organization; and transmitting the supplier data to the one or more supplier management systems.

2. The computer-implemented method of claim 1, wherein transmitting further comprises the step of:

simulating user interface events at the one or more supplier management systems.

3. The computer-implemented method of claim 1, further comprising:

updating automatically the supplier management systems with additional supplier data.

4. The computer-implemented method of claim 1, further comprising:

receiving additional supplier data at the electronic procurement system; and updating automatically the supplier management systems with the additional supplier data.

5. The computer-implemented method of claim 1, further comprising:

receiving additional supplier data at the electronic procurement system;

mapping the additional supplier data to the one or more data schema of the supplier management systems; and updating automatically the supplier management systems with the additional mapped supplier data.

6. The computer-implemented method of claim 1, further comprising:

mapping additional supplier data to the one or more data schema of the supplier management systems; and updating automatically the supplier management systems with the additional mapped supplier data.

7. A system, comprising:

one or more computer processors; and one or more memory connected to the one or more computer processors, wherein the one or more memory is configured with instructions to cause the one or more computer processors to:

at an electronic procurement system:

receive a request for access from a supplier user;

grant access to the electronic procurement system;

receive supplier data;

store the received supplier data to one or more databases;

receive a designation of a subset of the supplier data as protected supplier data;

receive a supplier user's selection of one or more buyer organization's supplier management systems to receive the supplier data;

map the supplier data to one or more data schema of the one or more buyer organization's supplier management system, wherein a respective data schema of one of the respective buyer organizations describes an internal data model of the respective buyer organization; and transmit the supplier data to the one or more supplier management systems.

8. The system of claim 7, further comprises the instruction to simulate user interface events at the one or more supplier management systems.

9. The system of claim 7, further comprising the instruction to:

update automatically the supplier management systems with additional supplier data.

10. The system of claim 7, further comprising the instructions to:

receive additional supplier data at the electronic procurement system; and update automatically the supplier management systems with the additional supplier data.

11. The system of claim 7, further comprising the instructions to:

receive additional supplier data at the electronic procurement system;

map the additional supplier data to the one or more data schema of the supplier management systems; and update automatically the supplier management systems with the additional mapped supplier data.

12. The system of claim 7, further comprising the instructions to:

map additional supplier data to the one or more data schema of the supplier management systems; and update automatically the supplier management systems with the additional mapped supplier data.

13. A non-transitory computer readable storage medium storing one or more programs configured for execution by a computer, the one or more programs when executed cause the computer to perform the following steps:

at an electronic procurement system:

receive a request for access from a supplier user;

grant access to the electronic procurement system;

receive supplier data;

store the received supplier data to one or more databases;

receive a designation of a subset of the supplier data as protected supplier data;

receive a supplier user's selection of one or more buyer organization's supplier management systems to receive the supplier data;

map the supplier data to one or more data schema of the one or more buyer organization's supplier management system, wherein a respective data schema of one of the respective buyer organizations describes an internal data model of the respective buyer organization; and transmit the supplier data to the one or more supplier management systems.

\* \* \* \* \*